US008010993B1

(12) United States Patent
Bartholomay et al.

(10) Patent No.: US 8,010,993 B1
(45) Date of Patent: Aug. 30, 2011

(54) DEVICES, SYSTEMS, AND METHODS FOR ENABLING RECONFIGURATION OF SERVICES SUPPORTED BY A NETWORK OF DEVICES

(75) Inventors: William G. Bartholomay, Orange, CT (US); Sin-Min Chang, Shelton, CT (US); Santanu Das, Monroe, CT (US); Arun Sengupta, Fairfield, CT (US); Suvhasis Mukhopadhyay, Shrewsbury, MA (US)

(73) Assignee: Domanicom Corp., Newton, MA (US)

( * ) Notice: Subject to any disclaimer, the term of this patent is extended or adjusted under 35 U.S.C. 154(b) by 0 days.

(21) Appl. No.: 12/953,602

(22) Filed: Nov. 24, 2010

Related U.S. Application Data

(63) Continuation-in-part of application No. 12/892,903, filed on Sep. 28, 2010, which is a continuation-in-part of application No. 12/871,854, filed on Aug. 30, 2010, which is a continuation-in-part of application No. 12/853,146, filed on Aug. 9, 2010, which is a continuation-in-part of application No. 12/835,963, filed on Jul. 14, 2010.

(60) Provisional application No. 61/364,165, filed on Jul. 14, 2010.

(51) Int. Cl.
 *G06F 17/00* (2006.01)
(52) U.S. Cl. .......................................................... 726/1
(58) Field of Classification Search ........................ None
 See application file for complete search history.

(56) References Cited

U.S. PATENT DOCUMENTS

| 6,930,598 | B2 | 8/2005 | Weiss | |
|---|---|---|---|---|
| 2004/0128670 | A1* | 7/2004 | Robinson et al. | 718/1 |
| 2008/0165789 | A1 | 7/2008 | Ansari et al. | |
| 2008/0168523 | A1 | 7/2008 | Ansari et al. | |
| 2008/0189774 | A1 | 8/2008 | Ansari et al. | |
| 2008/0235757 | A1* | 9/2008 | Li | 726/1 |
| 2009/0037382 | A1 | 2/2009 | Ansari et al. | |
| 2009/0083829 | A1* | 3/2009 | Peterson | 726/1 |
| 2009/0125974 | A1* | 5/2009 | Zhang et al. | 726/1 |
| 2009/0199177 | A1* | 8/2009 | Edwards et al. | 718/1 |
| 2009/0222880 | A1* | 9/2009 | Mayer et al. | 726/1 |
| 2009/0249438 | A1* | 10/2009 | Litvin et al. | 726/1 |
| 2009/0276773 | A1* | 11/2009 | Brown et al. | 718/1 |
| 2010/0071053 | A1 | 3/2010 | Ansari et al. | |

OTHER PUBLICATIONS

Market Overview Consumer http://www.openpeak.com/MarketOverview.php.
Market Overview Enterprise http://www.openpeak.com/MarketOverview.php.

(Continued)

*Primary Examiner* — David Pearson
(74) *Attorney, Agent, or Firm* — Atanu Das; DaVinci IP

(57) ABSTRACT

Systems, devices, and methods are disclosed for enabling the reconfiguration of services supported by a network of devices. Such reconfiguration can be realized dynamically and in real time without compromising the security of the overall system from external threats or internal malfunctions. These systems, devices and methods may provide a first functional stack supporting a previous version of a specific service and the provisioning of a second functional stack dynamically and in real-time that supports an updated version of the specific service. In addition, an administration function may be included in the embodiment such that the administration function manages and controls the functional stacks and network operations. Using these mechanisms, an existing service can be changed dynamically or a new service can be added dynamically in a secure manner without interruption of other existing services.

20 Claims, 64 Drawing Sheets

OTHER PUBLICATIONS

Open Services Overview http://www.openpeak.com/OpenServices.php.

Open Services Features http://www.openpeak.com/OpenServices.php.

Set-top Integration Overview http://www.openpeak.com/Set-topIntegration.php.

Set-top Integration Features http://www.openpeak.com/Set-topIntegration.php.

* cited by examiner

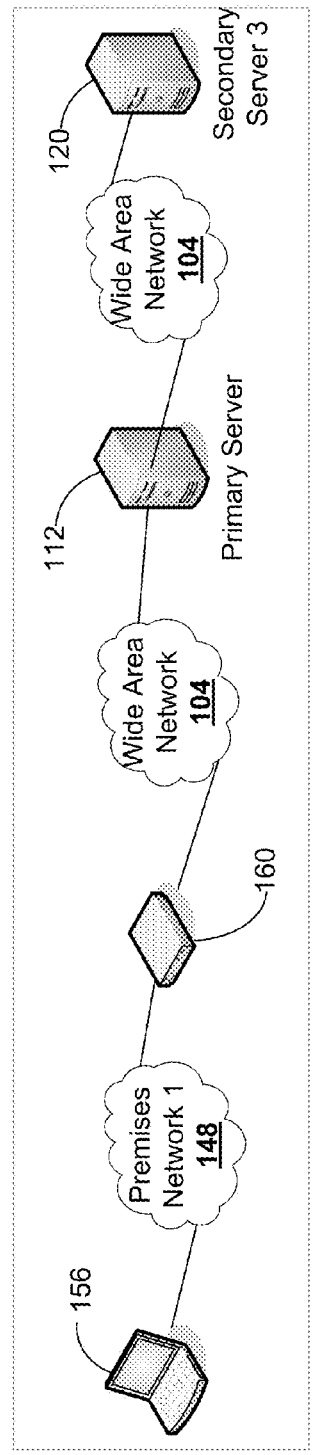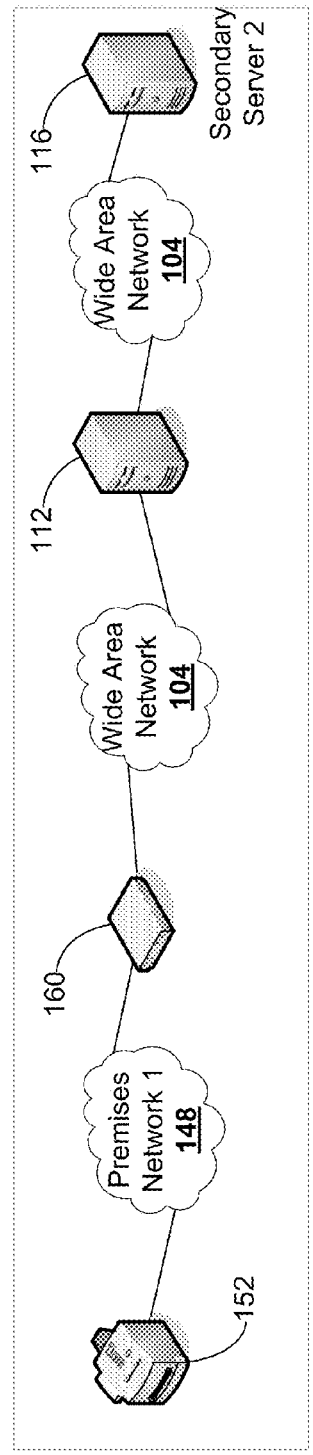
Figure 1D

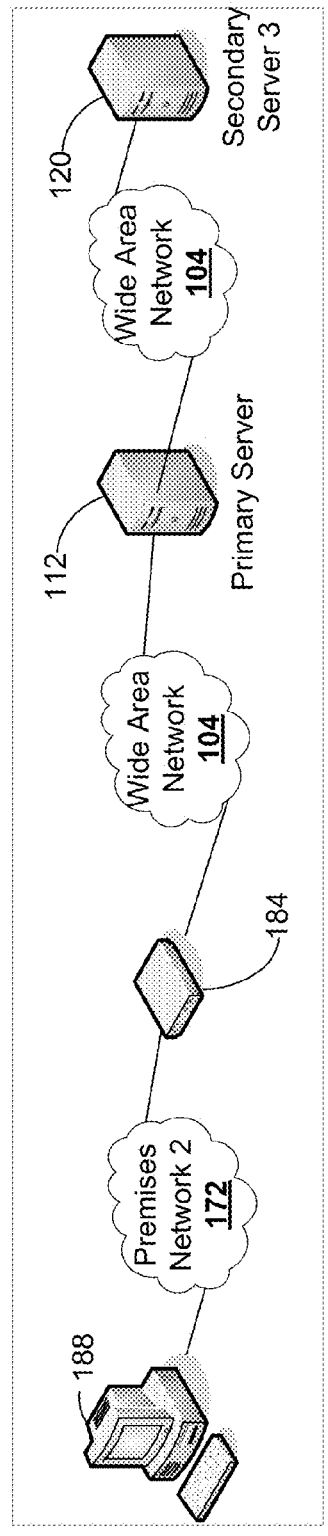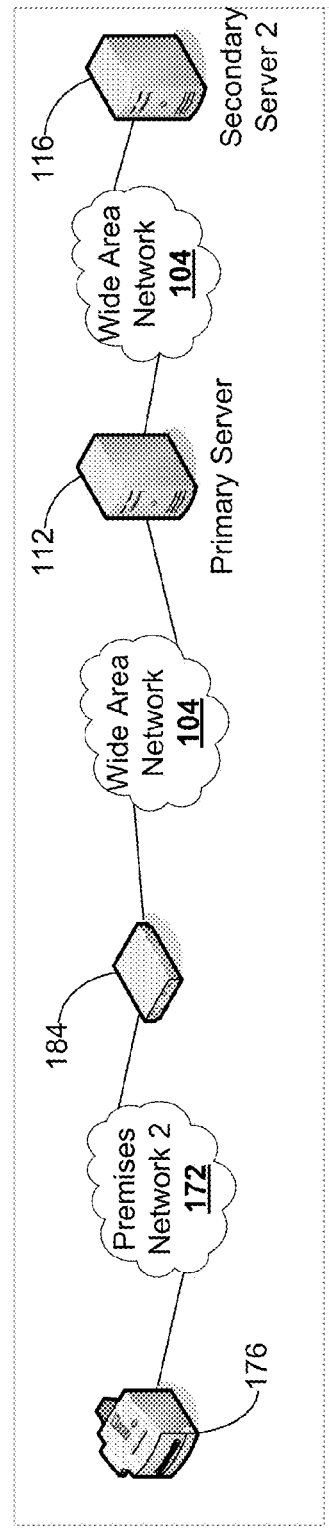
Figure 1E

- Premises Security (Newly Provision) VM#(n+4) 3661 | Sec+Data Mining 3645 | OS#z 3629
- Energy Management VM#(n+3) 3659 | Sec+Data Mining 3643 | OS#z 3627
- Video/Image Processing Graphic Processing Display Buffer Management VM#(n+1) 3656 | Sec+Data Mining 3640 | OS#y 3624
- Video VM#n 3654 | Sec+Data Mining 3638 | OS#x 3622
- Social Networking & Regular Internet VM#(n-1) 3652 | Sec+Data Mining 3636 | OS#w 3620
- Third-Party & Other Apps. VM#(n-2) 3650 | Sec+Data Mining 3634 | OS#v 3618
- 3660
- E-commerce VM#3 3548 | Sec+Data Mining 3632 | OS#1 3616
- Banking VM#2 3646 | Sec+Data Mining 3630 | OS#i 3614
- Administration VM 3644
- GateWay + Basic Setup + Storage VM#1 3642 | Analytics Data Mining 3628 / Security 3626 | OS#1 3612

Common Security (Virtual Machine Monitoring) 3610
Virtualizer 3606
Device Operating System (Common Kernel) 3604
Drivers for Accessing Hardware Resources (processors, I/O resources, storage devices, display) 3602
Privilege Descriptors 3608

3600

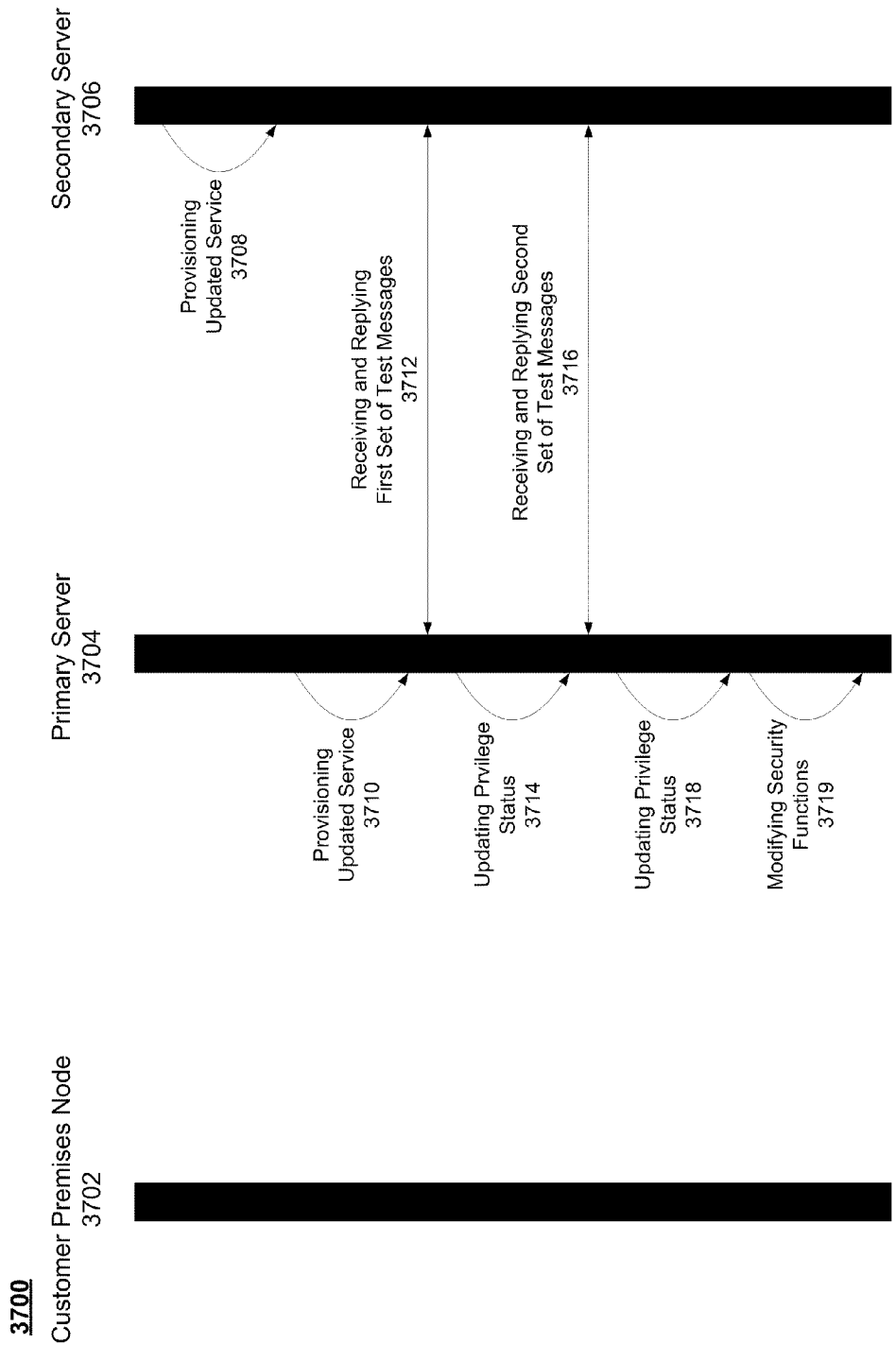

DEVICES, SYSTEMS, AND METHODS FOR ENABLING RECONFIGURATION OF SERVICES SUPPORTED BY A NETWORK OF DEVICES

CROSS-REFERENCE TO RELATED APPLICATIONS

The present application claims priority under the laws and rules of the United States, including 35 USC §120, to U.S. patent application Ser. No. 12/892,903 filed on Sep. 28, 2010. Further, U.S. patent application Ser. No. 12/892,903 filed on Sep. 28, 2010 claims priority under the laws and rules of the United States, including 35 USC §120, to U.S. patent application Ser. No. 12/871,854 filed on Aug. 30, 2010. Further, U.S. patent application Ser. No. 12/871,854 filed on Aug. 30, 2010 claims priority under the laws and rules of the United States, including 35 USC §120, to U.S. patent application Ser. No. 12/853,146 filed on Aug. 9, 2010. Further, U.S. patent application Ser. No. 12/853,146 filed on Aug. 9, 2010 claims priority under the laws and rules of the United States, including 35 USC §120, to U.S. patent application Ser. No. 12/835,963 filed on Jul. 14, 2010 and claims priority under the laws and rules of the United States, including 35 USC §120, to U.S. Provisional Patent Application No. 61/364,165 filed on Jul. 14, 2010. The contents of U.S. patent application Ser. No. 12/835,963, U.S. Provisional Patent Application No. 61/364,165, U.S. patent application Ser. No. 12/853,146, U.S. patent application Ser. No. 12/871,854, and U.S. patent application Ser. No. 12/892,903 are herein incorporated by reference.

BACKGROUND

An individual using a computer, smartphone, or gaming system may subscribe to multiple services from across the Internet to enhance the individual's quality of life or increase efficiency in work. Examples of such services may include controlling banking and financial activity, conducting e-commerce, managing premise security and energy consumption, Internet gaming as well as other services. Alternatively, businesses using computers and other electronic equipment may also subscribe to multiple services from across the Internet including managing business content, controlling financial transactions, office security, energy consumption as well as other services. Many of these services may require the consumer (e.g. an individual at home or an employee of a business) to initiate a virtual network between a terminal network device having client service software application and a service provider server which controls and manages the virtual network. Thus, the terminal network device and the service provider server must maintain the service virtual network. Such a scheme of generating a service virtual network may be inefficient in using network resources as well as expensive in both time and cost to implement such virtual network management and control features into each terminal network device or each service provider server.

In addition, terminal devices such as computers, set-top boxes, and gaming systems may be able to provide user behavioral information, analytical information as well as other service data to primary and secondary service providers such as Cable TV operators, e-commerce providers, and gaming providers. However, traditional network architectures may have limited or may not be capable of providing such data to the service providers in an efficient and secure fashion. Further, traditional network architectures do not incorporate ways to analyze and process such user behavioral and analytical information to provide cross-service functions across a wide array of services. Also, due to lack of analyzing and processing such user behavioral and analytical information, business processes and revenue streams cannot be realized for providing additional services based on providing, analyzing, and processing the user behavioral and analytical information.

SUMMARY

An individual or a family at home is increasingly facing needs to subscribe to multiple services from service providers to enhance the individual's (or family's) quality of life, increase efficiency of work or enjoy enhanced safety or security. Business entities are also experiencing similar needs. Examples of such services may include conducting banking transactions, engaging in e-commerce, managing premises security, controlling energy consumption, gaming etc. The individuals at home or in business generally use a computer, a Smart phone, gaming system or any other electronic equipment to access the services or control the proper usage of such services. The service providers in many instances may need access to resources at home or business premises in order that they may provide services. For instance, in providing energy management services, access to energy consuming elements such as home appliances may be needed. To obtain access to resources on the premises, a terminal or end point device may need to be installed at the premises and the terminal device (end point device) may need a tethered or non-tethered connection to the controlled appliances. Note, terminal devices and end point devices may be used interchangeable throughout this disclosure. Different functions in the terminal device may be accessible by different service providers in a seamless and secure way. Further, one service provider may not be allowed to interfere with the workings or services of other service providers on the same terminal device. Each service provider may have required access to and control of elements (e.g. appliances, etc. at home) which are in the service provider's domain of access, but not in any other domain. Generally, service providers may deploy a server or server function hosted in a public server or Cloud computer to control functions at the premises that may access the elements at the premises through the terminal device at the premises. Consequently, there may be multiple virtual service networks in operation, each virtual service network comprised of a server controlled or managed by a service provider and a subset of functions in the terminal device, the subset of functions providing access to the elements in the premises which are in the domain of the particular service (e.g. appliances, etc.). The connection between the servers controlled or managed by the service providers and the terminal device may be hard-wired, connected through the Internet or some other communication network that may include, but not limited to, a wireline network, a cable network or a wireless network. The connection between the terminal device at the premises and the elements (e.g. appliances, etc.) in the premises may be hard-wired, indirectly coupled, or coupled through a wireless network using WIFI, Zigbee or other wireless protocols. The present application discloses systems, devices and methods for generating and operating multiple virtual networks which are cost-effective, easy to administer and expand, and secure from third party interference as well as from cross service domain (cross virtual network) interference.

Traditionally, terminal network devices and/or service provider's servers together form, control, and maintain specific virtual networks for the benefit of a community which requires access to a communication network for business or entertainment. Providing, generating and maintaining simultaneous multiple networks for multiple services may encompass the same set of clients (terminal or end point devices) such that different service providers may provide different services to the clients. Traditional implementation paradigms may be inefficient and expensive in providing, generating and maintaining simultaneous multiple networks for multiple services. The present application discloses systems, devices, and methods for providing multiple virtual networks for multiple services while maintaining or enhancing the level of security that traditional individual networks currently provide. The disclosed systems, devices, and methods generate such multiple secure virtual networks for providing different services controlled by different service providers by using intermediate network nodes which generate, control, and maintain virtual service networks for individual and business consumers. The intermediate nodes may be customer premises equipment or a server of a primary service provider (e.g. cable television or telephone service provider). The intermediate nodes may be controlled by the primary service provider and the intermediate nodes may ensure that other service providers have access to network resources controlled by the primary service provider in a specified and secure manner for the benefit of the end user community. While maintaining these multitudes of virtual service networks, the intermediate network nodes may inspect received data packets of different services and collect data and other information (e.g. time of day, etc.) from the received data packets. Consequently, the intermediate nodes may process the collected data to ensure and maintain segregation between services, increase security from third party intrusion into the virtual service networks, generate additional robust service features by analyzing data across different services, and may provide consumer behavioral data to enhance e-commerce activities including advertising if the user permits. Service segregation provides not only the ability of service providers to operate in separate domains, but also enables sharing of common facilities for regulated and non regulated services. In addition to the above-mentioned benefits, having virtual network management and control for multiple services implemented by intermediate nodes in a network such as several primary servers (e.g. primary service provider server) or several customer premises equipment, has the further advantages of having the virtual network management and control mechanism residing in only a few intermediate nodes rather than a comparatively larger number of terminal network devices (e.g. end point devices) and service providers servers (e.g. secondary servers).

One or more business processes are described that may utilizes systems, devices, and methods described herein for providing multiple services to premises over communication networks. Secondary service providers, whose services and systems (e.g. servers, etc.) may be layered on top of, or otherwise integrated into such previously mentioned systems, devices, and methods, may take advantage of not only a lower cost and more secure infrastructure for providing their specific service but also can take advantage of the trusted relationship that exists between the consumers and the primary service provider that controls the infrastructure. The business processes resulting from such an underlying architecture of systems, devices, and methods, provides an incentive for both the primary service provider and the one or more secondary service providers to cooperate in a mutually beneficial relationship. The cooperation may involve sharing information between participating service providers (primary as well as secondary) such that each service provider can gain a wider scope of information to better serve end users than would be only possible if each service provider had its own infrastructure.

For the increased benefit of the end user, information shared among the service providers may need to be shared as well with a system manufacturer whose systems, devices, and methods may be used in an architecture that allows the service providers to share the same infrastructure to provide various services. The system manufacturer can continuously improve the performance and the cost of the systems, devices, and methods, based on the availability of such information. Thus, expanding the domain of cooperation among the service providers to include the system manufacturer benefits the end user who as a result may experience better services from the service providers. Therefore, the architecture engenders a cooperative behavior.

Further, because the shared information contains some pertinent and some less useful data, the system manufacturer may need to provide and continuously enhance data mining and analytic functions and algorithms (that may include fuzzy algorithms) so that the shared information benefits the end user through improved performance of each of the services. For example, an alarm monitoring service that shares the system with an energy management service can provide a persistent door open status to the energy management service so that the end user can be alerted that energy is being wasted. Likewise, the energy management service can indicate high energy consumption at an odd hour to the alarm monitoring service that might indicate a failure of a heating device that could lead to a fire. However, the energy management service may not want to use information from exterior motion detectors as these may not be meaningful with regard to energy consumption. Since such actions may be performed in real time, the end user would benefit from the above mentioned example by not wasting energy and by turning off the offending appliance before a fire starts. Such service enhancement would not be possible without information sharing unless each service provider were to duplicate the sensors and controls of the other service providers and support their own algorithms.

Based upon such systems, devices, and methods for providing multiple services to premises over communication networks and that the architecture may engender a cooperative behavior among the service providers along with the system manufacturer, a business model (e.g. one or more business processes) may be provided that incentivizes and compensates participating parties. The primary service provider may be compensated for providing the communications infrastructure to each of the secondary service providers which is typically based on each secondary service's use of the communications infrastructure. Thus, compensation can come in the form of revenue sharing from each of the service providers based on their monthly or annual subscription fees as well as additional revenues that the each service provider obtains from advertising, e-commerce, etc. Further, the compensation to the system manufacturer may be a portion of such revenue from the primary service provider based upon the analytical data that is generated by the systems, devices, and methods and may thus continuously improved upon for the purpose of further enhancing the end user experience. The above-mentioned business processes can co-exist with the usual license fee and annual maintenance fee used for most products.

In addition, the present disclosure describes systems, devices and methods that facilitate access to and use of a plurality of services from a home or business by combining video and other data outputs from a set top box or satellite receiver with the output of a cable or xDSL modem (home LAN) plus other sources of information via WiFi, Bluetooth, and other wireless or wired sources to drive display components (e.g. TV receivers) and other functions for display and interaction. Such systems, devices and methods may be controlled through a controller similar to a TV remote controller or wireless keyboard/mouse combination. In addition, control can be facilitated by a smart phone application which is connected either wirelessly via the Internet through the cable or xDSL modem to the systems, devices, and methods or wirelessly via WiFi using the local area network.

Further, the systems, devices, and methods may enhance and add to the video data services and other services provided by Cable TV service providers, Telephone Companies and other service providers. In addition, the systems, devices, and methods allow satellite based video service providers to attain the same level of functions and features as Cable TV service providers and Telephone Companies supplied Video services. The features of the systems, devices, and methods can be enhanced when a Secure Access Node and Secure Access Server and Software Platform are connected to the Service Multiplexer either via Ethernet or WiFi through the inclusion of information and status of the Secure Access Node's functions and features (e.g. Secure Access Node status/control panel or Secure Access node connected surveillance cameras) as shown in the present disclosure.

Novel aspects of one or more embodiments may include, but are not limited to, providing a novel security and operating system architecture for delivering a plurality of services to consumers as may be described in the following exemplary embodiment. Such an embodiment may include a device that includes one or more processors coupled to one or more storage devices. The device may further include one or more software applications stored in the one or more storage devices and executed by the one or more processors. The one or more software applications may implement a common security function for the device as well as a device operating system. In addition, the one or more software applications may receive input commands via a control interface to generate and configure one or more virtual machines on the device. Input commands may be provided using a remote control device, similar to a television remote control but with additional or different features and functions. Further, the device may have Internet access such that it may receive input commands via the Internet. Such input commands may be provided by a user through a configuration website pertinent to the device, through a remote controller, or some other type of input device. Consequently, one or more control interfaces may be an interface between the remote control or via a website on the Internet.

Each virtual machine may have several components including a data mining and analytics processing engine, service security functions, and a service operating system. The service security functions and the service operating system are separate and distinct from the common security functions and the device operating system respectively. Such a novel architecture provides several benefits that include segregation of each service in a virtual machine thereby allowing the device to provide pertinent security functions, pertinent operating system and pertinent application software to each service optimizing the service and device capabilities. This particular service segregation capability allows inclusion of targeted security features tailored to particular service applications. The device architecture and implementation include the ability to reconfigure the virtual machines not only to provide a vast array of services currently available but also to support future, unforeseen services, further, improving the scalability and flexibility of the device.

Within the embodiments described below, an exemplary device for multiplexing one or more services may include one or more communication interfaces, one or more processors, one or more storage devices coupled to the one or more processors, and one or more software applications stored in the one or more storage devices and executed by the one or more processors. The exemplary device further includes one or more virtual machines generated and configured by one or more software applications executed by the one or more processors and stored in the one or more storage devices, each of the one or more virtual machines: (i) supports a service; (ii) provides a service operating system; (iii) provides a set of service application functions for the service (iv) provides one or more application security functions for the service application functions; (v) analyzes a set of service data using the application security functions to provide service security (vi) generates application security data based on analyzing the set of service data; (vii) provides an administration function for each virtual machine that allows monitoring the application security data (viii) provides an application alerting mechanism that reports application security trigger events based on the application security data.

In addition, the exemplary device includes a common layer generated and configured by one or more software applications executed by the one or more processors and stored in the one or more storage devices, the common layer (i) provides a common operating system; (ii) provides common security functions that includes common information gathering and dissemination functions; (iii) provides an alert function that receives one or more trigger events from one or more alerting mechanisms of each virtual machine; (iv) provides a messaging function that allows one or more messages to be transmitted or received between the one or more virtual machines; (v) processes one or more trigger events received from the one or more alerting mechanisms of each virtual machine and generates a common alert function for the common security functions.

Further, each of the one or more virtual machines using the one or more software applications: (i) provides one or more data sub-layers that collects and analyzes a set of protocol data that includes protocol information; (ii) generates protocol security data based on the protocol data; (iii) transmits the protocol security data to the common security functions using the administration function for each virtual machine allowing monitoring of the protocol security; (iv) provides a set of protocol alerting mechanisms that reports one or more protocol security trigger events based on the protocol security data to the one or more data sub-layers and the common security functions using the administration function. The protocol and data layers may include but not limited to, the protocols and data layers (including application protocols and application data layers) described in the seven layer stack and other communication stacks known in the art and described in the present disclosure.

In addition, the common security functions transmit common security data to the application security functions to increase service security wherein the common security data includes application security configuration data. Also, the common security functions transmit common security data to the one or more data sub-layers to increase service security wherein the common security data includes protocol security configuration data. Further, the common security functions use a first set of fuzzy logic rules to detect cross-service trigger events between one or more virtual machines.

Moreover, the application security functions use application fuzzy logic rules to detect application security trigger events, and the one or more data sub-layers use protocol fuzzy logic rules to detect protocol security trigger events.

In addition, the exemplary device may provide one or more common alerts generated by the common alert function that are transmitted to the primary server communication interface wherein the primary server communication interface is one of the one or more communication interfaces. Persons of ordinary skill in the art would understand that a communication interface is may be implemented in either software or hardware or a combination thereof on an exemplary device and may be coupled to a communication network. Further the exemplary device may include a common layer that provides a message consistency checking system to determine that the one or more messages are valid and the common layer provides a domain checking system to determine and maintain the domain and memory integrity for each virtual machine.

Traditional dynamic, real-time initialization and reconfiguration of services on telecommunication, data networking or other types of equipment as well as personal computers and smartphones may be implemented but usually at the expense of security. For example, a personal computer or smartphone upon which new applications and system updates can be added at the expense of potential back doors being left open to viruses, worms, Trojan horses, denial of service attacks, etc. Generally, security software may find only known attacks and can prevent such attacks from reoccurring or spreading, but are mostly ineffective against new or unknown attacks. In addition, if an attempt is made to attack the personal computer or smartphone by respecting all security rules on the personal computer or smartphone (e.g. sending a valid email to a non-secure address containing proprietary information or for one service to collect data from another service and communicate it in the guise of the one service's normal communication), current systems (e.g. personal computer, smartphone, etc.) for public use may not guard against such an attack. Aspects of the present disclosure permit new applications and system updates to be performed with better security particularly against new attacks as well as to prevent attempts to extract proprietary data from a system using valid communications.

Further, aspects of the present disclosure provides a number of security measures that are based on users or services that use different functional stacks each implemented on a different virtual machine, thus, preventing cross-stack (e.g. cross-service) interference with each other in ways that could cause a security breach to one of the different stacks. In addition, aspects of the present disclosure may provide a mechanism that permits a functional stack to be added (e.g. newly provisioned) or changed (e.g. updated, reconfigured) within rules developed for existing security mechanisms in a secure way and not permitting potential security 'hole' while doing so. A secure access node or service multiplexer have minimal service awareness, thus, upgrades to such elements may be less frequently required. For example, meter reading software changes for new features and functions will not likely change a secure access node's energy management functional stack as the secure access node mostly executes commands from the server which are most likely not to be affected.

Within the embodiments described below, an exemplary system for enabling reconfiguration of one or more services supported by a network of one or more devices is disclosed. The system may include a communication network and a set of one or more devices coupled to the communication network. The set of devices may include a primary server and each of a set of one or more secondary servers, a set of one or more secure access nodes, and a set of one or more service multiplexers. Each device may have one or more communication interfaces that includes an administrative user interface (at least one of the one or more communication interfaces is coupled to the communication network), one or more processors, one or more storage devices coupled to the one or more processors, and one or more software applications stored in the one or more storage devices and executed by the one or more processors. Further, the devices may include one or more virtual machines generated and configured by one or more software applications executed by the one or more processors and stored in the one or more storage devices, each virtual machine implementing a functional stack with a corresponding operating system, the functional stack supporting one or more services and capable of being reconfigured dynamically in real-time.

In addition, each device may include a common layer generated and configured by one or more software applications executed by the one or more processors and stored in the one or more storage devices, the common layer having a common operating system and common security functions that segregate services supported by each functional stack on each virtual machine and minimize cross-service interference between services supported by each functional stack on each virtual machine during the reconfiguration of one or more functional stacks wherein the common operating system includes a common kernel that receives instructions from one or more software functions on the device and controls hardware resources, wherein the hardware resources include the one or more processors, the one or more storage devices, one or more input/output resources, and one or more display components.

Also, each device may include a gateway virtual machine having a gateway functional stack providing basic network interface functions for the device that includes a gateway operating system, gateway security functions, gateway data mining functions, and set of gateway software applications that support gateway and basic services. Additionally, each device may have an administration function that manages and controls the functional stacks and network operations, and receives and replies to messages from an administration function of other devices through one of the communication interfaces.

Further. each device may include a first virtual machine generated and configured by one or more software applications executed by the one or more processors and stored in the one or more storage devices, a first virtual machine supporting a first functional stack, the first functional stack having a first service operating system, a first set of security functions, a first set of data mining functions, and set of previous version software applications that support a previous version of a first service. In addition, each device may include a second virtual machine generated and configured dynamically in real-time by one or more software applications executed by the one or more processors and stored in the one or more storage devices on the device, the second virtual machine supporting a second functional stack, the second functional stack having a second service operating system, a second set of security functions, a second set of data mining functions, and a set of updated version software applications that support an updated version of the first service. Also, each device may have a common security layer generated and implemented by the common layer, the common security layer including virtual machine monitoring functions, common security functions, fuzzy logic security functions, and an inter-virtual machine communication integrity checking function to segregate services among the one or more functional stacks on the devices and to minimize cross-service interference among services supported by the one or more functional stacks.

The common layer further implements a virtualizer function that manages one or more privilege descriptors and a state of a privilege status of each privilege descriptor, each privilege descriptor and privilege status corresponding to a functional stack. One of the privilege descriptors may be a first privilege descriptor corresponding to a first privilege status of the first functional stack and one of privilege descriptors may be a second privilege descriptor corresponding to a second privilege status of the second functional stack. The first privilege status may be in an active state and the second privilege status may be in an inactive state.

The administration function implemented by the device receives and replies to a first set of test messages from the one or more communication interfaces and the administration function sends a first set of instructions to the virtualizer to modify the first privilege status to an inactive state and the second privilege status to an active state to update the first service based on successful execution of the first set of test messages. Further, the administration function receives and replies to a second set of test messages from the one or more communication interfaces, the administration function sends a second set of instructions to the virtualizer to remove the first functional stack from the device by changing the first privilege status to a null state and returning resources used by the first functional stack to a common pool using the common operating system based on successful execution of the second set of test messages validating the second functional stack. In addition, the common security functions and the fuzzy logic security functions are modified based on the set of updated version software applications that support an update version of the service to provide an updated version of cross-functional security between the updated service and other services supported by the device.

Alternatively, each device may include a newly introduced hardware module and a newly provisioned virtual machine generated and configured dynamically in real-time by one or more software applications executed by the one or more processors and stored in the one or more storage devices on the device, the newly provisioned virtual machine supporting a newly provisioned functional stack, the newly provisioned functional stack having a newly provisioned service operating system, a third set of security functions, a third set of data mining functions, and a set of newly provisioned software applications that support a newly provisioned service. The newly provisioned functional stack has a corresponding third privilege descriptor and a third privilege status initially being in an inactive state. Further, the administration function implemented by the device receives and replies to a third set of test messages from the one or more communication interfaces, the administration function sends a third set of instructions to the virtualizer to modify the third privilege status to an active state based on successful execution of the third set of test messages.

Within the embodiments described below, an exemplary device for enabling reconfiguration of one or more services supported by the device is disclosed. The device includes one or more communication interfaces that includes an administrative user interface (at least one of the communication interfaces is coupled to the communication network), one or more processors, one or more storage devices coupled to the one or more processors, and one or more software applications stored in the one or more storage devices and executed by the one or more processors. Further, the device may include a first virtual machine may be generated and configured by one or more software applications executed by the one or more processors and stored in the one or more storage devices, a first virtual machine supporting a first functional stack, the first functional stack having a first service operating system, a first set of security functions, a first set of data mining functions, and set of previous version software applications that support a previous version of a first service. In addition, a second virtual machine may be generated and configured dynamically and in real-time by one or more software applications executed by the one or more processors and stored in the one or more storage devices, the second virtual machine supporting a second functional stack, the second functional stack having a second service operating system, a second set of security functions, a second set of data mining functions, and a set of updated version software applications that support an updated version of the first service.

The device may also include a common layer generated and configured by one or more software applications executed by the one or more processors and stored in the one or more storage devices, the common layer including (i) a common operating system and a common security layer having virtual machine monitoring functions, common security functions, fuzzy logic security functions, and an inter-virtual machine communication integrity checking function to segregate services among the one or more functional stacks one the network devices and to minimize cross-service interference among services supported by one or more functional stacks; (ii) one or more privilege descriptors, each privilege descriptor having a privilege status, the privilege status of each privilege descriptor having one or more states; and (iii) a virtualizer function that manages the one or more privilege descriptors and the state of the privilege status of each privilege descriptor, each privilege descriptor and privilege status corresponding to a function stack. wherein the common operating system includes a common kernel that receives instructions from one or more software functions on the device and controls hardware resources, wherein the hardware resources include the one or more processors, the one or more storage devices, one or more input/output resources, and one or more display components.

The device may further include a gateway virtual machine having a gateway functional stack providing basic network interface functions for the device that includes a gateway operating system, gateway security functions, gateway data mining functions, and set of gateway software applications that support gateway and basic services. In addition, the device may have an administration function that manages and controls the functional stacks and network operations, and receives and replies to messages from an administration function of other devices through the one or more communication interfaces. The privilege descriptors may include a first privilege descriptor corresponding to a first privilege status of the first functional stack and a second privilege descriptor corresponding to a second privilege status of the second functional stack. The first privilege status may be in an active state and the second privilege status is in may inactive state.

The administration function implemented by the device may receive and reply to a first set of test messages from one of the communication interfaces and the administration function may send a first set of instructions to the virtualizer to modify the first privilege status to an inactive state and the second privilege status to an active state to update the first service based on the successful execution of the first set of test messages. Further, the administration function may receive and reply to a second set of test messages from one of the communication interfaces and the administration function may send a second set of instructions to the virtualizer to remove the first functional stack from the device by changing the privileged status and returning the resources used by the first functional stack to a common pool using the common operating system based on the successful execution of the second set of test messages validating the second functional stack. In addition, the common security functions and the fuzzy logic security functions are modified based on the set of updated version software applications that support an updated version of the service to provide an updated version of cross-functional security between the updated service and other services supported by the device.

Alternatively, the device may further include a newly introduced hardware module and a newly provisioned virtual machine generated and configured dynamically in real-time by one or more software applications executed by the one or more processors and stored in the one or more storage devices on the device, the newly provisioned virtual machine supporting a newly provisioned functional stack, the newly provisioned functional stack having a newly provisioned service operating system, a third set of security functions, a third set of data mining functions, and a set of newly provisioned software applications that support a newly provisioned service. The newly provisioned functional stack has a corresponding third privilege descriptor and a third privilege status initially being in an inactive state. The administration function implemented by the device receives and replies to a third set of test messages from the one of the communication interfaces and may send instructions to the virtualizer to modify the third privilege status to an active state based on successful execution of the third set of test messages.

Within the embodiments described below, an exemplary method for enabling reconfiguration of one or more services supported by a device is disclosed. The method may include providing a first functional stack by a first virtual machine, the first functional stack having a first service operating system, a first set of security functions, a first set of data mining functions, and set of previous version software applications that support a previous version of a first service. Another step in the exemplary method may be providing a second functional stack by a second virtual machine dynamically and in real-time, the second functional stack having a second service operating system, a second set of security functions, a second set of data mining functions, and set of updated version software applications that support an update version of the first service. A further step may be providing a common layer generated and configured by one or more software applications executed by the one or more processors and stored in the one or more storage devices, the common layer including (i) a common operating system and a common security layer having virtual machine monitoring functions, common security functions, fuzzy logic security functions, and an inter-virtual machine communication integrity checking function to segregate services among the one or more functional stacks one the network devices and to minimize cross-service interference among services supported by one or more functional stacks; (ii) one or more privilege descriptors, each privilege descriptor having a privilege status, the privilege status of each privilege descriptor having one or more states, each privilege descriptor and privilege status corresponding to a function stack; and (iii) a virtualizer function that manages the one or more privilege descriptors and the state of the privilege status of each privilege descriptor wherein the common operating system includes a common kernel that receives instructions from one or more software functions on the device and controls hardware resources, wherein the hardware resources include the one or more processors, the one or more storage devices, one or more input/output resources, and one or more display components.

An additional step in the exemplary method may be providing a gateway virtual machine having a gateway functional stack providing basic network interface functions for the device that includes a gateway operating system, gateway security functions, gateway data mining functions, and set of gateway software applications that support gateway and basic services. Another step may be providing an administration function that manages and controls the functional stacks and network operations, and receives and replies to messages from an administration function of other devices through one or more communication interfaces. One of the privilege descriptors may be a first privilege descriptor corresponding to a first privilege status of the first functional stack and one of the privilege descriptors may be a second privilege descriptor corresponding to a second privilege status of the second functional stack. The first privilege status may be in an active state and the second privilege status may be in an inactive state. The first virtual machine, the second virtual machine, the gateway virtual machine, and the administrative function each are coupled to the one or more communication interfaces that includes an administrative user interface wherein at least one of the one or more communication interfaces is coupled to a communication network.

Further steps in the exemplary method may include receiving and replying to a first set of test messages by the administration function on the device from the one or more communication interfaces and providing a first set of instructions from the administration function to the virtualizer to modify first privilege status to an inactive state and the second privilege status to an active state to update the first service based on the successful execution of the first set of test messages. Additional steps may be receiving and replying to a second set of test messages by the administration function from the one or more communication interfaces and providing a second set of instructions from the administration function to the virtualizer to remove the first functional stack from the device and virtualizer modifying the privileged status of the first functional stack based on the successful execution second set of test messages validating the second functional stack as well as returning the resources used by the first functional stack to a common pool using the common operating system. Another step may be modifying the common security functions and the fuzzy logic security functions based on the set of updated version software applications that support an updated version of the service to provide an updated version of cross-functional security between the updated service and other services supported by the device.

Alternatively, other steps in the exemplary method may be provisioning a newly introduced hardware module and providing a newly provisioned virtual machine generated and configured dynamically in real-time by one or more software applications executed by the one or more processors and stored in the one or more storage devices on the device, the newly provisioned virtual machine supporting a newly provisioned functional stack, the newly provisioned functional stack having a newly provisioned service operating system, a third set of security functions, a third set of data mining functions, and set of newly provisioned software applications that support a newly provisioned service. The newly provisioned functional stack has a corresponding third privilege descriptor and a third privilege status initially being in an inactive state.

Further steps may be receiving and replying to a third set of test messages from the one or more communication interfaces and providing instructions from the administration function to the virtualizer to modify the third privilege status to an active state based on successful execution of the third set of test messages.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

FIG. 1B-1E show exemplary network architectures for individual virtual networks;

FIGS. 36A-36D are another exemplary functional block diagrams that shows exemplary functional architecture of a network device;

FIGS. 37A-37F are exemplary transaction diagrams that show example systems, devices and methods for enabling reconfiguration of one or more services supported by a network of one or more devices;

DETAILED DESCRIPTION

Figure 1A:
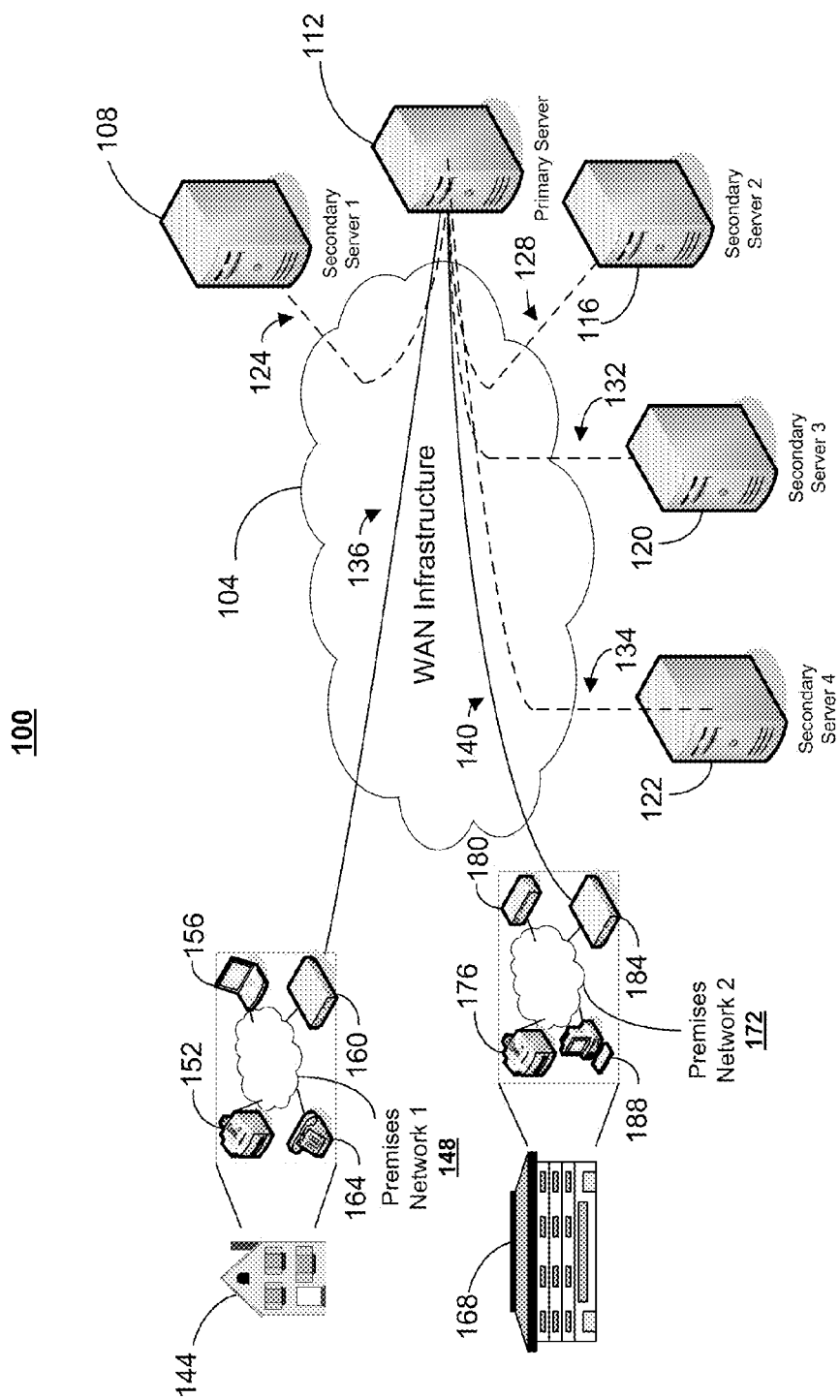
FIG. 1A is an exemplary network architecture providing multiple services to premises over communication networks.

In the following detailed description, reference is made to the accompanying drawings, which for a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the following description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

Traditionally, terminal network devices and/or service provider servers generate, control, and maintain service virtual networks that may be inefficient and expensive. The present application discloses systems, devices, and methods for providing virtual networks for multiple services. Aspects of the disclosed systems, devices, and methods have intermediate network nodes generate, control, and maintain virtual service networks for individual and business consumers. The intermediate nodes may be customer premises equipment or a server of a primary service provider (e.g. Internet Service Provider). Further, while maintaining the virtual service networks, the intermediate network nodes may inspect data packets of different services and collect service application data. Consequently, the intermediate nodes may process the collected data to maintain segregation between services, increase security from third party intrusion into the virtual service networks, generate additional robust service features by analyzing data across different services, and provide consumer behavioral data to enhance user experiences and security on e-commerce activities. In addition, having virtual network management and control for multiple services implemented by intermediate nodes in a network such as several primary server (e.g. primary service provider server) or several customer premises equipment has the further advantages of having the virtual network management and control mechanism residing in only a few intermediate nodes rather than a comparatively larger number of terminal network devices (e.g. end point devices) and service providers servers (e.g. secondary servers).

FIG. 1A shows exemplary network architecture 100 providing multiple services to premises over communication networks. The network architecture 100 may include a wide area network (WAN) infrastructure 104 that provides network connectivity using communications links (124, 128, 132 and 134) between a primary service provider's server (e.g. primary server) 112 and one or more secondary service provider servers (e.g. secondary servers) (108, 116, 120, and 122). A wide area network may be network of nodes or computers whose communication links spans a broad area including crossing metropolitan, regional, national, and continental political and geographic boundaries. Examples of wide area networks may include the Internet, wireless wide area communication networks, metropolitan area network, cellular networks, and WiMAX networks. The Wide Area Network Infrastructure 104 may include network elements or nodes that facilitate network connectivity between terminal network devices and servers (e.g. primary server, secondary servers, etc.) as shown by the network architecture 100 in FIG. 1A. Examples of such network elements or nodes include routers, switches, multiplexers, servers, etc. Communication links between network elements and nodes that are part of the WAN infrastructure such as the communication links (124, 128, 132, and 134) between the secondary servers (108, 116, 120, and 122) and the primary server 112 may incorporate packet switching technology, circuit switching technology, or a combination of both.

In addition to providing network connectivity between the primary server 112 and the secondary servers (108, 116, 120, and 122), the WAN infrastructure 104 provides network connectivity between the primary server and one or more secure access nodes (160 and 184). Although FIG. 1A shows the primary server 112 connected to two secure access nodes (160 and 184), persons of ordinary skill in the art would recognize that the primary server may be connected to additional secure access nodes. As with the other communication links (124, 128, 132, and 134) pictured in FIG. 1A, the communication links (136 and 140) between the secure access nodes (160 and 184) and the primary server 112 may incorporate packet switching technology, circuit switching technology, or a combination of both. Further, the exemplary network 100 shows that secondary servers may communicate to end point devices (152, 156, 164, 176, 180, and 188) (e.g. terminal devices) through the WAN infrastructure 104, the primary server 112, one or more secure access nodes (160 and 184) and one or more premises networks (148 and 172).

Each of the secure access nodes (160 and 184) reside on customer premises. One secure access node 160 resides in a customer premises 144 and another secure access node 184 resides in a business customer premises 168. The home customer premises 144 may include a premises communication network 148 connecting the secure access node 160 to multiple terminal network or end point devices (152, 156, and 164). Alternatively, the business customer premises 168 may include a premises communication network 172 connecting the secure access node 184 to multiple terminal network or end point devices (176, 180, and 188). Further, each of the secure access nodes may have multiple communication interfaces supporting different protocols (e.g. USB, Ethernet, Firewire, Bluetooth, WiFi, etc.). One communication interface on each of the secure access nodes (160 and 184) may be connected to the WAN Infrastructure 104. Another communication interface may be connected to their respective premises networks (148 and 172).

A primary service provider that may own or operate the primary server 112 may be an Internet Service Provider (ISP), for example, or any multi-service operator (MSO) such as a cable television company, a telephone company, or any other company that may also be an ISP. The primary server may provide services to one or more end point devices located on customer premises (144 and 168) over the WAN infrastructure 104. For example, the primary server 112 may provide Internet access, email, network security as well as other types of features or services. An end point device, such as a personal computer 156 may utilize such services. In addition, secondary service providers may own and operate the secondary servers (108, 116, 120, and 122) to provide their respective services. Secondary service providers may provide services such as Voice-over-Internet-Protocol (VoIP), energy management, premises security, electronic security, different types of e-commerce, media streaming and storage, etc. In FIG. 1A, for example, a secondary server 108 may provide energy management services, another secondary server 116 may provide premises security services, a third secondary server 120, may provide e-commerce services, and a fourth secondary server 122 may provide VoIP services to one or more end point devices (152, 156, 164, 176, 180, and 188).

For example, in the exemplary network 100, end point device 152 and end point device 176 may represent customer premises equipment for a premises (home or office) security service provider. The end point devices (152 and 176) may include sensors and alarms that are located throughout the premises (home 144 or office 168) that provide information to the premises server 116. Another example in the network 100 may be that end point device 156 is a home computer and end point device 188 is an enterprise computer. A primary server 112 may be a server owned and operated by an Internet Service Provider (ISP) or MSO and provide the end point device 156 and end point device 188 with a variety of services such as providing Internet access, email, and network security. Further, a secondary server 120 may be provide e-commerce services such as providing an electronic market place for the users of end point devices (156 and 188) to buy and sell goods. An additional example in network 100 may be that end point device 180 may be a premises energy management system and secondary server 108 may be energy management server. End point device 180 may include different sensors that provide the energy management server 120 with energy consumption and other energy management information for different portions of the office 168. A further example may be that end point device 164 is a VoIP telephone and the secondary server 122 is a VoIP server providing voice telephony services (e.g. telephony, caller identification, voicemail, etc.) to the home 144.

Figure 1B:
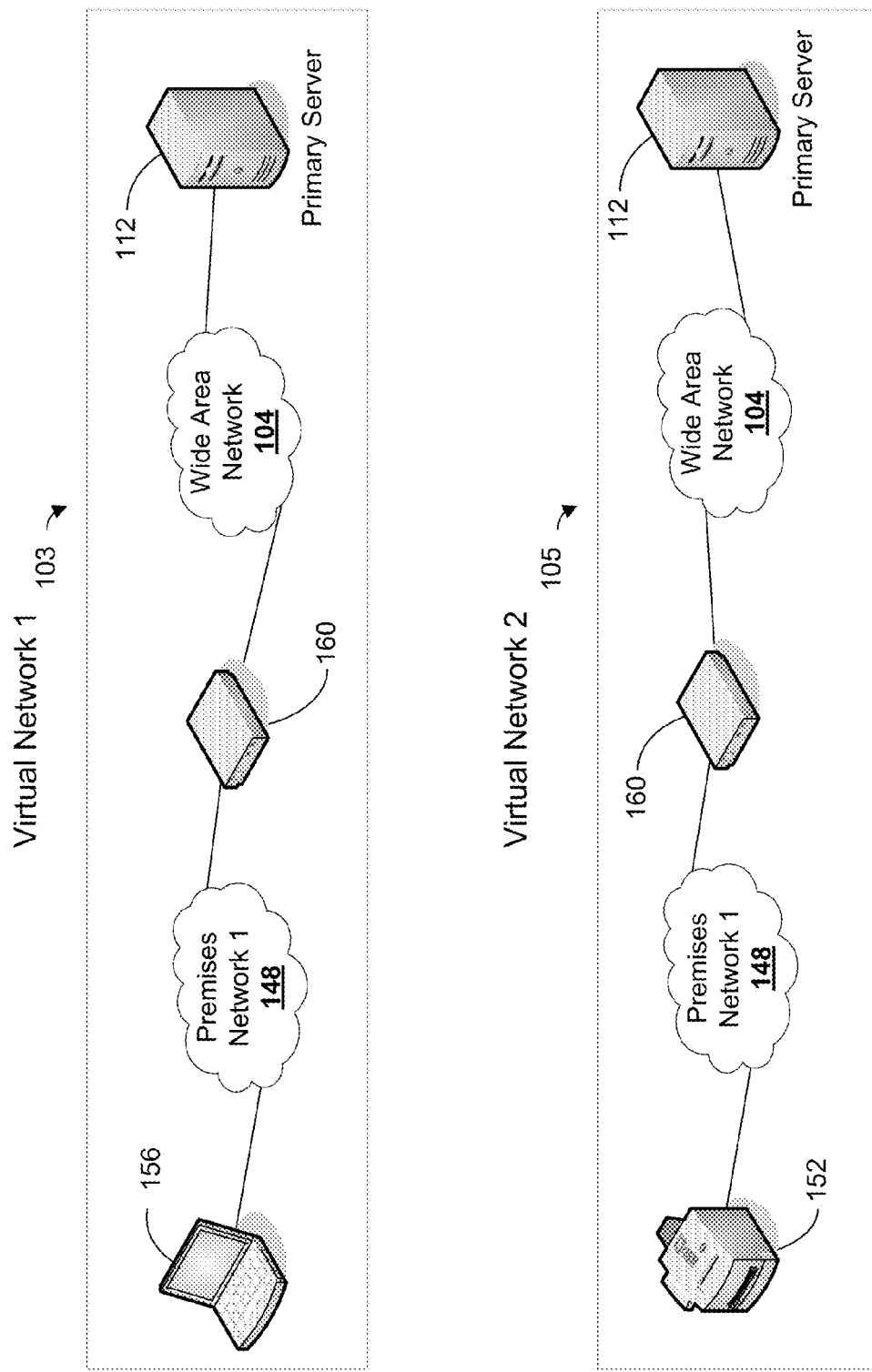

FIG. 1B shows exemplary network architectures 101 for two different individual virtual networks (103 and 105). The network elements and communication networks shown in FIG. 1A are used in illustrating virtual networks (103 and 105) shown in FIG. 1B. A virtual network 103 includes primary server 112, wide area network 104, secure access node 160, premises network 148, and end point device 156. As mentioned in describing FIG. 1A, the primary server 112 may be owned and operated by an Internet Service Provider (ISP) or MSO and provide the end point device 156 with a variety of services such as provide Internet access, email, and network security. The virtual network segregates the services provided by the ISP (e.g. Internet access, email, and network security, etc) from other services received by the end point device 156 such as, for example, e-commerce services from secondary server 120. A software platform residing on the primary server 112 or software and hardware platforms residing on the secure access node 160 may generate and maintain the virtual network 103 and segregates the ISP services from other services provided to the end point device 156.

Further, a virtual network 105 includes primary server 112, wide area network 104, secure access node 160, premises network 148, and end point device 152. The primary server 112 may be owned and operated by an Internet Service Provider (ISP) or MSO. The end point device 152 may be customer premises equipment for a security service provider that may include sensors and alarms located throughout the premises (home 144) that provide information to the premises server 108. In traditional networks, the primary server 112 may not be involved in any of the services provided by the premises security service provider. However, in the virtual network 105, the primary server 112 and/or the secure access node 160 may segregate the premises security service from other services (email, network security, e-commerce, energy management, VoIP, etc.) as a virtual network. A software platform residing on the primary server 112 or software and hardware platforms residing on the secure access node 160 may generate and maintain the virtual network 105 and segregates the premises security services from other services provided to the end point device 152.

Figure 1C:
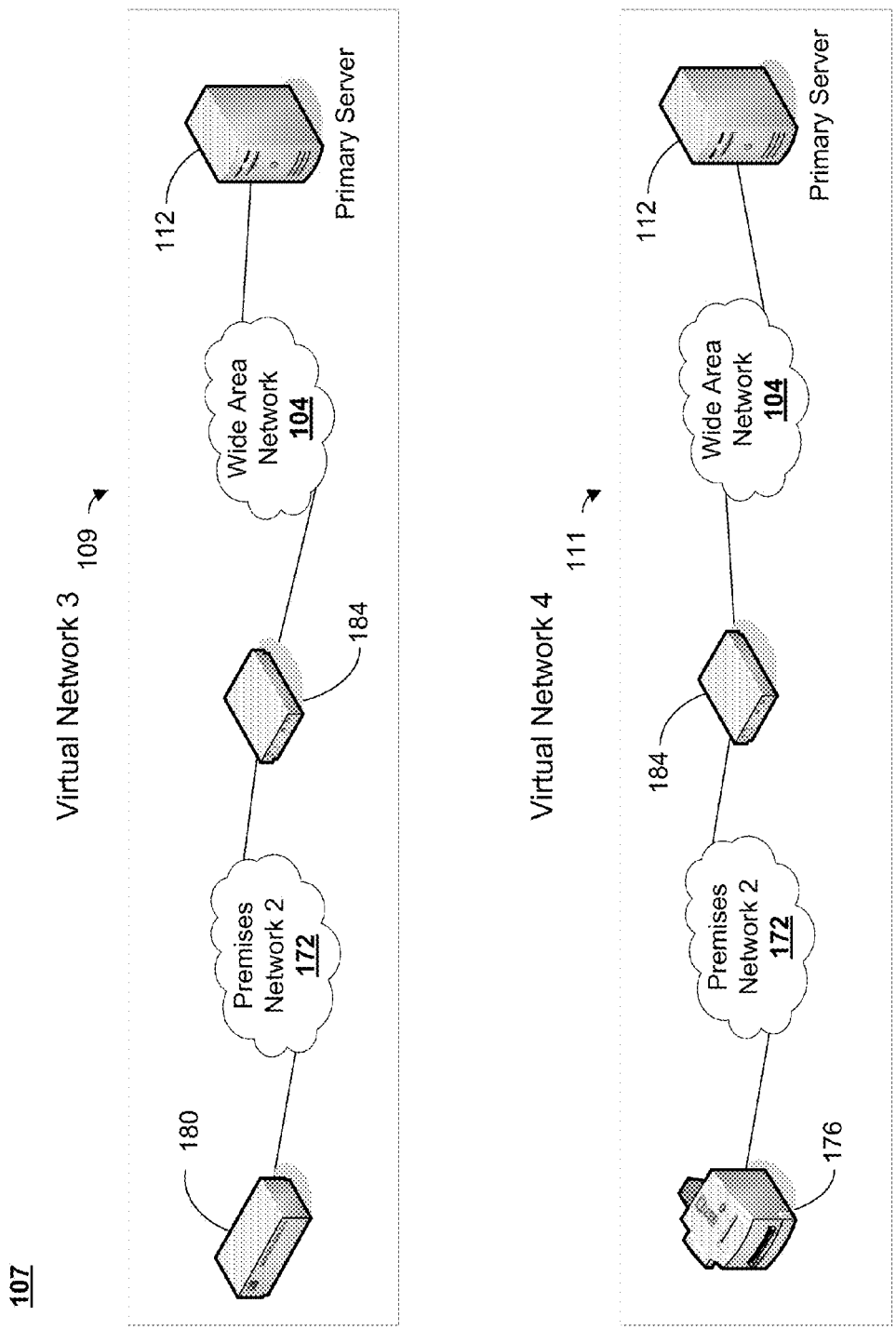

FIG. 1C shows exemplary network architectures 107 for two different individual virtual networks (109 and 111). The network elements and communication networks shown in FIG. 1A are used in illustrating virtual networks (109 and 111) shown in FIG. 1C. A virtual network 109 includes primary server 112, wide area network 104, secure access node 184, premises network 172, and end point device 180. The primary server 112 may be owned and operated by an Internet Service Provider (ISP) or MSO and provide the end point device 180 with a variety of services such as provide Internet access, email, and network security. The virtual network segregates the services provided by the ISP (e.g. Internet access, email, and network security, etc) from other services received by the end point device 180 such as, for example, e-commerce, premises security, and energy management services from a secondary server. A software platform residing on the primary server 112 or a software and hardware platform residing on the secure access node 184 may generate and maintain the virtual network 109 and segregates the ISP services from other services (e.g. energy management services) provided to the end point device 180.

Further, a virtual network 111 includes primary server 112, wide area network 104, secure access node 184, premises network 172, and end point device 176. The primary server 112 may be owned and operated by an Internet Service Provider (ISP) or MSO. The end point device 176 may be customer premises equipment for a premises (home or office) security service provider that may include sensors and alarms located throughout the premises (office 168) that provide information to the premises server 108. In traditional networks, the primary server 112 may not be involved in any of the services provided by the premises security service provider. However, in the virtual network 111, the primary server 112 and/or the secure access node 184 may segregate the premises security service from other services (email, network security, e-commerce, energy management, VoIP, etc.) as a virtual network. A software platform residing on the primary server 112 or software and hardware platforms residing on the secure access node 184 may generate and maintain the virtual network 111 and segregates the premises security services from other services provided to the end point device 176.

FIG. 1D shows exemplary network architectures 113 for two different individual virtual networks (115 and 117). The network elements and communication networks shown in FIG. 1A are used in illustrating virtual networks (115 and 117) shown in FIG. 1D. A virtual network 115 includes primary server 112, wide area network 104, secure access node 160, premises network 148, and end point device 156 as well as secondary server 3 (120). The secondary server 3 (120) may be owned or operated by an e-commerce service provider and may allow an end point device user to buy and sell goods in an electronic marketplace, for example. The primary server 112 may be owned and operated by an Internet Service Provider (ISP) or MSO and provide the end point device 156 with a variety of services such as provide Internet access, email, and network security. However, the virtual network segregates the services provided by the ISP (e.g. Internet access, email, and network security, etc) from other services received by the end point device 156 such as e-commerce services from secondary server 108. A software platform residing on the primary server 112 or software and hardware platforms residing on the secure access node 160 may generate the virtual network 115 and segregates the ISP services from the e-commerce services provided to the end point device 156. In addition, the software platform on the primary server 112 or a software and hardware platform residing on the secure access node 160 may provide additional features to a particular service or across a range of services that are segregated in virtual networks as will be described in the present disclosure.

Further, a virtual network 117 includes primary server 112, wide area network 104, secure access node 160, premises network 148, and end point device 152 as well as secondary server 2 (116). The primary server 112 may be owned and operated by an Internet Service Provider (ISP). The end point device 152 may be customer premises equipment for a premises (home or office) security service provider that may include sensors and alarms located throughout the premises (home 144) that provide information to secondary server 2, the premises security server 116. In a traditional network, the primary server 112 may not be involved in any of the services provided by the premises security service provider. However, in the virtual network 117, the primary server 112 and/or the secure access node 160 may segregate the premises security service from other services (email, network security, e-commerce, energy management, VoIP, etc.) as a virtual network. A software platform residing on the primary server 112 or software and hardware platforms residing on the secure access node 160 may generate and maintain the virtual network 117 and segregates the premises security services from other services provided to the end point device 152. In addition, the software platform on the primary server 112 or a software and hardware platform residing on the secure access node 160 may provide additional features to a particular service or across a range of services that are segregated in virtual networks as will be described in the present disclosure.

FIG. 1E shows exemplary network architectures 119 for two different individual virtual networks (121 and 123). The network elements and communication networks shown in FIG. 1A are used in illustrating virtual networks (121 and 123) shown in FIG. 1E. A virtual network 121 includes primary server 112, wide area network 104, secure access node 184, premises network 172, and end point device 188 as well as secondary server 3 (120), an e-commerce server 120. The primary server 112 may be owned and operated by an Internet Service Provider (ISP) or MSO and provide the end point device 188 with a variety of services such as provide Internet access, email, and network security. The virtual network segregates the services provided by the ISP (e.g. Internet access, email, and network security, etc) from other services received by the end point device 188 such as, for example, e-commerce services from secondary server 120. A software platform residing on the primary server 112 or software and hardware platforms residing on the secure access node 184 may generate and maintain the virtual network 121 and segregates the ISP services from e-commerce services as well as the other services provided to the end point device 188. In addition, the software platform on the primary server 112 or a software and hardware platform residing on the secure access node 184 may provide additional features to a particular service or across a range of services that are segregated in virtual networks as will be described in the present disclosure.

Further, a virtual network 123 includes primary server 112, wide area network 104, secure access node 184, premises network 172, and end point device 176 as well as secondary server 2 (116). The primary server 112 may be owned and operated by an Internet Service Provider (ISP) or MSO. The end point device 176 may be customer premises equipment for a security service provider that may include sensors and alarms located throughout the premises (office 168) that provide information to the premises server 116. In traditional networks, the primary server 112 may not be involved in any of the services provided by the premises security service provider. However, in the virtual network 123, the primary server 112 and/or the secure access node 184 may segregate the premises security service from other services (email, network security, e-commerce, energy management, VoIP, etc.) as a virtual network. A software platform residing on the primary server 112 or software and hardware platforms residing on the secure access node 184 generate the virtual network 123 and segregates the premises security services from other services provided to the end point device 176. In addition, the software platform on the primary server 112 or a software and hardware platform residing on the secure access node 184 may provide additional features to a particular service or across a range of services that are segregated in virtual networks as will be described in the present disclosure.

Figure 2:
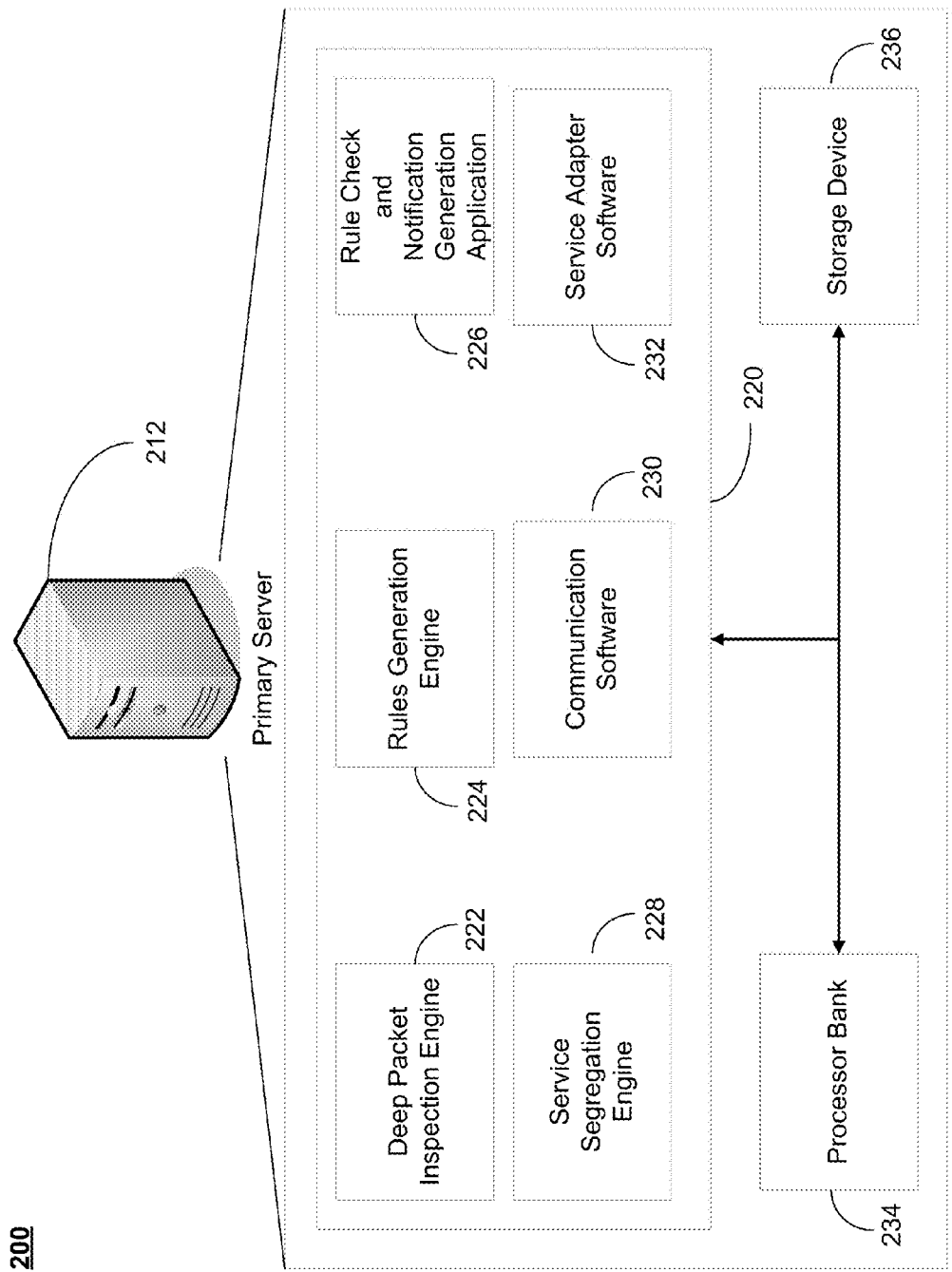
FIG. 2 shows an exemplary software platform for a primary service provider server that provides aspects of providing multiple services to premises over communication networks.

FIG. 2 shows an exemplary software platform 220 for a primary service provider server 212 that provides aspects of providing multiple services to premises over communication networks. The primary server 212 executes a server software platform 220 on one or more server processors and stores the server software platform 220 and any associated data in a server storage device 236. The one or more processors may be represented as a processor bank 234. Persons of ordinary skill in the art would understand that the one or more processors comprising the processor bank 234 may be distributed across the primary server hardware and may not be limited to being co-located next to one another. Further, the server software platform 220 includes a server deep packet inspection engine 222, a server rules generation engine 224, a server rule check and notification generation engine 226, a server service segregation engine 228, a server communication software application 230, and a server service adapter software application 232.

A primary server 212 may receive and transmit one or more data packets through one or more communication interfaces for multiple services provided to one or more end point devices. Segregating services into different virtual networks as well as providing additional features across the multiple services may require the primary server 212 to read the data within each of the one or more data packets received. Generally, the server deep packet inspection engine 222 allows the primary server to read the data within the received data packets. The data read from the one or more data packets may be stored in the server storage device 236.

To provide additional features across multiple services, the server software platform 220 may generate service rules using the server rules generation engine. Service rules are generated based on the data read from the data packets received and may be called derived rules. Custom rules may also be inputted by a user or by a service provider to the primary server 212 using a communication interface such as user interface (e.g. web browser, etc.). Service rules (e.g. derived rules, custom rules, etc.) may also be stored in the server storage device 236.

The additional features may be delivered to a service subscriber by the primary server 212 using a server rule check and notification generation engine 226. The additional features may be incorporated into one or more notifications based on a rule check or violation when analyzing the data in the received data packets. For example, a rule may be derived or inputted by a user that states no e-commerce activity may be done at a home computer end point device between 9 am to 5 pm on weekdays. However, the primary server reads received data packets indicating that a home computer is conducting an e-commerce activity at 10:03 am on a weekday. Consequently, primary server 212 may send a notification to either the home computer or the e-commerce secondary server stating a rule violation occurred.

The server software platform 220 may further include a server service segregation engine 228 that reduces the cross-service interference between different services relayed by the primary server 212 from one or more secondary service provider servers to one or more end point devices. Additionally, the server service segregation 228 engine may assist in generating and maintain a virtual network for a specific service (e.g. premises security, energy management, VoIP, e-commerce, etc.) in conjunction with other aspects of the server software platform 220 such as a server communication software application 230 and a server adapter software application 232. The server service segregation engine 228 may prevent cross-service interference, for example, when an energy management server may be attempting to shut down one or more components of a premises security system such as premises security alarms, sensors, etc.

The server communication software 230 of a server software platform may also be involved in generating and maintaining a virtual network for a specific service. The communication software may generate and maintain a communication tunnel between the primary server 212 and a secure access node to an end point device. Alternatively, the communication software may generate and maintain a communication connection such as in a virtual LAN or using MPLS technology.

In addition, the server software platform 220 may have server service adapter software 232 that may provide an adaption layer between an application layer and a network layer, or between any two layers of a communication protocol stack. Such an adaption layer provides additional functionality to the primary server 212 and a secure access node. The adaptation layer provides a mechanism for the primary server 212 and a secure access node to generate and maintain a virtual network for a specific service and reduce cross-service interference.

Figure 3:
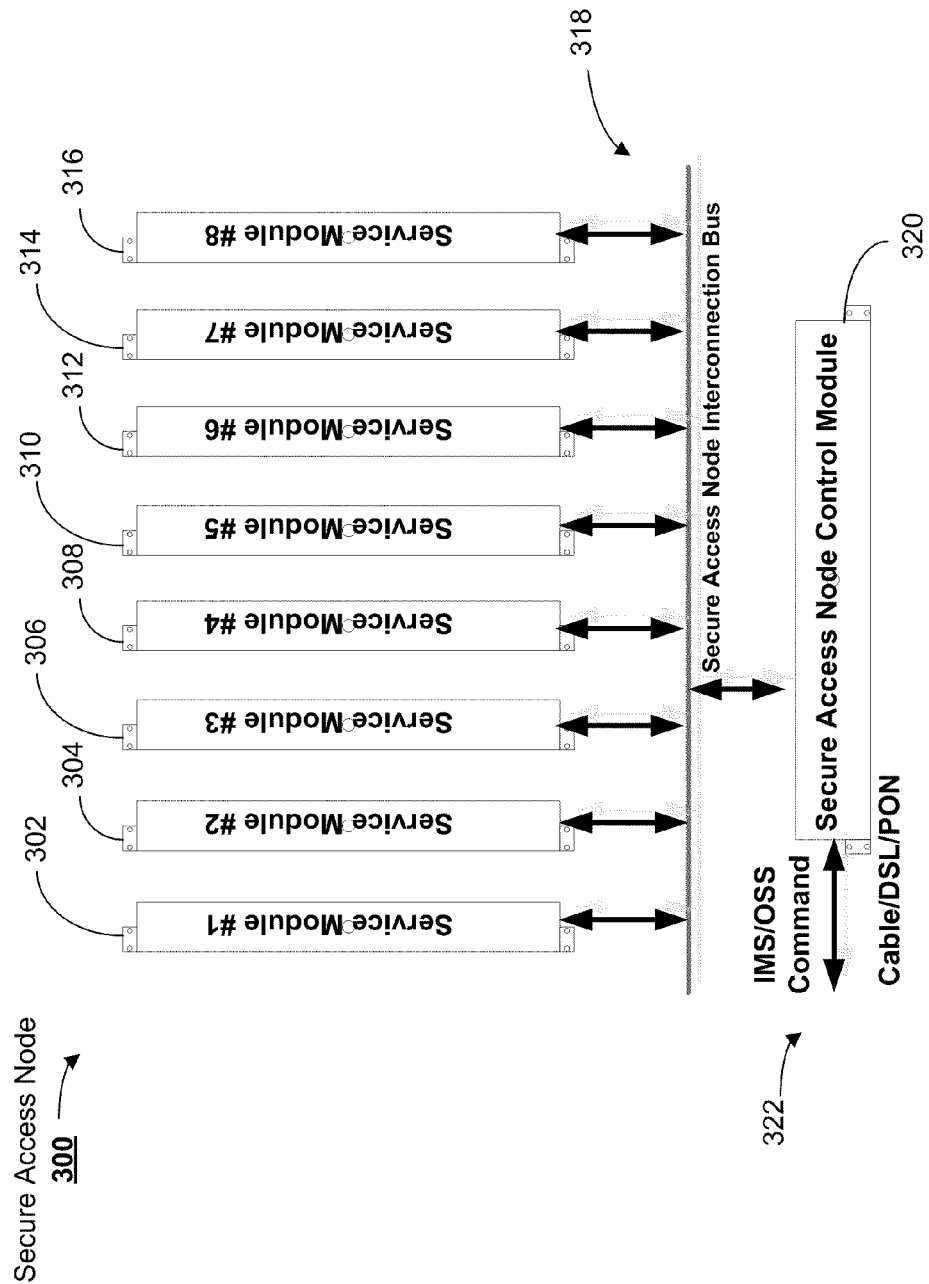
FIG. 3 shows an exemplary architecture for a secure access node that provides aspects of providing multiple services to premises over communication networks.

FIG. 3 shows an exemplary architecture for a secure access node 300 that provides aspects of providing multiple services to premises over communication networks. The exemplary secure access node 300 in FIG. 3 has eight service modules (302, 304, 306, 308, 310, 312, 314, and 316). Persons of ordinary skill in the art would recognize that a secure access node may include more or less than the exemplary number of eight service modules shown in FIG. 3. A service module within a secure access node 300 may be coupled to one or more end point devices that receive one or more services from a primary server or one or more secondary servers across a communication network (e.g. premises network, WAN, etc.). The end point devices may be coupled to a service module through one or more communication interfaces. Each communication interface may support a different communication technology (USB, Firewire, Bluetooth, Ethernet, WiFi etc.).

In addition to the eight service modules (302, 304, 306, 308, 310, 312, 314, and 316), the secure access node 300 may have a secure access control module 320. Further, the service modules (302, 304, 306, 308, 310, 312, 314, and 316) may communicate with the secure access control module 320 through a secure access node interconnection bus 318. Persons of ordinary skill in the art would understand that the secure access node interconnection bus 318 is an exemplary communication mechanism between the secure access control module 320 and the service modules (302, 304, 306, 308, 310, 312, 314, and 316) and that any other appropriate inter-node communication mechanism may be used. Further, the secure access node may have one or more communication interfaces 322 to communicate with one or more communication networks (e.g. WAN, LAN, premises network, etc.) that deal with different technology (Ethernet, DSL, PON, Cable, IMS, etc,).

Figure 4:
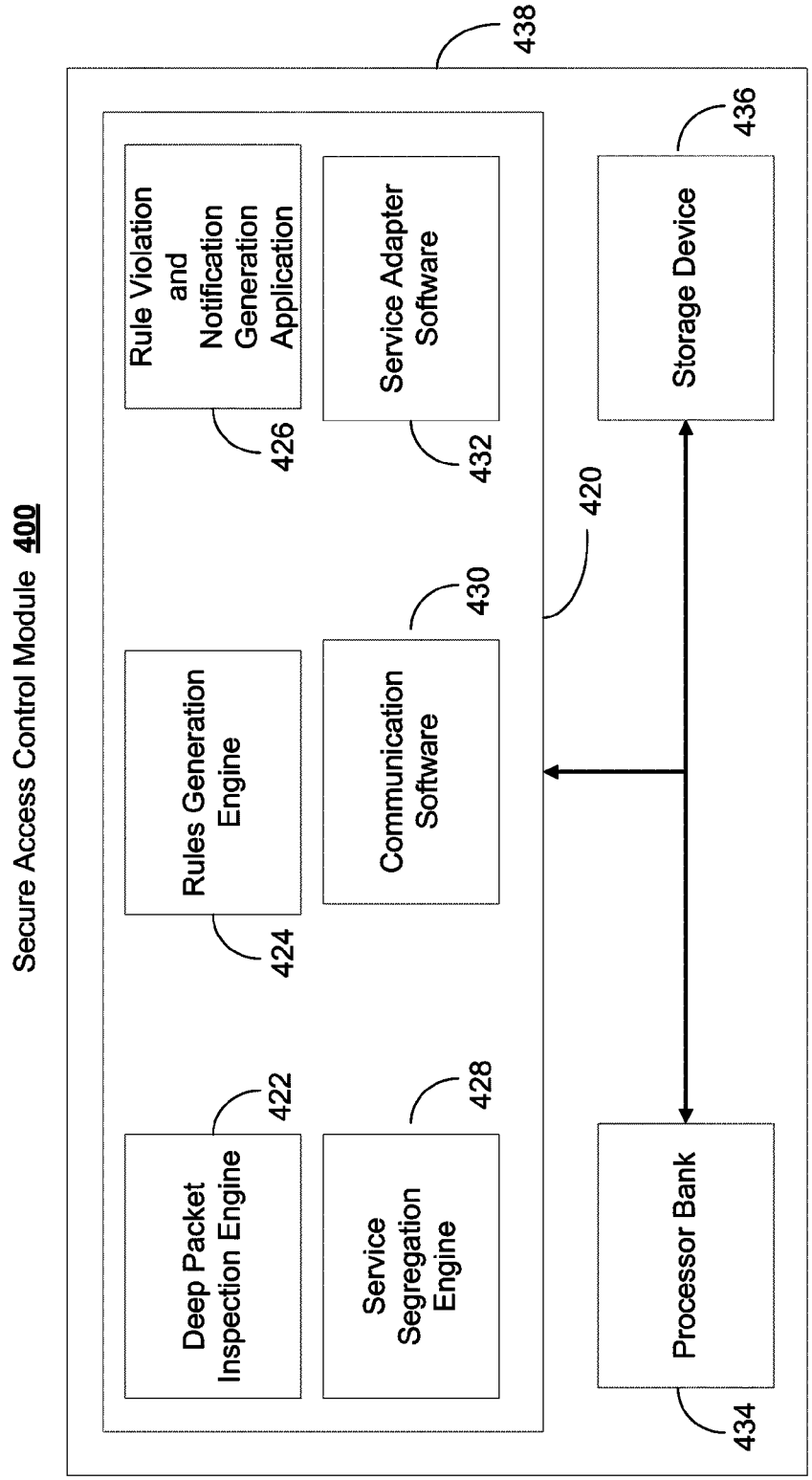
FIG. 4 shows an exemplary software platform for a secure access control module that provides aspects of providing multiple services to premises over communication networks.

FIG. 4 shows an exemplary software platform 420 for a secure access control module 400 that provides aspects of providing multiple services to premises over communication networks. The secure access control module 400 executes a server software platform 420 on one or more node processors and stores the node software platform 420 and any associated data in a node storage device 436. The one or more processors may be represented as a processor bank 434. Persons of ordinary skill in the art would understand that the one or more processors comprising the processor bank 434 may distributed across the secure access node hardware and may not be limited to being co-located next to one another. The node software platform 420 includes a node deep packet inspection engine 422, a node rules generation engine 424, a node rule check and notification generation engine 426, a node service segregation engine 428, a node communication software application 430, and a node service adapter software application 432.

The secure access control module 400 may receive and transmit one or more data packets though one or more communication interfaces for multiple services provided to one or more end point devices. Segregating services into different virtual networks as well as providing additional features across the multiple services may require the secure access control module 400 to read the data within each of the one or more received data packets. Generally, the node deep packet inspection engine 422 allows the secure access control module 400 to read the data within the received data packets. The data read from the one or more data packets may be stored in the node storage device 436.

To provide additional features across multiple services, the node software platform 420 may generate service rules using the server rules generation engine. Service rules are generated based on the data read from the received data packets and are called derived rules. Custom rules may also be inputted by a user or by a service provider to the secure access control module 400 using a communication interface such as user interface (e.g. web browser, etc.). Service rules (e.g. derived rules, custom rules, etc.) may also be stored in the node storage device 436.

The additional features may be delivered to a service subscriber by the secure access control module 400 using a node rule check and notification generation engine 426. The additional features may be incorporated into one or more notifications based on a rule check or violation when analyzing the data in the received data packets. For example, a rule may be derived or inputted by a user that states no e-commerce activity may be conducted at a home computer end point device between 9 am to 5 pm on weekdays. However, the secure access control module 400 reads received data packets indicating that a home computer is conducting an e-commerce activity at 10:03 am on a weekday. The secure access control module 400 may send a notification to either the home computer or the e-commerce secondary server, either via a primary server or directly, stating a rule violation occurred.

The node software platform 420 may further include a node service segregation engine 428 that reduces the cross-service interference between different services relayed by the secure access control module 400 to one or more end point devices. Additionally, the node service segregation 428 engine may assist in generating and maintain a virtual network for a specific service (e.g. premises security, energy management, VoIP, e-commerce, etc.) in conjunction with other aspects of the node software platform 420 such as a node communication software application 430 and a node adapter software application 432. The node service segregation engine 428 may prevent cross-service interference, for example, when an energy management server may be attempting to shut down one or more components of a premises security system such as premises security alarms, sensors, etc.

The node communication software 430 of a node software platform 420 may also be involved in generating and maintaining a virtual network for a specific service. The communication software 430 may generate and maintain a communication tunnel between the secure access control module 400 and a primary server to an end point device. Alternatively, the communication software 430 may generate and maintain a communication connection such as in a virtual LAN or using MPLS technology.

In addition, the node software platform 420 may have node service adapter software 432 that may provide an adaption layer between an application layer and a network layer or between any two layers of a communication protocol stack. Such an adaption layer provides additional functionality to the secure access control module 400 and a primary server. The adaptation layer provides a mechanism for the secure access control module 400 and a primary server to generate and maintain a virtual network for a specific service and reduce cross-service interference.

Figure 5:
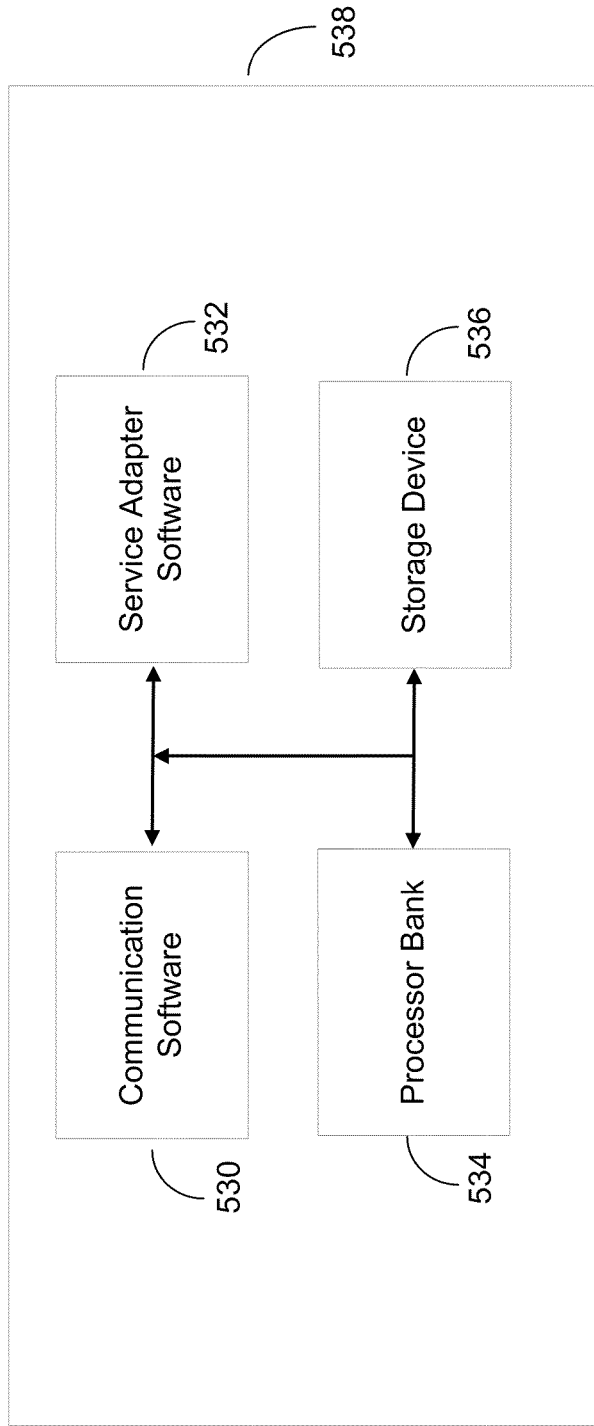
FIG. 5 shows an exemplary software platform for a service module that provides aspects of providing multiple services to premises over communication networks.

FIG. 5 shows an exemplary module software platform for a service module 500 that provides aspects of providing multiple services to premises over communication networks. The service module 500 executes a module software platform on one or more module processors and stores the module software platform and any associated data in a module storage device 536. The one or more module processors may be represented as a processor bank 534. Persons of ordinary skill in the art would understand that the one or more module processors comprising the processor bank 534 may distributed across the service module hardware and may not be limited to being co-located next to one another. The module software platform includes a module communication software application 530 and a module service adapter software application 532.

The module communication software 530 of a module software platform may be involved in generating and maintaining a virtual network for a specific service. The communication software 530 may generate and maintain a communication tunnel between an end point device, the service module 500, secure access control module and a primary server. Alternatively, the communication software 530 may generate and maintain a communication connection such as in a virtual LAN or using MPLS technology.

In addition, the module software platform may have module service adapter software 532 that may provide an adaption layer between an application layer and a network layer or any two layer of a communication protocol stack. Such an adaption layer provides additional functionality to the service module 500, a secure access control module, and a primary server. The adaptation layer provides a mechanism for the service module, secure access control module, and a primary server to generate and maintain a virtual network for a specific service and reduce cross-service interference.

Persons of ordinary skill in the art would understand that functionality incorporated in the service module 500 may be performed by a secure access control module and that service module software platform may not be needed to generate and maintain a virtual network for a specific service.

Figure 6:
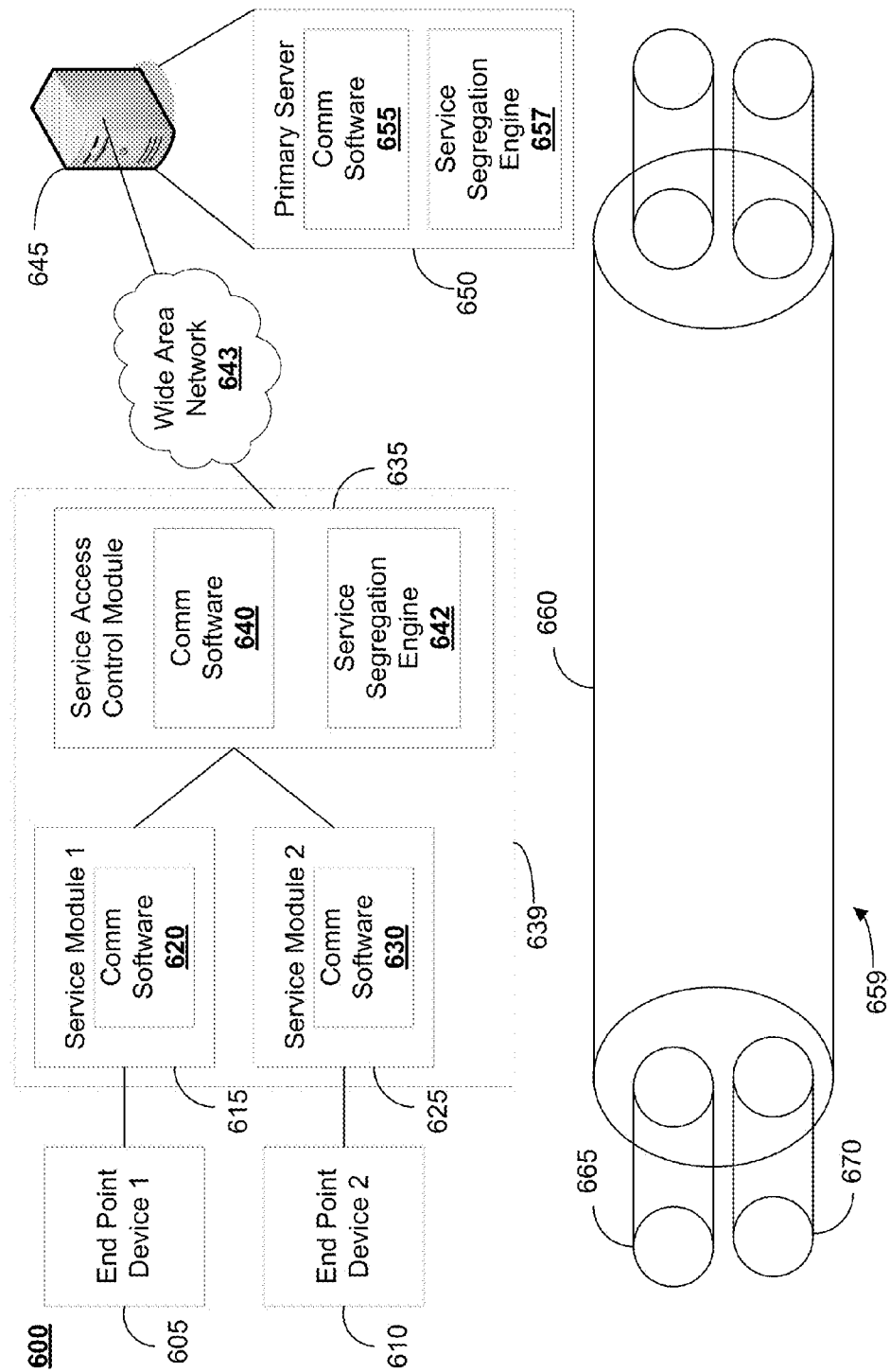
FIG. 6 illustrates exemplary communication software and service segregation aspects of providing multiple services to premises over communication networks.

FIG. 6 illustrates exemplary communication software and service segregation aspects of providing multiple services to premises over communication networks. Further, FIG. 6 shows an exemplary network 600 having a primary server 645 coupled a secure access node 639 having a secure access control module 635 and one or more service modules (615 and 625) across a wide area network 643. Each of the service modules (615 and 625) may be coupled to one or more end point devices (605 and 610) across a premises network (not shown).

The primary server 645 may have a communication software application 655 and a service segregation engine 657 both as part of a server software platform Further, the secure access control module 635 may have a node communication software application 640 and a node service segregation engine 642 both as part of a node software platform. Additionally, each of the service modules (615 and 625) may have a communication software application (620 and 630) as part of a module software platform.

The communication software applications (615, 625, 640, and 655) residing on each service module (615 and 625), the secure access control module 635, and the primary server 645 may provide tunneling or connection capabilities to generate and maintain a virtual network for each particular service provided to the end point devices (605 and 610). Examples of tunneling technology that may be used by the communication software applications (615, 625, 640, and 655) may include, but are not limited to, Generic Routing Encapsulation (GRE), Layer 2 Tunneling Protocol (L2TP), Point-to-Point Tunneling Protocol (PPTP) as well as other plaintext and non-plaintext tunneling protocols. Alternatively, the communication software applications (615, 625, 640, and 655) may utilize other communication software technologies to generate aspects of a virtual network for a particular service. These communication technologies may include Multiprotocol Label Switching (MPLS) technology or other communication technology that generates and maintains a connection using either a circuit-switched or packet-switched technology known to persons of ordinary skill in the art.

The server service segregation engine 655 and the node service segregation engine 642 may also generate and maintain aspects of a virtual network for a specific service. For example, the server service segregation engine 655 and the node service segregation engine 642 may provide additional security and decrease or reduce cross-service interference between different services supported by different virtual networks by the secure access node 639 and the primary server 645. The additional security may be provided by cryptographic protocol schemes known to persons of ordinary skill in the art that include, but are not limited to, symmetric-key algorithms such as Data Encryption Standard (DES), Triple DES, and Advanced Encryption Standard (AES) as well as public-key algorithms such as a RSA algorithm and the like. Additional security may also be provided by monitoring the state of the communication protocols such as TCP states of initiation and termination of a connection to determine that states of connection progress properly. Communication protocols may be further strengthened using proprietary protocols between the primary server 645 and service access control module 635, service module 615 and 625. Further, the server service segregation engine 657 and the node service segregation engine 642 may utilize security protocols such as IPsec and Microsoft Point-to-Point Encryption (MPPE). Persons of ordinary skill in the art would understand that IPsec may be used in conjunction with Layer 2 Tunneling Protocol and MPPE may be used in conjunction with PPTP.

In addition, the server service segregation engine 657 and the node service segregation engine 642 may also provide additional features to reduce cross-service interference. For example, the server service segregation engine 657 and the node service segregation engine 642 may prevent an energy management service provider from shutting off an alarm or sensor as part of a premises security system. Another example may be the server service segregation engine 657 and the node service segregation engine 642 preventing a home computer user from conducting e-commerce transactions between 9 am and 5 pm on weekdays.

The functionality of the server service segregation engine 657 and the node service segregation engine 642 as well as the communication software applications (615, 625, 640, and 655) may be illustrated by concentric tunnel diagram 659 shown in FIG. 6. Further, FIG. 6 shows a communication pipe 660 illustrating a connection or communication link between the primary server 645 and the secure access control module 635. Moreover, the concentric tunnel diagram 659 illustrates the tunneling/connection functionality as well as aspects of the virtual network capability provided by the server service segregation engine 655 and the node service segregation engine 642 as well as the communication software applications (615, 625, 640, and 655). Particularly, communication pipe 665 within communication pipe 660 may illustrate a tunnel or connection supporting a particular service, the tunnel or connection provided by the server service segregation engine 657 and the node service segregation engine 642 as well as the communication software applications (615, 625, 640, and 655) while communication pipe 670 may be another tunnel or connection supporting a particular service, the tunnel or connection provided by the server service segregation engine 657 and the node service segregation engine 642 as well as the communication software applications (615, 625, 640, and 655).

Figure 7:
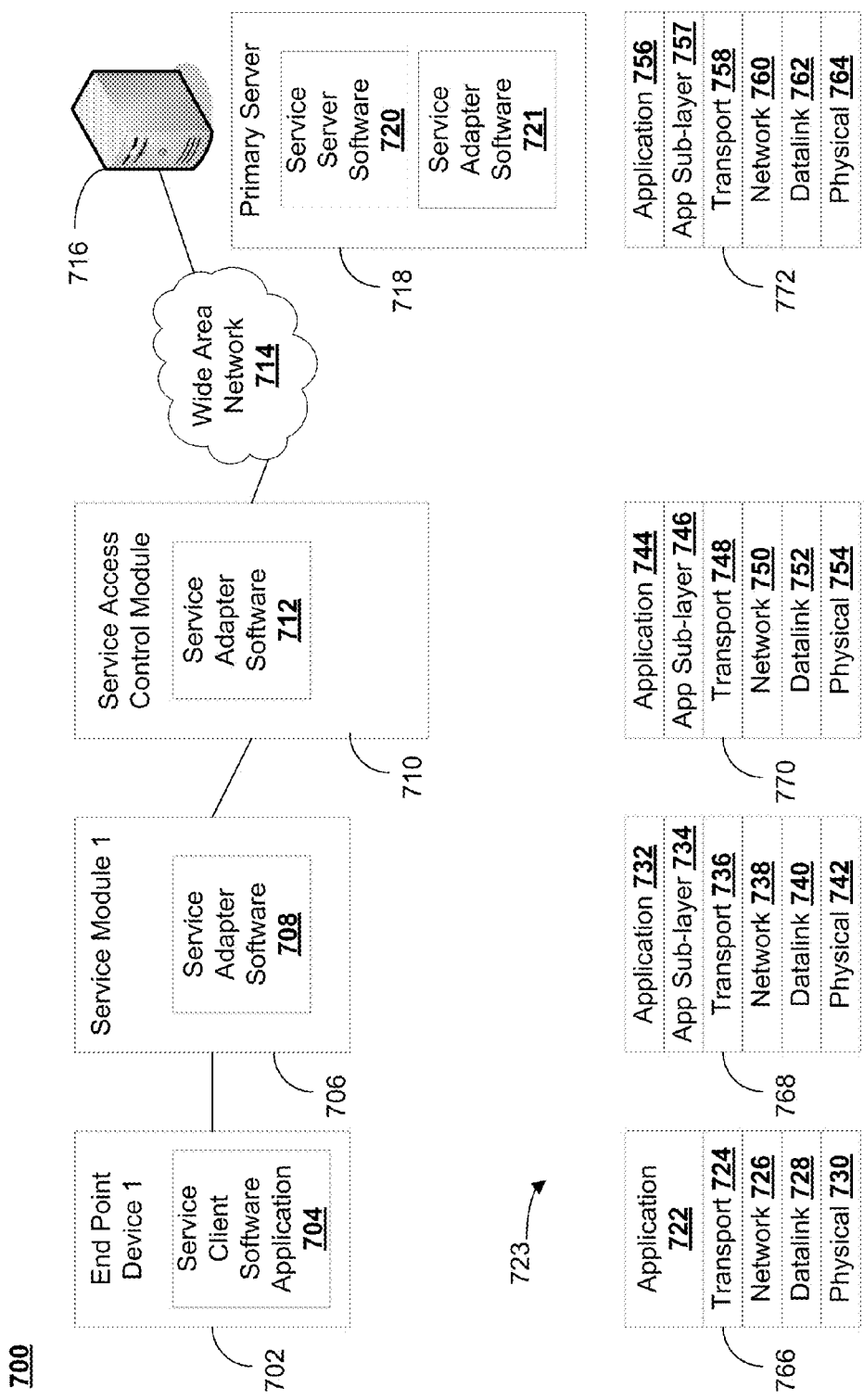
FIG. 7 illustrates exemplary service adaptation aspects of providing multiple services to premises over communication networks.

FIG. 7 illustrates exemplary service adaptation aspects of providing multiple services to premises over communication networks. Specifically, FIG. 7 shows an exemplary network 700 that includes a primary server 716 coupled to a secure access control module 710 across a wide area network (WAN) 714. Further, the secure access control module 710 may be coupled to a service module 706. In addition, the service module 706 may be coupled to an end point device 702 across a premises network. The primary server 716 may have a server service adapter software application 721 as part of the primary servers server software platform. Also, the primary server 716 may have server service application software 720 that provides service functionality to the end point device 702. For example, the end point device 702 may be a home computer and the primary server 716 may provide email services to such an end point device 702. Thus, the end point device may have a client service software application 704 that supports the features provided by the service server software application 720. For example, the client service software application 704 may be a client email software application that supports the email services provided by the service server software application 720.

In addition, FIG. 7 shows an exemplary functional block diagram 723 that illustrates the functionality of the server service adapter software application 721, the node service adapter software application 712, and the module service adapter software application 708. Particularly, the exemplary functional block diagram 723 shows a server protocol stack 772 implemented by the primary server 716, a node protocol stack 770 implemented by the secure access control module 710, a module protocol stack 768 implemented by the service module 706, and an end point device protocol stack 766 implemented by the end point device 702.

An application layer 756 may be at the top of the server protocol stack 772 implemented by the service server software application 718. Below the application layer 756 may be an application sub-layer 757 implemented by the server service adapter software application 721. Under the application sub-layer 757, maybe a transport layer 758, network layer 760, datalink layer 762, and physical layer 764.

Further, an application layer 744 may be at the top of the node protocol stack 712 residing on the secure access control module 712. Below the application layer 746 may be an application sub-layer 746 implemented by the node service adapter software application 712 residing on the secure access control module 710. Under the application sub-layer 746, may be a transport layer 748, network layer 750, datalink layer 752, and physical layer 754.

In addition, an application layer 732 may be at the top of the module protocol stack 768 residing on the service module 706. Below the application layer 732 may be an application sub-layer 734 implemented by the module service adapter software application 708 residing on the service module 706. Under the application sub-layer 734, may be a transport layer 736, network layer 738, datalink layer 740, and physical layer 742.

Also, an application layer 722 may be at the top of the end point device protocol stack 766 implemented by the client service software application residing on the end point device 702. Below the application layer 732 may be a transport layer 724, network layer 726, datalink layer 728, and physical layer 730.

The server service adapter software application 721, node service adapter software application 712, and the module service adapter software application 708 may provide a proprietary or standard sub-layer within the server protocol stack 772, node protocol stack 770, and module protocol stack 768 to generate and maintain a virtual network for a specific service between the primary server 716 and the end point device 702. For example, the server service adapter software application 721, node service adapter software application 712, and the module service adapter software application 708 may be encryption software to provide increased security (e.g. DES, RSA, proprietary methods, etc.), proprietary commands to reduce cross-service interference (e.g. preventing energy management service to turn off aspects of premises security service), and quality of service tags to provide additional service features to the end point device (e.g. prioritizing streaming video over e-commerce transactions). Persons of ordinary skill in the art would recognize that the sub-layers (723, 746, and 734) shown under the application layer (756, 744, and 732) in their respective protocol stacks (772, 770, and 768) in FIG. 7 may be implemented under any layer (e.g. application, transport, network, datalink, physical, etc.). Further, persons of ordinary skill in the art would understand that functionality depicted in the service module 706 may also be alternatively implemented by the secure access control module 710.

Figure 8:
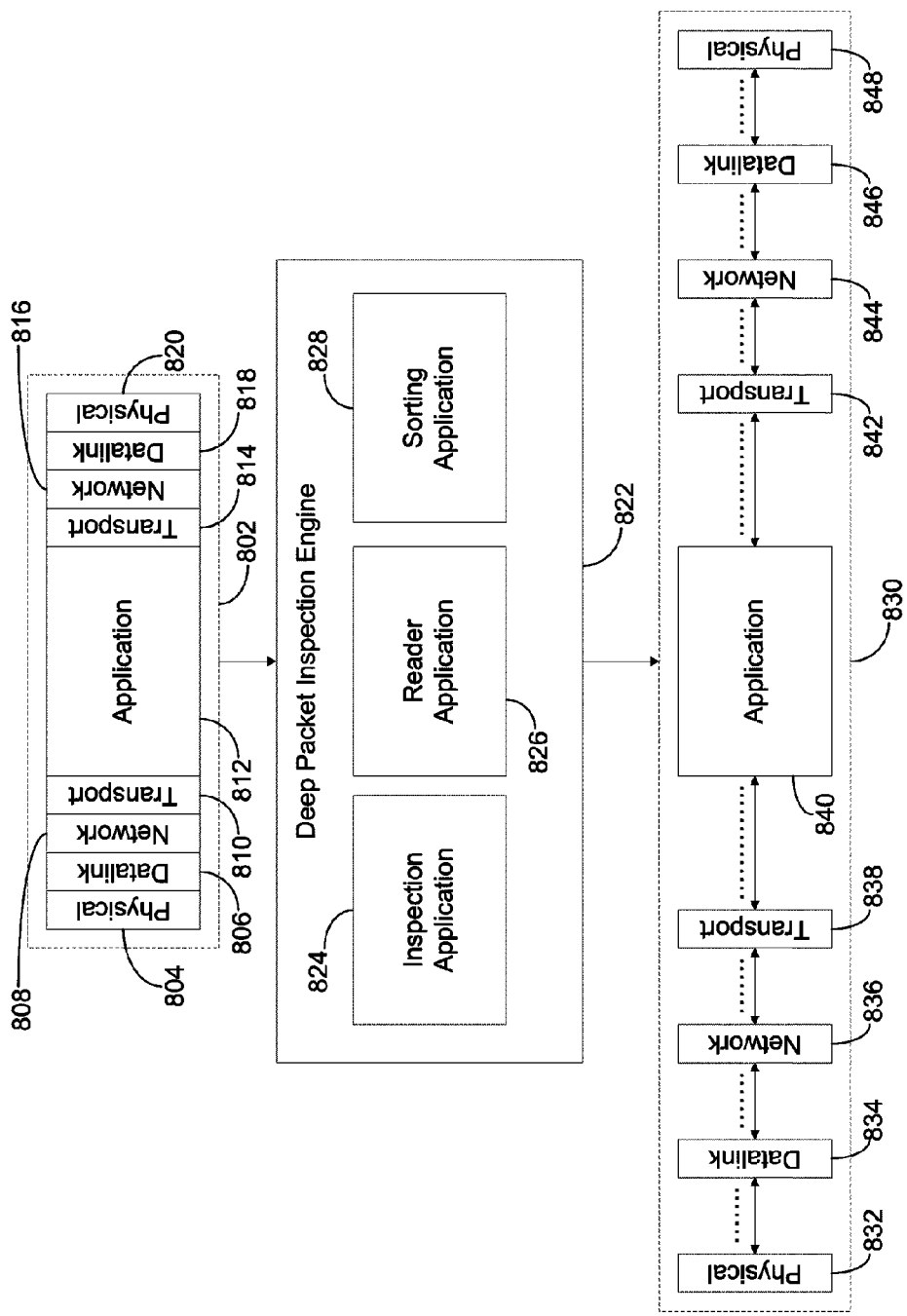
FIG. 8 illustrates an exemplary deep packet inspection engine that may be used to provide additional service features in providing multiple services to premises over communication networks.

FIG. 8 illustrates an exemplary deep packet inspection engine 822 that may be used to provide additional service features in providing multiple services to premises over communication networks. Persons of ordinary skill in the art would recognize that the deep packet inspection engine can modify and process data packets and may include functions such as count, copy, forward drop, modification, and other actions in addition to the functions described below. Further, the functions may include proprietary functions to implement novel aspects of the systems, devices, and methods disclosed.

Particularly, FIG. 8 shows a data packet 802 having an application layer 812 payload and encapsulated by a transport header 810 and a transport trailer 814 to comprise a transport layer, a network header 808 and a network trailer 816 to comprise a network layer, a datalink header 806 and a datalink trailer 818 to comprise a datalink layer, and a physical header 804 and a physical trailer 820 to comprise a physical layer. The data packet 802 may be received by a deep packet inspection engine 822. The deep packet inspection engine may be part of a server software platform residing on a primary server as shown in FIG. 2 or a node software platform residing on a secure access control module as shown in FIG. 4.

The deep packet inspection engine 822 may include an inspection software application 824, a reader software application 826, and a sorting software application 828. The inspection application 824 may decapsulate the received data packet 802 into its different layers (headers and trailers) corresponding to a protocol stack as shown in the decapsulating functional diagram 830. The reader software application 826 may read the data at each layer of the data packet such as an application layer 840, a transport layer (838 and 842), a network layer (836 and 844), a datalink layer (834 and 846) and a physical layer (832 and 848). The sorting software application 828 may analyze the data in the one or more layers (e.g. application, transport, network, datalink, and physical) and store the data in one or more memory subcomponents within a storage device.

Figure 9:
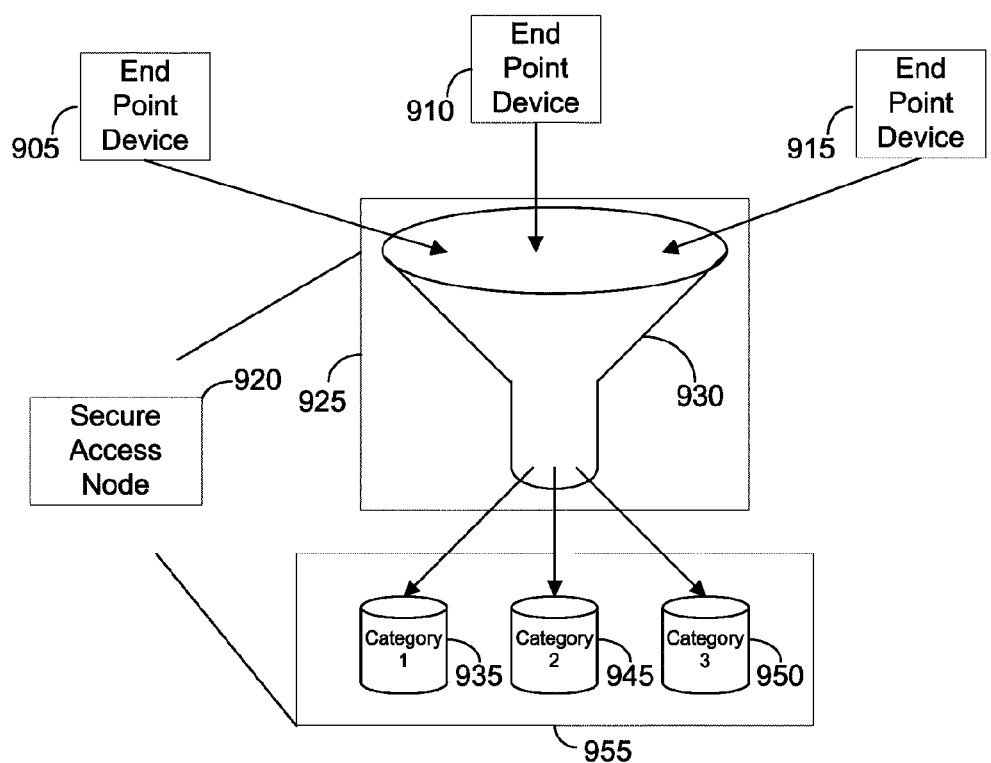
FIG. 9 illustrates exemplary aspects of the secure access node that provide additional service features in providing multiple services to premises over communication networks.

FIG. 9 illustrates exemplary aspects of the secure access node 920 that provide additional service features in providing multiple services to premises over communication networks. FIG. 9 shows a functional block diagram 900 illustrating functions of a sorting software application 930 that may be part of a deep packet inspection engine 925 which in turn may be part of a secure access node software platform. The deep packet inspection engine may receive data packets from one or more end point devices (905, 910, and 915) and inspects and reads the data packets using an inspection software application and a reader software application, respectively, as discussed in FIG. 8. The sorting software application 930 may analyze the data in the one or more layers (e.g. application, transport, network, datalink, and physical) of the received data packets and store the data in one or more memory subcomponents (935, 945, and 950) within a storage device 955 residing on the secure access node 920. Data read from the received data packets may be stored in different memory subcomponents (935, 945, and 950) according to different categories within the storage device 955 based on the analysis by the sorting software application 930. For example, data may be stored in different categories based on service type (e.g. premises security, energy management, e-commerce, etc.) or by data layer type (e.g. application, transport, network, datalink, physical, etc.).

Figure 10:
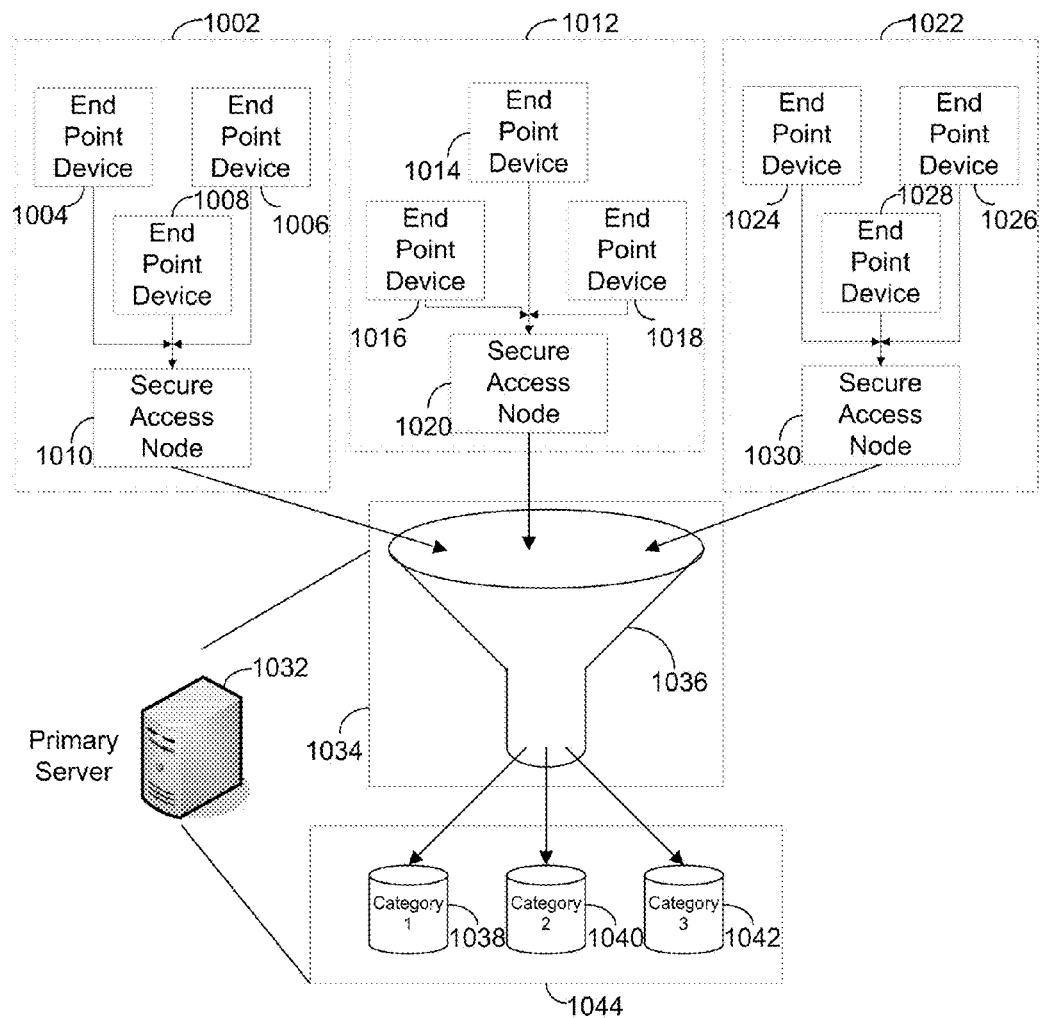
FIG. 10 illustrates exemplary aspects of the primary service provider server that provide additional service features in providing multiple services to premises over communication networks.

FIG. 10 illustrates exemplary aspects of the primary service provider server 1032 that provide additional service features in providing multiple services to premises over communication networks. FIG. 10 shows a functional block diagram 1000 illustrating functions of a sorting software application 1036 that may be part of a deep packet inspection engine 1034 which in turn may be part of a primary server software platform. The deep packet inspection engine 1034 may receive data packets from one or more secure access nodes (1010, 1020, and 1030) each coupled to one or more end point devices (1004, 1006, and 1008, 1014, 1016, and 1018, and 1024, 1026, and 1028) across a premises network. Further, the deep packet inspection engine 1034 inspects and reads the data packets using an inspection software application and a reader software application, respectively, as discussed in FIG. 8. The sorting software application 1036 may analyze the data in the one or more layers (e.g. application, transport, network, datalink, and physical) of the received data packets and store the data in one or more memory subcomponents (1038, 1040, and 1042) within a storage device 1044 residing on the primary server 1032. Data read from the received data packets may be stored in different memory subcomponents (1038, 1040, and 1042) according to different categories within the storage device 1044 based on the analysis by the sorting software application 1036. For example, data may be stored in different categories based on service type (e.g. premises security, energy management, e-commerce, etc.) or by data layer type (e.g. application, transport, network, datalink, physical, etc.). Data may be stored according to other types of categories such as by secure access node (1010, 1020, and 1020) or by end point device type (e.g. computer, premises security equipment, energy management equipment, etc.).

Figure 11:
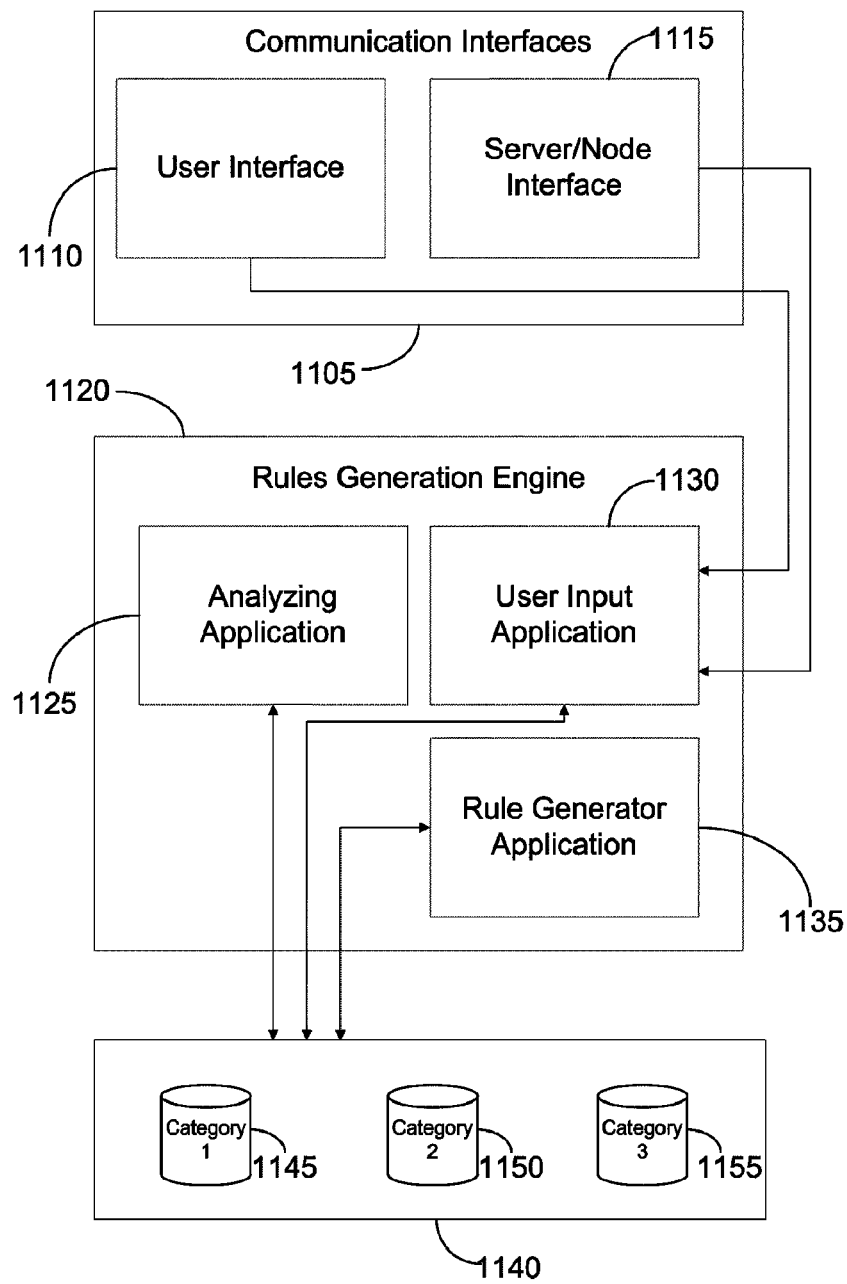
FIG. 11 illustrates an exemplary rule generation engine that may be used to provide additional service features to providing multiple services in premises over communication networks.

FIG. 11 illustrates an exemplary rule generation engine 1120 that may be used to provide additional service features to providing multiple services in premises over communication networks. The exemplary functional block diagram 1100 shown in FIG. 11 depicts different functional components of a network element such as a primary server or a secure access node. The functional components may be one or more communication interfaces 1105 that may include a user interface 1110 such as an internet browser, and a server/node communication interface such as an Ethernet, LAN, WiFi, Bluetooth, etc. interface 1115. The one or more communication interfaces 1105, including the user interface 1110 and the server/node communication interface 1115, may be coupled to the rule generation engine 1120 which is part of the server/node software platform. The rule generation 1120 may include an analyzing software application 1125, a user input software application 1130, and a rule generator software application 1135. Additionally, the rule generation engine 1120 may be coupled to a network element storage device 1140 having one or more memory subcomponents (1145, 1150, and 1155). The storage device 1140 as well as the one or more memory subcomponents (1145, 1150, and 1155) may store data from data packets received by the network element (e.g. primary server or secure access node). Further, the data may be stored into different memory subcomponents (1145, 1150, and 1155) according to different categories such as service type (e.g. premises security, energy management, e-commerce, etc.), data layer type (e.g. application, transport, network, datalink, physical, etc.), secure access node type, or by end point device type. In addition, a user may provide user data through the user interface 1110 using a user input software application 1130 that categorizes and stores the user data into different memory subcomponents (1145, 1150, and 1155) within the storage device 1140.

The analyzing software application 1125 may access the storage device 1140 as well as the one or more memory subcomponents (1145, 1150, and 1155) to obtain the data from the received data packets and the user data. Further, the analyzing software application 1125 provides an analysis of the received data packet data and the user data and forwards the analysis to the rule generator software application 1135. Consequently, the rule generator software application 1135 determines service rules based on the data from the received data packets called derived rules and service rules based on user data called custom rules. The derived rules and the custom rules may be stored in to different memory subcomponents (1145, 1150, and 1155) within the storage device 1140 according to different categories.

For example, the analyzing software application 1125 may access the data from the received data packets and determine that an end point device such as a home computer does not conduct e-commerce between 9 am-5 pm on most days. Thus, based on such analysis the rule generator software application 1135 may generate a derived rule to prevent e-commerce activity on the end point device between 9 am-5 pm every day. However, user data may be obtained by the analyzing software application 1125 that states that e-commerce activity can be conducted on the end point device between 9 am-5 pm on weekends. Hence, the rule generator software application 1135, based on the user data may develop a custom rule to prevent e-commerce activity on the end point device between 9 am-5 pm only on weekdays.

Another example may be that the analyzing software application 1125 observes multiple facets of communications based on time of day, source address filter, traffic pattern, etc. to classify a threat level or to specify a type of threat of a received packet; Further, fuzzy logic techniques may be used, because the secure access node or primary server does not have necessary or sufficient information regarding either content or protocol of connections passing through a platform (e.g. server software platform, node software platform, etc.). In many cases, a rule check or rule violation may not be severe and the primary server's or secure access node's response may need to be proportional to the rule check or rule violation detected. As a result, fuzzy logic becomes a useful method to include into the analyzing software application 1135. A rule check fuzzy set to threat type/threat level fuzzy set relationship matrix may be established based on prior experiences using Cartesian Product Method, for example, and be stored in the memory device 1140. As a further example, a user may not place a restriction on time of day or day of week to conduct e-commerce, but that prior usage over the past month indicated that the user never conducted e-commerce during a weekday from 9 am to 5 pm. Such a fuzzy logic may be derived and used by a rule check and notification generation engine.

Figure 12:
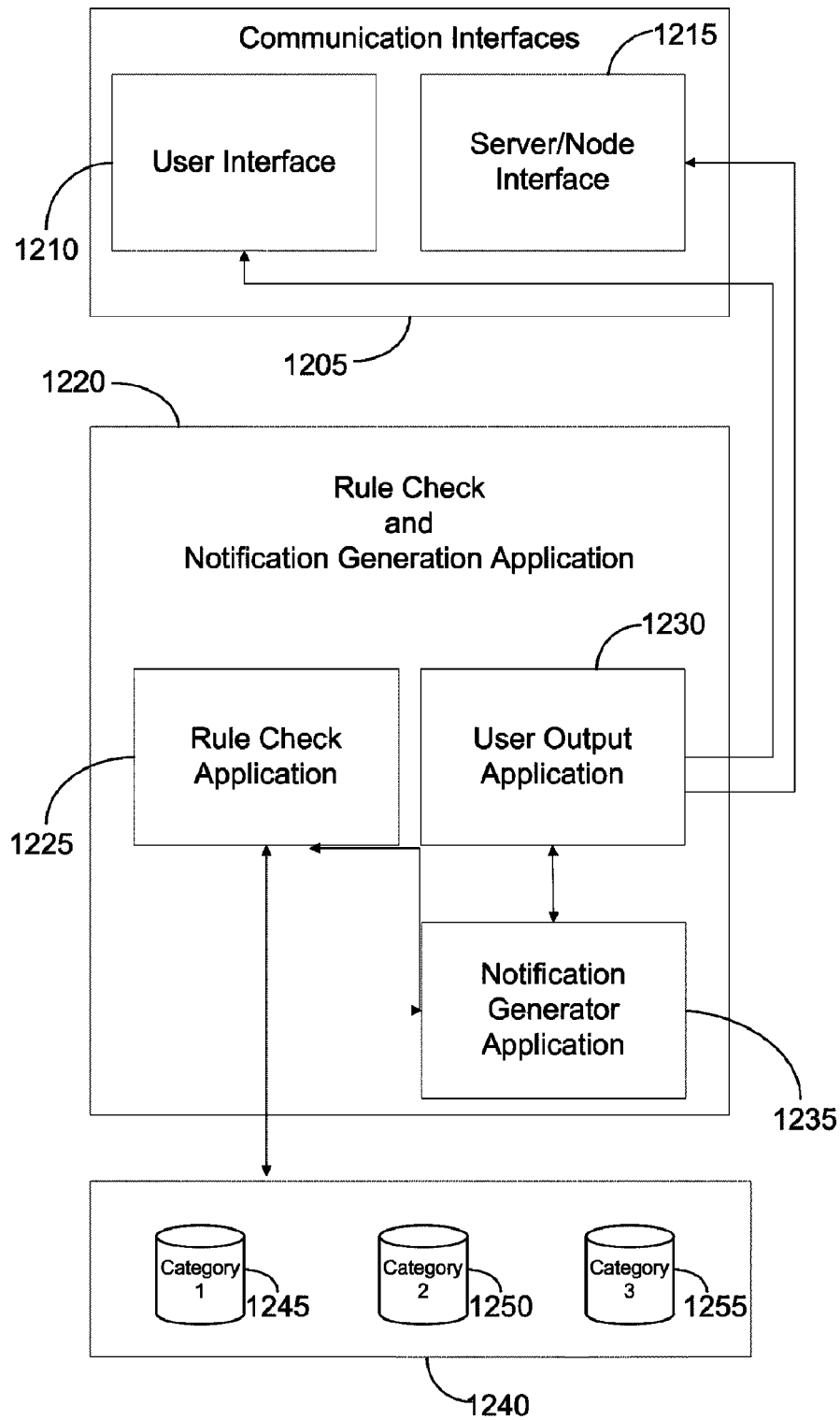
FIG. 12 illustrates an exemplary rule check and notification generation engine that may be used to provide additional service features in providing multiple services to premises over communication networks.

FIG. 12 illustrates an exemplary rule check and notification generation engine 1220 that may be used to provide additional service features in providing multiple services to premises over communication networks. The exemplary functional block diagram 1200 shown in FIG. 12 depicts different functional components of a network element such as a primary server or a secure access node. The functional components may be one or more communication interfaces 1205 that may include a user interface 1210 such as an internet browser, and a server/node communication interface such as an Ethernet, LAN, WiFi, Bluetooth, etc. interface 1215. The one or more communication interfaces 1205, including the user interface 1210 and the server/node communication interface 1215, may be coupled to the rule check and notification generation engine 1220 which may be part of the server/node software platform. The rule check and notification generation engine 1220 may include a rule check software application 1225, a user output software application 1230, and a notification generator software application 1235. Additionally, the rule check and notification generation engine 1220 may be coupled to a network element storage device 1240 having one or more memory subcomponents (1245, 1250, and 1255). The storage device 1240 as well as the one or more memory subcomponents (1245, 1250, and 1255) may store service rules including derived rules and custom rules provided by a rule generation engine as discussed when describing FIG. 11. Further, the service rules as well as data from data packets received through the one or more communication interfaces may stored into different memory subcomponents (1245, 1250, and 1255) according to different categories such as service type (e.g. premises security, energy management, e-commerce, etc.), data layer type (e.g. application, transport, network, datalink, physical, etc.), secure access node type, or by end point device type.

The rule check software application 1225 accesses the service rules as well as the data from the received data packets from the different memory subcomponents (1245, 1250, and 1255) within the storage device 1240. Further, the rule check software application 1225 determines whether a trigger event has occurred, such as rule violation, based on the service rules and the received packet data. If so, the rule check software application 1225 sends the trigger event (e.g. violation) to the notification generator software application 1235. Based on the trigger event (e.g. violation), the notification generator software application 1235 generate a trigger event notification and forwards the trigger event notification to the user output software application 1230. Additionally, the user output software application 1230 may provide the trigger event notification to the user interface 1210 to be displayed to a user.

For example, a service rule may be obtained by the rule check software application 1225 that states no e-commerce activity may be conducted between 9 am-5 pm on weekdays (prohibited time period) on a particular end point device. However, the rule check software application 1225 also obtains data from received data packets that shows the particular end point device conducting e-commerce activity at 10:03 am on a Monday. Thus, e-commerce activity is being conducted during a prohibited time according to the service rule. A trigger event along with data associated with the prohibited activity as well as the service rule may be forwarded to the notification generator software application 1235. Based on the trigger event along with prohibited activity data as well as the service rule, the notification generator software application 1235 generates an exemplary trigger event notification that may state "Warning: Prohibited E-Commerce Activity Conducted" that is forwarded to the user output software application 1230 which in turn provides the exemplary trigger event notification to the user interface 1210 to be displayed to a user. Additionally, the network element software platform may solicit a user password as part of the exemplary trigger event notification for a user to continue conducting e-commerce activity during the prohibited time period.

Another example, the rule check software application 1225 on a secure access node observes multiple facets of communications based on time of day, source address filter, traffic pattern, etc. to check a threat level or a type of threat of an incoming packet based on rules generated by a rules generation engine. Further, fuzzy logic techniques may be used because a secure access node or primary server may not have necessary or sufficient information regarding either content or protocol of connections passing through a server or node software platform. In some cases, a rule check or violation may not be severe and a primary server's or secure access node's response may need to be proportional to the rule check or violation detected. As a result, fuzzy logic becomes a useful method to incorporate into the primary server or secure access node software platform. A rule check fuzzy set to threat type/threat level fuzzy set relationship matrix may be established based on prior experiences examined by the rules generation engine. An incoming rule violating packet's violation fuzzy set may be processed based on the relationship matrix stored in the memory device 1240. By using a composite operation in the fuzzy logic, the threat level and threat type may be determined. Such a determination may be forwarded to the notification generator application 1235. Further to the example, a user may not place a restriction on time of day and day of week to conduct e-commerce, but that prior usage over the past month indicated that the user never conducted e-commerce during a weekday from 9 am to 5 pm. Such a fuzzy logic rule may be derived and used by a rule check software application. Further, a user may attempt to conduct e-commerce at 10:03 am on a Monday. A notification may be generated based on the derived fuzzy logic rule described above such as; "Warning—Potentially Unusual Activity being attempted".

Another example may be each primary server managing multiple secure access nodes each of which resides in a subscriber's premises. Information, including a number of rejected packets and usage of some popular Internet sites may be collected and compiled. Further, a rule check software application on each primary server may collect rule violation statistics of all managed secure access nodes and may compile a network wide security condition using a fuzzy set representation which may be an n-tuple of threat level of each secure access node the primary server manages on a per time period basis. This n-tuple information may be processed using each premises' preference to common Internet sites usage relationship matrix stored in the memory device 1240 to determine a potential threat level to commonly used sites on networks or subscribed secondary services such that rules (e.g. access control list) may be applied using the notification generator application 1235. Consequently, Internet resources and services are better protected although limited knowledge or limited details of a scenario are made known to the primary server. Persons of ordinary skill in the art would recognize that the fuzzy logic algorithms known in the art as well as those disclosed through the above examples or understood by those persons skilled in the art may be incorporated in other aspects or embodiments of the present disclosure.

Figure 13A:
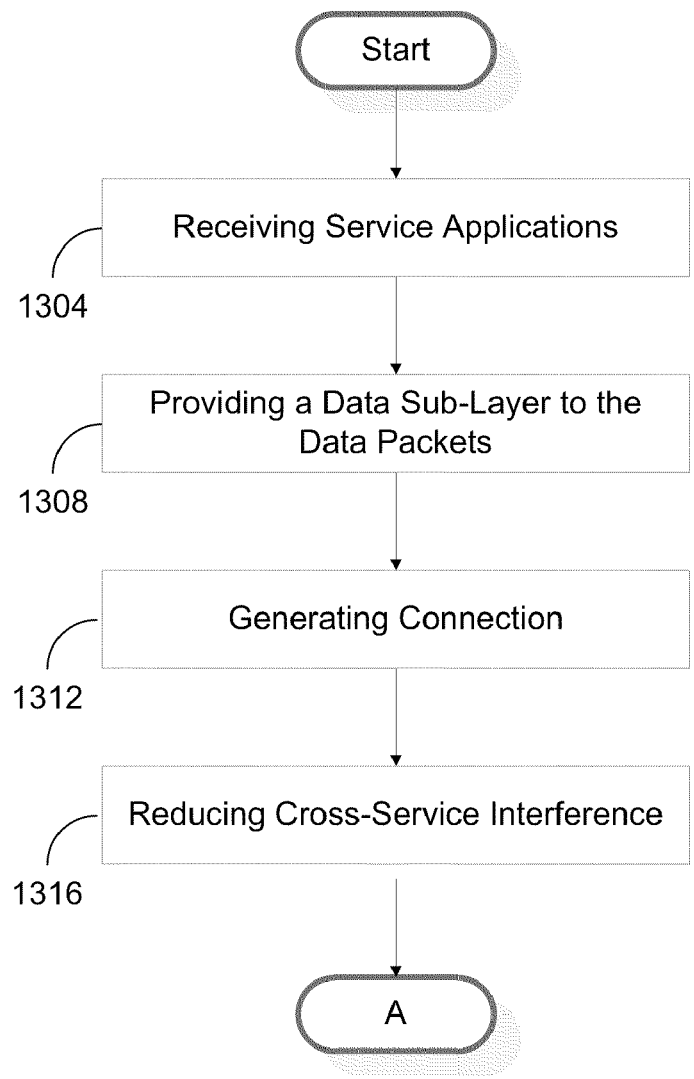
FIGS. 13A-13D provide exemplary flowcharts that show example methods of providing multiple services to premises over communication networks.

FIGS. 13A-13D provide exemplary flowcharts that show example methods of providing multiple services to premises over communication networks. In FIG. 13A, the example method shown may include a step for receiving one or more service applications, as shown in block 1304. The service applications may be received by a primary server or a secure access node and stored in a storage device or memory. Each of the one or more service applications may be received from the primary server or from a secondary server. For example, the one or more service applications may be an email application received from a primary server, an e-commerce application received from a secondary server, an energy management service application received from another secondary server, or other service applications.

A further step in the example method may be providing a data sub-layer to one or more data packets, as shown in block 1308, by a network element using a service adapter software application that is part of the network element's software platform. The network element may be a primary server or a secure access node. For example, the service adapter software application may be encryption software to provide increased security (e.g. DES, RSA, etc.), proprietary commands to reduce cross-service interference (e.g. preventing energy management service to turn off aspects of premises security service), and quality of service tags to provide additional service features to the end point device (e.g. prioritizing streaming video over e-commerce transactions). Persons of ordinary skill in the art would recognize that the data sub-layer may not only be implemented under the application layer but also may be implemented under any communication protocol layer (e.g. transport, network, datalink, physical, etc.).

Another step in the example method may be generating a connection or tunnel, as shown in block 1312, by a network element using a communication software application that is part of the network element's software platform. The network element may be a primary server or a secure access node. Examples of tunneling technology that may be used by the communication software applications may include, but are not limited to, Generic Routing Encapsulation (GRE), Layer 2 Tunneling Protocol (L2TP), Point-to-Point Tunneling Protocol (PPTP) as well as other plaintext and non-plaintext tunneling protocols. Alternatively, the communication software application may utilize other communication software technologies to generate aspects of a virtual network for a particular service. These communication technologies may include Multiprotocol Label Switching (MPLS) technology or other communication technology that generates and maintains a connection using either a circuit-switched or packet-switched technology.

An additional step in the example method may be reducing cross-service interference, as shown in block 1316, using a service segregation engine that is part of a network element's software platform. The network element may be either a primary server or a secure access node. For example, the segregation engine may reduce cross-service interference by preventing an energy management service provider from shutting off an alarm or sensor as part of a premises security system.

Figure 13B:
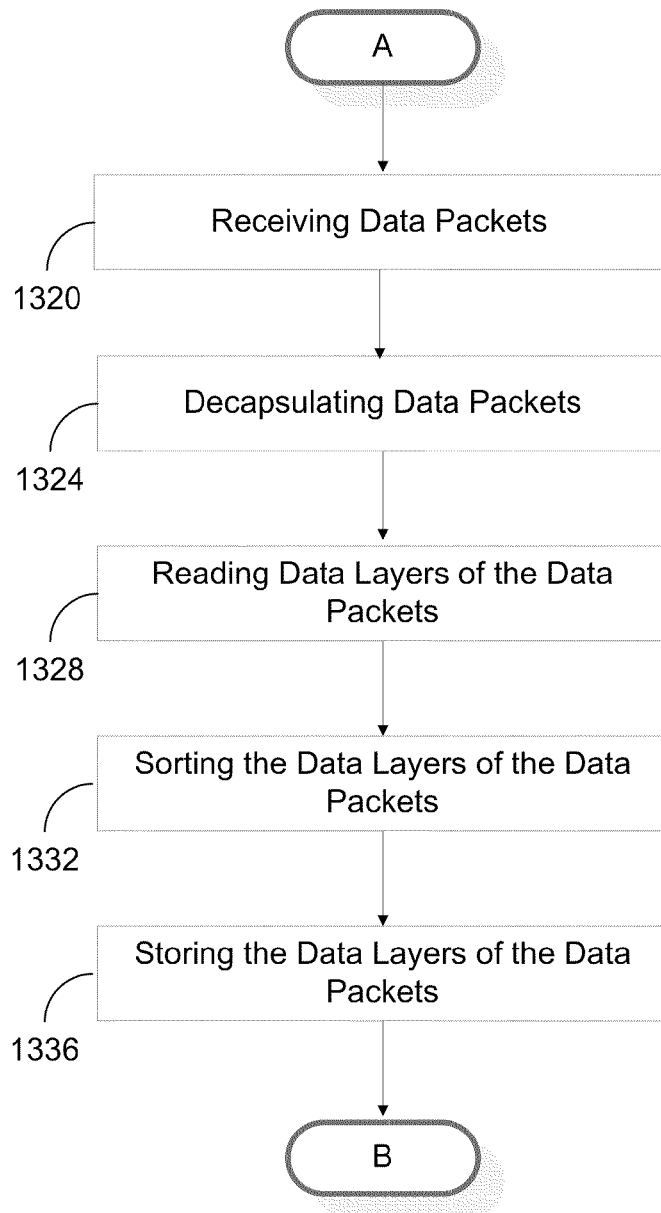

Referring to FIG. 13B, the example method may include receiving data packets by a primary server or secure access node through one or more communication interfaces, as shown in block 1320. The data packets may be stored in a storage device within the primary server or secure access node. A further step in the example method may be decapsulating the data packets, as shown block 1324, using an inspection software application of a deep packet inspection engine residing on the primary server or secure access node as part of a software platform. Decapsulating may include separating the data from each communication data layer (e.g. physical, datalink, network, transport, application, etc.) of the data packet. An additional step in the example method may be reading data from the different layers of the decapsulated data packet, as shown in block 1328, using a reader software application of the deep packet inspection engine residing on the primary server or secure access node. Another step in the example method may be sorting the data from the different layers of the decapsulated data packet into different categories using a sorting software application of the deep packet inspection engine, as shown in block 1332. Further, the sorting software application may store the sorted data in a storage device according to different categories, as shown in block 1336. The storage device may have different memory subcomponents such that each category of sorted data may be stored in a different memory subcomponent.

Figure 13C:
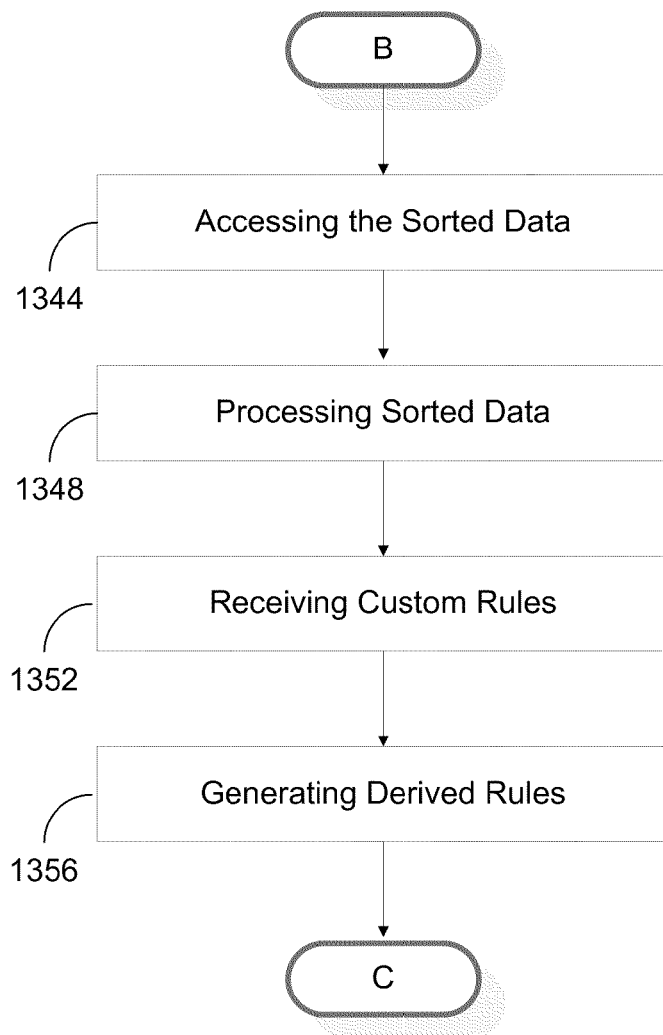

Referring to FIG. 13C, the example method may include accessing sorted data from the different memory subcomponents within a storage device, as shown in block 1344, using an analyzing software application of a rules generation engine that is part of a primary server's or secure access node's software platform. A further step in the example method may be processing the sorted data to determine end point device behavior, as shown in block 1348. For example, the analyzing software application may access the sorted data and determine that an end point device such as a home computer does not conduct e-commerce between 9 am-5 pm on most days.

An additional step in the example method may be receiving custom rules from user software application that may be part a rule generation engine through a user interface of the primary server or secure access node, as shown block 1352. For example, a custom rule may be to allow e-commerce activity between 9 am-5 pm on weekends. Another step in the example method may be generating derived rules using a rule generator software application that may be part of the rule generation engine, as shown in block 1356. The derived rules may be generated based on the analysis of the sorted data provided by an analyzing software application and based on the received custom rules. An exemplary derived rule may be preventing e-commerce activity between 9 am-5 pm on weekdays. Note that custom rules and derived rules may be called services rules collectively.

Figure 13D:
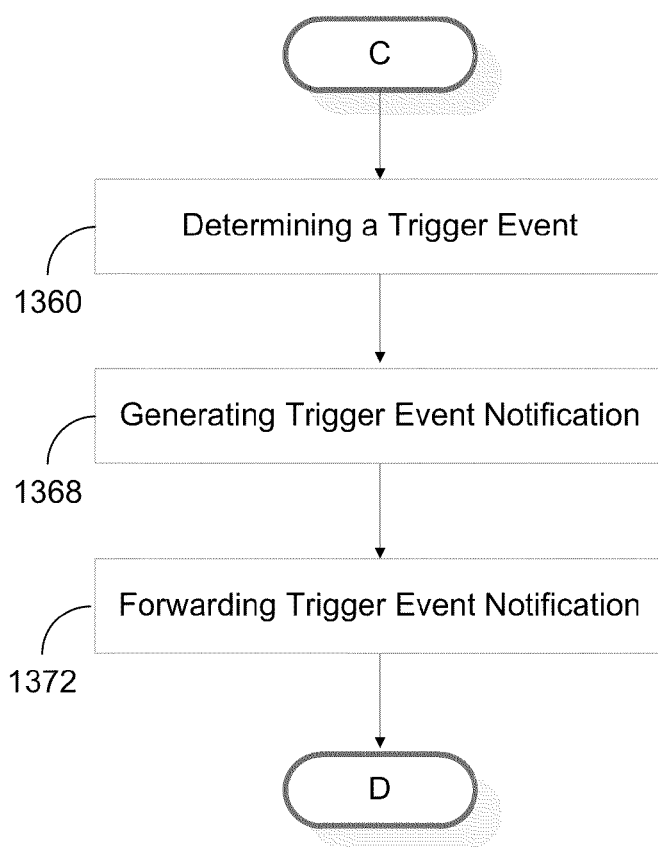

Referring to FIG. 13D, the example method may include determining a trigger event using a rule check software application of a rule check and notification generation software application that may be part of a primary server's or secure access node's software platform, as shown in block 1360. The rule check software application may access received data from data packets as well as the service rules from a storage device. A trigger event may be determined based on the received data and/or service rules. For example, a service rule may be obtained by the rule check software application that states no e-commerce activity may be conducted between 9 am-5 pm on weekdays on a particular end point device. However, the rule check software application also obtains data from received data packets that shows the particular end point device is conducting e-commerce activity at 10:03 am on a Monday. Thus, the rule check software application may determine and generate a trigger event based on e-commerce activity is being conducted during a prohibited time according to the service rule.

A further step in the example method may be generating a trigger event notification using a notification generator software application as part of the rule check and notification generation software application, as shown in block 1368. For example, based on the exemplary trigger event based on prohibit e-commerce conduct by an end point device, the notification generator software application generates an exemplary trigger event notification that may state "Warning: Prohibited E-Commerce Activity Conducted." An additional step in the method may be forwarding the trigger event notification to a user output software application that is part of the rule check software application, as shown in block 1372. The user output software application may display the trigger event notification to a user through a user interface.

Based upon such systems, devices, and methods for providing multiple services to premises over communication networks and that the architecture may engender a cooperative behavior among the service providers along with the system manufacturer, a business model (e.g. one or more business processes) may be provided that incentivizes and compensates participating parties. The primary service provider may be compensated for providing the communications infrastructure as shown in the associated figures and described in the present disclosure to each of the secondary service providers which is typically based on each secondary service's use of the communications infrastructure. Thus, compensation can come in the form of revenue sharing from each of the service providers based on their monthly or annual subscription fees as well as additional revenues that each service provider obtains from advertising, e-commerce, etc. Further, the compensation to a system manufacturer may be a portion of such revenue from the primary service provider based upon the analytical data and cross-service data that is generated by the systems, devices, and methods implemented by system manufacture equipment and may thus continuously be improved upon for the purpose of further enhancing the end user experience Cross-service data is information that may be gathered at any data layer (e.g. physical, datalink, network, transport, application, etc.) from different services and may be provided to a separate distinct service. The above-mentioned business processes can co-exist with the usual license fee and annual maintenance fee used for most products.

A system may run software that is used to collect data from all the connected services. For example, an electronic commerce system may take the user's request for a good or service, may poll the system for general status information data and may also retrieves the user's stored profile (cookie) associated with the electronic commerce system that includes past buying history and other learned history. The electronic commerce system may then run an algorithm that first removes any mismatches between offered available goods or services in the electronic commerce system's available goods and services and the requested good or service parameters (explicit criteria) in addition to known environmental factors from system data and the user profile (implicit criteria). Next, the goods or services that meet the user's explicit and implicit criteria may be prioritized based on other factors that are taken from secure access node data and a user profile. The selected goods or services with their associated advertisements may be presented to the user. The advertisements are logged for collecting a fee and the user's profile may be updated to enhance future prioritizations.

If the user selects a specific good or service for purchase, the purchase may be logged for collecting a commission, the user profile may be updated and the relevant and not private criteria (e.g. price, delivery, installation, warranty, maintenance contracts, features, etc. for males, females, home owners, renters, of different age groups, that watch certain TV channels, that use the electronic commerce system at specific times, have home security systems, home energy management systems, etc.) in the selection is fed to a common data base. The common data base may be used by the system manufacturer (e.g. manufacturer of the secure access node or primary server software) to identify trends (e.g. demographic) used in weighting the prioritization algorithm vectors for specific goods or services selections which is done off line by an electronic commerce system vendor. Electronic commerce logged advertising and sales may be tallied periodically so that purveyors of goods or services can be billed and so that the electronic commerce system vendor can be paid.

Systems may include a Video Service Multiplexer (VSM) whereby, microsegmented advertising can be implemented. The video service multiplexer permits advertisements that are pertinent to specific groups of users to be downloaded to the VSM of each group. When appropriate time slots that permit substitution become available on the content delivery system (e.g. Cable TV channel being viewed), a substitution can be made. This mechanism allows a single time slot to be used with different advertisements to different groups of viewers at the same time. For example, apartment dwellers may receive advertisements for renters insurance and home owners may receive different advertisements for homeowner's insurance. The end user satisfaction is increased by only seeing pertinent advertisements and the content distributer can re-sell the same time slot repeatedly for the same value as the value in general of any advertisement is relative to its potential market not the total audience.

Figure 14:
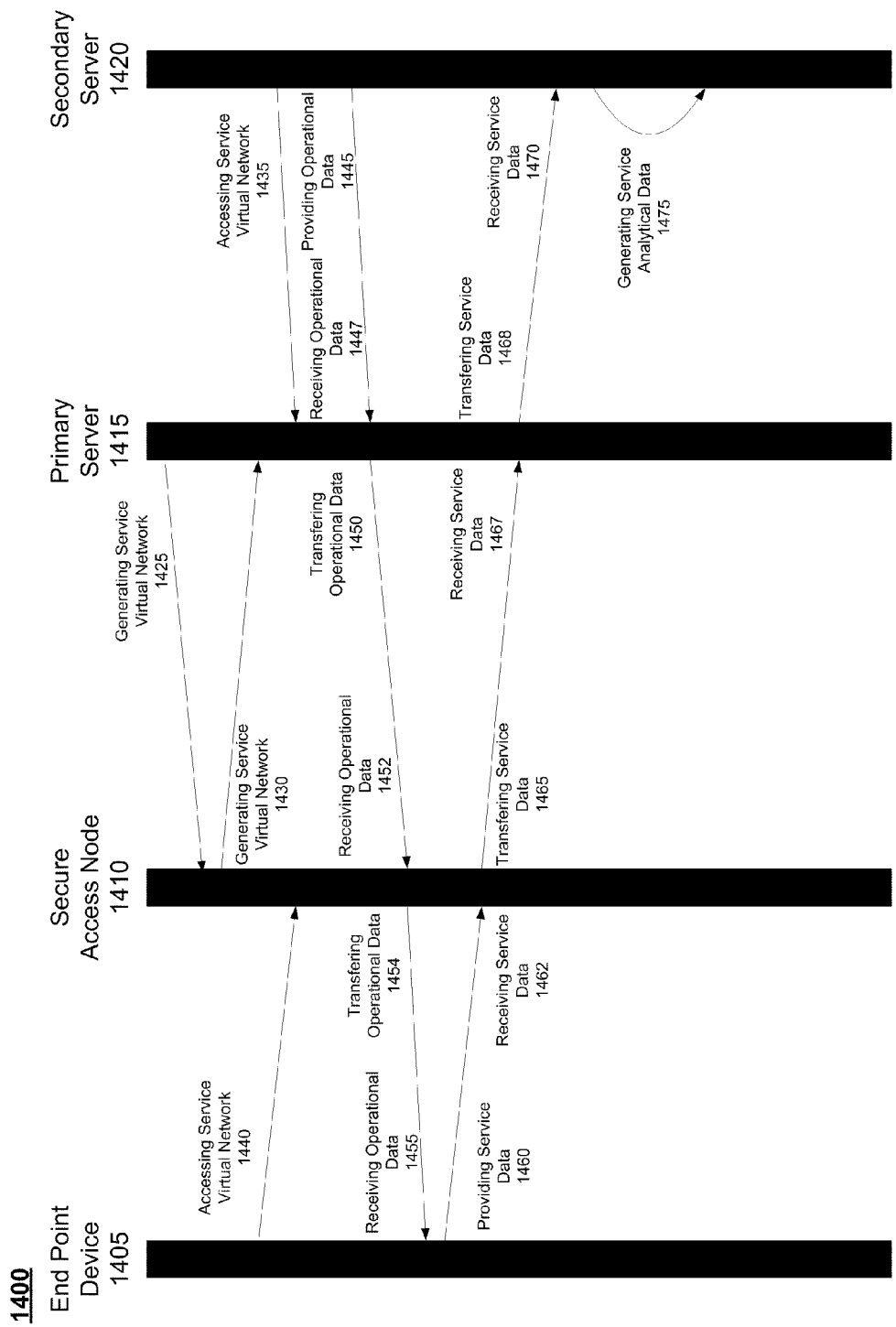
FIGS. 14-16 are exemplary transaction diagrams that show example systems, devices and methods for providing a plurality of services to premises over one or more communication networks.

FIG. 14 is an exemplary transaction diagram 1400 that shows example systems, devices and methods for providing a plurality of services to premises over one or more communication networks. The diagram includes functional blocks that represent an end point device 1405, a secure access node, 1410, a primary server 1415, and a secondary server 1420. Persons of ordinary skill in the art would recognize that the configuration of the transaction diagram in FIG. 14 is exemplary and that a primary server may be coupled to one or more secure access nodes and one or more secondary servers. Further, each secure access node may be coupled to one or more end point devices.

FIG. 14 further shows exemplary transactions performed by one or more network nodes, namely the end point device 1405, the secure access node, 1410, the primary server 1415, and the secondary server 1420. A first transaction may be generating a service virtual network 1425 by the primary server 1415 using one or more primary server software applications. The service virtual network may carry one or more primary services provided by the primary server (owned, controlled or managed by a primary service provider) to different end point devices across different communication networks. Alternatively, service virtual network may carry one or more secondary services provided by a secondary server (owned, controlled or manage by a secondary service provider). Subsequently, the one or more secure access nodes (each secure access node may be residing in a different customer premises) may also generate or establish a service virtual network 1430 with the primary server 1415. Once the service virtual network is established for a service, the service virtual network may incorporate aspects of the service virtual network described in the present disclosure. This may include segregating the service carried by the service virtual network from other services in different service virtual networks spanning the primary server 1415 and the secure access node 1410.

Further, the service virtual network may provide one or more communication interfaces for the service virtual network residing on different network devices. The communication interfaces may be hardware interfaces such as ether port, USB, WiFi, WiMax, Bluetooth, etc. or software that allows the primary server 1415 or secondary server 1420 as well as the secure access node 1410 and the end point device 1405 to access the service virtual network from any one data layer or a combination of data layers as known to those skilled in the art and as described in the present disclosure. Each access point may be considered a service virtual network communication interface. Thus, there may be an end point service virtual network communication interface, a secure access node service virtual network communication interface, a primary server service virtual network communication interface, and a secondary server service virtual network communication interface. Data layers may include the physical layer, the datalink layer, the network layer, the transport layer, the application layer. For example, the service virtual network may provide an adaption layer as part of the service virtual network at the application layer, or alternatively, at the network layer depending on the circumstances (network status, type of service, etc.). Thus, another transaction depicted in FIG. 14 may be a secondary server 1420 accessing the service virtual network 1435 provided by the primary server 1420 and the secure access node 1410 using a server virtual network communication interface. A secondary server function may control at least in part the server virtual network communication interface. In addition, the end point device 1405 may access the service virtual network 1440 using an end point virtual network communication interface.

Once the secondary server 1420 has accessed or been logically coupled to the service virtual network via the server virtual network communication interface controlled by a service virtual network secondary server function, the secondary server may provide operational data for the service carried by the service virtual network 1445. Accordingly, the primary server 1415 may receive the operational data from the secondary server 1447. The primary server 1415 may then transfer the operational data 1450 from the primary server 1415 to the secure access node 1410. Accordingly, the secure access node 1410 may receive the operational data 1452 from the primary server 1415. The secure access node, may in turn, transfer operational data 1454 to the end point device 1405. Consequently, the operational data may be received 1455 by the end point device 1405.

In addition, the end point device 1405 may provide service data 1460 destined for the secondary server 1420 to the secure access node 1410 which receives the service data 1462, accordingly, and transfers the service data 1465 to the primary server 1415. The service data may be received 1467 by the primary server 1415 and then transfer the service data 1468 to the secondary server 1420. The secondary server 1420 may receive the service data 1470 and then process the service data 1475 to provide additional service features or configuration data to the end point device 1405. Note, that the transactions for providing, receiving and transferring operational data shown in FIG. 14 as well as the providing, receiving, and transferring service data are carried by the service virtual network.

Figure 15:
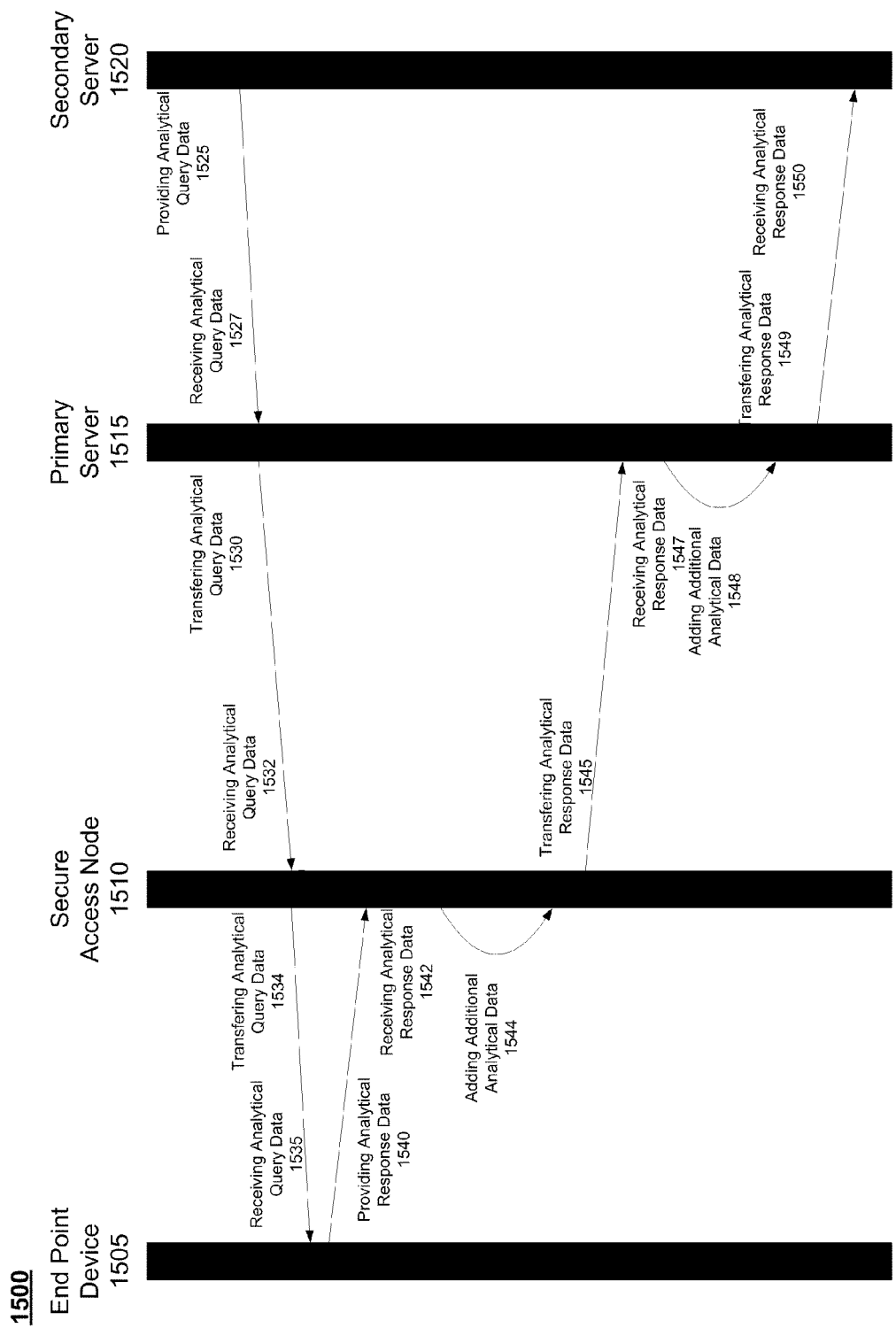

FIG. 15 is an exemplary transaction diagram 1500 that shows example systems, devices and methods for providing a plurality of services to premises over one or more communication networks. The diagram includes functional blocks that represent an end point device 1505, a secure access node, 1510, a primary server 1515, and a secondary server 1520. Persons of ordinary skill in the art would recognize that the configuration of the transaction diagram in FIG. 15 is exemplary and that a primary server may be coupled to one or more secure access nodes and one or more secondary servers. Further, each secure access node may be coupled to one or more end point devices.

A secondary service provider may request analytical information from an end point device 1505 using a secondary server 1520. The end point device 1505 may provide analytical information in response to the secondary service provider request. The secondary service provider may process the analytical information using the secondary server 1520 to provide additional service features or reconfiguration data to the end point device 1505. For example, secondary service provider by the secondary server 1520 may be streaming media provider that streams movies, television shows, and other media to a computer or television end point device 1505. Further, the end point device may have analytical information that may include a recent science fiction television show viewed or recent searches to movie websites for the most recent science fiction thriller playing at a local theater. The end point device 1505 may provide such analytical information upon request by the secondary server 1520 so that the secondary server 1520 may advertise science fiction content that the secondary server 1520 may stream to the end point device 1505.

Thus, FIG. 15 shows the exemplary transactions for the secondary server 1520 requesting analytical information and the end point device 1505 responding to the request. Further, FIG. 15 shows the transactions performed by the primary server 1515 and the secure access node 1510.

Before the transactions shown in FIG. 15 are performed, a service virtual network may be generated and established as discussed in describing FIG. 14. Thereafter, the secondary server 1520 may provide analytical query data 1525 destined for the end point device 1505 to request analytical information. The primary server 1515 may receive the analytical query data 1527 and transfer the analytical query data 1530 to the secure access node 1510. Moreover, the secure access node 1510 may receive the analytical query data 1532 and transfer the analytical query data 1534 to the end point device 1505 which in turn receives the analytical query data 1535.

The end point device 1505 may provide analytical response data 1540 destined for the secondary server 1520 after receiving or in response to the analytical query data. The secure access node 1510 may receive the analytical response data 1542 and transfers the analytical response data 1545 to the primary server 1515. Prior to transfer the secure access node 1510 may analyze and process the analytical response data 1544 sent by the end point device 1505. Accordingly, the secure access node 1510 may add additional analytical response data based on the above analysis and processing 1544. Moreover, the primary server 1515 may receive the analytical response data 1547 and transfers the analytical response data 1549 to the secondary server 1525 which in turn receives the analytical response data 1550. Prior to transfer, the primary server 1515 may analyze and process the analytical response data 1548 sent by the secure access node 1510. Accordingly, the primary server 1515 may add additional analytical response data as well as cross-service functional data based on the above analysis and processing 1548.

Figure 16:
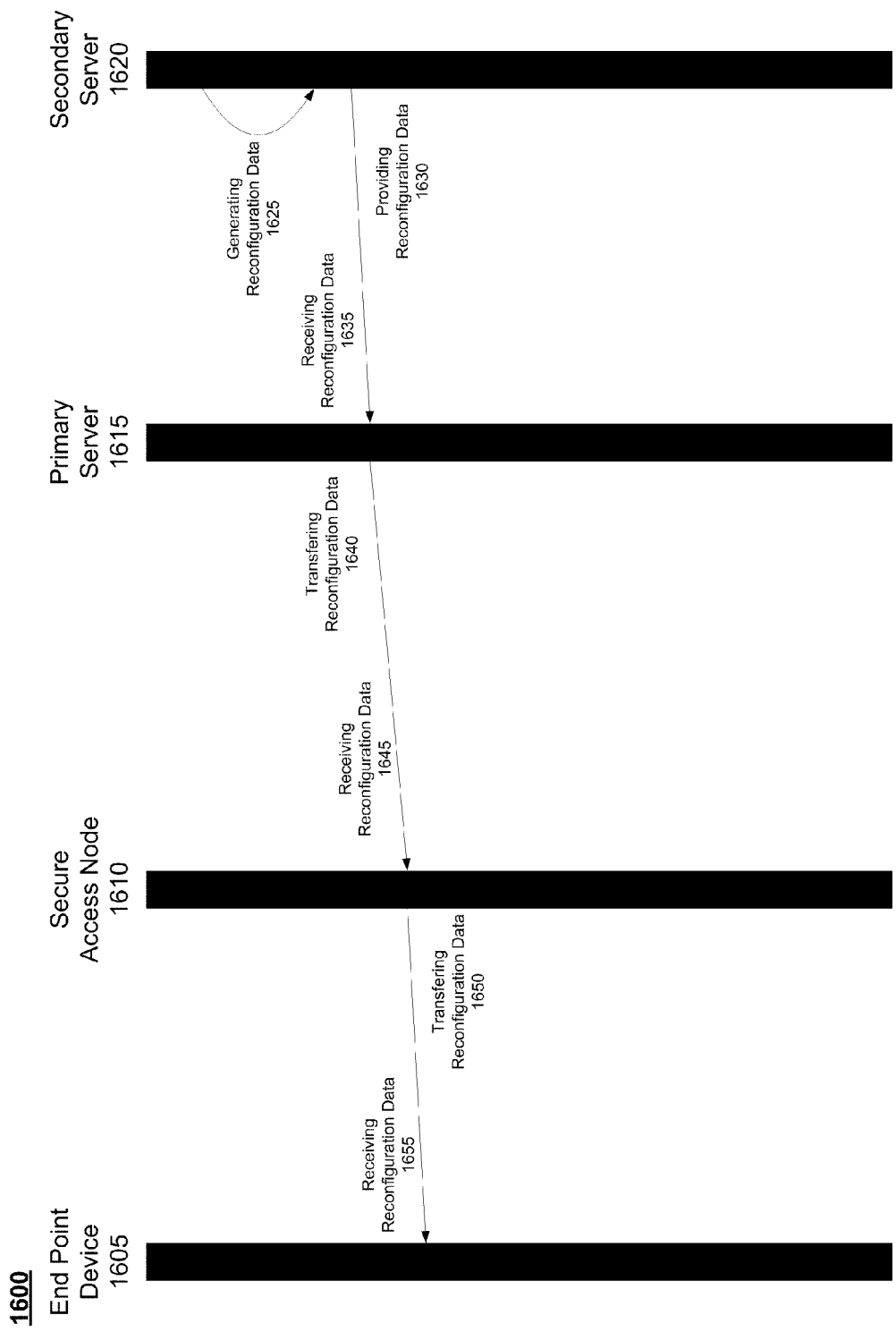

FIG. 16 is an exemplary transaction diagram 1600 that shows example systems, devices and methods for providing a plurality of services to premises over one or more communication networks. The diagram includes functional blocks that represent an end point device 1605, a secure access node, 1610, a primary server 1615, and a secondary server 1620. Persons of ordinary skill in the art would recognize that the configuration of the transaction diagram in FIG. 16 is exemplary and that a primary server may be coupled to one or more secure access nodes and one or more secondary servers. Further, each secure access node may be coupled to one or more end point devices.

As shown and described in FIG. 15, a secondary server may receive end point device analytical information. Further, the secondary server may process the analytical information and determine to send reconfiguration data destined for the end point device to reconfigure the end point device. For example, the secondary server may be operated by an e-commerce website and the end point device may be a computer. Analytical information may show that parental controls are set on the computer to inhibit children in the evening hours to purchase from the e-commerce website. However, one evening parental controls have not been set during the evening hours. The secondary server may process the analytical information and then determine to provide reconfiguration data to the end point device to institute parental controls on the e-commerce website as is customary.

Before the transactions shown in FIG. 16 are performed, a service virtual network may be generated and established as discussed in describing FIG. 14. Thereafter, the secondary server 1620 may generate reconfiguration data 1625 based on analytical data received from the end point device 1605. Further, the secondary server 1620 may provide the reconfiguration data 1630 to the primary server 1615. Consequently, the primary server 1615 may receive the reconfiguration data 1635 and transfer the reconfiguration data 1640 to the secure access node 1610. Moreover, the secure access node 1610 may receive the reconfiguration data 1645 and transfer the reconfiguration data 1650 to the end point device 1605. The reconfiguration data may be received 1655 by the end point device 1605 and may process to provide the additional service features or other functions as directed by the reconfiguration data.

Figure 17:
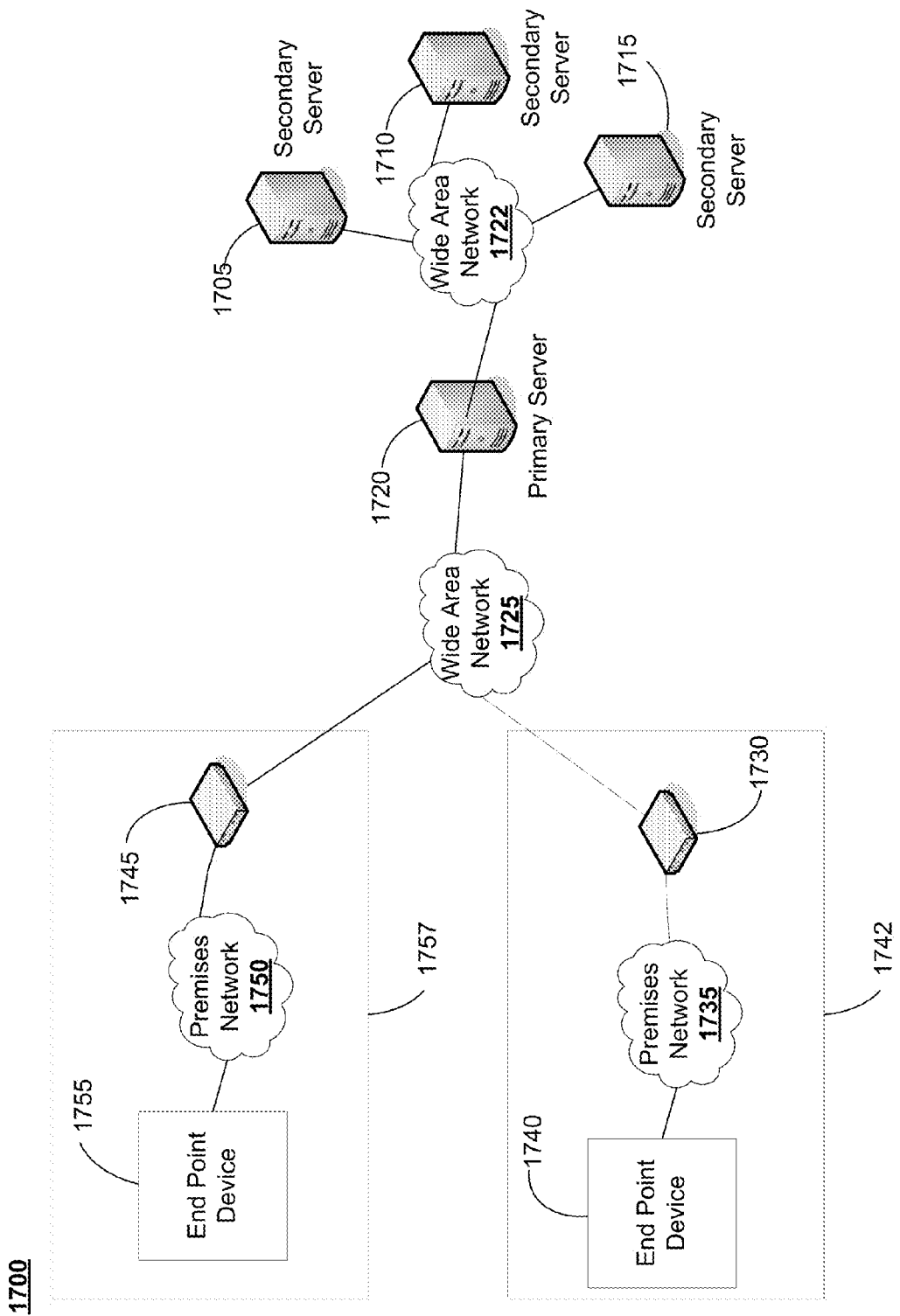
FIG. 17 shows an exemplary network architecture for providing a plurality of services to premises over one or more communication networks.

FIG. 17 shows exemplary network architecture 1700 for providing a plurality of services to premises over one or more communication networks. The systems, devices, nodes, and communication networks shown in FIG. 17 may be similar to the systems, devices, nodes, and communication networks shown in FIG. 1 and as described in the present disclosure. The exemplary network architecture 1700 can support different services including generating, transferring, and managing advertisements for a primary service provider as well as one or more secondary service providers. The exemplary network architecture 1700 may include a secondary server 1705, secondary server 1710, and secondary server 1715. Each secondary server (1705, 1710, and 1715) may be coupled to a primary server 1720 through a wide area network (WAN) 1722. Further, each secondary server (1705, 1710, and 1715) may be owned and operated by a different secondary service provider and the primary server 1720 may be owned and operated by a primary service provider. For example, a secondary server 1705 may be owned and operated by an e-commerce service provider while secondary servers (1710 and 1715) may each be owned and operated by different cable content providers (e.g. Netflix, Amazon, etc.). Additionally, the primary server 1720 may be owned and operated by a cable service provider. Such a cable service provider may provide cable television services as well as Internet services to customer premises.

As shown in FIG. 17, the network architecture 1700 includes the primary server 1722 coupled to two secure access nodes (1730 and 1745) across a wide area network 1725, each secure access node (1730 and 1745) may be located in a different customer premises (1742 and 1757). Persons of ordinary skill in the art would recognize that the primary server 1720 coupled to two secure access nodes (1730 and 1745) is exemplary and that the primary server 1720 may be coupled to several more secure access nodes, if need be, across the wide area network 1725.

In one customer premises 1742, the secure access node 1730 may be coupled to an end point device 1740 across a premises network 1735. Persons of ordinary skill in the art would recognize that the secure access node 1720 coupled to the end point device 1740 is exemplary and that the secure access node 1730 may be coupled to several more end point devices, if need be, across the premises network 1735.

In the other customer premises 1757, the secure access node 1745 may be coupled to an end point device 1755 across a premises network 1750. Persons of ordinary skill in the art would recognize that the secure access node 1745 coupled to the end point device 1755 is exemplary and that the secure access node 1745 may be coupled to several more end point devices, if need be, across the premises network 1750.

The exemplary network architecture 1700 shown in FIG. 17 may depict, for example, one customer premises 1742 to be one residence with the end point device 1740 being a computer providing streaming media services and content to a first user. Alternatively, the other customer premises 1757 may be another residence such that the end point device 1755 may also be a computer providing streaming media services and content to a second user. Continuing with the example, the primary server 1720 may be a cable service provider that is coupled to the end point devices (1740 and 1755) via the wide area network 1725 as well as the respective secure access nodes (1730 and 1745) and premises networks (1735 and 1750). Further, the secondary server 1710 may be a first streaming media content provider and the secondary server 1715 may be a streaming media content provider.

The primary server 1720 may access analytical information from each end point device (1740 and 1755) through their respective secure access nodes (1730 and 1745), premises networks (1735 and 1750) and the wide area network 1725. The primary server 1720 may pass the analytical information to secondary server 1710 that that is a Netflix server and secondary server 1715 that is an Amazon server to the cable service provider, for example. The analytical information may show that one end point device 1740 has a propensity of showing foreign films to the first user. Alternatively, the analytical information may show that one end point device 1755 has a propensity of showing comedy films to the second user. The secondary server 1710 (e.g. Netflix) and the secondary server 1715 (e.g. Amazon) may generate and provide advertisements for the end point devices 1740 and 1755 for their respective content. For example, secondary server 1710 might have more foreign film content than secondary server, 1715, however, secondary server 1715 might have more comedy film content than secondary server 1710. Consequently, the secondary server 1710 may provide a foreign film advertisement to the primary server 1720 and the secondary server 1715 may provide a comedy film advertisement to the primary server 1720. Further, the primary server 1720 (cable service provider server) may then manage the advertisements to route the foreign film advertisement from secondary server 1710 to the end point device 1740 during a certain time slot during user viewing and the comedy film advertisement from secondary server 1715 to the end point device 1755 during the same time slot. Thus, the network architecture 1700 including the systems, devices, nodes, and networks shown in FIG. 17 supports targeted advertisements to be displayed on multiple end point devices during the same time slot. Alternatively, the primary server (cable service provider server) may generate and provide an advertisement to the first user such as discount rates for different foreign film movie packages offered by the cable service provider, for example.

Figure 18:
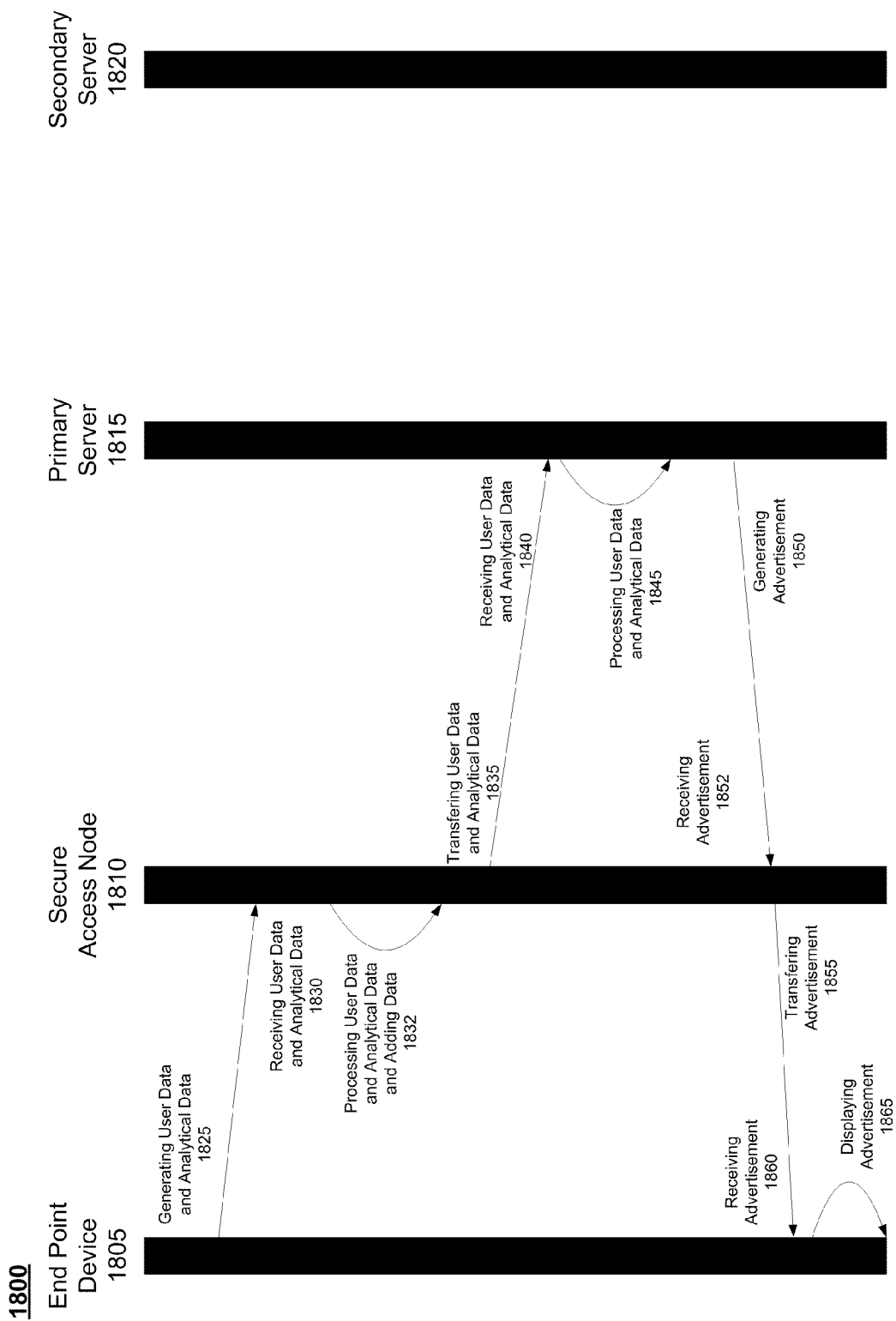
FIGS. 18 and 19 are exemplary transaction diagrams that show example systems, devices and methods for providing a plurality of services to premises over one or more communication networks.

FIG. 18 is an exemplary transaction diagram that shows example systems, devices and methods for providing a plurality of services to premises over one or more communication networks. The diagram includes functional blocks that represent an end point device 1805, a secure access node, 1810, a primary server 1815, and a secondary server 1820. Persons of ordinary skill in the art would recognize that the configuration of the transaction diagram in FIG. 18 is exemplary and that a primary server may be coupled to one or more secure access nodes and one or more secondary servers. Further, each secure access node may be coupled to one or more end point devices.

A first transaction shown in FIG. 18 may be an end point device, such as a set top box-television combination, generating user data and analytical data 1825. The user data may include user preferences inputted by the user into the set top box or other configuration information. Analytical data may include the programming preferences by the user for cable television programming. Further, the end point device 1805 may provide the user data and analytical data to the secure access node 1810. Further, the secure access node 1810 may receive the user data and analytical data 1830 from the end point device 1805 and may transfer the user data and analytical data 1835 to the primary server 1815. However, before transfer, the secure access node processes the received data and may add additional data 1832. The additional data may be cross-service functional user data and other cross-service functional data such as from e-commerce service provider. The primary server 1815 may receive the user data and analytical data 1840. Moreover, the primary server 1815 may process the user data and analytical data 1845 received from secure access node and generate an advertisement 1850 based on the user data and analytical data. For example, the primary server 1815 may be a cable service provider server. The primary server may process the user data and analytical data to determine that the user of the end point devices has a propensity to view movie programming. Consequently, the primary server 1815 may generate an advertisement of different movie packages offered by the cable service provider, for example. The primary server 1815 may provide the advertisement to the secure access node 1810. Further, the secure access node 1810 may receive the advertisement 1852 and transfer the advertisement 1855. In addition, the end point device 1805 may receive the advertisement 1860 and display the advertisement 1865. The advertisement may be displayed according to instructions conveyed by the primary server 1815.

Figure 19:
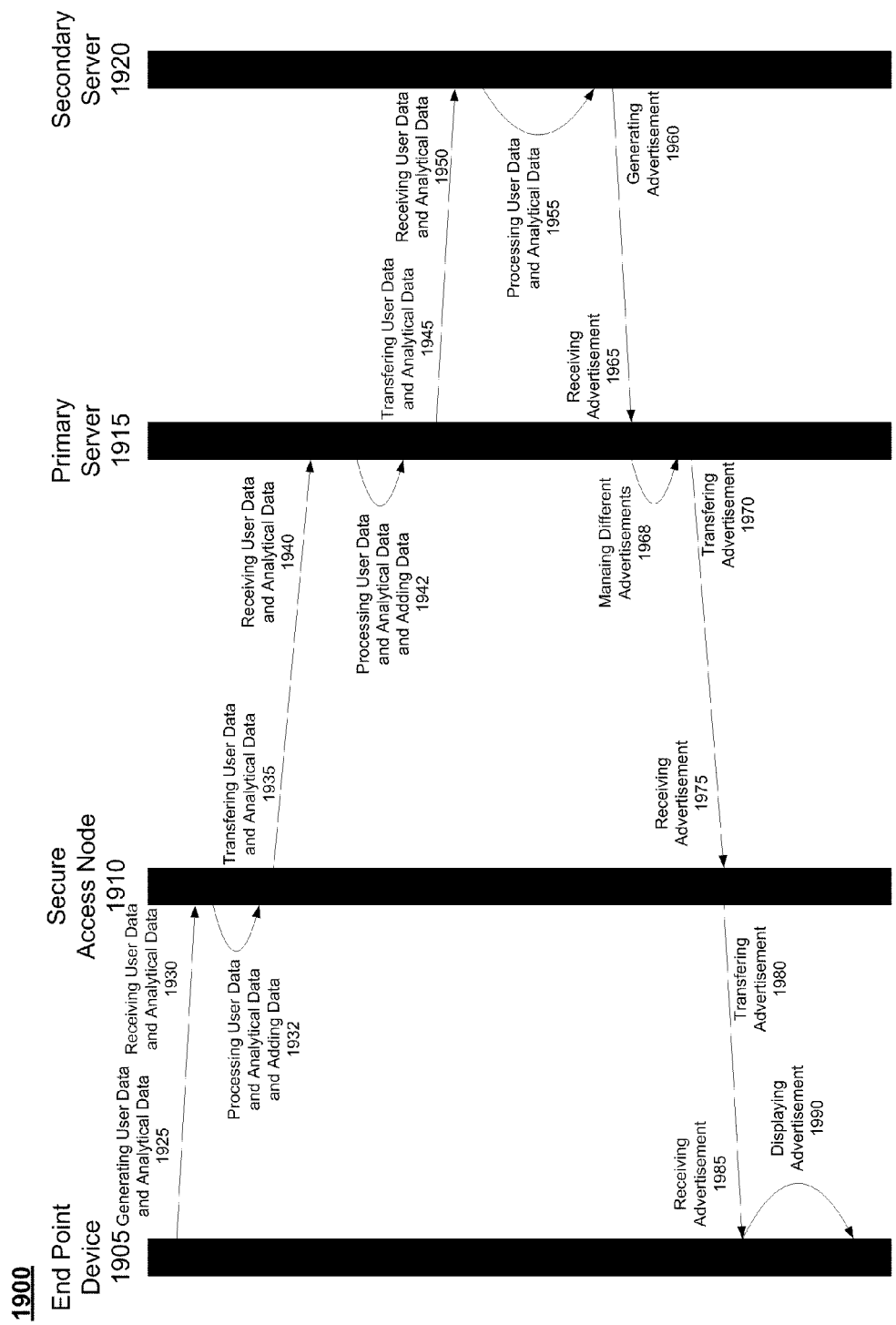

FIG. 19 is an exemplary transaction diagram that shows example systems, devices and methods for providing a plurality of services to premises over one or more communication networks. The diagram includes functional blocks that represent an end point device 1905, a secure access node, 1910, a primary server 1915, and a secondary server 1920. Persons of ordinary skill in the art would recognize that the configuration of the transaction diagram in FIG. 19 is exemplary and that a primary server may be coupled to one or more secure access nodes and one or more secondary servers. Further, each secure access node may be coupled to one or more end point devices.

A first transaction shown in FIG. 19 may be an end point device, such as a set top box-television combination, generating user data and analytical data 1925. Such a set-top-television combination may have a capability of receiving and displaying streaming media from one or more secondary service providers. The user data may include user preferences inputted by the user into the set top box or other configuration information. Analytical data may include the viewing preferences by the user for streaming media. Further, the end point device 1905 may provide the user data and analytical data 1925 to the secure access node 1910. In addition, the secure access node 1910 may receive the user data and analytical data 1930 from the end point device 1905 and may transfer the user data and analytical data 1935 to the primary server 1915. Before transfer, the secure access node may process the received data and add additional data such as cross-service functional user data and other cross-service functional data such as from e-commerce service provider 1932. The primary server 1915 may receive the user data and analytical data 1940 and transfer the user data and analytical data 1945. Before transfer, the primary server may process the received data and add additional data such as cross-service functional user data and other cross-service functional data such as from or for an e-commerce service provider 1942. The secondary server 1920 may receive the user data and analytical data 1950. Moreover, the secondary server 1920 may process the user data and analytical data 1955 and generate an advertisement 1960 based on the user data and analytical data. For example, the secondary server 1920 may be a streaming media provider such as Netflix. The secondary server 1920 may process the user data and analytical data to determine that the user of the end point devices has a propensity to view certain types of films (e.g. drama, comedy, action, foreign, etc.). Consequently, the secondary server 1920 may generate an advertisement for streaming media content offered by the streaming media provider, for example. The advertisement may be provided to, and received by 1965, the primary server 1915 which may be a cable service provider server. The primary server may receive several different advertisements from different cable content providers. Consequently, the primary server 1915 may manage the advertisements from different content providers (e.g. streaming media, etc.) 1968, for example. As part of managing the advertisements, the primary server 1915 may select the appropriate advertisement from a particular cable content provider for the specific end point device 1905 and the time slot to instruct the end point device to display the advertisement. Once the primary server 1915 selects the advertisement for the end point device 1905, the primary server 1915 may transfer the advertisement 1970 to the secure access node 1910. Further, the secure access node 1910 may receive the advertisement 1975 and transfer the advertisement 1980. In addition, the end point device 1905 may receive the advertisement 1985 and display the advertisement 1990. The advertisement may be displayed according to instructions (e.g. time slot, etc.) conveyed by the primary server 1915.

Figure 20:
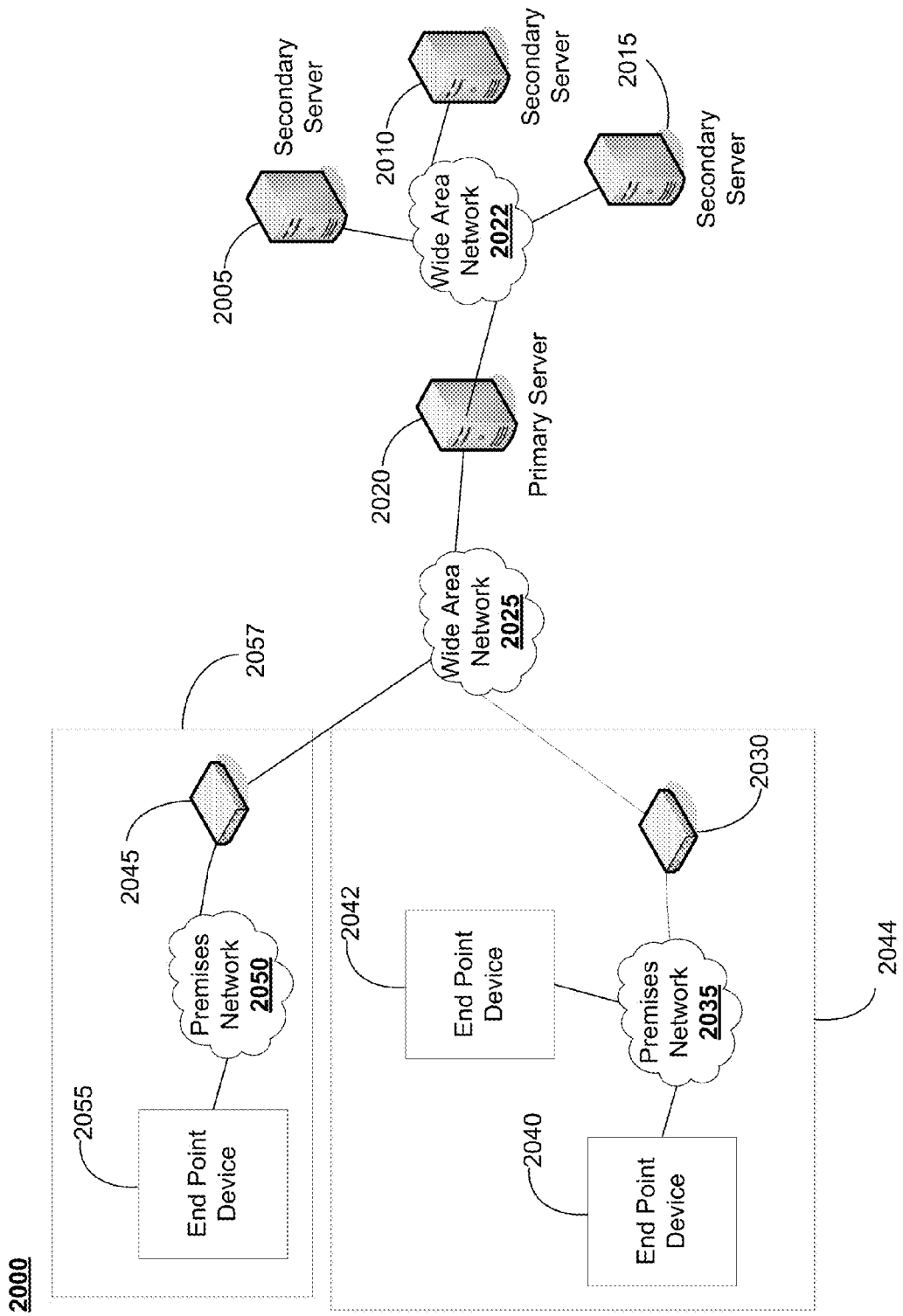
FIG. 20 is an exemplary network architecture for providing a plurality of services to premises over one or more communication networks.

FIG. 20 shows exemplary network architecture 2000 for providing a plurality of services to premises over one or more communication networks. The systems, devices, nodes, and communication networks shown in FIG. 20 may be similar to the systems, devices, nodes, and communication networks shown in FIG. 1 and as described in the present disclosure. The exemplary network architecture 2000 can support different services including a primary service provider collecting service data and analytical data from several different end point devices, processing the service data and analytical data by a primary server 2020 owned and operated by the primary service provider, and providing cross-service functions to one or more secondary service providers based on the service data and analytical data.

The exemplary network architecture 2000 may include a secondary server 2005, secondary server 2010, and secondary server 2015. Each secondary server (2005, 2010, and 2015) may be coupled to a primary server 2020 through a wide area network (WAN) 2022. Further, each secondary server (2005, 2010, and 2015) may be owned and operated by a different secondary service provider and the primary server 2020 may be owned and operated by a primary service provider. For example, a secondary server 2005 may be owned and operated by an e-commerce service provider, secondary server 2010 may be owned and operated by an energy management provider, and secondary server 2015 may be owned and operated by a premises security provider. Additionally, the primary server 2020 may be owned and operated by an Internet service provider. Such an Internet service provider may provide Internet services to customer premises.

As shown in FIG. 20, the network architecture 2000 includes the primary server 2020 coupled to two secure access nodes (2030 and 2045) across a wide area network 2025, each secure access node (2030 and 2045) may be located in a different customer premises (2044 and 2057). Persons of ordinary skill in the art would recognize that the primary server 2020 coupled to two secure access nodes (2030 and 2045) is exemplary and that the primary server 2020 may be coupled to several more secure access nodes, if need be, across the wide area network 2025.

In one customer premises 2044, the secure access node 2030 may be coupled to an end point device 2040 and an end point device 2042 across a premises network 2035. Persons of ordinary skill in the art would recognize that the secure access node 2030 coupled to the end point device 2040 and the end point device 2042 are exemplary and that the secure access node 2030 may be coupled to several more end point devices, if need be, across the premises network 2035.

In the other customer premises 2057, the secure access node 2045 may be coupled to an end point device 2055 across a premises network 2050. Persons of ordinary skill in the art would recognize that the secure access node 2045 coupled to the end point device 2055 is exemplary and that the secure access node 2045 may be coupled to several more end point devices, if need be, across the premises network 2050.

End point device 2040 may be an energy management sensor and end point device 2042 may be an alarm (premises security) sensor. The primary server 2020 may collect service data and analytical data from both end point device 2040 and end point device 2042, specifically energy management service information and premises security service information, respectively. The primary server 2020 may process the collected service data and analytical data from both end point devices. Consequently, the primary service may offer cross-service functions to the secondary servers (2005, 2010, and 2015) owned and operated by different secondary service providers. For example, the collected service data and analytical data from the energy management end point device 2040 may indicate that an appliance such as an oven may be on for a prolonged period of time. Further, data from the alarm sensor end point device 2042 may show that the alarm sensor has failed for some reason. Consequently, the primary server 2020 may provide a cross-service function such as an alert or alarm to the premises security server 2015 indicating that there is an alarm sensor failure and a potential fire hazard (oven).

Figure 21:
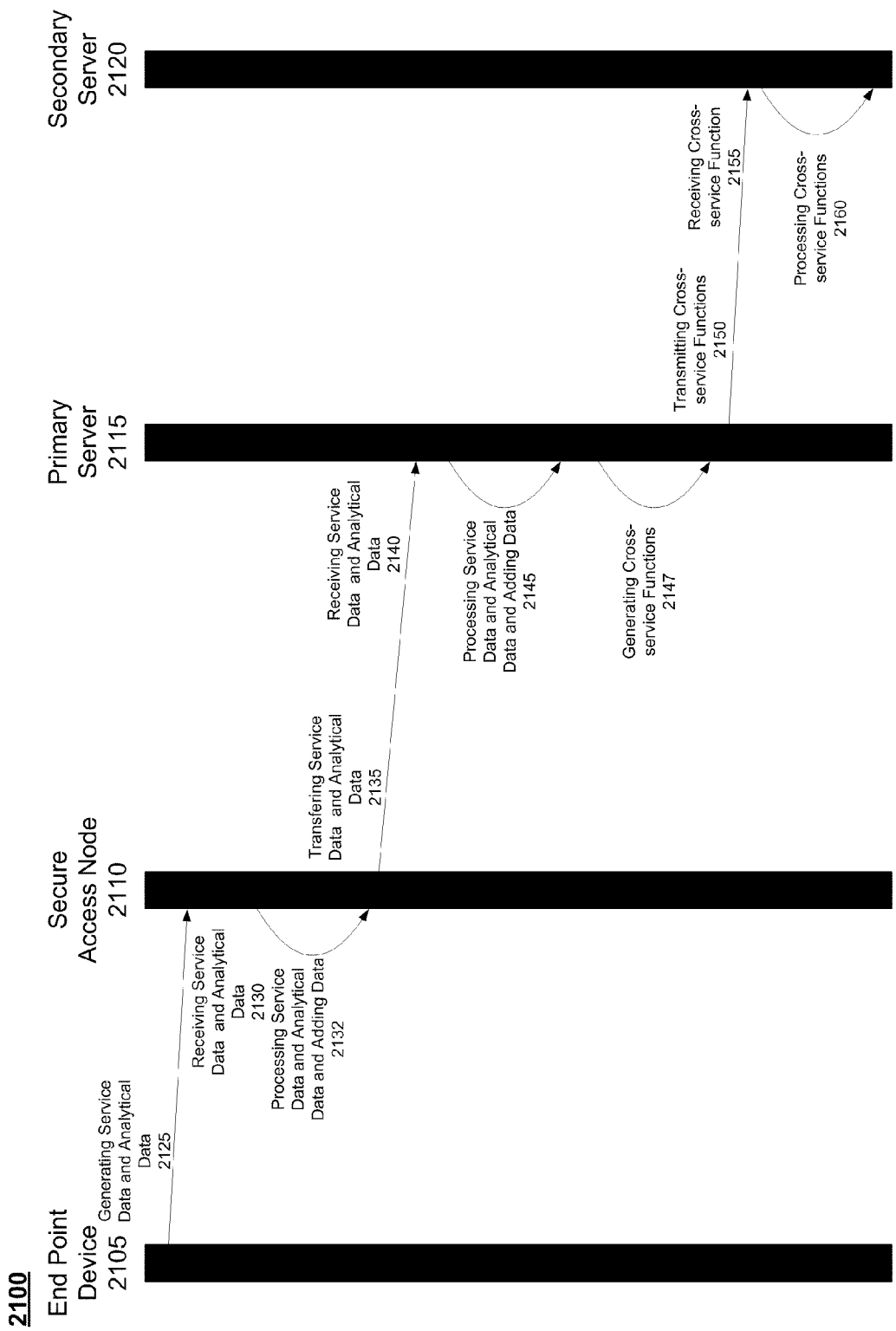
FIG. 21 is an exemplary transaction diagram that shows example systems, devices and methods for providing a plurality of services to premises over one or more communication networks.

FIG. 21 is an exemplary transaction diagram that shows example systems, devices and methods for providing a plurality of services to premises over one or more communication networks. The diagram includes functional blocks that represent an end point device 2105, a secure access node, 2110, a primary server 2115, and a secondary server 2120. Persons of ordinary skill in the art would recognize that the configuration of the transaction diagram in FIG. 21 is exemplary and that a primary server may be coupled to one or more secure access nodes and one or more secondary servers. Further, each secure access node may be coupled to one or more end point devices.

A first transaction shown in FIG. 21 may be an end point device, such as a alarm sensor, generating service data and analytical data 2125. The service data may include service information and configuration information. Analytical data may include the user preferences, end point device status, and other data. Further, the end point device 2105 may provide the service data and analytical data to the secure access node 2110 as shown 2125. Further, the secure access node 2110 may receive the service data and analytical data 2130 from the end point device 2105 and may transfer the service data and analytical data 2135 to the primary server 2115. Before the transfer, the secure access node 2110 may process the service data and analytical data and add data such as cross-service functions 2132 based on the service data and analytical data. The primary server 2115 may receive the service data and analytical data 2140. Moreover, the primary server 2115 may process the service data and analytical data 2145 and generate cross-service functions 2147 based on the service data and analytical data. Moreover, the primary server 2115 may transmit the cross-service function 2150 to the secondary server 2120. Also, the secondary server 2120 may receive the cross-service functions 2155 from the primary server 2115 and process the cross-service function 2160. Based on processing the cross-service functions, the secondary server may take some action. For example, if the secondary server is owned and operated a premises security service provider and receives notification that an alarm sensor (end point device 2105) has failed as well as a potential fire hazard, then the premises security service provider may dispatch a repairmen to repair the alarm sensor as well as notify the fire department or notify a premises owner of the potential fire hazard by providing reconfiguration data to a premises alarm panel which may be an additional end point device (See FIG. 16).

Figure 22:
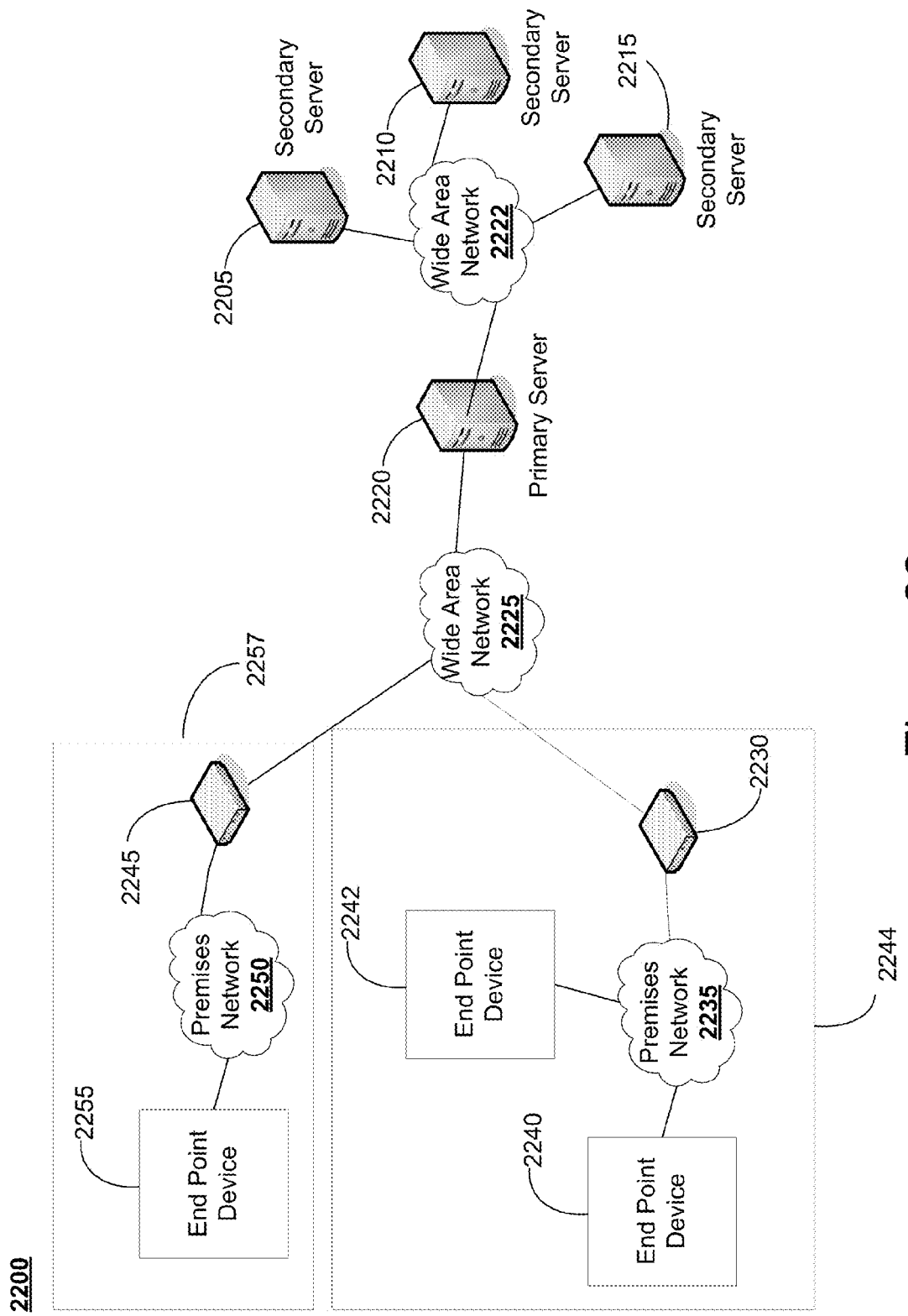
FIG. 22 shows an exemplary network architecture for providing a plurality of services to premises over communication networks and associated business processes that are provided by such an exemplary network architecture.

FIG. 22 shows exemplary network architecture 2200 for providing a plurality of services to premises over communication networks and the associated business processes that are provided by such an exemplary network architecture. The systems, devices, nodes, and communication networks shown in FIG. 22 may be similar to the systems, devices, nodes, and communication networks shown in FIG. 1 and as described in the present disclosure. The exemplary network architecture 2200 can support different services. Moreover, business processes may be associated with providing such services by the exemplary network architecture 2200.

The exemplary network architecture 2200 may include a secondary server 2205, secondary server 2210, and secondary server 2215. Each secondary server (2205, 2210, and 2215) may be coupled to a primary server 2220 through a wide area network (WAN) 2222. Further, each secondary server (2205, 2210, and 2215) may be owned and operated by a different secondary service provider and the primary server 2220 may be owned and operated by a primary service provider. For example, a secondary server 2205 may be owned and operated by an e-commerce service provider, secondary server 2210 may be owned and operated by an energy management provider, and secondary server 2215 may be owned and operated by premises security provider. Additionally, the primary server 2220 may be owned and operated by an Internet service provider. Such an Internet service provider may provide Internet services to customer premises.

As shown in FIG. 22, the network architecture 2200 includes the primary server 2222 coupled to two secure access nodes (2230 and 2245) across a wide area network 2225, each secure access node (2230 and 2245) may be located in a different customer premises (2244 and 2257). Persons of ordinary skill in the art would recognize that the primary server 2220 coupled to two secure access nodes (2230 and 2245) is exemplary and that the primary server 2220 may be coupled to several more secure access nodes, if need be, across the wide area network 2225.

In one customer premises 2244, the secure access node 2230 may be coupled to an end point device 2240 and an end point device 2242 across a premises network 2235. Persons of ordinary skill in the art would recognize that the secure access node 2230 coupled to the end point device 2240 and the end point device 2242 are exemplary and that the secure access node 2230 may be coupled to several more end point devices, if need be, across the premises network 2235.

In the other customer premises 2257, the secure access node 2245 may be coupled to an end point device 2255 across a premises network 2250. The end point device 2255 may be a computer that can perform e-commerce transactions. Persons of ordinary skill in the art would recognize that the secure access node 2245 coupled to the end point device 2255 is exemplary and that the secure access node 2245 may be coupled to several more end point devices, if need be, across the premises network 2250.

In FIG. 22, the network architecture 2200 engenders different secondary service providers to cooperate and provide their respective secondary services over the network 2200. Further, the primary service provider may utilize the network architecture 2200 to provide additional services to the secondary service providers and derive revenue based on the network attributes of the network architecture as well as the additional services. For example, the primary service provider may be given a share of revenue received by the secondary service providers by end users of the network 2200 for providing end users with services. The primary service provider and the network architecture 2200 may provide incentive schemes and network attributes that may attract secondary service providers to utilize the network architecture 2200. For example, the primary service provider, through the primary server 2220, may be able to collect analytical data from end point devices for one or more secondary services. Further, the primary service provider may provide cross-service functions based on collected service and analytical data such that the secondary service provider may act in response to received cross-service functions from the primary service provider. In addition, the network itself may have certain network attributes (e.g. number and type of users, network bandwidth, quality of service, number of secure access nodes, etc.). Also, the primary service provider provides support for and manages targeted advertisements for certain secondary service providers (e.g. e-commerce, content, etc.). The primary service provider may generate or receive revenue or fees based on performing the above mentioned actions. Moreover, the primary server may receive a commission from any sale due to any advertisements supported or managed by the primary service provider.

Figure 23A:
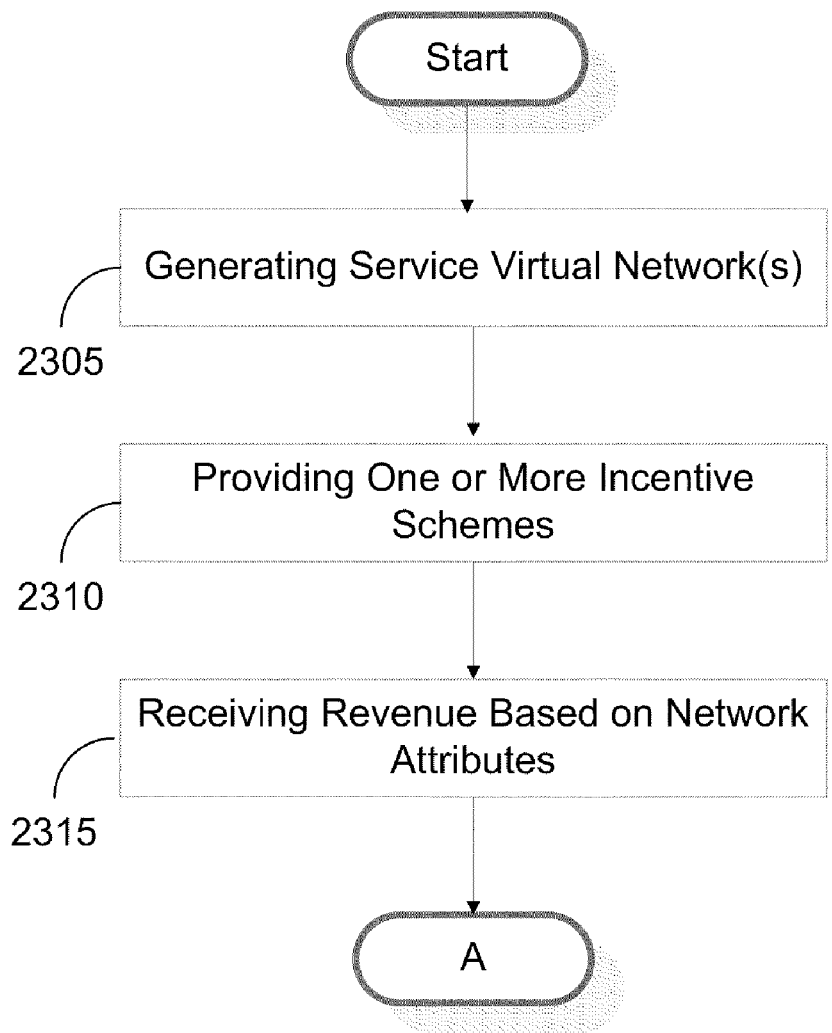
FIGS. 23A-23C are exemplary flowcharts that show example methods for providing a plurality of services to premises over communication networks and associated business processes that are provided by such an exemplary methods.
Figure 23B:
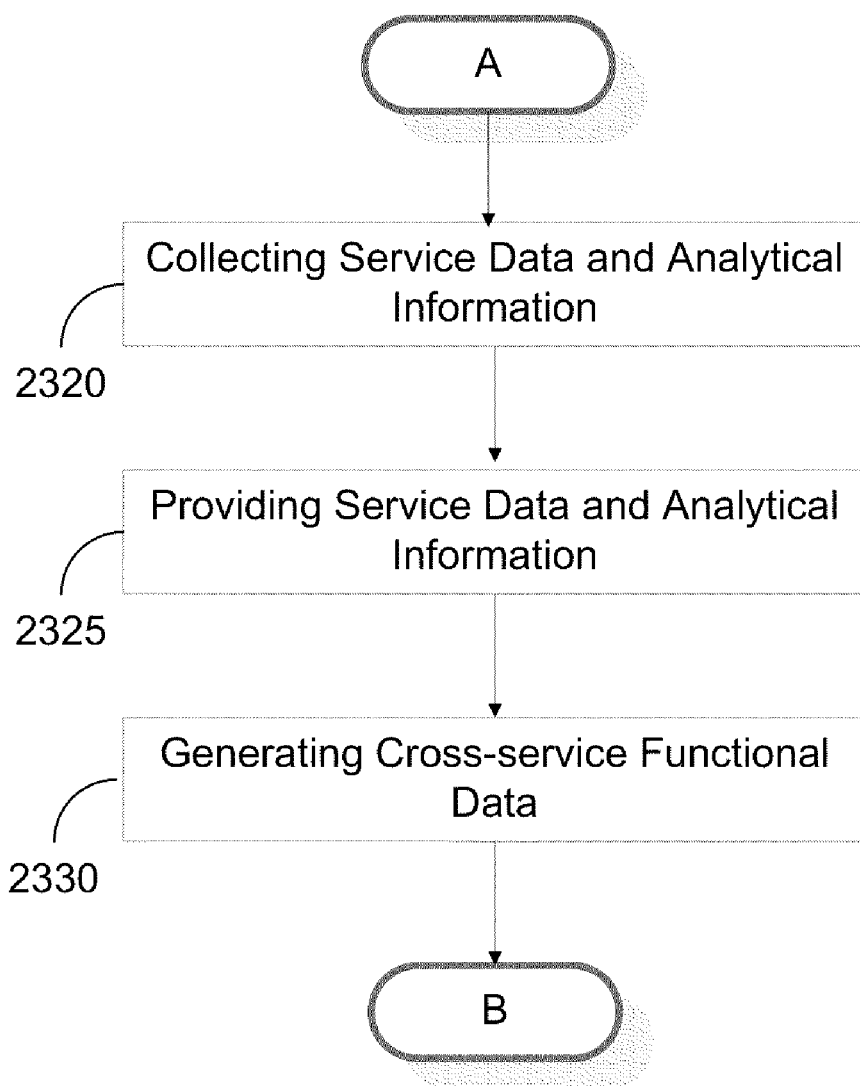
Figure 23C:
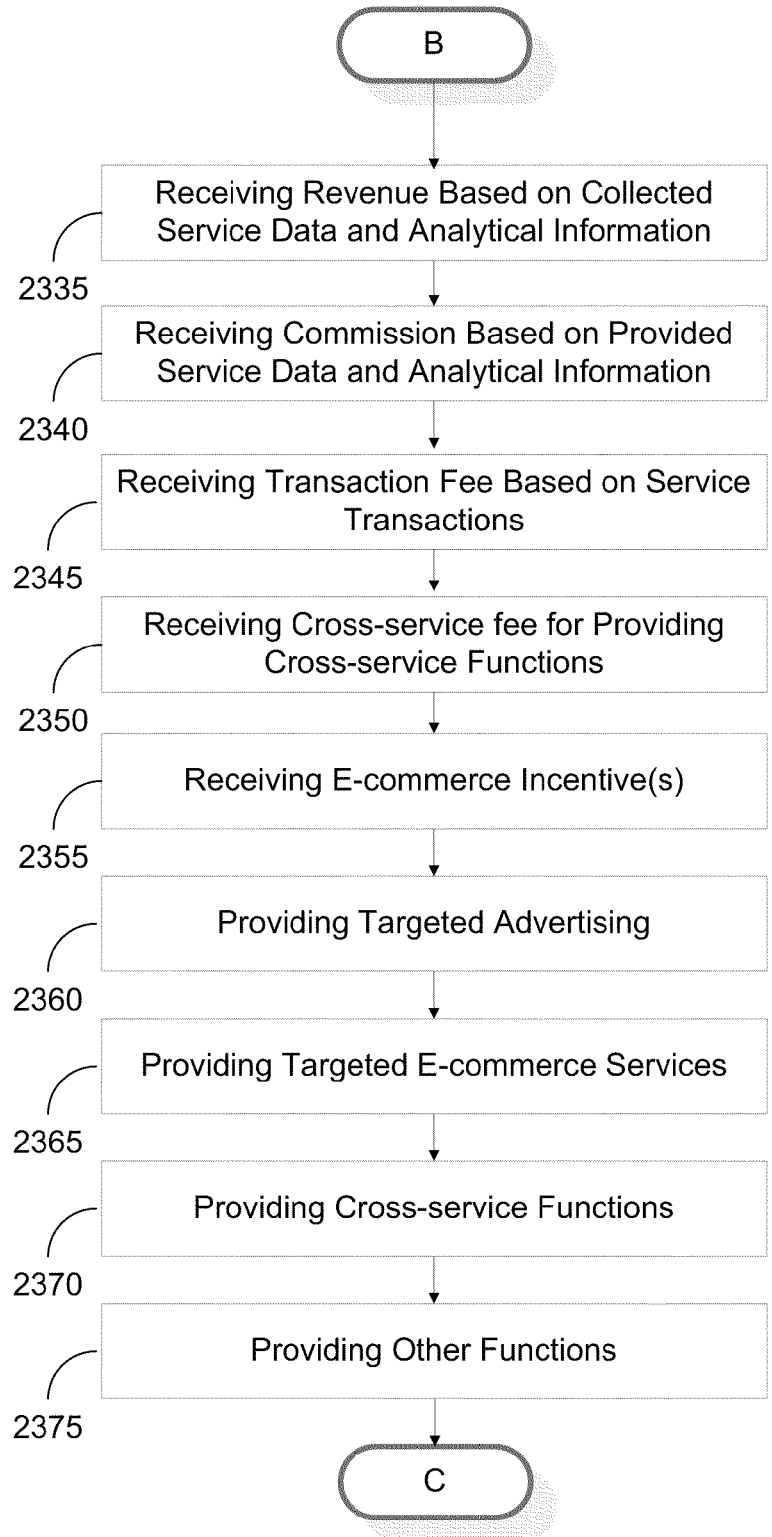

FIGS. 23A-23C are exemplary flowcharts that show example methods for providing a plurality of services to premises over communication networks and the associated business processes that are provided by such exemplary methods. A step in the method may be generating one or more service virtual networks by a primary server and one or more secure access nodes, as shown in block 2305. The primary server and secure access nodes provide service virtual network interfaces to one or more secondary servers and one or more end point devices to access the one or more service virtual networks. Further, a network architecture (see FIG. 22) resulting from the one or more service virtual networks may provide one or more incentive schemes to one or more secondary service providers to offer secondary services over the one or more service virtual networks, as shown in block 2310. Exemplary incentive schemes may include providing a collection of end user, service, and analytical data from one or more end point devices. Further, the capability of segregating services from different service providers thereby reducing cross-service interference offers other incentives. In addition, the ability for a primary service provider that owns and operates a primary server to provide additional or cross-service functions based on collected end user, service, and analytical data from one or more end point devices may be an additional incentive scheme. An additional step in the example method may be a primary service provider receiving revenue based on the network attributes and incentive schemes, as shown in block 2315. Network attributes may include the number and type of end users and end point devices (e.g. network bandwidth, quality of service, number of secure access nodes, etc.).

Referring to FIG. 23B, another step in the example method may be a primary server collecting service data and analytical information from one or more end point devices, as shown in block 2320. A further step in the method may be providing the service data and analytical information to one or more secondary service providers by the primary server, as shown in block 2325. An additional step in the method may be a primary server providing cross-service functional data to one or more secondary service providers based on collected service data and analytical information, as shown in block 2330.

Referring to FIG. 23C, another step in the method may be a primary service provider receiving revenue based on collected service data and analytical information, as shown in block 2335. A further step in the method may be a primary service provider receiving a commission based on providing service data and analytical information to one or more secondary service providers, as shown in block 2340. An additional step may be the primary service provider receiving a transaction fee based on service transactions enacted by one or more secondary service providers, as shown in block 2345. The transactions may be enacted due to analyzing or processing the provided service data, and analytical information. For example, analytical information may indicate a home appliance is broken and in need of repair or replacement. A secondary service provider may dispatch a repairman or an e-commerce provider may advertise for a discounted home appliance. In each case, the primary service provider may receive a transaction fee based on the transaction by each secondary service provider.

Another step in the method may be a primary service provider receiving a cross-service fee due to providing cross-service functions to one or more secondary service providers, as shown in block 2350. For example, a primary service provider may detect a home appliance, such as an oven, has been on for a prolonged period of time by collecting data for an energy management service provider. The primary service provider may then alert a premises security service provider of a potential fire hazard. A further step in the method may be a primary service provider receiving e-commerce incentives from e-commerce service providers, as shown in block 2355. For example, the primary service provider may offer advertisements to products offered by preferred e-commerce service providers in exchange for a share of revenue or a fee. An additional step in the method may be a primary service provider providing targeted advertising, as shown in block 2360. For example, the primary service provider may be a cable service provider and may provide targeted advertising for sports content providers to users who have a propensity to view sports programming. Another step in the method may include the primary service provider providing targeted e-commerce services for an e-commerce service provider, as shown in block 2365. For example, the primary server operated by a primary service provider may collect end user data and analytical information from one or more end point devices. Historical data may indicate that parental controls on e-commerce websites are instituted during certain evening hours, however, on a particular day, parental controls were not implemented. The primary service provider, using the primary server, may institute parental controls on the e-commerce website. Such an action may prompted by the e-commerce service provider or performed due to the primary service providers discretion based on processing collected analytical information from the end point devices. Additional steps in the method may be providing cross-service function, as shown in block 2370, as well as providing other functions, as shown in block 2375, as recognized by persons skilled in the art.

Figure 24:
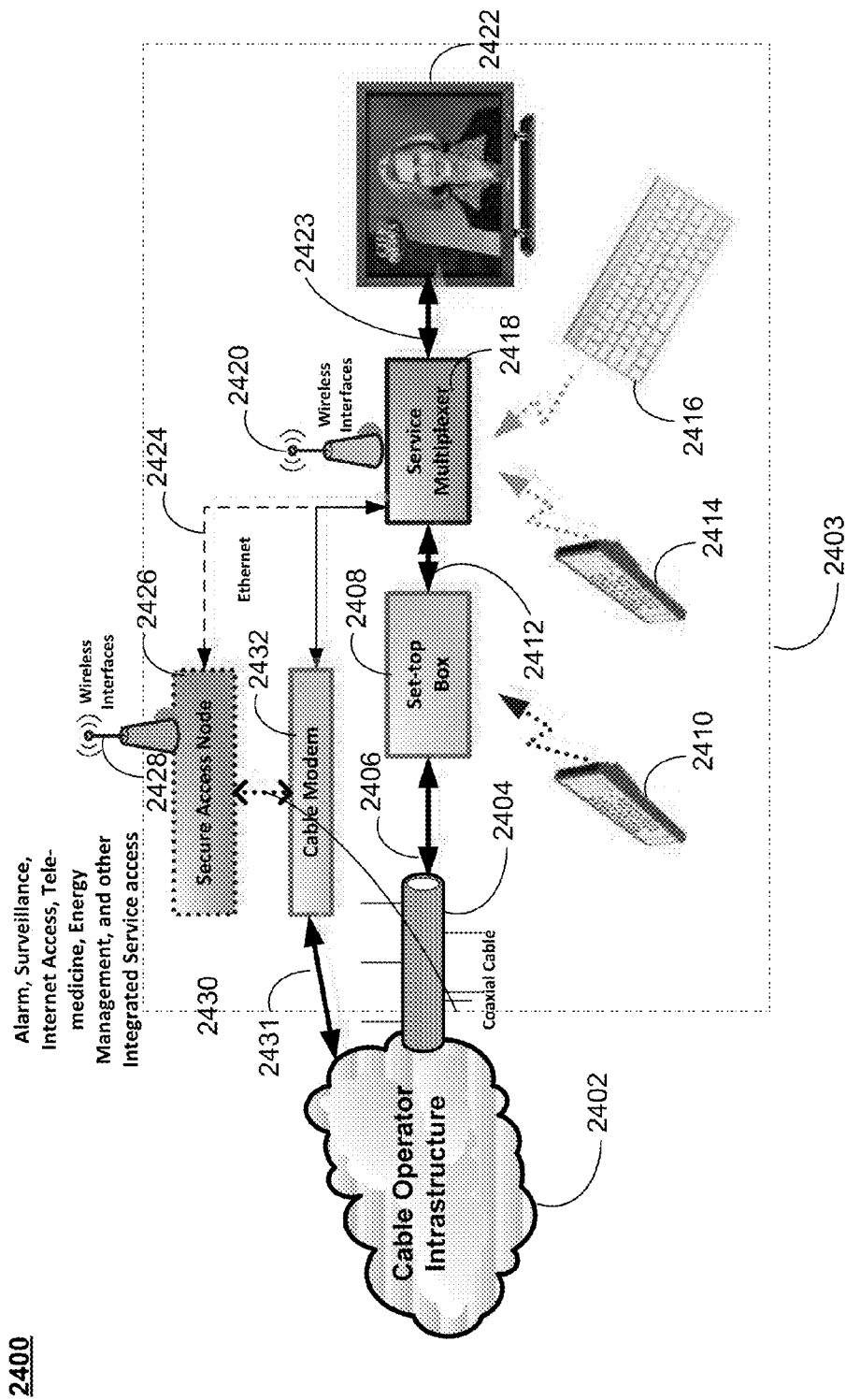
FIG. 24 is an exemplary system for multiplexing one or more services at a customer premises.

FIG. 24 is an exemplary system 2400 for multiplexing one or more services at customer premises 2403. The system 2400 may include a cable operator infrastructure 2402 providing a coaxial cable connection (2404 and 2406) to a set-top box 2408 at the customer premises 2403. The cable operator infrastructure 2402 may be owned and operator by a cable television company that may provide cable television services to the customer premises 2403 using such an infrastructure 2402. A set-top box 2408 is a device that may be coupled, directly or indirectly, to a television or other display device. Functionally, the set-top box 2408 may receive a television signal and converts the signal into content to be shown on a display device. For example, in FIG. 24, the set-top box is connected to the Cable Operator Infrastructure 2402 via a coaxial cable 2404 and a cable connection 2406. Thus, the set-top box may convert a cable television signal, received through the coaxial cable 2404 and cable connection 2406, to content to be displayed on a display device 2422. Further, the set-top box 2408 may be controlled by one or more user interfaces coupled to the set-top box via one or more communication interfaces. For example, the set-top box 2408 may have a user interface placed on the set-top box 2408 itself.

Alternatively, for example, the set-top box 2408 may be controlled by a remote controller 2410 coupled to the set-top box 2408 across a wireless communication interface. Other embodiments may include, but are not limited to, a satellite television infrastructure coupled to a set-top box providing satellite television content. Cable operator infrastructure may include equipment to facilitate distribution of cable television content. Analogously, the satellite infrastructure may include equipment to facilitate distribution of satellite television content.

The customer premises 2403 may include a cable modem 2432 coupled to the Cable Operator Infrastructure 2402 through a communication link 2431. The Cable Operator infrastructure 2402 may be communicatively coupled to the Internet such that it can provide data and other services that are distributed across the Internet to the customer premises 2403 through the cable modem 2432. Further, a secure access node 2426 with one or more wireless communication interfaces 2428 may be coupled to the cable modem through a communication link 2430. The one or more wireless communication interfaces 2428 may support any number of wireless protocols known in the art such as WiFi, Bluetooth, etc. as well as any proprietary wireless protocols. The secure access node 2426 has functionality as described in the present disclosure, may receive, process and augment different services provided by different service providers. Exemplary service may include Alarm and Premises Security, Surveillance, Internet Access, Telemedicine, Energy Management, and other Integrated Services accessible via the Internet through the Cable Operator Infrastructure 2402.

In addition, customer premises equipment may include a service multiplexer 2418 communicatively coupled (2412, 2424) to the set-top box 2408, cable modem 2432, and secure access node 2426. The communication link 2412 between the set-top box 2408 and service multiplexer 2418 may be bi-directional. The communication links 2424 between the service multiplexer 2418, cable modem 2432, and secure access node 2426 may be Ethernet links. The service multiplexer may receive one or more services from the set-top box 2408, cable modem 2432, and secure access node 2426. With respect to the secure access node 2426, the services received from the secure access node by the service multiplexer 2418 may include services received by the secure access node 2426 as well as any cross-service functions or additional service features provided by the secure access node 2426 itself. The service multiplexer 2418 may include one or more communication interfaces, one or more processors, and one or more storage devices coupled to the one or more processors. Further, the service multiplexer 2418 may have one or more software applications stored in the one or more storage devices and executed by the one or more processors. Note, the secure access node 2426 may have similar functionality as the secure access nodes shown and described in the present disclosure including connecting to a primary server executing a primary server software platform across a communication network.

In one or more embodiments, the service multiplexer 2418 may have one or more virtual machines generated and configured by one or more software applications executed by the one or more processors and stored in the one or more storage devices based on a first set of input commands. The first set of input commands may be stored in flash memory in one of the storage devices of the service multiplexer. Alternatively, the first set of input commands may be provided through a user interface on the service multiplexer 2418 itself or through one or more wireless communication interfaces 2420 via a remote controller 2414 or keyboard 2416 or by other communication devices through other communication interfaces as known to those persons skilled in the art. Further, the one or more wireless communication interfaces 2420 may support any number of wireless protocols known in the art such as WiFi, Bluetooth, etc. as well as any proprietary wireless protocols.

Further, each of the one or more virtual machines may receive a first set of service data for corresponding to one service of the one or more services. Thereafter, the one or more virtual machines may process the first set of service data using the one or more software applications to generate a second set of service data and data instructions associated with the second set of service data. In addition, the one or more virtual machines may provide a service security function for each service and provide a service operating system for each service. Additional software functions may mine the first set of service data, as well as the activities and responses of the users associated with the first set of data, which may include analytical information as described in the present disclosure. Another function for the service multiplexer 2418 may be transmitting the second set of service data and data instructions associated with the second set of service data to a display interface. The display interface may be one of the one or more communication interfaces included in the service multiplexer 2418. The display interface of the service multiplexer 2418 may be communicatively linked to a display 2422 such as a television, personal computer or some other monitor or display device known in the art via a bidirectional communication link 2423. The display interface of the service multiplexer 2418 may be coupled to the communication link 2423.

For example, service multiplexer 2418 may be configured to multiplex such services as premises security, energy management, cable television content, and e-commerce services. The cable television content service may be received by the service multiplexer 2418 from the set-top box 2408. The premises security, energy management, and e-commerce services may be received from the secure access node 2426. In a specific time period, the service multiplexer 2418 may forward the cable television content to the display device 2422. While viewing the cable television content, a user may want to purchase an item seen in a commercial. Using a remote controller 2414, the user may provide input commands to the service multiplexer 2418 to display an e-commerce service on the display device 2422. Based on the input commands, the service multiplexer 2418 may provide instructions to the display device 2422 such that the user may view the cable television content and the e-commerce service in split screen format. That is, about half the display shows the cable television content and the other half shows the e-commerce service. Further, the displayed e-commerce service may be the e-commerce service website (e.g. Amazon, Best Buy, Wal-Mart, etc.). The user may control viewing and navigating through the e-commerce website using the remote controller 2414 by providing instructions to the service multiplexer 2418 which in turns provides instruction to the display device 2422 to show video or images based on user input.

Another example may be that a user would like to reconfigure the service multiplexer 2428 to provide an additional service such as streaming video. The user may input commands through a remote controller 2414 or other user interface (web browser, etc.) to provide such a reconfiguration effect on the service multiplexer 2418. Consequently, the service multiplexer would be reconfigured by the cable operator or other entity in charge of managing the service multiplexer 2418. Further, the service multiplexer may receive the streaming video service from the secure access node 2426. In addition, the user may provide additional input commands via the remote controller 2414 to the service multiplexer 2418 such that the service multiplexer instructs the display device to show in split screen the cable television content (e.g. football game) with muted audio and the streaming video (e.g. movie). Although split screen is used as an exemplary display feature, the system, devices, and methods implements aspects of the service multiplexer may use other display features such as banner, picture in picture and whole screen (traditional) display feature types.

Figure 25:
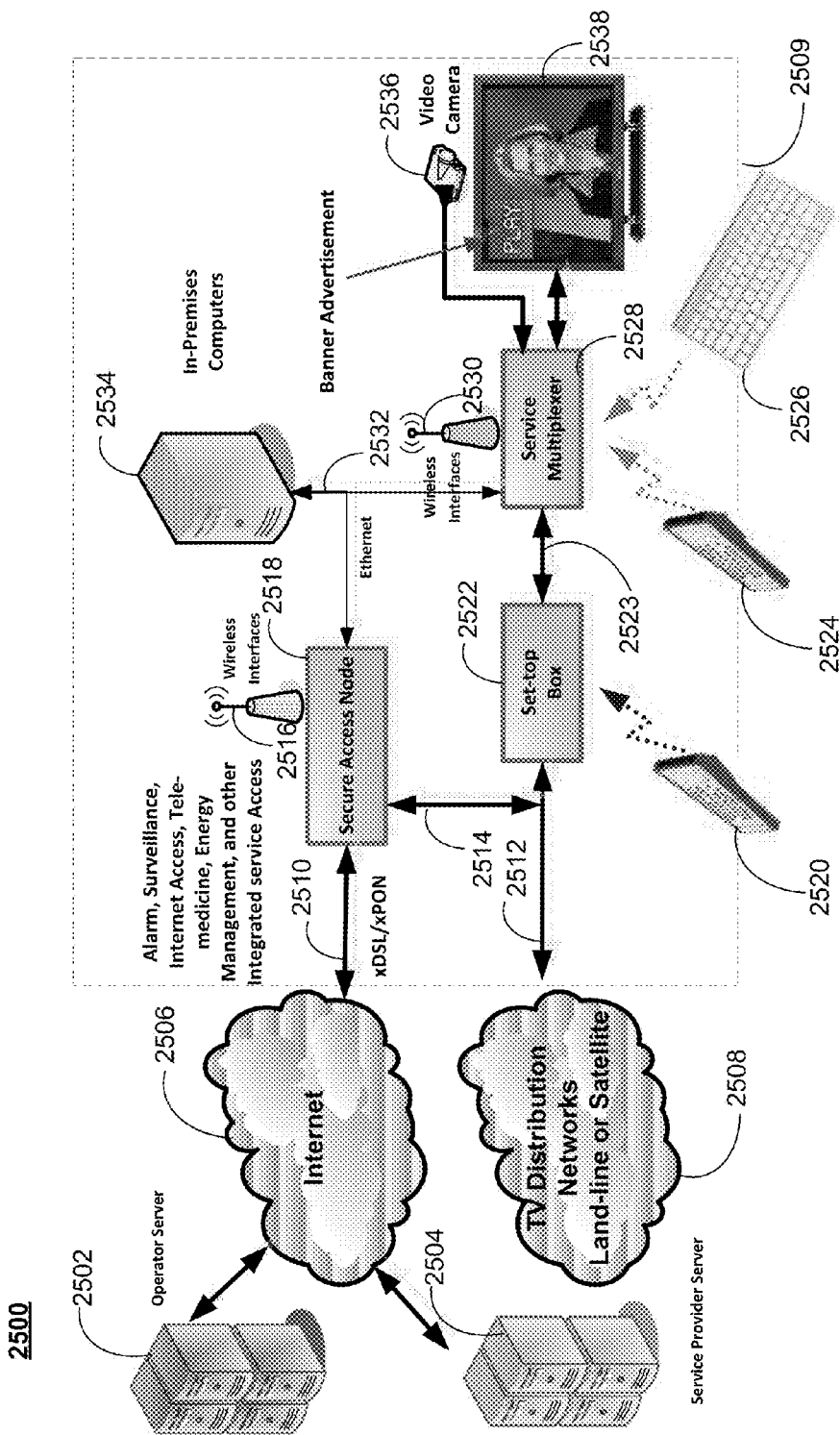
FIG. 25 is another exemplary system for multiplexing one or more services at a customer premises.

FIG. 25 is another exemplary system 2500 for multiplexing one or more services at customer premises 2509. The system 2500 may include a television distribution networks that may be a land-line (e.g. cable) or satellite based infrastructure 2508 providing a connection (2512 and 2514) to a set-top box 2522 and a secure access node 2518 at the customer premises 2509. A set-top box 2522 is a device, similar to a set-top box shown in FIG. 24 that may be coupled, directly or indirectly, to a television or other display device. Functionally, the set-top box 2522 may be similar to the set-top box shown in FIG. 24. However, in FIG. 25, for example, the set-top box 2522 is connected to the television distribution networks that may a be land-line (e.g. cable television, broadcast television, etc.) or satellite based infrastructure 2508. Thus, the set-top box 2522 may convert a cable television signal, received through the cable connection 2512, to content to be displayed on a display device. Further, the set-top box 2522 may be controlled by one more user interfaces coupled to the set-top box 2522 via one or more communication interfaces. For example, the set-top box 2522 may have a user interface placed on the set-top box 2522 itself. Alternatively, for example, the set-top box may be controlled by a remote controller 2520 coupled to the set-top box 2522 across a wireless communication interface. Cable infrastructure may include equipment to facilitate distribution of cable television content. Analogously, the satellite infrastructure may include equipment to facilitate distribution of satellite television content.

The customer premises 2509 may include a secure access node 2518 with one or more wireless communication interfaces 2516 coupled to the TV distribution Networks 2508 through communication links 2512 and 2514. The one or more wireless communication interfaces 2516 may support any number of wireless protocols known in the art such as WiFi, Bluetooth, etc. as well as any proprietary wireless protocols. Further, the secure access node 2518 may be communicatively coupled to the Internet 2506 through communication link 2510. The communication interface between the secure access node 2518 and the Internet 2506 may be DSL, PON, or any other communication interface or protocol known to those persons skilled in the art. The secure access node 2518 has functionality as described in the present disclosure and may receive, process and augment different services provided by different service providers Thus, the secure access node 2518 may be coupled to a service provider server 2504 and an operator server 2502 (e.g. primary service provider server) across the Internet 2506. Exemplary services provided by the operator server 2502 and service provider server 2504 may include Alarm and Premises Security, Surveillance, Internet Access, Telemedicine, Energy Management, and other Integrated Services accessible via the Internet 2506.

In addition, customer premises equipment may include a service multiplexer 2528 communicatively coupled (2523, 2532) to the set-top box 2522, secure access node 2518, and one or more in-premises computers 2534. The communication link 2523 between set-top box 2522 and set-top box 2528 may be bi-directional. The communication links 2532 between the service multiplexer 2528, secure access node 2518 and in-premises computers 2534 may be Ethernet links. Moreover, the communication link 2523 between the set-top box 2522 and the service multiplexer 2528 are those which are known to persons skilled in the art. The service multiplexer 2528 may receive one or more services from the set-top box 2522 and secure access node 2518. The service multiplexer 2528 may have the same or similar functionality as the service multiplexer shown and described in FIG. 24. Further, the service multiplexer may have one or more communication interfaces one of which may be a wireless communication interface 2530. The service multiplexer 2528 may be coupled to one or more input devices such as a remote controller 2524 or wireless keyboard 2526 via the one or more wireless communication interfaces 2530. Further, the one or more wireless communication interfaces 2530 may support any number of wireless protocols known in the art such as WiFi, Bluetooth, etc. as well as any proprietary wireless protocols. Another function for the service multiplexer 2528 may be transmitting a set of service data and data instructions associated with the set of service data to a display interface. The display interface may be one of the one or more communication interfaces included in the service multiplexer 2528. The display interface of the service multiplexer 2528 may be communicatively linked (bi-directionally) to a display 2538 such as a television, the in-premises computer 2534 or some other monitor or display device known in the art. Alternatively, the service multiplexer 2528 may be coupled to video camera 2536 via a bi-directional communication link (e.g. camera for video conferencing and tele-medicine) to receive video data to be multiplexed as part of the service multiplexing functionality of the service multiplexer 2528.

Figure 26:
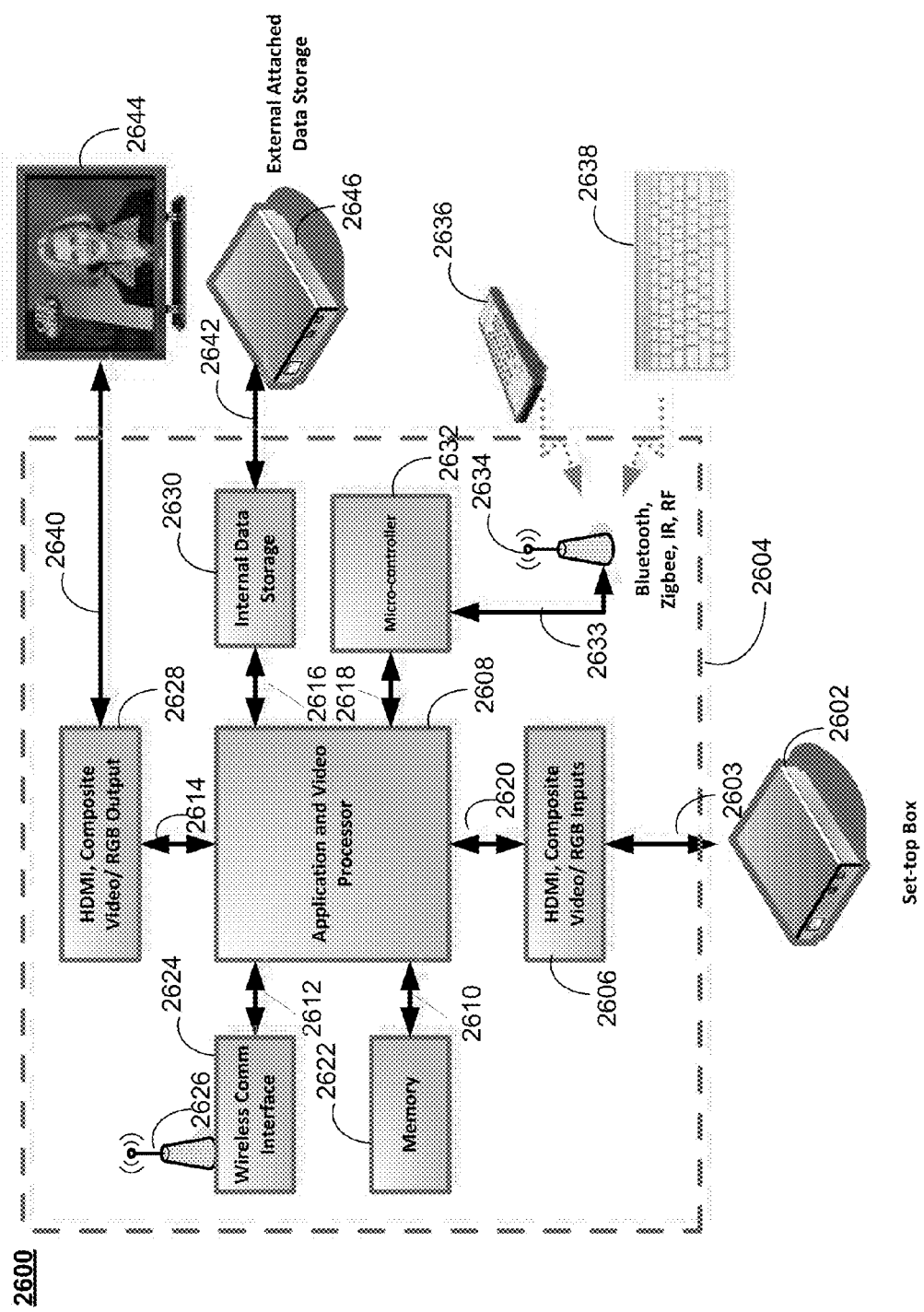
FIG. 26 shows a functional block diagram of an exemplary device used in an exemplary system for multiplexing one or more services at a customer premises.

FIG. 26 shows a functional block diagram 2600 of an exemplary device 2604 used in an exemplary system 2600 for multiplexing one or more services at a customer premises. Specifically, a set-top box 2602 may be coupled to a service multiplexer 2604 using a communication link 2603. The communication link 2603 may be coupled to one or more communication interfaces of the service multiplexer 2604 including, but not limited to, HDMI, Composite Video, and RGB Input interfaces 2606. The one or more communication interfaces 2606 may be coupled to an application and video processor 2608. The one or more communication interfaces 2602 may include a hardware interface (e.g. antenna) or a software interface (e.g. protocol software, drivers, etc.). Persons of ordinary skill in the art would recognize that the application and video processor functions, as with other processor functional blocks shown and described in the present disclosure, may be implemented by one or more processors.

The application and video processor 2608 of the service multiplexer 2604 may be coupled to one or more device components. Such device components may include a memory 2622 coupled by a communication link 2610. Persons of ordinary skill in the art would recognize that such a memory component 2622 may be implemented by one or more storage devices. The memory 2622 can be of one more types that include, but are not limited to, flash memory, Random Access Memory, Read-only memory. Further, the storage devices implementing the memory 2622 may be implemented using electronic, optical, or other types of media. Further components may include one or more wireless communication interfaces (2624 and 2626) coupled by communication link 2612. The wireless communication interfaces may implement one of many different wireless protocols known in the art such as WiFi, WiMAX, Bluetooth, Zigbee, IR, RF, etc. Also, the one or more wireless communication interfaces (2624 and 2626) may include a hardware interface (e.g. antenna) or a software interface (e.g. protocol software, drivers, etc.).

Other device components coupled to the application and video processor 2608 of the service multiplexer 2604 may include an internal data storage component 2630 coupled by a communication link 2616 as well as an external attached data storage device 2646 coupled directly or indirectly to the application and video processor 2608 via a communication link 2642. The storage devices (2630 and 2646) may be implemented using electronic, optical, or other types of media. An additional component coupled to the application and video processor 2608 may include a mircrocontroller 2632 via communication link 2618. Further, the microcontroller 2632 may be coupled to one or more wireless communication interfaces 2634 via a communication link 2633 or other type of communication interfaces. The one or more wireless communication interfaces 2634 may support several different communication protocols including, but not limited to, Bluetooth, Zigbee, IR, RF, WiFi, and WiMAX. Further, the one or more wireless communication interfaces may receive data such as input commands from one or more remote input devices such as a remote controller 2636 or a wireless keyboard 2638.

In addition, the application and video processor 2608 may be coupled to one or more output communication interfaces 2628 via a communication link 2614. The one or more output communication interfaces may support several different communication protocols such as HDMI, Composite Video, and RGB. Further, the one or more communication interfaces may include a display interface 2640 that is coupled to a display device 2644 (e.g. television, personal, computer, monitor, smart phone, etc.). Also, inter-device communication links (2610, 2612, 2614, 2616, 2618, and 2633) may be in a form of a bus or some other inter-device communication system known in the art. Further, any of the communication links shown in FIG. 26 may be bidirectional.

Functionally, the set-top box may receive television content from television content distribution network owned or operated by a cable television, broadcast (traditional terrestrial/over air) television, or satellite television provider. The content may be of video that is transmitted to the one or more input communication interfaces 2606 of the service multiplexer 2604. The one or more input communication interfaces may forward the video content to the application and video processor 2608. Also, the one or more communication interfaces (2606. 2624, 2626, 2628, and 2634) may receive service data from the Internet from one or more different service provider supporting different services. By executing one or more software applications stored in memory 2622, internal data storage 2630, and external attached data storage 2646, the application and video processor 2608 may process the video content received from the set-top box 2602 and/or the service data received from across the Internet, to offer cross-service functions or additional services based on different supported services. Further, the application and video processor 2608 may mine the data received across all the communication interfaces (2603, 2606, 2624, 2633, 2628, and 2640) including any received user and input data to also offer cross-service functions or additional services based on different supported services.

In addition to potentially storing one or more software applications in memory 2622, internal storage device 2630, and external attached storage device 2646, the memory 2622, internal storage device 2630, and external attached storage device 2646 may store a service multiplexing operating system and common security software application implemented by the application and video processor 2608. Further, memory 2622, internal storage device 2630, and external attached storage device 2646 may store initial input commands that may be executed by the application and video processor 2608. Such initial input commands may instruct the application and video processor 2608 to generate and configure one or more virtual machines on the service multiplexer. Further, memory 2622, internal storage device 2630, and external attached storage device 2646 may store a service operating system and service security functions implemented as a virtual machine. Also, the service multiplexer may receive data from one or more communication interfaces (2606, 2624, 2626, 2628, and 2634) that includes input commands to reconfigure the one or more virtual machines to add, delete, or reconfigure supporting a service including a service operating system and service security functions. Further, the microcontroller 2632 processes some or all of the information received from, or transmitted to, wireless communication interface 2634.

Figure 27:
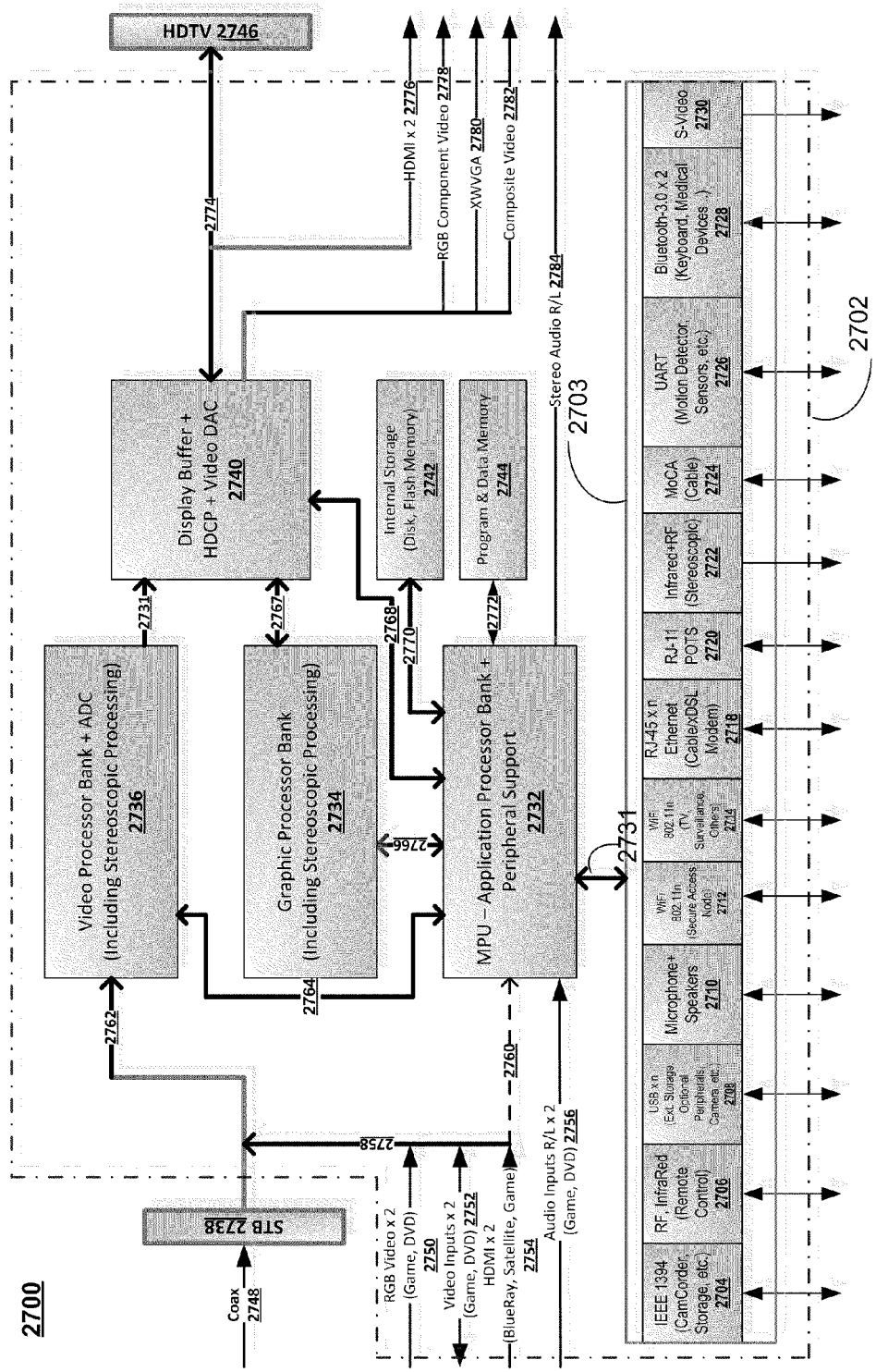
FIG. 27 shows a functional block diagram of an exemplary device for multiplexing one or more services at a customer premises.

FIG. 27 shows a functional block diagram of an exemplary device 2702 for multiplexing one or more services at a customer premises as part of an exemplary system 2700. The exemplary device 2702 may be a service multiplexer 2702, similar to the ones described and referenced in FIGS. 24-26. The service multiplexer 2702 may have several communication interfaces 2703 supporting different communication protocols, software drivers, and physical interfaces. Reference to a communication interface in the present disclosure may indicate only the software functionality, software driver, communication protocol supported, physical interface or any combination thereof. The one or more communication interfaces may include IEEE 1394 (Camcorder, Storage, etc.) 2704, RF/IR (e.g. for remote control applications) 2706, USB×n, (External Storage, Optional Peripherals, etc) 2708. Microphone/Speakers 2710, WiFi 802.11n (for e.g. access to secure access node or Internet) 2712, WiFi 802.11n (for e.g. access to surveillance camera and other equipment) 2714, RJ-45×n Ethernet (Cable/xDSL Modem) 2718, RJ-11 POTS (Plain Old Telephone System) 2720, IR/RF (for stereoscopic applications) 2722, MoCA (for cable applications) 2724, UART (for e.g. motion detector, sensors, etc.) 2726, Bluetooth 3.0×2 (for e.g. Keyboard, Medical Devices, etc.) 2728, S-Video 2730.

The one or more communication interfaces 2703 transmit and receive data such that the service multiplexer 2702 may offer cross-service functions and additional services as well as multiplexing one or more services. The one or more communication interfaces 2703 may be coupled to a multiprocessor unit (MPU) 2732 that may be an application processor which supports peripherals coupled to one or more communication interfaces 2703. Further, the MPU 2732 may be coupled to additional communication interfaces such as RGB Video×2 inputs 2750 (e.g. gaming and DVD applications), Video Inputs×2 (for e.g. gaming and DVD applications) 2752. HDMI×2 (e.g. Blue Ray, Satellite, and Gaming applications) 2754, and Audio Inputs 2756 (e.g. gaming and DVD applications). The additional communication interfaces (2750, 2752, 2754, and 2756) may be coupled to the MPU 2732 using a communication link 2760. The MPU 2732 may also be coupled to a video processor 2736 across a communication link 2764 as well as graphic processor 2734 across communication link 2766. The MPU 2732, the video processor 2736, and graphic processor 2734 may have the same or similar functionality as the application and video processor shown in FIG. 26 and described in the present disclosure. Further, the MPU 2732, the video processor 2736, and graphic processor 2734 may also incorporate other functions that are known in the art such as stereoscopic processing and analog-to-digital conversion.

The video processor 2736 may also be coupled to one or more communication interfaces (2750, 2752, and 2754) via communication links 2758 and 2762. Further, the video processor 2736 may be coupled to a set-top box 2738 via communication link 2762. Also, the set-top box 2738 may be coupled to a television distribution network using a coaxial cable communication interface 2748.

In addition, the MPU may be coupled to a program & data memory 2744 and internal storage 2742 across communication links 2772 and 2770, respectively. The program & data memory 2744 and internal storage 2742 may have the same or similar functionality as the memory, internal data storage, and external attached data storage as shown in FIG. 26 and described in the present disclosure. Further, the MPU 2732 may be coupled to a display buffer 2740, via communication link 2768, that may also have HDCP and video digital-to-analog conversion functionality.

The display buffer 2740 may have one or more communication interfaces including Composite Video 2782, XWGA 2780, RGB Component Video 2778, and HDMI 2776 as well as an HDTV interface 2774. The communication interfaces (2774-2782) may be display interfaces and may be used to transfer data from the service multiplexer 2702 to a display device such as HDTV 2746. Note, all communication links and communication interfaces may be bi-directional depending on the supported protocol (e.g. HDMI, etc.). A further note, MPU 2732, Graphic Processor 2734, and Video Processor 2736 may be one or more processors or a processor bank. Additionally, any processors shown and discussed in the present disclosure may represent one or more processors or a processor bank.

Figure 28:
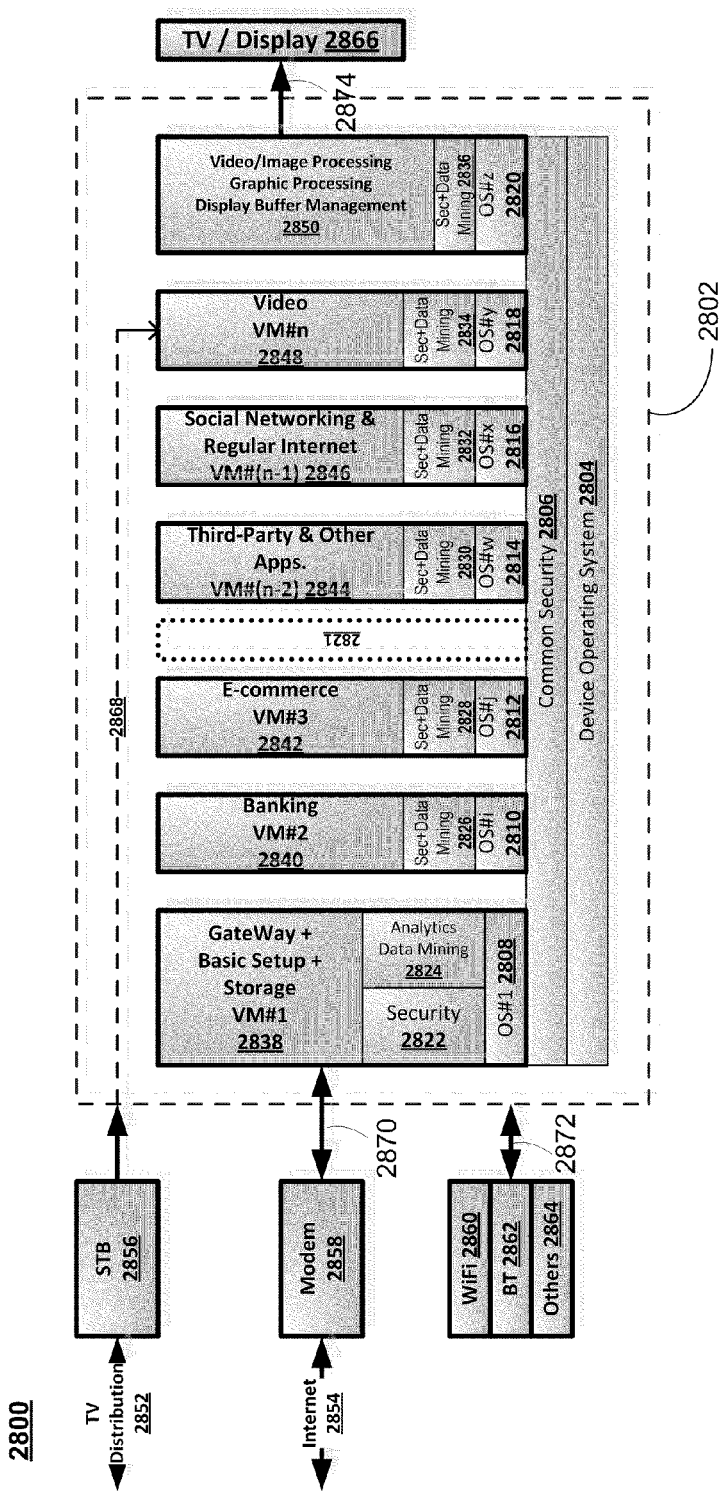
FIG. 28 shows a functional block diagram of an exemplary device for multiplexing one or more services at a customer premises.

The MPU 2732 along with appropriate software functions and applications such as operating systems, virtualization software, security software and application software packages associated with Banking, E-commerce, etc. may implement functional stacks as shown in FIG. 28. The MPU 2732 may further provide an encryption/decryption function within MPU hardware and software to support per flow encrypted communications. The hardware interface peripheral logic shown in FIG. 27 may interface with software drivers also hosted in the MPU 2732. The graphic processing and Video processing units (2734 and 2736) along with the pertinent virtual machine implemented using the MPU 2732 are used for driving the display functions such as the primary connected TV receiver, remotely connected (via e.g. WiFi) TV receivers or remote smart phones and PC that support such applications. Storage and buffering of video content may be provided as shown in FIG. 27 using the internal storage 2742. In addition, both volatile and non volatile storage are provided for software executables and configuration data. Analog to Digital and Digital to Analog conversion are provided to analog video sources and displays. Codec functionality is provided to support industry standard compressed video sources. The additional interfaces like HDMI, component video, composite video, etc. are used to interface and are digitized as needed from external video sources.

FIG. 28 shows a functional block diagram of an exemplary device 2802 for multiplexing one or more services at a customer premises. The exemplary device 2802 is a service multiplexer 2802 that may be part of an exemplary system 2800. The service multiplexer 2802 may incorporate the same and similar functionality as the service multiplexers pictured in FIGS. 24-27 and described in the present disclosure. The service multiplexer 2802 may implement device architecture

2802 as shown in FIG. 28. The device architecture 2802 may be implemented in software or a combination of software and hardware. Also, the device architecture may be implemented as a layered architecture. The device architecture includes a device operating system 2804 that is used by the service multiplexer 2802 for device-wide functions. Further, the service multiplexer may have a common security layer 2806 to provide device-wide security. In addition, the service multiplexer may implement several virtual machines using one or more processors. Each virtual machine may support one or more services received, multiplexed, and/or transmitted by the service multiplexer 2802. Also, each virtual machine may have a service operating system (2810-2820) and security as well as data mining and analytics functions (2822-2838). Thus, the functional block diagram in FIG. 28 may be described as having one or more functional stacks, each functional stack supporting one or more services. Each functional stack may be implemented by a virtual machine and may have a service application layer on top of a service security layer and an analytics and data mining layer. Further, the service security layer and an analytics and data mining layer may be on top of a service operating system later. In addition, the service operating system layer of each functional stack may be on top of the device common security layer which rests on top of the device operating system. The exemplary service supported by each virtual machine of the service multiplexer 2802 include Gateway/Basic Setup/Storage 2838, Banking 2840, E-commerce 2842, Third Party and Other applications 2844, Social Networking and regular Internet services 2846, Video 2848, and Video/Image Processing/Graphic Processing/Display Buffer Management 2850.

Further, the service multiplexer 2802 may be coupled to one or more communication interfaces such as WiFi 2860, Bluetooth 2862 and other types of communication interfaces 2864 via one or more communication links 2872. In addition, a modem 2858, coupled to the Internet 2854, may be coupled to the service multiplexer 2802. Further, the modem may be coupled to a specific virtual machine such as the virtual machine supporting Gateway/Basic Setup/Storage 2838, via communication link 2870, to receive, process, multiplex, or transmit data for that particular service. Additionally, a set-top box 2856 coupled to a TV distribution network 2852, may be coupled to the service multiplexer 2802. Specifically, the set-top box 2856 may be coupled to a particular virtual machine that supports video services 2848 via communication link 2868. In addition, the Video/Image Processing/Graphic Processing/Display Buffer Management 2850 virtual machine may be coupled to a TV or display device 2866 via communication link 2874.

Functionally, the common operating system 2804 with a common security layer 2806 enables each functional stack implemented by a separate virtual machine to operate independently and securely from the other functional stacks. A functional stack may be provided for the wide area network access which can be via a Cable modem, xDSL modem or WiFi based home LAN with Internet access (2808, 2822, 2824, 2838). The functional stack (2808, 2822, 2824, 2838) may also be in control of the peripherals to the service multiplexer 2802 such as blue tooth keyboard/mouse, WiFi channels to other television receivers, printers, Smart phones and even personal computers (PCs).

Each functional stack can operate a service operating system (2810-2820) and can have a service security layer (2822-2836) that operates in conjunction with the common security layer 2806, but provides a key distinction in that each service security layer (2822-2836) can prevent a single point of intrusion which is not possible with a single OS or security layer.

The common OS (e.g. Linux, Unix etc.) may be used for message passing between the various functional stacks and management of overall resources as well as other functions for the device 2802. Further, the device architecture 2802 permits the service multiplexer 2802 to communicate with distant servers through the wide area network interface either directly or via LAN resources using the same message passing mechanism. The virtualization concept used in the architecture of the service multiplexer 2802 may be extended to the distant servers as well.

Further functions and features of the service multiplexer may be the following. Through the modem or WiFi interfaces (2858 and 2860) and the Gateway functional stack, IP TV services and other Internet provided video services may be selected, offered, and displayed on the connected TV receivers in the premises. Selection of the specific content may be done via a wireless (e.g. Bluetooth enabled keyboard/mouse, smart phone application or other) and message communication is done over the modem or WiFi interfaces (2858 and 2860). Video content is passed from the Gateway functional stack to the Video/Image processing and Graphic processing stack for buffering and display on the connected TV receiver using the common OS and security layers (2804 and 2806). The WiFi connection can also be accessed for unicast or multicast display as discussed below. The Gateway stack may also support an encryption and decryption function that enables communication paths to the wide area network and even to local WiFi connections to be encrypted on a per flow basis as required.

In addition, through the Video stack, Broadcast TV sources (e.g. from a Set Top Box, VCR, DVD player, smart phone, HDMI output, camera HDMI output, etc.), plus IP TV services and other internet provided video services (from the Gateway stack) can be optionally stored locally in the Gateway stack for later viewing on connected TV receivers in the premises. Storage may also be provided by a separate Storage stack with its own service OS and service security layer. Selection of the specific content, storage options, etc. may be done via a wireless (e.g. Bluetooth enabled keyboard/mouse, smart phone application or other) and message communication is done over the modem or WiFi interfaces (2858 and 2860). Video content is passed from the Gateway stack and/or the Video stack to the Video/Image processing and Graphic processing stack for buffering and display on the connected TV receiver using the common OS and security layers (2804 and 2806). Instant replay may be supported as well for all video sources with such mechanisms.

Social media pages may be selected and operated via a wireless keyboard/mouse (as described above), processed by the Social Networking and Regular Internet stack and sent to the Video/Image processing and Graphic processing stack for buffering and displayed on the connected TV receiver using the common OS and security layers (2804 and 2806) as described above for communication. Simultaneous display of the content and other content described above is supported by the Video/Image processing and Graphic processing stack.

In a similar fashion, as described above, photos and video sources from cameras and other sources (e.g. memory sticks) are also selected and displayed. Further, via the Gateway functional stack with the optional use of a Storage functional stack, locally stored video sources can be selectively (selection as described above via the wireless keyboard/mouse) backed up on a network server for future use, viewing or for access by others. Also, via the Gateway functional stack additional local video sources to the premises such as surveillance cameras to be displayed on connected TV receivers in the premises as described above. Such a display selection, in addition to selection by a controller or keyboard, may be triggered by a motion detector, door/window opening or doorbell (which is supplied as a status change input to the Gateway stack via an attached WiFi or Bluetooth device, a message from a Third-Party and other Application via messages communicated via the common OS and Security layer).

Additional services like E-mail, twittering, texting and social media information updating (e.g. text and still or full motion video) are accessed, and via a wireless keyboard/mouse processed, by the Social Networking and Regular Internet functional stack and displayed on the connected TV receiver using the common OS and security layers (2804 and 2806) for communication. Simultaneous display of the content and other content described above is supported by the Video/Image processing and Graphic processing stack.

The Gateway stack contains an Analytics and Data mining function that observes and extracts key user information that is communicated with a WAN attached server that analyzes each service multiplexer's information with information from many or all of the other attached service multiplexers' served by the server. The data mining feature is an option for each stack and provides its data to the Analytics and Data mining portion of the Gateway stack. The data and analytic information may be used to generate targeted advertisements which may be micro-segmented to groups of users thus providing them pertinent advertisements. The Gateway stack receives such advertisements and stores them for appropriate future delivery opportunities. Display of such advertisements in selected or all TV receivers in the premises by either replacing the existing network advertisements or simultaneously with a network advertisement using banner, captions, picture in picture or split screen is provided. Further, the service multiplexer 2802 may provide simultaneous advertising may be synchronized to the currently viewed channel with the primary service provider indicating the permissible times for insertion or substitution on a per channel basis plus the number of times it or they are to be repeated over a defined period of time (such information may be supplied by the primary service provider with the download of the advertisement). The Video/Image processing and Graphic processing stack may perform a merge function for the advertisements and the common OS and Security layer provides communication as described above. For verification of delivery the remote control activity, motion sensor or other means supported by the Gateway stack is used to inform the primary service provider's server of success.

Simultaneous E-commerce is supported by the E-commerce stack in a similar fashion as described for other services above. The Gateway stack adds profile and choice information from its Analytic and Data mining function to enhance a user's experience by communicating this information with the E-commerce stack by the common OS and Security layer. The E-commerce stack also contains a payment processing function that ensures a secure payment transaction with an optional printed receipt if a WiFi connected printer is available via the Gateway stack. For users that conduct Banking via the service multiplexer, a separate Banking stack is provided with its own dedicated security layer for added security. Display options can include a hiding capability that may be common with password entry to keep such information private from even other household members.

Additional services may include two party video conferencing that may be performed using a built in camera and microphones or stand-alone camera and microphones supported by external speakerphone which are under control of the Gateway stack. Selection and control of the video conferencing function may be via the wireless keyboard/mouse as described for above. Using the Video/Image processing and Graphic processing stack either picture in picture or split screen audio and display formats are supported. The remote party may be a multiparty Video conference bridge to enable multiple parties to interact with voice and video simultaneously. Firewire, USB or Bluetooth interfaces are used to connect external cameras, camcorders, etc.

The Gateway stack may enable a local IT backup service for any premises connected personal computer (PC), smart phone, etc. by supporting local file storage either via the Gateway stack's storage or via an optional storage stack as described above. Additional file security can be supported by periodic update to a network server service as described above. A synchronization service may be supported (e.g. selected PC files are the same on the PC as on a network) as well as a version control feature may be supported (a record of selected PC files has all or a defined number or date range of previous versions of files to be held on a network). For a connected Smart phone the Third-Party and Other Application Stack may be used to communicate with the Smart phone via the WiFi interface.

Third party applications (e.g. secure access node status and control function, interactive games, dedicated games, Smart phone applications as described above, etc.) may be supported on the service multiplexer using the Third-Party and Other Application Stack. For display of information on connected TV receivers in the premises, the Video/Image processing and Graphic processing stack may used with communication via the device operating system and common security layer as described above. When the game or application interfaces with a remote party may not be in the premises, the Gateway stack may provide such a communication interface function. Simultaneous advertising can also be displayed with such a function using banner, picture in picture, pop-up or split screen, etc. The advertisements may be sought and selected by the primary service provider, an application source or server supplier or an equipment supplier. Further, certain pertinent smart phone applications are supported by the service multiplexer (converted to be run on the service multiplexer's, Third-Party and Other Application stack's operating system). As describe in above communication, control, advertising, display, etc. are supported.

A connected smart phone can act as a wireless keyboard/mouse or as a general input device for the service multiplexer as well as a means of a display and thus permits a smart phone application to act as the controller or keyboard as well as display for the service multiplexer. The Third-Party and Other Application stack may host this function and the service multiplexer uses the Gateway stack for communication, the Video/Image processing and Graphic processing stack for the display merging and the device operating system and common security layer for inter-stack communication. Using such a mechanism, a smart phone application remote to the service multiplexer's premises will be capable of secure control of the service multiplexer's features and functions.

Internet radio and other remote audio sources can be played on connected TV receivers in the premises. The displayed video can default to details of the music artist, etc. as is common today on broadcast radio, to micro-segmented advertisements or the user can choose his own photo album or other stored video as a source (electronic picture frame).

Further, public service announcements with micro-segmentation (e.g. a neighborhood near a river that floods) can access the banner, picture in picture, pop-up or split screen features to send warnings of pending security and safety warnings (e.g. weather alerts). The repetition of such announcements plus the verification of delivery is supported.

The addition of audible alerting and automatic power up of connected TV receivers in the premises is also supported.

Additionally, the service multiplexer can use the banner, picture in picture, pop-up or split screen as a friendly bill payment alert for the primary or other service providers. In addition, a prescription reminder for elderly or ill subscribers, as well as a calendar service, a wake up service, etc. can use this same reminder mechanism. The function may be supported by the Gateway stack using the same repetition and verification mechanisms.

Also, a remote view of the output of the Video/Image processing and Graphic processing stack may supported which captures the displayed content of a selected TV receiver and sends it via the internet to a Smart phone (or a PC) using the Third-Party and Others stack. Additionally, any video content available or locally stored may be viewed in a similar manner.

Motion detected activation may be supported on the service multiplexer to detect movement in a room to automatically turn on the TV and display a pre-selected content including audio and an alert can be optionally transmitted via the Internet to a pre-selected destination (latch key babysitter support). Such a feature may reside in the Gateway functional stack and the options available to the end user are selected using the wireless keyboard/mouse.

The source for all IP streams supporting the disclosed features and functions can be WiFi (802.11a/b/g/n), Ethernet (GigE and Fast Ethernet) or USB (2.0 or 3.0).

Further, the Gateway stack plus the common security layer contain both conventional security mechanisms (firewall, spam filter, etc.) as well as fuzzy logic mechanisms (both learned and provided) to ensure security against outside, unwanted interference as well as cross domain (service) interference. In addition, the individual functional stacks (e.g. E-commerce and Banking) may also contain both conventional and fuzzy logic based security mechanisms.

Each functional stack may have optional functional stack IP address within the service multiplexer such that the service multiplexer can be addressed for communication purposes beyond the premises network and individual functions (e.g. e-commerce, banking, etc.) can support a higher level of functionality as well as security. For security control, a host server may be either that of the equipment supplier or that of the primary service provider such that the IP address (implicitly the email address of the unit) will be associated with the domain name of either the primary service provider or the equipment supplier.

When the content from the set top box or other source is 3D, the Video/Image processing and Graphic processing stack can optionally tint right eye and left eye frames differently (red and blue) and combine these frames into a single frame for viewing on a conventional 2D TV receiver. Such a function is optionally selected using the wireless (e.g. Bluetooth enabled keyboard/mouse). For high definition 2D TV receivers that support 60 Hz or higher consecutive frames, shutter glasses control may be provided so that 3D may be viewed on such display devices. The Video/Image processing and Graphic processing functional stack can optionally provide the wireless or Infrared output with a user adjustable timing control to synchronize the shutter glasses with the image being viewed; that may be necessary to account for variable per TV receiver delays in image timing versus input signal timing.

All of the features and functions disclosed can be displayed and interacted singly or simultaneously with the connected TV receivers in the premises using the wireless keyboard/mouse or smart phone application as described above along with simultaneous display of a broadcast source using a picture in a picture or split screen format.

Support for unicast or multicast to multiple TV receivers in the premises for all of the above features and functions may be supported. Such a function may be provided by the WiFi, Home PNA or MOCA interfaces, or other types of communication interfaces under control of the Gateway stack. As described above, the same video as displayed on the connected TV in the premises or any other video/audio source available in the service multiplexer can be transmitted to remote TV receivers and remote display devices.

All of the disclosed features and functions that either communicate via the communication interfaces used for in premises communication can optionally have encryption applied to both the control paths and the data content (e.g. video). Using such a feature and additional software functions, a closed community of user groups who may use the service multiplexer for email and other communication can be defined whereby this community can enjoy the benefit of secure email and other communication including associated authentication services. For users outside such a community, the communication will use standard security features supported by their service provider.

The service multiplexer may also enhance the video and other services provided by cable television providers and a telephone company. The examples of additional services which are provided through the use of this system include but are not limited to the following. IP TV services and other internet provided video services may be offered and, displayed on the connected TV receivers in the premises. Broadcast TV sources (e.g. from a Set Top Box, VCR DVD player smart phone HDMI output, camera HDMI output, etc.), IP TV services and other internet provided video services are permitted to be stored locally for later viewing on connected TV receivers in a premises. Further, instant replay is supported for video sources. Social media pages are allowed to be selected (via a controller or keyboard), displayed and stored for viewing on connected TV receivers in the premises. Locally stored video sources are allowed to be backed up (archive, stored long term, etc.) on a network server for future use, viewing or for access by others. Such a feature includes a local IT backup service for any premises connected PC, smart phone, etc. by supporting local file storage. Additional file security may be optionally supported by periodic update to a network.

Local video sources to the premises such as surveillance cameras are permitted to be displayed on connected TV receivers in the premises. Display may be triggered by a motion detector, door/window opening or doorbell in addition to selection by a controller or keyboard. Services such as email, twittering, texting and social media information updating (e.g. text and still or full motion video) are allowed to be accessed and inputted using a controller or keyboard. Inputting of additional advertisements, which have been preloaded and stored locally, are to be displayed in selected or all TV receivers in a premises either replacing the existing network advertisements or simultaneously with a network advertisement using banner, captions, picture in picture, pop-up or split screen. Simultaneous advertising may be synchronized to the currently viewed channel with the primary service provider indicating the permissible times for insertion or substitution on a per channel basis (such information may be supplied by the primary service provider with the download of the advertisement). For verification of delivery the remote control activity, a motion sensor or other means can be used to inform the primary service provider of success.

In addition, secure simultaneous e-commerce and banking activities are enabled to be pursued using controller or keyboard enhanced by micro-segmentation based on user's preference, profile and choice. Third party applications (e.g. interactive games, dedicated games, etc.) are allowed to be run on (processed by) the service multiplexer and information displayed on connected TV receivers in the premises using the controller or keyboard to control the application. Simultaneous advertising may be displayed with such a function using banner, picture in picture, pop-up or split screen, etc. The advertisements are sought and selected by the primary service provider or the equipment supplier.

Public service announcement with micro-segmentation to access the banner, picture in picture or split screen features to warn specific groups, neighborhoods, etc. of pending security and safety warnings (e.g. weather alerts) may be supported. Audible alerting and automatic power up of connected TV receivers in the premises is also supported. Further, the service multiplexer permits the banner, picture in picture or split screen: 1) as a friendly bill payment alert for the primary or other service providers, 2) as a prescription reminder for elderly or ill subscribers, 3) as a calendar service, 4) wake up service, etc.

A Remote Viewing feature may be supported which captures the displayed content of a selected TV receiver and sends it via the internet to a specific destination (e.g. PC, Smart phone). In addition the remote viewer can turn on a TV in his home remotely and select any video source to be viewed remotely (e.g. local school sporting events, local news, stored DVR content, etc.). Motion detected activation may be supported in the service multiplexer to detect movement in a room to automatically turn on the TV and display a preselected content including audio and an alert is sent back by internet to a pre-selected destination (e.g. smart phone to enable 'latch key babysitter' support).

For three-dimensional (3D) content, the service multiplexer can tint the left and right eye frames, merge them into a single frame and display them for viewing on an ordinary two dimensional display in either standard or high definition. The user would be able to use the tinted glasses to receive the 3D effect on a regular TV set. For TV sets that support 60 Hz or higher refresh screen rates, the 3D content would be interleaved and the Video Service Multiplexer would provide the shutter glasses control signal to permit 3D viewing.

All of the features and functions disclosed can be displayed and interacted singly or simultaneously with the connected TV receiver in the premises using a controller or a keyboard along with simultaneous display of another video source using a picture in a picture or split screen format. Support for unicast or multicast to multiple TV receivers in the premises for all of the disclosed features may done using MoCa, Home PNA or WiFi or any other type of communication interface known to persons of ordinary skill in the art.

Figure 29A:
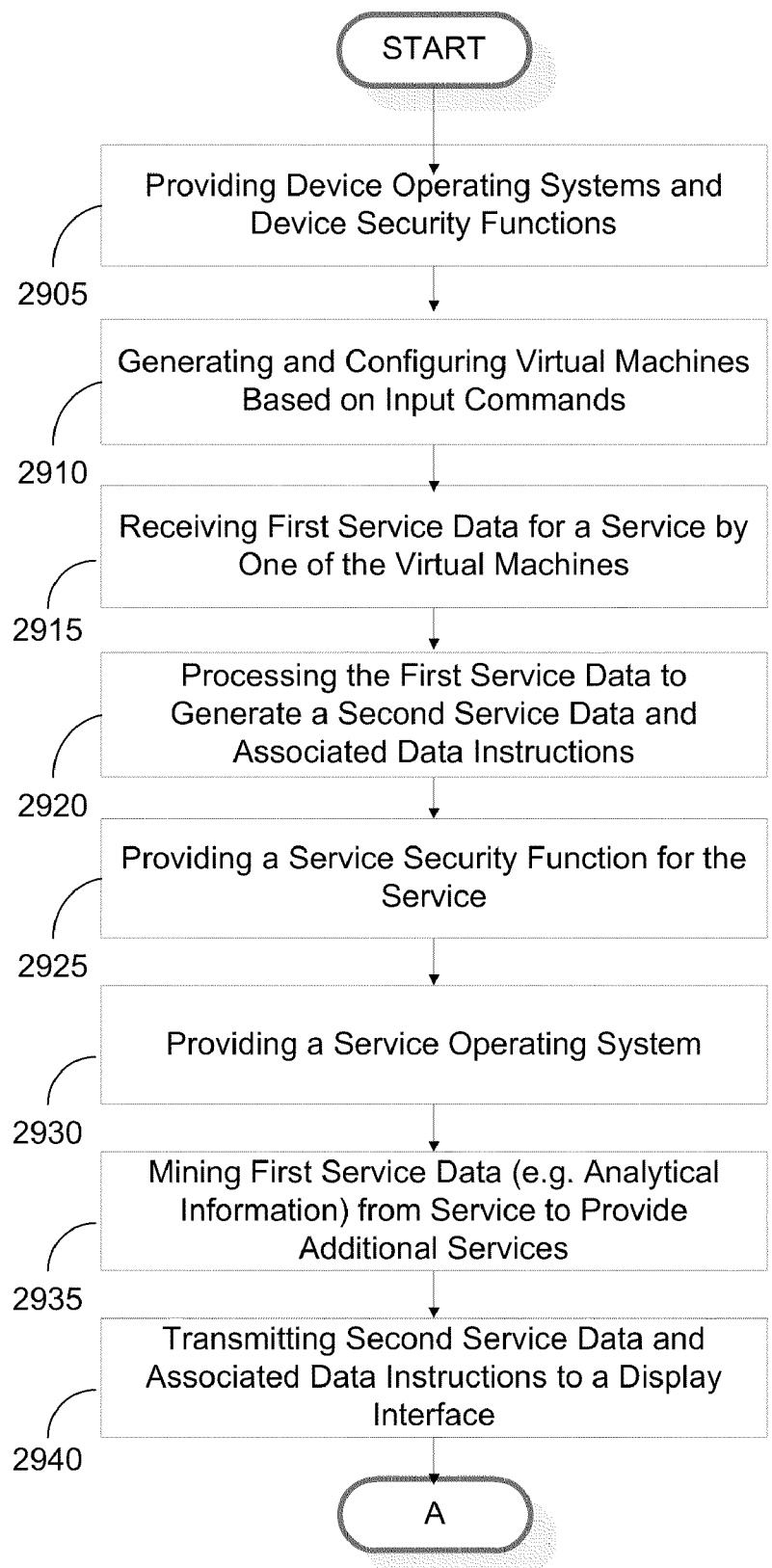
FIGS. 29A-29C provide exemplary flowcharts that show example methods for multiplexing one or more services at a customer premises.
Figure 29B:
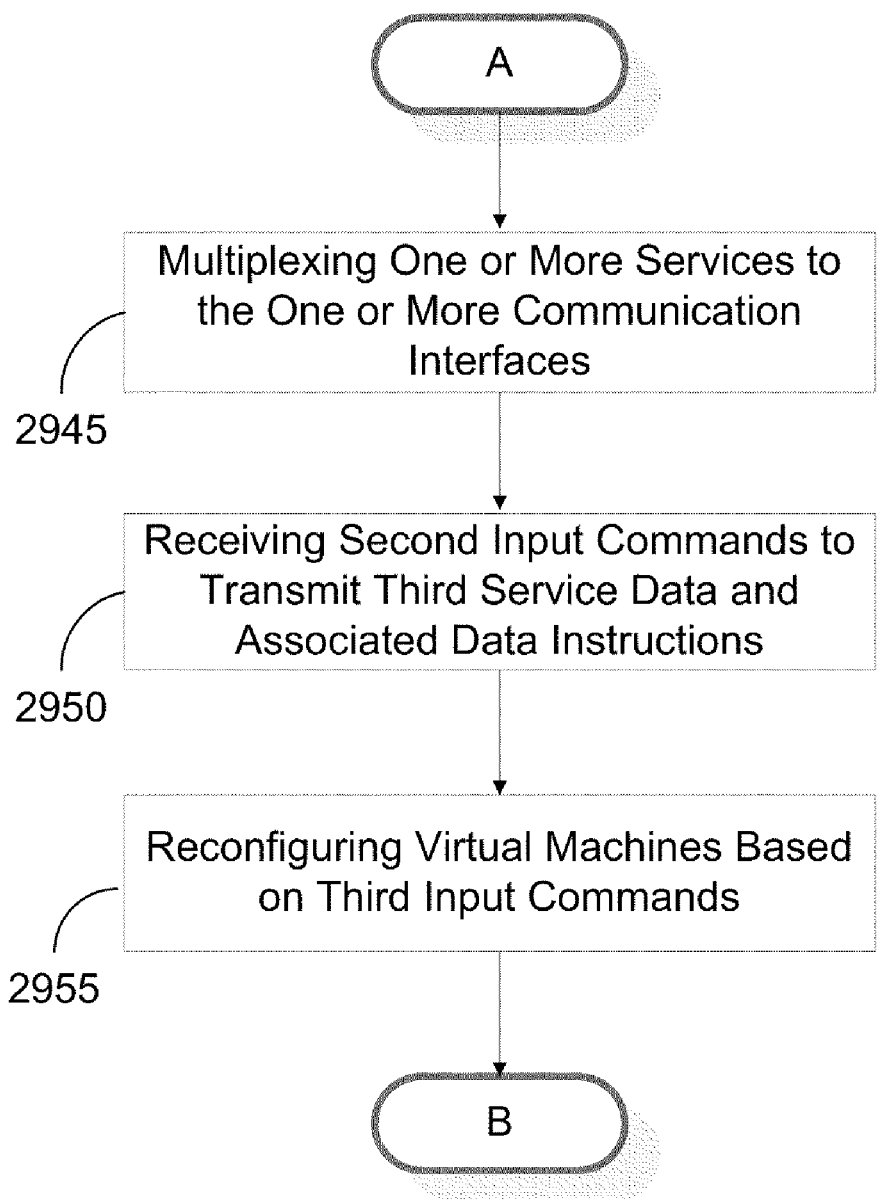
Figure 29C:
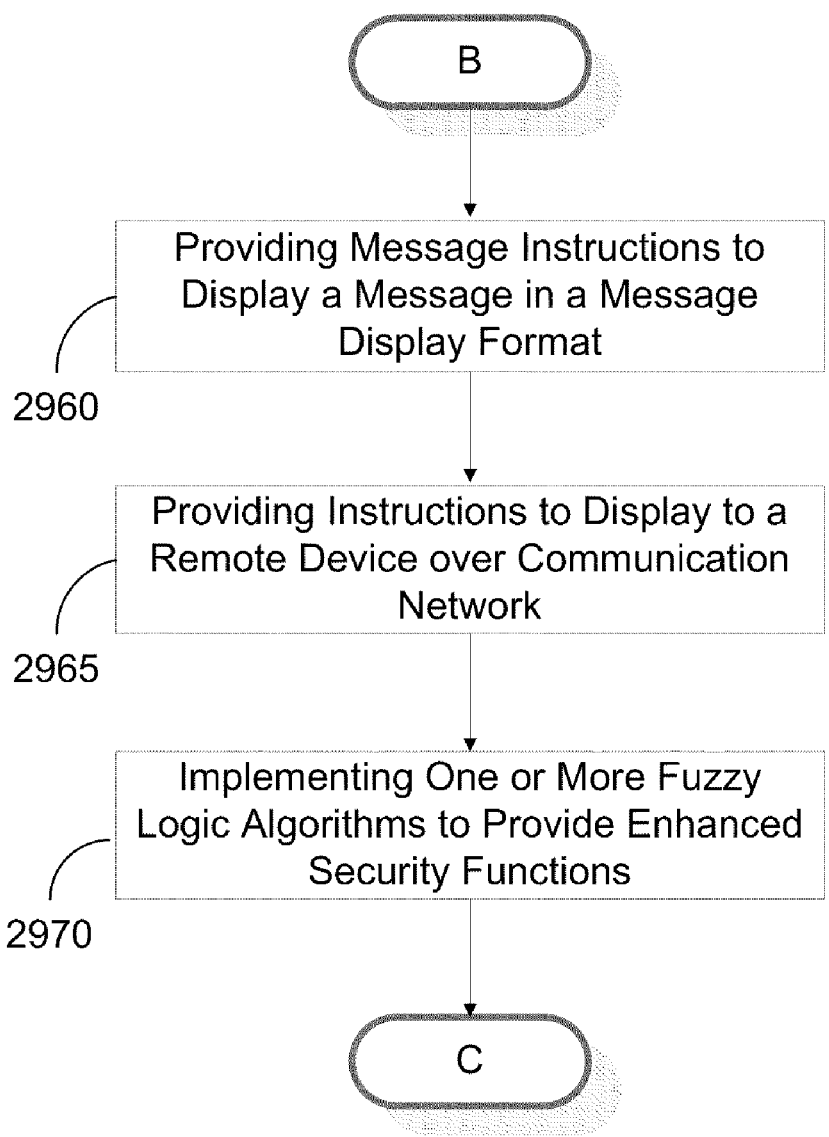

FIGS. 29A-29C are exemplary flowcharts that show example methods for multiplexing one or more services at a customer premises. The systems, devices, steps and functions described when discussing the examples methods shown in FIGS. 29A-29C may be similar in functionality to the systems, devices and methods described in other aspects of the present disclosure. A step in the example method may be providing a device operating system and device security functions using one or more device processors of a device such as a service multiplexer, as shown in block 2905. Another step may be generating and configuring one or more virtual machines using one or more software applications executed on the one or more device processors based on a first set of input commands, as shown in block 2910. The first set of input commands may be stored in memory (e.g. flash memory, storage device, etc.) or provided by a user through a user interface (web browser, remote controller, keyboard, input device etc.). Each of the virtual machines may support one or more services. Further, each virtual machine may be configured as a functional stack as shown in FIG. 28. That is, one or more service application layers may be on top of a service security layer and an analytics and data mining. Additionally, the service security layer and then analytics and data mining may be on top of a service operating system that rests on top of the device security function layer (implementing device security functions) and a device operating system. Such an architecture allows for the device to implement service security functions and a service operating system that may meet the specific needs of the service to optimize performance and efficiency of delivering the service to the end user. Such a device architecture (including the functional stacks and common device security layer and device operating system) allows flexibility for support of different services as well as future unforeseen services. Also, the common device security layer and device operating system may provide messaging or communication mechanisms between the functional stacks as well as process different service data to provide cross-service functions.

A further step may be receiving a first set of service data for a service of the one or more services by one of the one or more virtual machines, as shown in block 2915. For example, the service multiplexer may receive cable television content from a set-top box. An additional step may be processing the first set of service data using one or more software applications to generate a second set of service data and data instructions associated with the second set of service data, as shown in block 2920. For example, the service multiplexer implementing the one or more virtual machines may process the cable television content and provide the processed cable television content to a display device (across one or more communication interfaces) with instructions to display the processed cable television content in a split screen format. Another step may be providing a service security function for the service using the one or more software applications, as shown in block 2925. A further step may be providing a service operating system using the one or more software applications, as shown in block 2930. An additional step may be mining the first set of service data, including analytical information, from the service to provide additional services using one or more software applications, as shown in block 2935. For example, in such a step, the service multiplexer containing the one or more virtual machines may process e-commerce service data to determine a user preference for foreign films. Consequently, the mining and analytic function may pass this information to the device operating system to provide cross-service function to a cable content provider such that the cable content provider may target advertisements for foreign film content to the user. Another step may be transmitting the second set of service data and data instructions associated with the second set of service data to a display interface wherein the display interface is one of one or more communication interfaces, as shown in block 2940.

Referring to FIG. 29B, another step in the example method may be multiplexing the one or more services to the one or more communication interfaces, each of the one or more services provided by a corresponding service provider, as shown in block 2945. A further step may be receiving a second set of input commands across one or more control interfaces and to transmit a third set of service data and data instructions associated with the third set of service data to the one or more communication interfaces, as shown in block

2950. For example, based on input commands received from an (user) input device, a service multiplexer may provide cable television content to a display device as well as e-commerce service data (e.g. e-commerce website) to be shown in a split screen format. An additional step, may be receiving a third set of input commands across the one or more control interfaces and reconfiguring the one or more virtual machines based on the third set of input commands, as shown in block 2955. For example, in an initial configuration of the service multiplexer, the service multiplexer may support only cable television content, premises security, energy management, and e-commerce services. However, the user may like to also have streaming video services from a secondary service provider across the Internet. Based on receiving input commands from the user through an input device to such an effect, the service multiplexer may reconfigure the one or more virtual machines to support the streaming video service by implementing a functional stack to support the streaming video service including a streaming video service application, streaming video data mining functions to gather analytics, supporting streaming video security functions and a streaming video operating system.

Referring to FIG. 29C, another step in the example method may be providing message instructions to display a message in a message display format, as shown in block 2960. For example, the service multiplexer may provide a display device with a targeted advertisement and provide instructions to display the target advertisement in a banner message display format. A further step may be providing instructions to display to a remote device over a communication network 2965. For example, the display device may be remote such as a laptop or smart phone off customer premises. An additional step may be implementing one or more fuzzy logic algorithms to provide enhanced security functions, as shown in block 2970, and as described in the present disclosure. For example, based on time of day information, a service multiplexer may note that no e-commerce activity is performed during 9 am-5 pm on weekdays. However, the service multiplexer may detect that an e-commerce transaction is initiated at 3:25 pm on a weekday. Moreover, the service multiplexer may detect that the cable television content displayed on the display device is a children cartoon programming. Fuzzy logic algorithms may be implemented to determine that such a transaction may be performed by a household child without supervision of a parent. Thus, the service multiplexer may institute parental controls or other security functions on the e-commerce transaction as a result of implementing the fuzzy algorithms.

A conventional approach to security in home or personal communication devices uses a mixture of off the shelf point solution security functions that may include firewall, virus filter, spam filter, spyware blockers, etc. Protection from one application using data from or taking control of another application is not comprehensively provided by these mechanisms. The reason it is not comprehensively provided is primarily due to the sharing of a single operating system for all applications which permits I/O (Input/Output) port drivers, files and other data to be freely shared among all applications. Generally a shared memory scheme may be used for one application to communicate with another application further endangering the integrity of the system. In addition, many user-based applications permit on the fly creation of executable software which is generally the way in which Trojan horses and other viruses encroaches the security of a system. Such on the fly execution is needed for operating system, browser changes ('plug-ins') and other software application updates as well as ease of use expectations by users interacting with their applications. Aspects of the present disclosure describe systems, devices, and methods for providing increased security when multiplexing one or more services at a customer premises. This may include the ease of use and update capabilities of different services to co-exist and at the same time provide a much more secure solution for critical service applications.

As described in the present disclosure, FIG. 28 shows an exemplary functional architecture 2802 of a network device such as a secure access node, service multiplexer, or primary service provider server (e.g. primary server). The functional architecture 2802 can be implemented in hardware, software, or a combination thereof.

The architecture 2802 may be realized using one or more processors which are configured to provide multiple virtual machines (2838-2850), each virtual machine (2838-2850) supporting a particular service application, one or more service applications or type of service applications (e.g. e-mail, e-commerce, etc.). Each virtual machine (2838-2850) can also be configured to support a service compatible operating system, a security stack (e.g. one or more software applications) and service application software. The security stack may support off-the-shelf security software or hardware or a combination thereof in addition to enhanced or increased proprietary security functions. In an embodiment, the security stack may also include application specific fuzzy logic as discussed in the present disclosure. Further, as discussed in the present disclosure, the fuzzy logic rules may be implemented in any data layer of a communication protocol stack (e.g. physical, datalink, network, transports, session, presentation, application, etc.).

The number of virtual machines configured within a network device may be determined by the number of services or applications to be supported by the network device. Further, the number of virtual machines may be reconfigured to accommodate additional services and applications as well as additional functions and features. Moreover, the robust architecture 2801 is flexible, and scalable and can be configured to accommodate future unforeseen services, applications, functions, and features. In addition, in the secure access node and service multiplexer, each particular virtual machine may have its own service operating system. With each virtual machine having its own service operating system, other virtual machines on the device (e.g. secure access node or service multiplexer) may not be able to access each other's virtual machine thereby maintaining domain and memory integrity across services supported by the network devices (e.g. secure access node and service multiplexer). The primary server may also implement a scheme that each virtual machine has its own service operating system if the service operating system does not provide separate domain and memory integrity across the primary server's supported virtual applications. Maintaining domain and memory integrity reduces cross-service interference and allows the support of cross-service features and functions including cross-service security features and functions. However, if a particular virtual machine does require information from another virtual machine within a network device, such information is gathered by implementing an intra-network device messaging system that exchanges messages between different virtual machines through the common security layer 2806 or the common device operating system 2804. Further, the common security layer 2806 or device operating system 2804 checks a message for consistency, validity, etc. when receiving the message from a particular virtual machine before forwarding the message to another virtual machine.

The security functions of each functional stack may be implemented using traditional off-the-shelf security software that may be in addition to proprietary security functions that increase the security of the network device. Such proprietary functions may include implementing crisp logic and fuzzy logic. Both crisp logic (e.g. conventional or deterministic) and fuzzy logic that may be associated with each stack (which means that crisp logic and fuzzy logic may be implemented with each application or group of similar applications) is not only configured per the requirements of the particular set of applications but also can evolve through planned enhancements as well as through learning, a feature configured in the system. Such a learning function supports an individual functional stack's security using known behavior of a stack, like commonly used IP addresses, times of day for use, intervals commonly observed between uses, round trip delay between this stack and the server, etc. to detect unusual behavior. Such unusual behavior can be detected in each stack as well as the stack providing a report that can be sent to the common security layer to enhance security as discussed in the present disclosure.

In addition to the functional stacks created through implementation of the virtual machine, there is also one or more common layers on which the set of virtual machines is supported. Each functional stack supports its own operating system which is limited to supporting only its own functional stack and service (as discussed above). The common layer may include a common device operating system 2804 which could be different from those embedded in the virtual machines, and include a common security layer 2806 which could be a combination of off-the-shelf security software blocks that are enhanced by a proprietary security functions such as a fuzzy logic based security functions. The fuzzy logic based security functions can evolve through planned enhancements as well as through "learning" as discussed in the present disclosure.

The common operating system 2804 and the common security layer 2806 enables each functional stack to operate independently and securely from the other functional stacks. A functional stack, for example, may be provided for the system's wide area network access which can be via a Cable modem, xDSL modem or WiFi based home LAN with internet access.

The common operating system in conjunction with the one or more software applications may create the virtual machine's control, start up, memory allocation, time slicing and other resources provided to each virtual machine in a predetermined but reconfigurable manner. Though each stack may dynamically manage the resources allocated to it by the common layers, (e.g. common operating system 2804 and the common security layer 2806) no individual service stack may directly access resources allocated to another stack. If access to resources under the control of another stack is needed, a particular stack can send a message to another stack through the common layers (e.g. common operating system 2804 and the common security layer 2806) for such an access. The common layers using the common security layer 2806 adjudicates such actions, thus increasing the overall security and integrity of the system.

Each functional stack operates under control of its own operating system (OS) (2808-2820) and can have its own layer of security (2822, 2826-2836) that operates in conjunction with the common security layer 2806. Additionally, the architecture can prevent a single point of intrusion which may not possible with a single OS or security layer. Since the common OS 2804 is used for message passing between the various stacks and management of overall resources, the attempt of one stack to take control of another stack's resources is prevented by the common security layer 2806.

The common security layer has access to the communications data in each functional stack. Information received by a stack on its own may appear to be benign and thus is allowed to pass through each functional stack's dedicated security function. However, when combined with the communications data from other functional stacks, knowledge is gained (fixed and learned rules) as to the overall advisability of allowing such a communication. If suspicious, the transaction requested can be blocked. An example would be a banking transaction being initiated from a premise when the security system has been triggered because of an intrusion. While this is theoretically possible, the common security functions implemented by the common security layer 2806 mail prevent such a transaction and an enhanced security requirement of the system dictates a pragmatic step to be taken.

The functional architecture 2802 may also permit the networked system, like the Service Multiplexer, to communicate with distant servers through the wide area network interface either directly or via LAN resources using the same message passing mechanism. The virtualization concept used in architecting a device as described in the present disclosure, is extended to the distant servers as well. A primary server, with its view of all Secure Access Nodes or Service Multiplexers can use the primary server's learning of the behavior of one node to correlate with the behavior of other nodes to again enhance the overall security for any given application.

In addition to per service security enhancements by a primary server, the security of the communication links between the primary server and the nodes (or individual stacks) such as the Secure Access Node or the Service Multiplexer can be further improved using a proprietary scheme. An example scheme may be to modulate the inter-packet gaps of a packet stream going from the server to the nodes and vice versa. The packet gaps can be modulated using a pseudo-random pattern which can be changed automatically from time to time using a proprietary security key known only to the primary server and the specific node or a stack in the node.

Such a proprietary security scheme may be on the top of the communication protocols for different services. For example, for energy management system a protocol such as BacNet might be in use which is distinctly different from the protocol used for e-mail services. 7 A security scheme is attached to each protocol individually and thus a different level of security can be implemented for different services.

Persons of ordinary skill in the art would recognize that functional layers depicted in the figures of the present description may be implemented by software or hardware functions or a combination of both.

Figure 30:
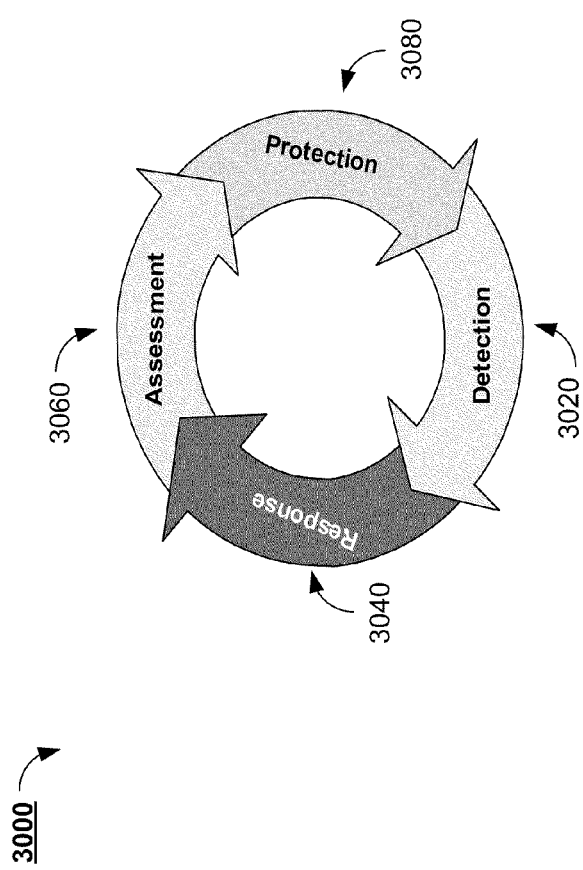
FIG. 30 is an exemplary flowchart that shows an exemplary security process.

FIG. 30 is an exemplary flowchart 3000 that shows an exemplary security process 3200. The exemplary process 3000 implements a security scheme on a network device or system including one or more network devices (e.g. primary server, secure access nodes, service multiplexers, etc.). Such a security process 3000 may include monitoring data that is transmitted or received by the network device and segregating different device functions into separate domains. Further, bundling or gathering common or similar functionalities and applications to a specific domain may simplify handling of security threats and may also streamline device or system architecture. An example may be bundling personal e-mail and social networking applications in one functional stack (implemented by a specific virtual machine) as the security requirements for e-mail services and social networking services may be similar. In addition, virtualization as well as service and traffic segregation are implemented by one or more network devices (e.g. service multiplexer, secure access node, primary server, etc.) using the an exemplary device architecture such as disclosed in FIG. 28 such that the network devices may provide the required level of privacy, integrity and authentication to end users.

Generally, the exemplary security process 3000 may involve four steps: One step may be Detection, as shown in block 3020. Detection, 3020, may include one or more software applications inspecting data packets received by a network device (e.g. deep packet inspection) and processing the data received to determine whether a security threat (e.g. virus, spam, etc.) has been received. A further step in the exemplary security process 3000 may be Response, as shown in block 3040. Exemplary responses to a security threat may be deleting the received data, confining the data to affected data storage devices, etc. An additional step in the exemplary security process 3000 may be Assessment, as shown in block 3060. Assessment, 3060, may include determining a way to prevent the detected security threat in the future for the particular device (e.g. secure access node, service multiplexer, primary server, etc.) or determine a way to prevent the detected security threat in other network devices. For example, a secure access node may detect a certain kind of virus received from inspecting social networking service data. The secure access node may provide a primary server with the type of virus and that the virus is associated with social networking service data. Consequently, the primary server may provide the virus information (type and associated social networking service data) to other secure access nodes. Another step in the exemplary security process 3000 may be Protection, as shown in block 3080. Protection may be incorporating a firewall feature to block previously detected security threats such as a virus associated with social networking data.

Further examples of implementing aspects of the exemplary security process 3000 may be the following. Detection of an anomaly (e.g. potential security threat) is usually performed at the lower levels of a seven layer ISO protocol stack (see FIG. 31), Internet Protocol stack, or any other communication stack using a rule based system that may be customized per application. Such a rule based system may incorporate crisp logic rules and fuzzy logic rules as described in the present disclosure. For example, a particular web site may be known (by IP address) to be in a blocked list as it typically is a source of viruses or spyware. The rule based system may block access, alert a user (through a user interface), or alert a common security layer to block such an attempt. Another example may be implementing aspects of the security process 3000 at the highest layer, for example, in the case of a particular web site requiring certain potentially compromising information to be input by a user, such as an email address or user name and password of another application. Consequently, rule based security software functions at the application layer may check for such compromising information within the message content. The security software functions at the application layer may not have a view of the full context of the message, and therefore the application security functions may report such a potential anomaly to the common security layer and block such messages from being sent if so instructed by the common security layer as an exemplary response in implementing the exemplary security process 3000.

Each response needs to be assessed to determine if the action taken to block a message, for example, is the result of simple user error or is a potential attack by an external security threat, like a virus or spyware. If the security threat appears to be external, then the rule base system (that includes a rule database) may be enhanced to catch any future such attempts. Assessing the potential damage and the severity of the consequences of the security threat may also be part of the Assessment 3060 stage of the exemplary security process 3000 to determine if a rule or policy of the rule based system needs to be updated or such a rule or policy weighting of the rule based system may need to be changed. Once the rules have been updated, software applications that may implement the Protection stage 3080 of the exemplary security process 3000 and use the enhanced rules stored in the rules based system database to drive the Detection stage 3020. Thus, Detection 3020 and Assessment 3060 may involve decision making; as a result, analysis of service data and security threats as well as generation of security associated data may play a role in security functions the network device in making decisions on whether certain activities are lawful', 'valid', or 'acceptable' and whether established policies and procedures in the rules based system may be invoked.

Figures 31A, 31B:
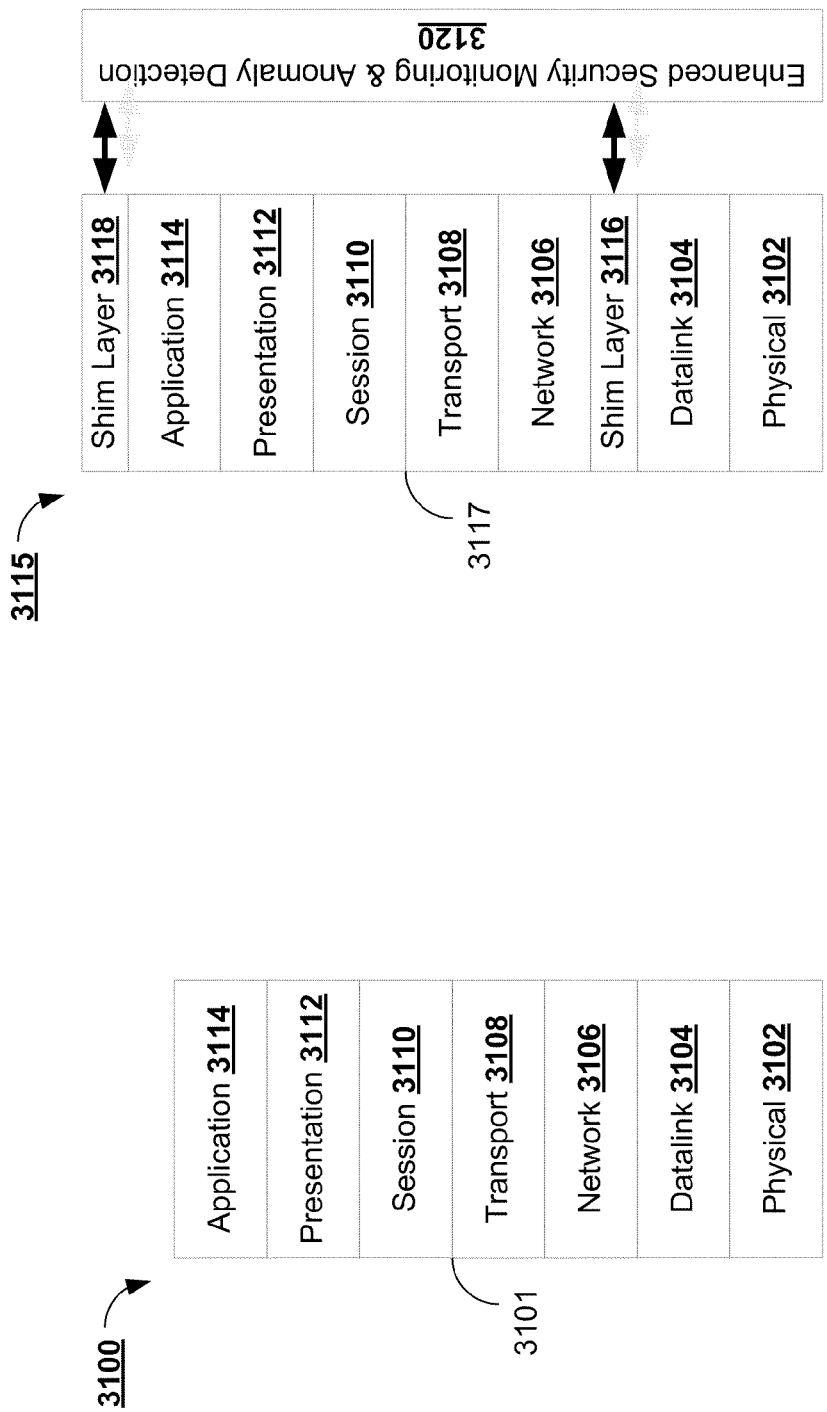
FIGS. 31A-31C are exemplary functional block diagrams that show exemplary security architecture of a network device.
Figure 31C:
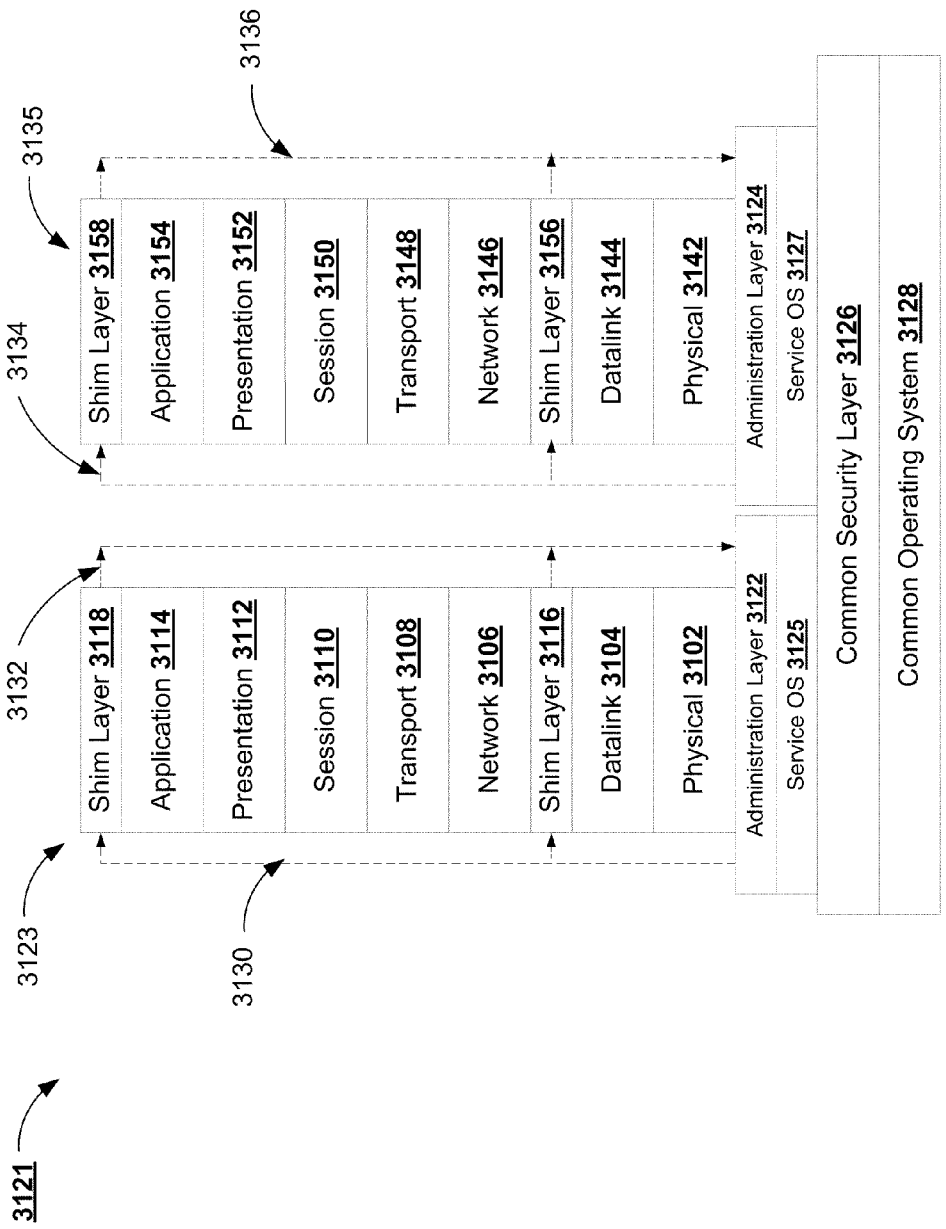

FIGS. 31A-31C are exemplary functional block diagrams that show aspects of exemplary security architecture of a network device (e.g. service multiplexer, secure access node, primary server, etc.). FIG. 31A shows a conventional seven layer communication protocol stack (3100, 3101) known to those skilled in the art. The data layers of the protocol stack may includes a physical layer 3102, a datalink layer 3104, a network layer 3106, a transport layer 3108, a session layer 3110, a presentation layer 3112, and an application layer 3114. FIG. 31B shows a modified protocol stack (3115, 3117) that provides a shim layer 3118 at the top of the application layer 3114 and a shim layer 3116 in between the datalink layer 3104 and network layer 3106. The shim layers (3116 and 3118) are data sub-layers implemented by one or more software applications and provide functions to detect, respond, or assess security threats to the network device as well as protect the network device from the security threats. The shim layers (3116 and 3118) may also include additional software functions that include inspecting, analyzing, and generating different types of data. The application shim layer 3118 may incorporate functions that detect, respond, assess, and protect the network device at the service application layer as well as other software functions. Alternatively, network shim layer 3116 may incorporate functions that detect, respond, assess, and protect the network device at the service network layer as well as other software functions. In addition, one or more software applications may implement an enhanced security monitoring and anomaly detection function 3120 that may receive protocol service data and associated security service data and service security data from the network shim layer 3116 and the application shim layer 3118 respectively. Persons of ordinary skill in the art would understand that a shim layer or a data sub-layer may be incorporated in between, on top of, or below, any data layer as well as one or more data sub-layers may be incorporated into the protocol stack.

FIG. 31C shows another exemplary functional stack 3121 for a network device (e.g. secure access node, service multiplexer, primary server, etc.) The exemplary functional stack 3121 may incorporate one or more modified protocol stacks. In FIG. 31C the exemplary functional stack 3121 may include two modified protocol stacks (3123, 3135). Each protocol stack may be implemented by a separate virtual machine running in the network device. A first modified protocol stack 3123 may include a physical layer 3102, a datalink layer 3104, a network layer 3106, a transport layer 3108, a session layer 3110, a presentation layer 3112, and an application layer 3114 as well as an application shim layer 3118 and a network shim layer 3116. A second modified protocol stack 3135 may include a physical layer 3142, a datalink layer 3144, a network layer 3146, a transport layer 3148, a session layer 3150, a presentation layer 3152, and an application layer 3154 as well as an application shim layer 3158 and a network shim layer 3156. The application shim layer may include one or more application functions that include, but is not limited to application security functions. Below each physical layer (3102, 3142) may be an administration layer (3122, 3124) implemented by one or more software applications or software functions. Further, below each administration layer (3122 and 3124) may be a service operating system (3125 and 3127). Note, that in alternative embodiments a primary server may not include a service operating system in such a modified protocol stack 3123 implemented by a virtual machine. Each administration layer may incorporate administration functions that may include data adaptation function, enhanced security monitoring and anomaly detection function as shown in FIG. 31B as well as other security functions. One or more software applications may provide a common security layer 3126 that implements common security functions for the network device as well as a common operating system 3128. The common security layer 3126 and/or the common operating system 31284 may pass messages between one modified protocol stack 3123 and another modified protocol stack 3135. Further, service data may be analyzed at each shim layer, or data sub-layer (3118 and 3158, 3116 and 3156) and application security data or protocol security data may be generated based on the analysis performed by the shim layer or data sub-layer. The application security data and protocol security data may be forwarded to the administration layer through an intra-device communication mechanism (3132, 3136) known to person skilled in the ordinary art. The administration layer, may in turn forward, directly or indirectly forward the application security data and the protocol security data to the common layer, including, but not limited to, the common security layer 3126 and the common operating system 3128. Further, after processing or analyzing the application security data and the protocol security data, the common security layer or the common operating system may provide data, such as reconfiguration data, to the shim layers (application security functions and data sub-layers) (3118, 3116, 3158, 3156) using intra-device communication mechanisms (3130 and 3134) to increase service security. Persons of ordinary skill in the art would understand the modified ISO seven layer stack shown in FIGS. 31A-31C is exemplary and that the network devices (e.g. primary servers, secure access node, service multiplexers, etc.) may use an Internet Protocol stack or any other communication protocol stack known in the art.

The following example illustrates the implementation of aspects of the exemplary protocol stacks and functional stacks shown in FIGS. 31A-31C that include protecting the network device against viruses, spam and spyware embedded in received e-mails. A security software block such as a spam filter, virus detection software or spyware filter software may be incorporated as one or more security functions in one of the data layers (e.g. application layer). Such a security function may be a point solution, that is, the security function protects a specific service from one particular type of security threat and may not be integrated with other point solutions within the service or in other services supported by the network device.

An example that illustrates analytical and security functions incorporated at the network shim layer (e.g. between the datalink and network layers) may include examining timing violations (time of day, frequency of use, round trip delay, etc.), suspicious IP addresses, suspicious port IDs, etc. for each modified stack (3123 and 3135). For example, a network device may support an energy management service. Thus, a modified protocol stack may be implemented to support the energy management service on the network device. Further, the premises security service provider may be allowed to monitor energy management sensors on a customer premises to enhance premises security. In such an example, if a request for the energy management stack is received from a third party such as premises security service provider's alarm monitoring server (which may have an incorrect source IP address from the point of view of the energy management service) an alert may be issued and the request may potentially be blocked by the network shim layer of the energy management service stack and may also determine such a request may be a security threat (the monitoring of energy management sensors could be allowed to work with the alarm server and thus not a threat). Even if the request to the energy management service stack was received from a correct IP address of, for example, an energy management server, the time of day or the round trip delay to the energy management server may be out of the acceptable range and hence determined to be suspicious or a security threat. Consequently, the request may be blocked, or an alert may be generated and sent to the common security layer of the network device.

Another example illustrating the security functions implemented by a network shim layer may involve LAN usage. A newly introduced device on a network and part of the system of network devices may attempt to gain access to a specific target network device. Such a network may not have a IP address that can be matched to an IP address listed in the target network device's list of "secure" network devices and allowed access to the target network device. However, such a computer may have a correct wireless encryption protocol (WEP) key. Consequently, the target network device may subject the network device to additional checks (e.g. signal level at the physical level) before being allowed access to target network device information (e.g. premise owner allows a guest to check premise owner e-mails).

In addition, the WAN physical layer for WAN and LAN access may have security features such as protection against MAC spoofing, power level monitoring of the radio link for low level or variation in level, number of simultaneous users (PCs, printers, phones, TVs, etc.), etc. The physical layer security functions may be are part of a modified LAN/WAN communication stack for LAN or WAN.

Another example may depict the manner in which a functional stack may deal with email functions by providing enhanced security using security architecture such as the one shown in FIG. 31C. It is assumed that the crisp logic based security functions such as spam filter, virus detection software and spyware filter may be part of the functional stack. The proprietary security functions may be incorporated in an application shim layer atop the application layer may extract, inspect, or analyze information from crisp logic security functions and may do further filtering using fuzzy logic rules that may be generated for that particular set of applications. These rules are the under pinning of the fuzzy block for this stack.

Continuing with the example, when a received e-mail is analyzed using fuzzy logic rules, credits may be calculated using a rule based relationship matrix to determine whether the particular received e-mail is a security threat or not. Table 1 is an example of rules and their associated credits. If the received email is determined to be a security threat, then the e-mail may be stored or confined in a specific storage area, deleted, marked as spam, etc. Similarly, an out-going e-mail may also be examined (inspected, analyzed, etc.) by using fuzzy rules. If such an out-going e-mail is determined as a security threat, then instead of placing the outgoing email into the Outbox for transmission, the network device may place the out-going email into a special email folder for the sender to re-examine the out-going email contents. In either the received email example or outgoing email example, the reasons for failing the fuzzy logic rule table may be reported to the user.

TABLE 1

Rule Table

| Rules (Crisp or Fuzzy Rules) | Credit Point |
|---|---|
| 1 If the content of the email is not using decent language (Fuzzy Rule) | 3 |
| 2 If the content of the email contain links to websites listed in a special "block-list" (Crisp Rule) | 4 |
| 3 If the destination email address is listed in a in a special "block-list" (Crisp Rule) | 4 |
| 4 If email contents contains bank account information (Fuzzy rule) | 4 |
| 5 If the content of the email doesn't match with contents in the attachment (Fuzzy Rule) | [determined by formula] |
| 6 If a normal business Email is from receiver's bank at a wrong time | 5 |

When analyzing a received email or an outgoing email using crisp logic and fuzzy logic rules, credits may assigned to the received email or outgoing email. If the total, accumulated amount of credits for the received email or outgoing email, equals or exceeds a threshold (e.g. 7), the email may be determined to be a security threat. Thus, for the out-going email example, the contents of the out-going email may be inspected by the application security functions incorporated at an application shim layer 3118 to find that the out-going email contents contains bank account information. Such a rule may be a fuzzy rule that was learned by the network device. The common security layer 3126 may receive bank account information from a banking service stack configured on the network device. Thereafter, the common security functions incorporated in the common security layer 3126 may relay the bank account information to the application shim layer 3118 on top of the email service stack. Application security functions incorporated in the application shim layer 3118 may generate a fuzzy logic rule such as the shown in Table 1 that determines whether contents of any out-going email contain bank account information. If so, analysis of the out-going email accumulates 4 credit points, according to Table 1.

Further, the network shim layer 3116 may incorporate network security functions that include crisp logic security rules such as a list of blocked IP addresses (IP addresses that are potentially not secure to send sensitive information) as shown in Table 1. Thus, the network (protocol) security functions may inspect and analyze the destination IP address of the out-going email address and determine the destination IP address is on the list of blocked IP addresses. Thus, the analysis of the out-going email accumulates another 4 credit points according to Table 1. Therefore, with a security threshold of 7, an alert may be generated based on exceeding the credit point threshold (8>7) to the common security layer 3126 and the common security functions incorporated in the common security layer 3126 may block transmission of the out-going email.

The administration layer (3122 and 3124) may be implemented by one or more software applications and include one or more administration software functions. One or more intra-device communication mechanisms (3123, 3132, 3134, and 3136), as known to those of ordinary skill in the art, may provide application and protocol service data, application and protocol security data, and other application and protocol data known to those of ordinary skill in the art. For example, the network shim layer 3116 may provide the administration layer 3122 certain exemplary network protocol information such as communication link statistics, RMON counters, between/among end points based on IP addresses; packet number statistics collected at the link layer for per physical port basis as well as at layers 3 and 4 of the ISO protocol stack for per end point basis. Such collected information by the administration layer 3122 may be used as the basis for further targeted network monitoring and probing packet generation on a per virtual machine basis as known to those skilled in the art. Further, a database may be stored in one or more storage devices of a network device that maintains and stores 1 second, 1 minutes, 15 minutes, 1 hr of RMON information. In addition, a database may be stored in a storage device, maintained and sorted by VLAN or specific tunneling method of traffic segregation. Another database may be stored and maintained in a storage device that include and correlate such information as application, hardware gear used, domain name, port ID and actual IP addresses for consistency check and further includes a change history, Radio Signal Strength Indicator (RSSI) of a WiFi device and response time from a particular application service. Such information as described above may be used as the basis for further Targeted Network Monitoring and Probing Packet Generation on a per virtual machine basis as known to those skilled in the art. In addition, there may be a database stored and maintained in a storage device for E-mail and other communication tools such as internet video and audio telephony and instant messaging service at the application layer that stores specific account consistency checks for different types of network devices (personal computers, tablet computers, laptop computers, smartphone, etc.) and the file format of attachments. Any new configuration and inconsistencies within the network may be flagged and reported to various service providers for validation.

As described in the present disclosure, a system for enhanced security may include service multiplexers and secure access nodes communicating directly or indirectly to a primary server. Further, in analyzing potential security threats, service multiplexers and secure access nodes may generate anomaly reports that may be cascaded through intermediate nodes to the primary server for further processing. Alternative embodiments may further cascade one or more anomaly reports to a secondary service provider server (e.g. secondary server). Further, the primary server can update rules, add rules and parameters (scores, weights and thresholds) associated with fuzzy logic rules in each communicatively coupled service multiplexer and secure access node as well as in the primary server. As part of analyzing the potential security threats probing/testing data packets may be generated and sent per application and software to validate observed traffic information or to obtain the network information (for example, the transmission latency may collected by transmitting separate ping test packet).

If a potential security threat is detected, for example, for improper addressing of a specific email message, a dialog box recommendation may be generated to a user interface so that improper email would not be sent prematurely. In addition, warning of web access or action as a possible security threat may be provided by a dialog box recommendation to a user interface so that unauthorized use of Internet resource to a third party may be avoided.

Figure 32:
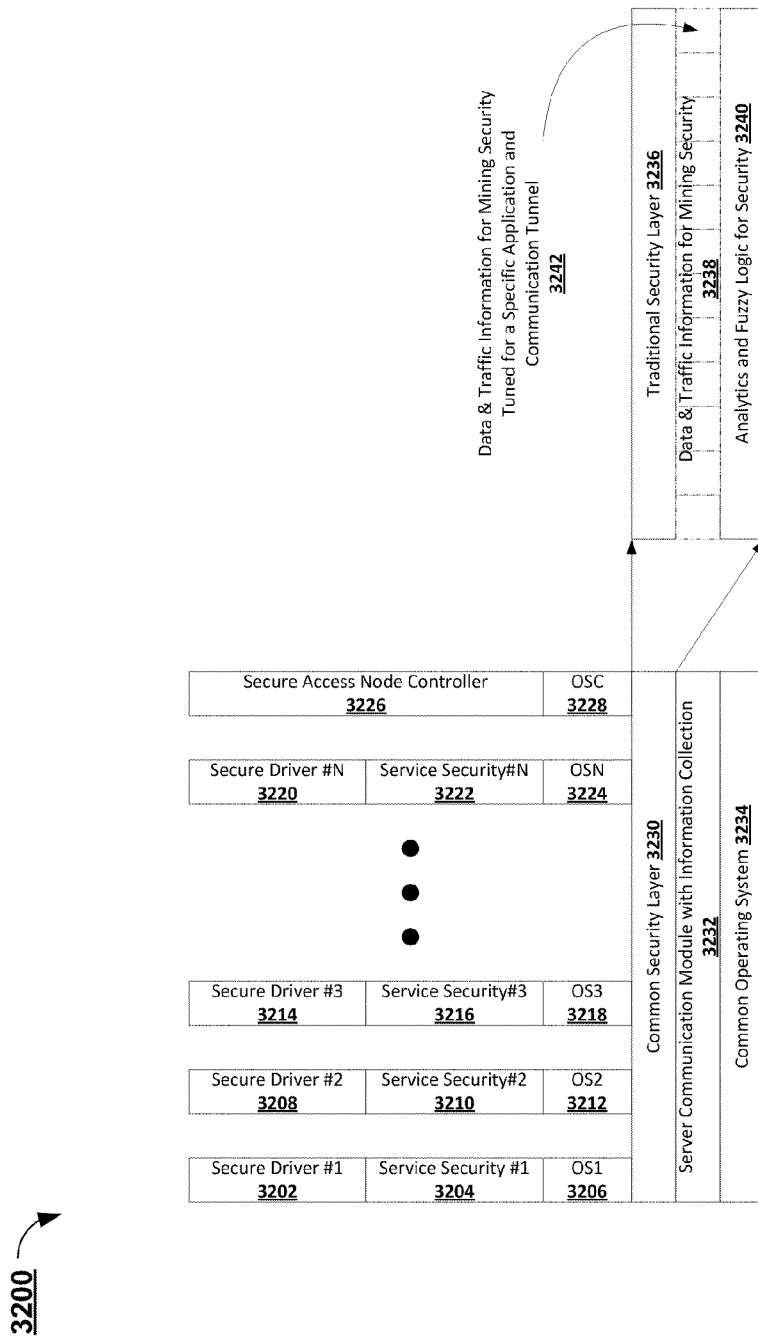
FIG. 32 is another exemplary functional block diagram that shows exemplary security architecture of a network device.

FIG. 32 is another exemplary functional block diagram 3200 that shows exemplary security architecture 3200 of a network device. The network device may have one or more virtual machines implemented by one or more processors. A virtual machine may implement a functional stack that may include a secure driver (3202, 3208, 3214, 3220) a service security function module (3204, 3210, 3216, 3222), and a service operating system (3206, 3212, 3218, 3224). In addition, a virtual machine may implement a secure access node controller module 3226 with an associated operating system 3228. The security architecture 3200 may also include a common security layer 3230, a server communication module with an information collection function 3232, and a common operating system 3234, each of which may be implemented by one or more software applications. The common security layer 3230 may include traditional security layer 3236 implementing traditional security functions, analytic and fuzzy logic security functions 3240, and data and traffic information collection for mining security functions 3238. The data and traffic information collection for mining security functions 3238 may include additional data and traffic information collection for mining security functions tuned for a specific application and communication tunnel 3242.

The common security layer 3230 collects data from each stack and cross-correlates or analyzes the data to generate a set of rules which are subsequently used by the common security functions incorporated in the common security layer 3230. The rules may be crisp logic or fuzzy logic. Thus, the network device uses additional information in each functional stack to generate an enhanced layer of security functions to protect each stack and then generates cross-stack observation information to generate a common security functions to improve the overall security of the network device as well as a system of network devices.

The information received by the common security layer 3230 that may include cross stack information may be dynamic. Consequently, service requirements and crisp logic and fuzzy logic rules may also be dynamic (learned). The common security rules can be used to further improve fuzzy logic rules associated with the individual functional stacks. Such an improvement may be automated or be developed off-line as needed. Collected analytics may be analyzed to continuously improve network device and system security by upgrading the one or more software applications of the network device or system of network devices at regular intervals.

As shown in FIG. 32, the Data & Traffic Information Mining for Security layer 3238 may extract information from each shim layer of each stack (as shown in FIGS. 31B-C) and forms a knowledge base on a per segregated stack basis. A fuzzy logic software application may be used to process the collected information as the information flowing through the network device may not be well structured but is understandable (e.g. the higher layers in each stack could be encrypted) in context. The extracted information may be used for analytics.

For example, email may pass through a traditional Internet application stack while access to a user's bank may use a different type of functional stack that may be called a banking functional stack. If the user has unusual email activity related to banking, which is detected, any stack having emails related to banking may be subsequently monitored and the network device may generate trigger events to alert a user through a user interface or have a protocol security functions (including application security functions) or common security functions to block transmission. Consequently, common security functions incorporated in the common security layer, may extract information from one or more functional stacks to enhance the security of a particular stack without any information, like passwords, being exchanged between the stacks which in itself could diminish a particular stack's security. Persons of ordinary skill in the art would recognize that alerts and trigger events may be used interchangeably.

Virtualizing and bundling applications into different stacks, each stack having specialized security logic or functions and an additional fuzzy logic based security layer and a common security layer may be implemented in network devices such as a secure access node, service multiplexer, primary server, etc. Any anomaly (e.g. potential security threat) detected in any network device may be used to inform other network devices to thus coordinate the overall security of the system of network devices against internal and external threats. Such a coordinated security approach may be facilitated by providing new rules learned in each network device to be shared with the other network devices through notifications sent between network devices as shown in FIG. 33.

Figure 33:
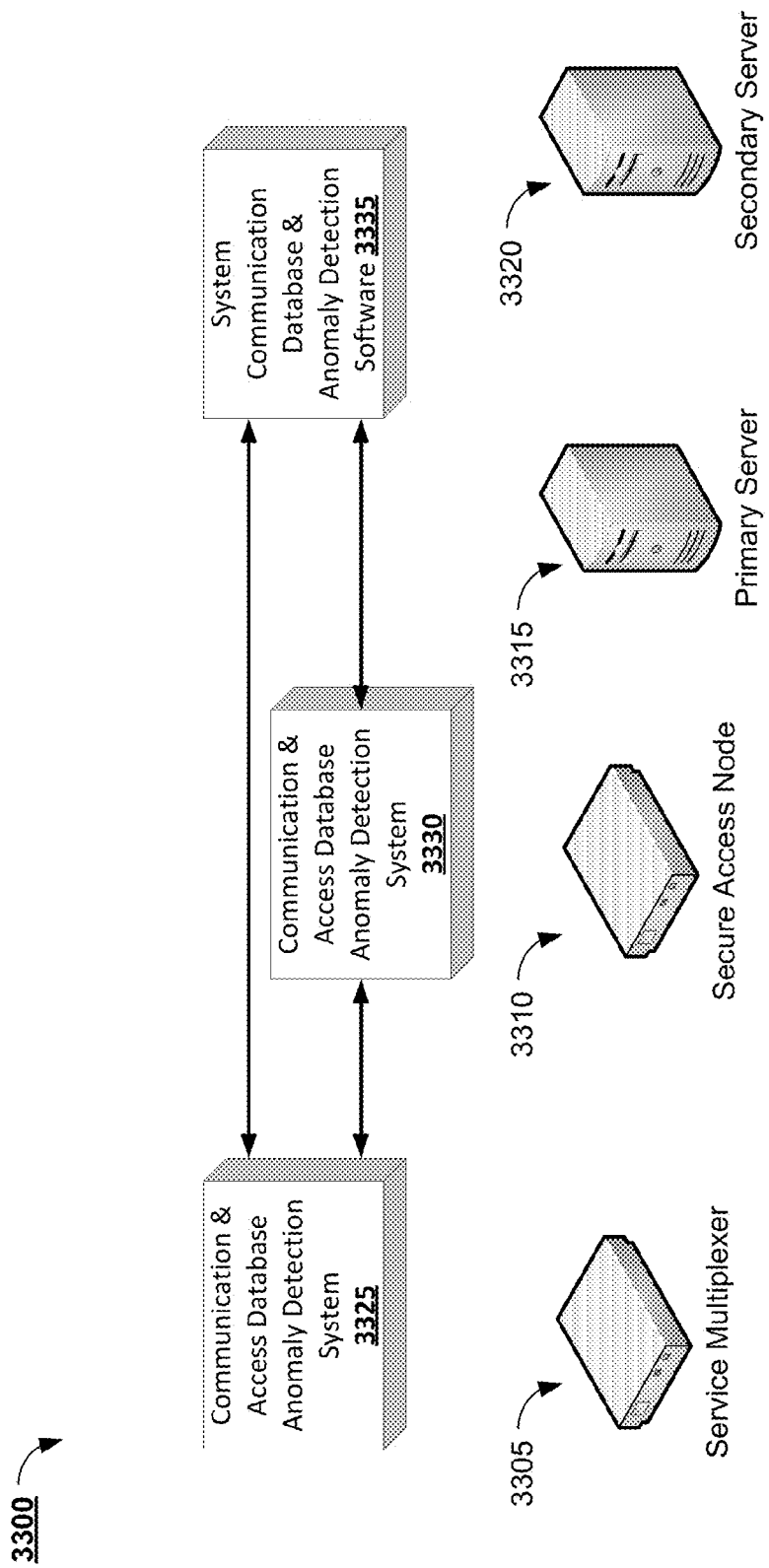
FIG. 33 provides exemplary network architecture to enhance the security of a system of network devices.

FIG. 33 shows exemplary network architecture 3300 to enhance the security of a system of network devices. The exemplary network architecture 3300 may include a service multiplexer 3305 and a secure access node 3310, both located at a customers premises and coupled through a premises communication network. The service multiplexer 3305 and the secure access node 3310, each may have a communication and access database and anomaly detection system (3325 and 3330). Such systems (3325 and 3330) may incorporate the security features described in the present disclosure. Further, the secure access node 3310 may be coupled to a primary server 3315 across a communication network such as a WAN. In addition, the primary server may be coupled to a secondary server 3320 across a communication network such as a WAN. Both the primary server and the secondary server may have a system communication database and anomaly detection software 3335 incorporating security features described in the present disclosure. Security information (e.g. detected potential security threats) from the service multiplexer 3305 may be forwarded to the secure access node 3310. Persons of ordinary skill in the art would recognize that the primary server 3315 may be coupled to one or more secure access nodes. The secure access nodes may, in turn, provide the system communication database and anomaly detection software 3335 with security information (e.g. security threats) so that the system communication database and anomaly detection software 3335 may coordinate the security of the system of network devices against the potential security threats.

For example, a secure access node, or a service multiplexer (via a communicatively coupled secure access node) may provide one or more common alerts or security notifications to a primary server. Such common alerts or security notifications may be, for example, notifying the primary server that the secure access node or service multiplexer received one or more security threats of the same type (e.g. virus) from a social networking service. Consequently, the security notifications may be flagged in the primary server which has the view of all activities performed by the secure access nodes and service multiplexers of the system. The common security layer in the primary server analyzes and correlates the security information from the secure access nodes and service multiplexers and updates the common security functions of the secure access nodes and service multiplexers with new security information so that the security logic of secure access nodes and service multiplexers becomes more robust against the security threats. For example, if there is a threat against certain functions (e.g. social networking) in a particular secure access node, all other secure access nodes may be alerted to change fuzzy logic rules to guard against such a security threat. Such a reconfiguration or update may be to change a credit scoring system associated with different rules or to change a credit threshold level of a particular type of security threat. Another example may be a security threat against a particular bank increasing the score from 5 to 6.

Referring to FIG. 27, an example of the hardware implementation of a secure networked system as described in the present disclosure is shown, supporting the system and software architecture described in FIG. 28. The MPU (e.g. a processor or processor bank) in FIG. 27 along with appropriate software functions like operating systems, virtualization software, security software and application software packages associated with Banking, E-commerce, etc. implement the functional stacks illustrated in FIG. 28. The MPU may provide an encryption/decryption function within its hardware and software to support per flow encrypted communications. The hardware interface peripheral logic shown at the bottom of FIG. 27 interfaces with software drivers also hosted in the MPU. The graphic processing and Video processing units along with the pertinent virtual machine implemented using the MPU are used for driving the display functions such as the primary connected TV receiver, remotely connected (via WiFi) TV receivers or remote Smart phones and PC that support such applications. Storage and buffering of video is provided as shown in FIG. 27 using internal storage. In addition both volatile and non volatile storage are provided for software executables and configuration data. Analog to Digital and Digital to Analog conversion may be provided to analog video sources and displays. Codec functionality is provided to support industry standard compressed video sources. The additional interfaces like HDMI, component video, composite video, etc. are used to interface and are digitized as needed from external video sources.

FIGS. 34A-34E are exemplary flowcharts that show example methods for providing increased security when multiplexing one or more services at a customer premises. A first step in the example or exemplary methods may be supporting a service using a virtual machine generated by one or more software applications stored in one or more storage devices and executed on one or more processors of a network device, as shown in block 3405. A network device may be a service multiplexer, secure access node, or primary server. Services supported may include Internet access, banking, e-commerce, social networking, email, video, or Voice over IP, energy management, premises security, etc. A further step in the methods may be to provide a service operating system for the virtual machine, as shown in block 3410. For example, an energy management service may require or perform optimally with a certain type of operating system while a banking service may require or perform optimally with a different type of service operating system. The network device may support such architecture because each service is supported by a different virtual machine. An additional step may be providing a set of service application functions for the service, as shown in block 3415. For example, an email service may have an email address function that may fill in an email address when provided with a name of a contact person. Another example of an application function may be for a banking service. An application function may query a user for an account name. Upon receiving the account name, the application function may be able to access the account number and routing number from a database based on the account name to ease the user in making money transfers.

Another step in the method may be providing one or more application security functions for the service application functions, as shown in block 3420. For example, an application security function for an email service may work with the address function for the email service. Thus, if the address function automatically fills an email address based on a user inputted name such as "Mark" with the email address mark@company1.com form a user contact list stored by the email service. However, an application security function may review the user contact list to find another "Mark" with email address mark@company2.com. Consequently, the application security function may query the user to confirm transmission of the email to make sure the email is sent to the correct recipient. The exemplary methods may also include a step for analyzing a set of service data using the application security functions to provide service security, as shown in block 3425. For example, when supporting a banking service, application security functions may inspect and analyze service data to determine account information such as bank account number and routing number. A further step in the method may be generating application security data based on analyzing the set of service data, as shown in block 3427. An additional step in the method may be providing an administration function for each virtual machine, as shown in block 3430. For example, banking application security function may generate banking application security data that instructs a set of common security functions using an administration function to detect whether banking formation may be transmitted using another service a such an email or social networking services. Another step may be transmitting the application security data to the common security functions using the administration function for each virtual machine, as shown in block 3435. The methods may also include a step for monitoring the application security data using an administration function of the virtual machine, as shown in block 3440. A further step may be reporting application security trigger events based on the application security data to the common security functions, as shown in block 3442.

For example, an email application function may analyze an email's content and determine the email contains bank information. Such an email application function may generate application security data to be transmitted to the common security functions using the administration functions. The administration function facilitates transmission of the application security data related to an email potentially containing bank information to the common security functions by monitoring application security data. The application security function may also generate an application security trigger event based such application security data and transmit the application security trigger event to the common security functions.

Figure 34A:
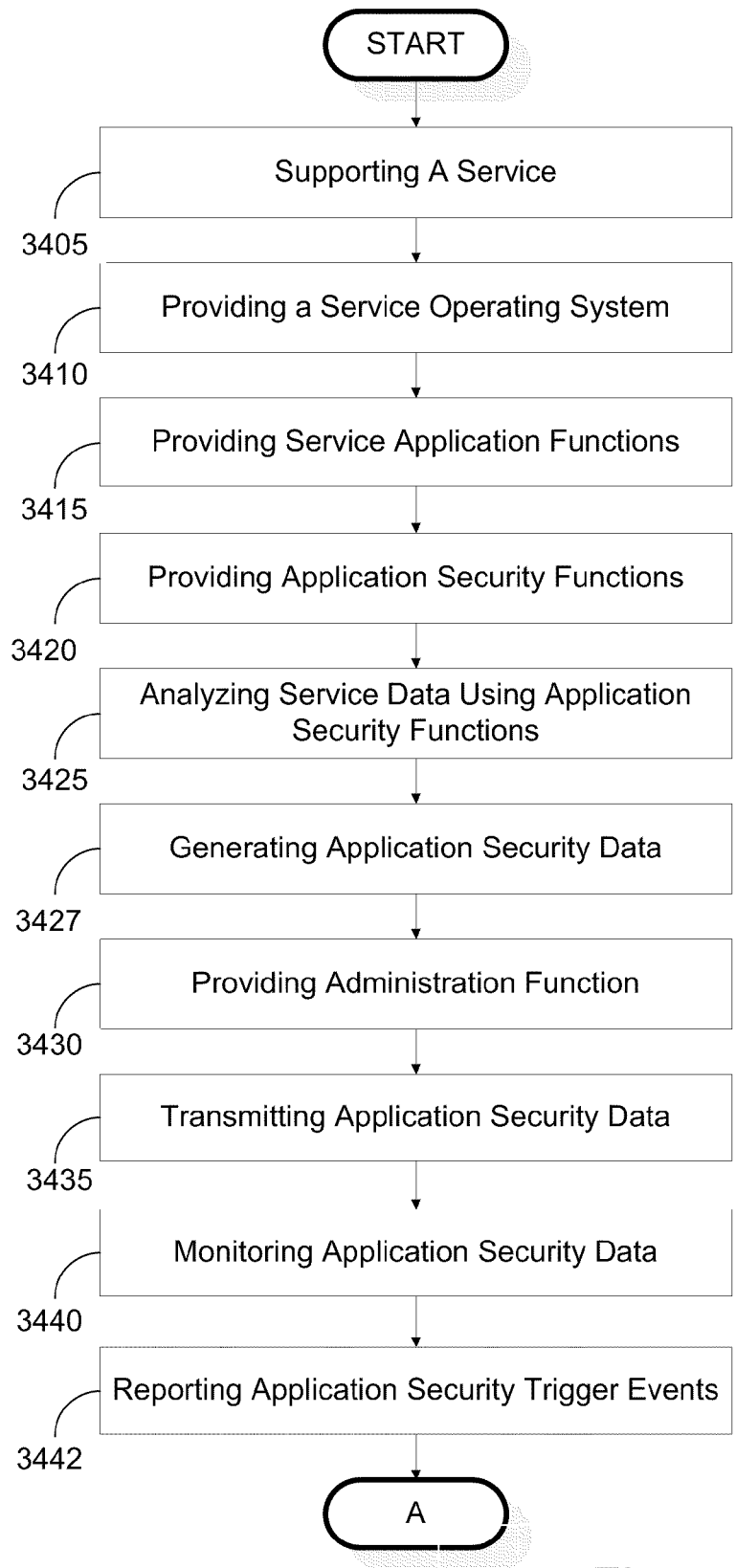
FIGS. 34A-34E show exemplary flowcharts that show example methods for providing increased security when multiplexing one or more services at a customer premises.
Figure 34B:
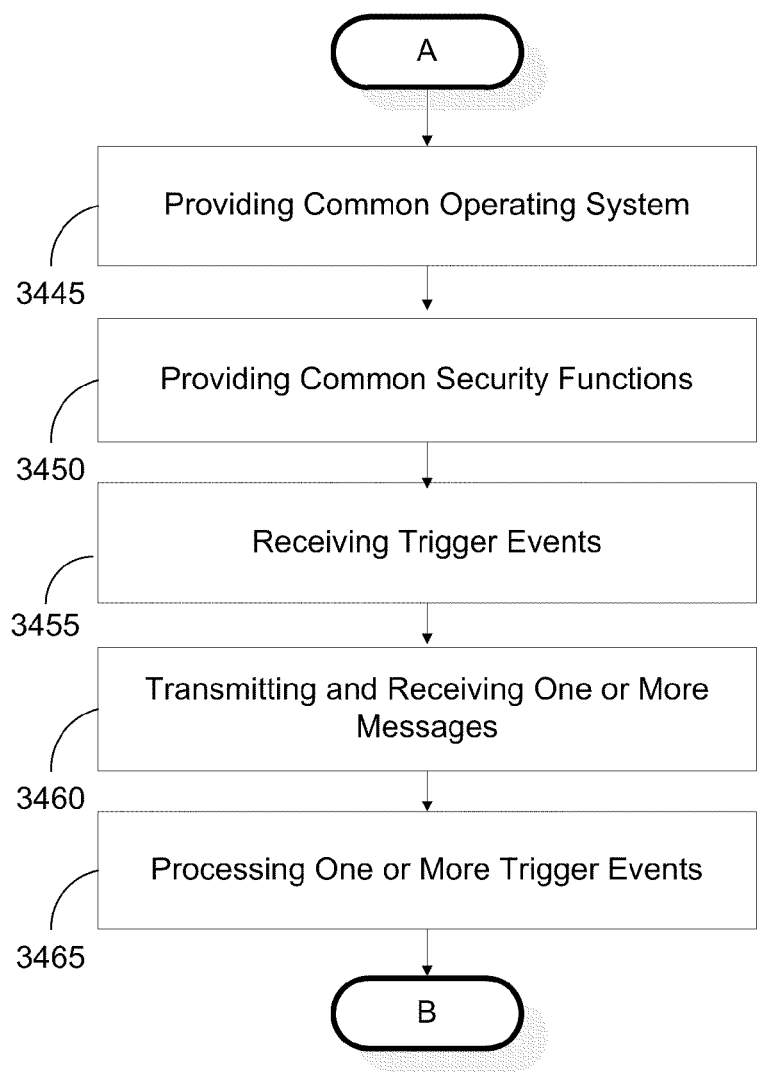

Referring to FIG. 34B, another step in the method may be providing a common operating system for a network device, as shown in block 3445. A further step in the methods may be providing a set of common security functions that includes common information gathering and common dissemination functions, as shown in block 3450. Thus, for example, the common security function may receive application security data related to an email potentially containing bank information. An additional step may be receiving one or more trigger events from the one or more alerting mechanisms of each virtual machine using a common security function, as shown in block 3455. For example, the common security function may receive an application security trigger event based on an email potentially containing bank information. Another step may be transmitting and receiving of one or more messages between the one or more virtual machines using the common operating system, as shown in block 3460. A further step may be processing one or more trigger events received from the one or more alerting mechanisms of each virtual machine and generating a common alert function for the common security functions, as shown in block 3465. For example, the common security information may send a message to a virtual machine supporting a banking service containing the potential bank information to determine whether bank information is in fact attempting to be transmitted. Further, the common security functions may have access to bank information and may process the application security trigger event to determine whether the email contains banking information.

Figure 34C:
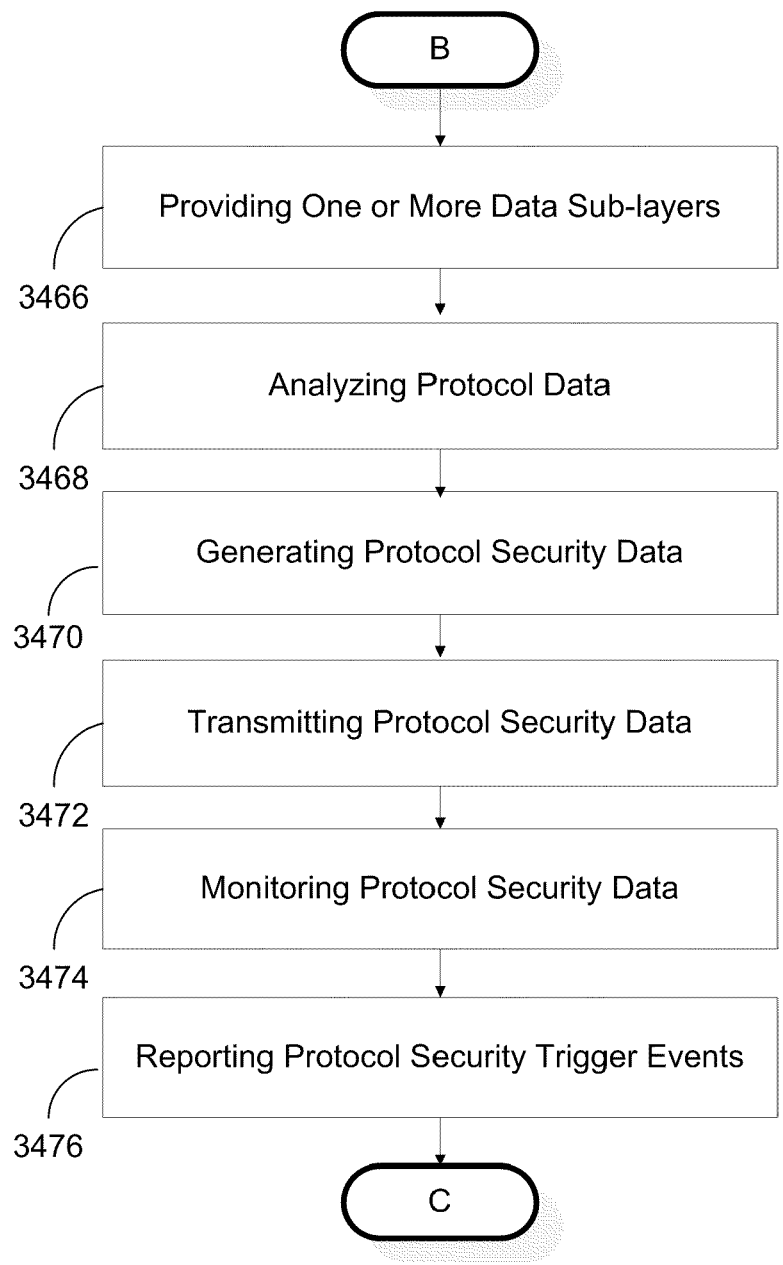

Referring to FIG. 34C, other steps in the method may be providing one or more data sub-layers and analyzing a set of protocol data that includes protocol information, as shown in block 3466 and block 3468. For example, a network data sub-layer may analyze the destination IP address of an email that may contain banking information and determine such an IP address may be on a special blocked list. A further step may be generating protocol security data based on the protocol data, as shown in block 3470. For example, the protocol security data may contain information stating that an email containing bank information is destined to an unauthorized IP address.

An additional step in the method may be transmitting the protocol security data to the common security functions using the administration function for each virtual machine, as shown in block 3472. Another step may be monitoring the protocol security data, as shown in block 3474. A further step may be reporting one or more protocol security trigger events based on the protocol security data to the one or more data sub-layers and the common security functions using the administration function, as shown in block 3476. For example, the protocol security data related to an email containing bank information to an unauthorized IP address may be sent to the common security functions and such protocol data may also be monitored by an administration function. Further, a protocol security trigger event may be generated based on such protocol security data.

Figure 34D:
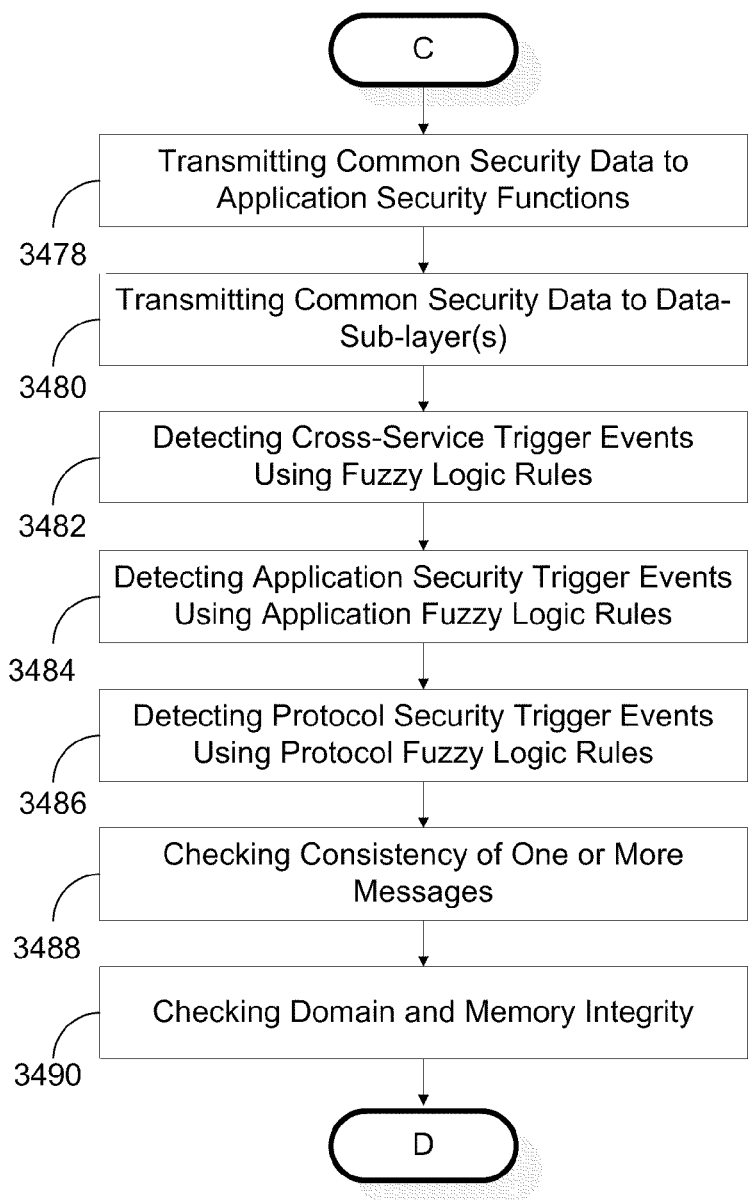

Referring to FIG. 34D, another step in the method may be transmitting common security data to the application security functions to increase service security wherein the common security data includes application security configuration data. using the common security functions, as shown in block 3478. For example, the common security functions may have bank information that is relayed to the email application security function along with reconfiguration data instructing the application security function to inspect any outgoing emails for such banking information. A further step may be transmitting common security data to the one or more data sub-layers to increase service security using the common security functions wherein the common security data includes protocol security configuration data, as shown in block 3480. For example, common security functions may provide a list of IP addresses that should be in a blocked list because list of IP addresses have been determined to be used by viruses that attempt to extract banking information from different network devices.

An additional step in the method may be detecting cross-service trigger events between one or more trigger events between one or more virtual machines using a first set of fuzzy logic rules implemented by the common security functions, as shown in block 3482. For example, a network device may understand that a virtual machine supporting a banking service may only transmit banking information. The common security function may generate a fuzzy rule that may consider any other service using bank information to be a suspicious activity. Subsequently, the common security function may monitor an outgoing email containing bank information and detect such a cross-service trigger event. Another step may be detecting application security trigger events using application fuzzy logic rules, as shown in block 3484. For example, an application security function may generate a fuzzy rule based on time of day for banking activities. That is, the fuzzy rule is generated because monitoring banking activity suggests users only perform such banking activities on weekday evenings or on weekends. Thus, if a banking activity is initiated on a weekday morning, an application trigger event is detected. A further step may be detecting protocol security trigger events using protocol fuzzy logic rules, as shown in block 3486. For example, a fuzzy rule may be generated that determines banking information is transmitted to only a specific IP address, If the network device attempts to send banking information to a different IP address, a protocol security trigger event may be detected. An additional step may be checking the consistency of one or more messages transmitted between one or more virtual machines, as shown in block 3488. Another step may be checking the integrity of the domain and memory for each virtual machine, as shown in block 3490.

Figure 34E:
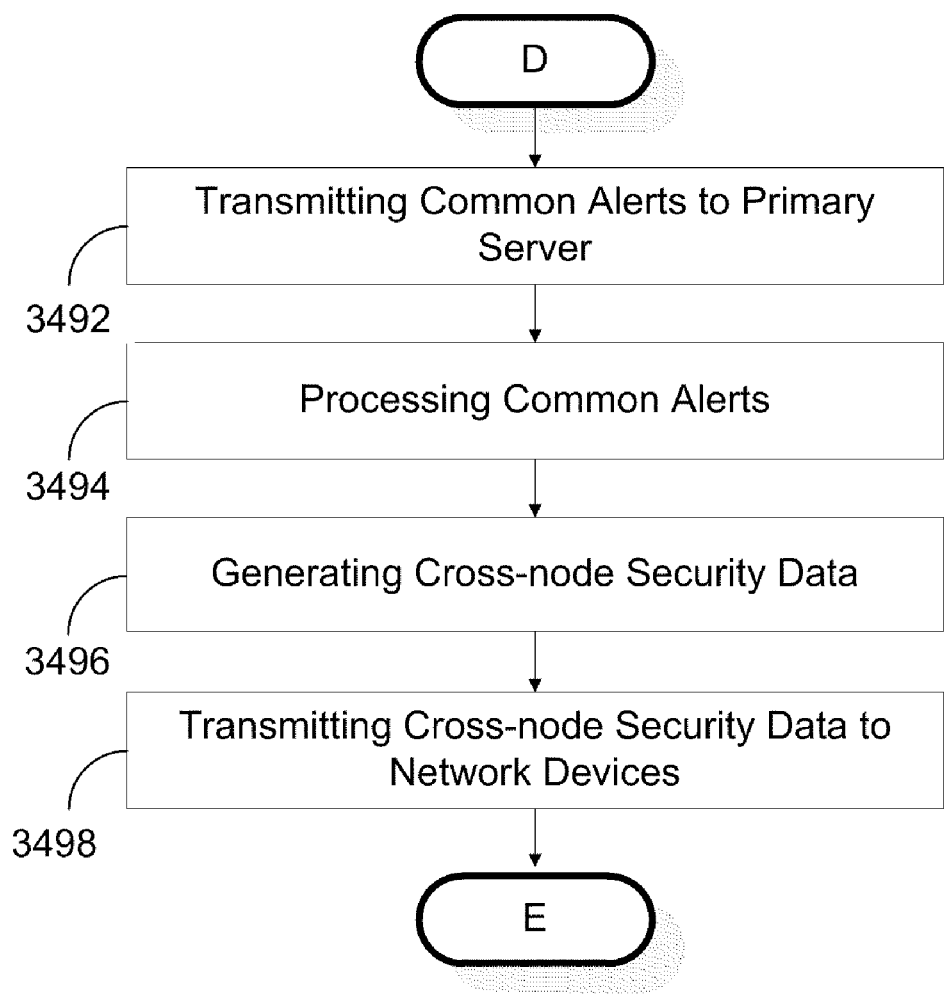

Referring to FIG. 34E, another step in the method may be transmitting one or more common alerts generated by the common alert function wherein the primary server communication interface is one of the one or more communication interfaces, as shown in block 3492. For example, a secure access node may deliver a common alert to a primary server suggesting that a social networking service may have received a virus attempting to extract banking information from the network device. A further step may be processing the one or more alerts, as shown in block 3494. The primary server may process a common alert to determine the severity of a potential security threat. For example, a social networking service attempting to extract banking information from a network device is a potentially severe security compromise. An additional step may be generating cross-node security data based on processing the one or more alerts, the cross-node security data including cross-node reconfiguration data, as shown in block 3496. For example, the primary server may generate cross-node security data warning other network devices of a social networking virus attempting to extract banking information. Another step in the method may be transmitting the cross-node security data to one or more network devices, as shown in block 3498. For example, the primary server may transmit mitt the cross-node security data stating that a social networking service may have received a virus that attempts to extract banking information from a network device. Further, the cross-node security data may include reconfiguration data for each network device supporting the social networking service to inspect social networking service data for a virus attempting to extract banking information.

Traditional dynamic, real-time initialization and reconfiguration of services on telecommunication, data networking or other types of equipment as well as personal computers and smartphones may be implemented but usually at the expense of security. For example, a personal computer or smartphone upon which new applications and system updates can be added at the expense of potential back doors being left open to viruses, worms, Trojan horses, denial of service attacks, etc. Generally, security software may find only known attacks and can prevent such attacks from reoccurring or spreading, but are mostly ineffective against new or unknown attacks. In addition, if an attempt is made to attack the personal computer or smartphone by respecting all security rules on the personal computer or smartphone (e.g. sending a valid email to a non-secure address containing proprietary information or for one service to collect data from another service and communicate it in the guise of the one service's normal communication), current systems (e.g. personal computer, smartphone, etc.) for public use may not guard against such an attack. Aspects of the present disclosure permit new applications and system updates to be performed with better security particularly against new attacks as well as to prevent attempts to extract proprietary data from a system using valid communications.

Further, aspects of the present disclosure provides a number of security measures that are based on users or services that use different functional stacks each implemented on a different virtual machine, thus, preventing cross-stack (e.g. cross-service) interference with each other in ways that could cause a security breach to one of the different stacks. In addition, aspects of the present disclosure may provide a mechanism that permits a functional stack to be added (e.g. newly provisioned) or changed (e.g. updated, reconfigured) within rules developed for existing security mechanisms in a secure way and not permitting potential security 'hole' while doing so. A secure access node or service multiplexer have minimal service awareness, thus, upgrades to such elements may be less frequently required. For example, meter reading software changes for new features and functions will not likely change a secure access node's energy management functional stack as the secure access node mostly executes commands from the server which are most likely not going to be affected.

Figure 35:
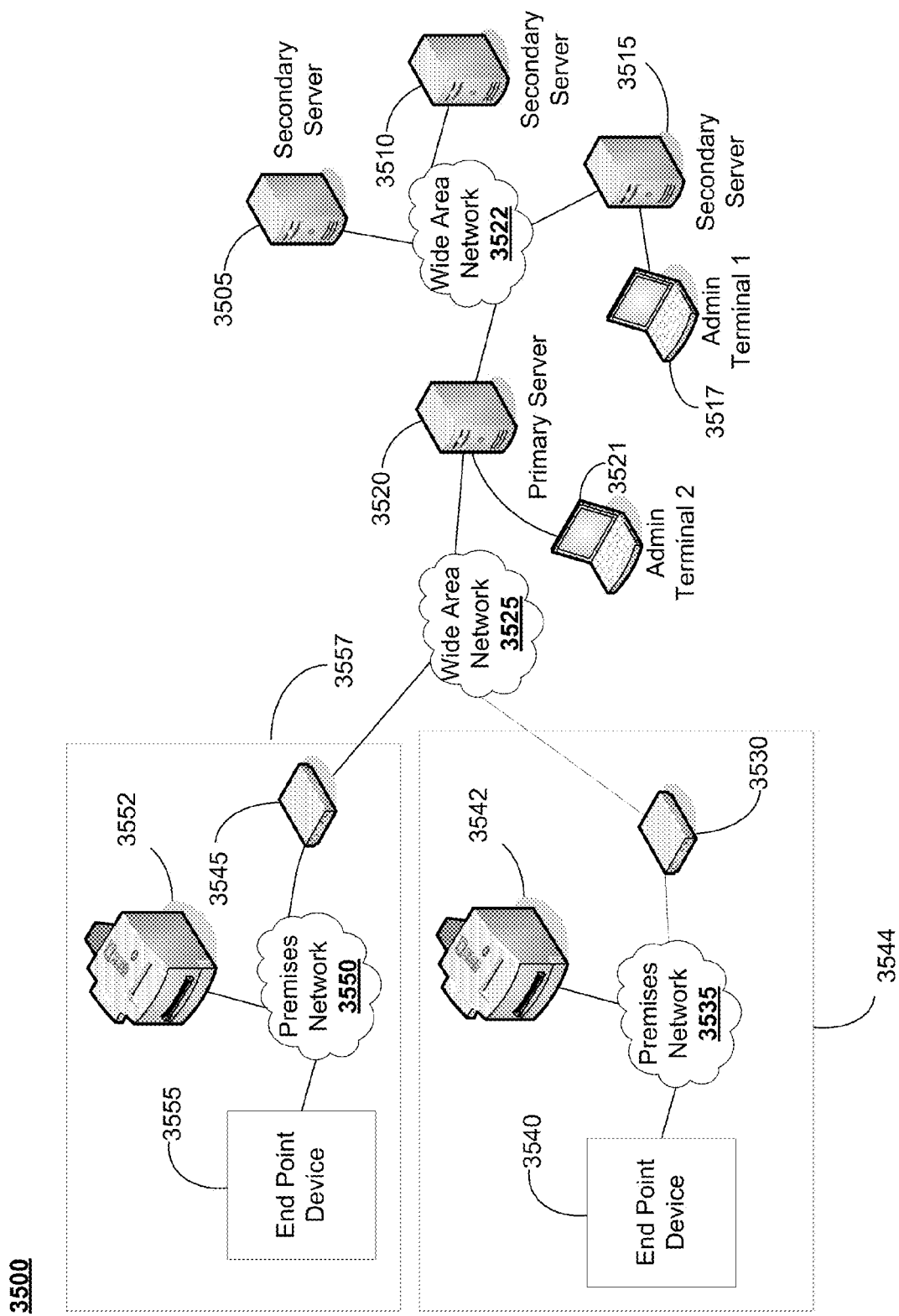
FIG. 35 provides exemplary network architecture system for enabling reconfiguration of one or more services supported by a network of one or more devices.

FIG. 35 provides exemplary network architecture for enabling reconfiguration of one or more services supported by a network of one or more devices. Note that persons of ordinary skill in the art would understand that reconfiguration may include, but is not limited to, introduction of new services and/or hardware on a network device, reconfiguration of existing services, software, or hardware, updating of existing services, software, or hardware, and replicating of existing services or software. The systems, devices, nodes, and communication networks shown in FIG. 35 may be similar to the systems, devices, nodes, and communication networks shown in FIG. 1 and FIG. 22 and as described in the present disclosure.

The exemplary network architecture 3500 may include a secondary server 3505, secondary server 3510, and secondary server 3515. Each secondary server (3505, 3510, and 3515) may be coupled to a primary server 3520 through a wide area network (WAN) 3522. Further, each secondary server (3505, 3510, and 3515) may be owned and operated by a different secondary service provider and the primary server 3520 may be owned and operated by a primary service provider. For example, a secondary server 3505 may be owned and operated by an e-commerce service provider, secondary server 3510 may be owned and operated by an energy management provider, and secondary server 3515 may be owned and operated by premises security provider. Additionally, the primary server 3520 may be owned and operated by an Internet service provider. Such an Internet service provider may provide Internet services to customer premises. Further, secondary server 3515 may be coupled to an Administration Terminal 1 (3517) that can be used by premises security provider personnel. Such personnel may assist in reconfiguring the secondary server to support a new type of service or update an existing service with additional software and/or hardware.

As shown in FIG. 35, the network architecture 3500 includes the primary server 3520 coupled to two secure access nodes (3530 and 3545) across a wide area network 3525, each secure access node (3530 and 3545) may be located in a different customer premises (3544 and 3557). Persons of ordinary skill in the art would recognize that the primary server 3520 coupled to two secure access nodes (3530 and 3545) is exemplary and that the primary server 3520 may be coupled to several more secure access nodes, if need be, across the wide area network 3525. Further, primary server 3520 may be coupled to an Administration Terminal 2 (3521) that can be used by primary service provider personnel. Such personnel may assist in reconfiguring the primary server to support a new type of service or update an existing service with additional software and/or hardware.

In one customer premises 3544, the secure access node 3530 may be coupled to an end point device 3540 and a service multiplexer 3542 across a premises network 3535. Persons of ordinary skill in the art would recognize that the secure access node 3530 coupled to the end point device 3540 and the service multiplexer 3542 are exemplary and that the secure access node 3530 may be coupled to several more end point devices, if need be, across the premises network 3535. Further, the service multiplexer 3542 may be coupled to another end point device (not shown) such as a television or personal computer to support services and functions of a service multiplexer as described in the present disclosure.

In the other customer premises 3557, the secure access node 3545 may be coupled to an end point device 3555 and a service multiplexer 3552 across a premises network 3550. The end point device 3555 may be a computer that can perform e-commerce transactions. Persons of ordinary skill in the art would recognize that the secure access node 3545 coupled to the end point device 3555 is exemplary and that the secure access node 3545 may be coupled to several more end point devices, if need be, across the premises network 3550. Further, the service multiplexer 3542 may be coupled to another end point device (not shown) such as a television or personal computer to support services and functions of a service multiplexer as described in the present disclosure.

In FIG. 35, the network architecture 3500 enables reconfiguration of one or more services supported by a network of one or more devices including, but not limited to, the secondary servers (3505, 3510, 3515), the primary server (3520), the secure access nodes (3530 and 3545), and the service multiplexers (3542 and 3552). The primary server 3520 is the first level of defense against security attacks against the network of devices such as secondary servers (3505, 3510, 3515), the primary server (3520), the secure access nodes (3530 and 3545), and the service multiplexers (3542 and 3552)). This may be because a substantial part of network communications may transit through the primary server 3520. Further, the primary server 3520 may check such communications from an application layer through physical layer of each data packet or message that may be part of the communications. Alternatively, the secondary servers (3505, 3510, and 3515) may only communicate with the secure nodes (3530 and 3545) by sending and receiving messages through the primary server (3520) which may certify that each and every message on a per packet basis is not a security threat.

If a new service is to be provided by a primary server or a secondary server, there may be two scenarios possible. First, a secure access node may already have a version of the software (and the hardware supporting the software is already in place) for the specific service. Second, a secure access node may need new software (which may need a new functional stack provisioned (see FIGS. 36A-36D and associated description)) and potentially also a new hardware module. There are other combinations possible, but for security reasons, those combinations may not be allowed.

FIGS. 36A-36D are another exemplary functional block diagrams that shows exemplary functional architecture of a network device. Further, the network device may be a secondary server, a primary server, a secure access node, or a service multiplexer as described in the present disclosure. The functional block diagram 3600 may include drivers for accessing hardware resources 3602 that may include processors, input/output (I/O) resources, storage devices, display, etc. In addition, the functional block diagram 3600 may include a device operating system (or common operating system) 3604 that may include a common kernel that may control and manage the hardware resources 3602. Also included in the functional block diagram 3600 may be a virtualizer function 3606 and privilege descriptors 3608. Another set of functions in the functional block diagram 3600 may be a common security layer 3610 that includes common security functions as well as virtual machine monitoring function. Further, the functional block diagram 3600 may include one or more virtual machines 3642-3660 implemented by one or more processors of the network device. In addition, each virtual machine may support a service and may include a service operating system 3612-3625 as well as security and data mining functions 3626-3641. The virtualizer function 3606 may generate and configure each virtual machine 3642-3660. The privilege descriptors 3608 may keep track and manage the state or status of the virtual machines 3642-3660. For example, a virtual machine may be in an active state, an inactive, state, a sleep state, a test state, etc. The virtual machine 3644 that supports the network device's administration functions may also assist in managing the functional stacks supported by each virtual machine 3646-3660. This may include receiving and replying test messages from a primary server, secondary server, or an admin terminal to ensure proper function of the updated service or the newly provisioned service.

A network device having the functional architecture 3600 shown in FIGS. 36A-36D may also have one or more communication interfaces that may include an administrative user interface coupled to an admin terminal. Further, at least one of the communication interfaces may be coupled to a communication network such as a wide area network or a premises network. In addition, the node may have one or more processors and one or more storage devices coupled to the one or more processors. Also, the network device may have one or more software applications stored in the one or more storage devices and executed by the one or more processors. The virtual machines shown in FIGS. 36A-36D may be generated and configured by one or more software applications executed by the one or more processors and stored in the one or more storage devices. In addition to each virtual machine having a service operating system and a set of data mining functions, each virtual machine may implement a set of software applications that support a service and a set of security functions that can include crisp logic and/or fuzzy logic security functions.

Further, the common layers (3602-3610) may generated and configured by one or more software applications executed by the one or more processors and stored in the one or more storage devices. In addition to a common operating system 3604 and a common security layer having virtual machine monitoring functions 3610 that include common security functions, and fuzzy logic security functions. The common security layer may have an inter-virtual machine communication integrity checking function to segregate services among the one or more functional stacks on the network device and to minimize cross-service interference among services supported by one or more functional stacks. Further, the administration function 3644 manages and controls the functional stacks and network operations, and receives and replies to messages from an administration function residing on other network devices (primary server, secondary server) through the communication interfaces. The administration function may include an administration terminal for a network operator to administer the administration function. The administration function residing in the primary server or secondary server may have an associated administration terminal (See FIG. 35) and have the functionality of originating administration messages that include test messages.

Figure 36A:
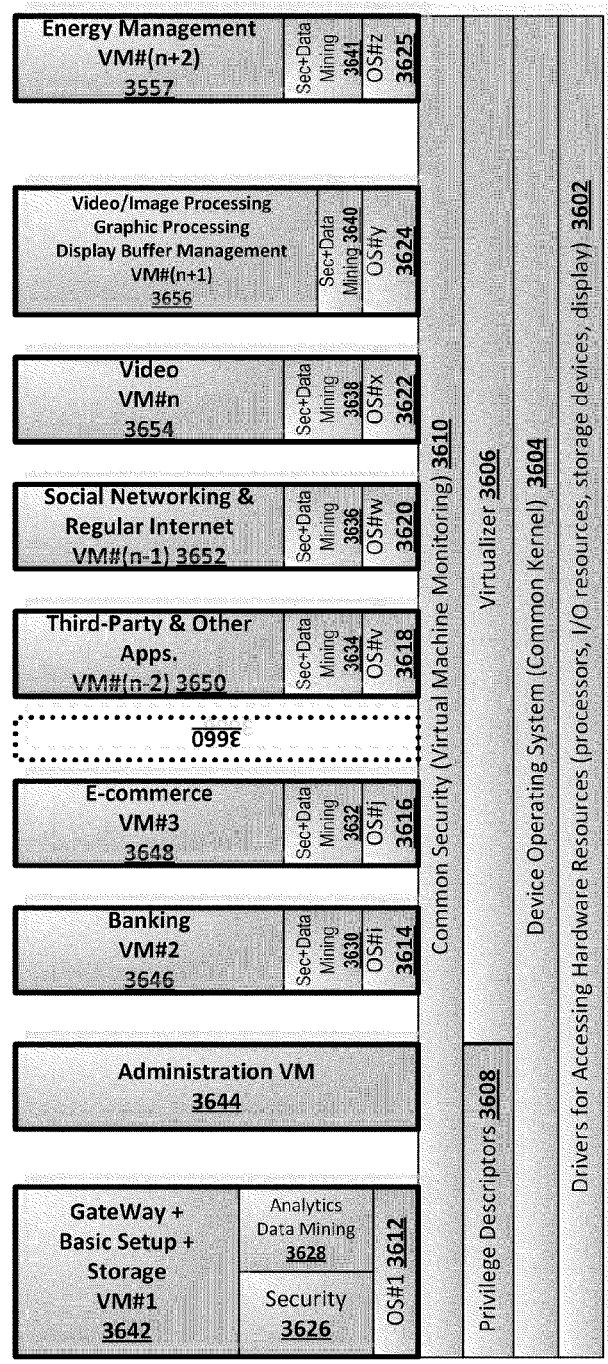
Figure 36B:
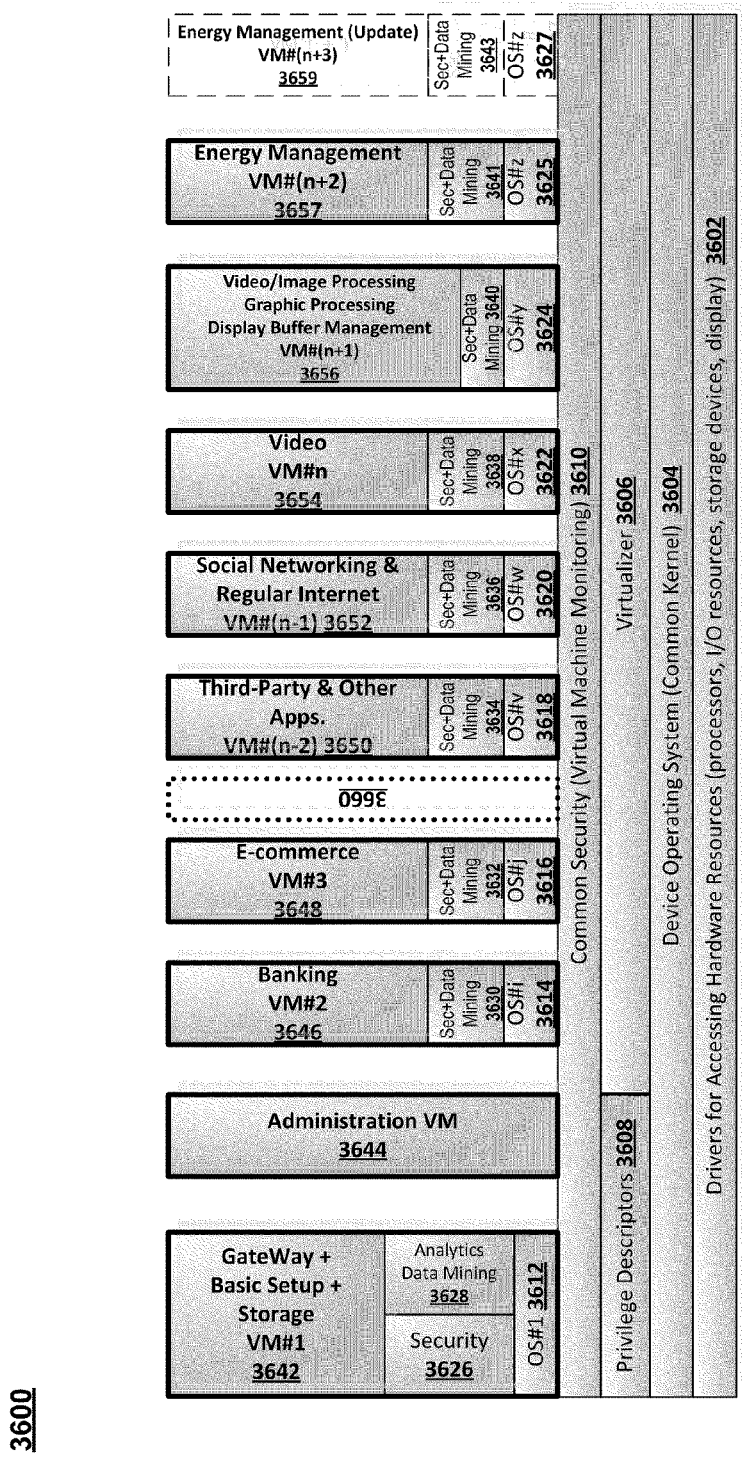

Referring to FIG. 36B, the functional block diagram 3600 of the network device (e.g. secure access node, service multiplexer, primary server, or secondary server) may be reconfigured to support an updated energy management service. Thus, a pseudo functional stack (3627, 3643, 3659) may be generated and configured on the network device dynamically and in real-time by one or more software applications executed by the one or more processors and stored in the one or more storage devices. The pseudo functional stack (3627, 3643, 3659) implemented by a virtual machine 3659 may have a service operating system 3627, a set of security functions and a set of data mining functions 3643, and a set of updated version software applications that support an updated version of the energy management service. Further, the pseudo functional stack (3627, 3643, 3659) may be associated with a privilege descriptor and a privilege status.

When updating the energy management service, the functional stack supporting the previous version of the energy management service (3625, 3641, 3657) may be associated with a privilege descriptor and a privilege status being in an active state. Further, when generating and configuring the pseudo functional stack (3627, 3643, 3659), the privilege status associated with the pseudo functional stack (3627, 3643, 3659) is in an inactive state.

Moreover, the administration function 3644 implemented by the network device may receive and reply to a first set of test messages through one of the communication interfaces on the network device. For example, if the network device is a secure access node, the administration function 3644 may receive and reply to a first set of test messages from an administration function residing on a primary server coupled to the secure access node across a communication network. Further, the administration function 3644 on the network device may send instructions to the virtualizer 3606 to modify the privilege status associated with the functional stack supporting the previous version of the energy management service (3625, 3641, 3657) to an inactive state and the privilege status associated with the pseudo functional stack (3627, 3643, 3659) to an active state to update the energy management service based on the successful execution of the first set of test messages between the secure access node and the primary server.

Figure 36C:
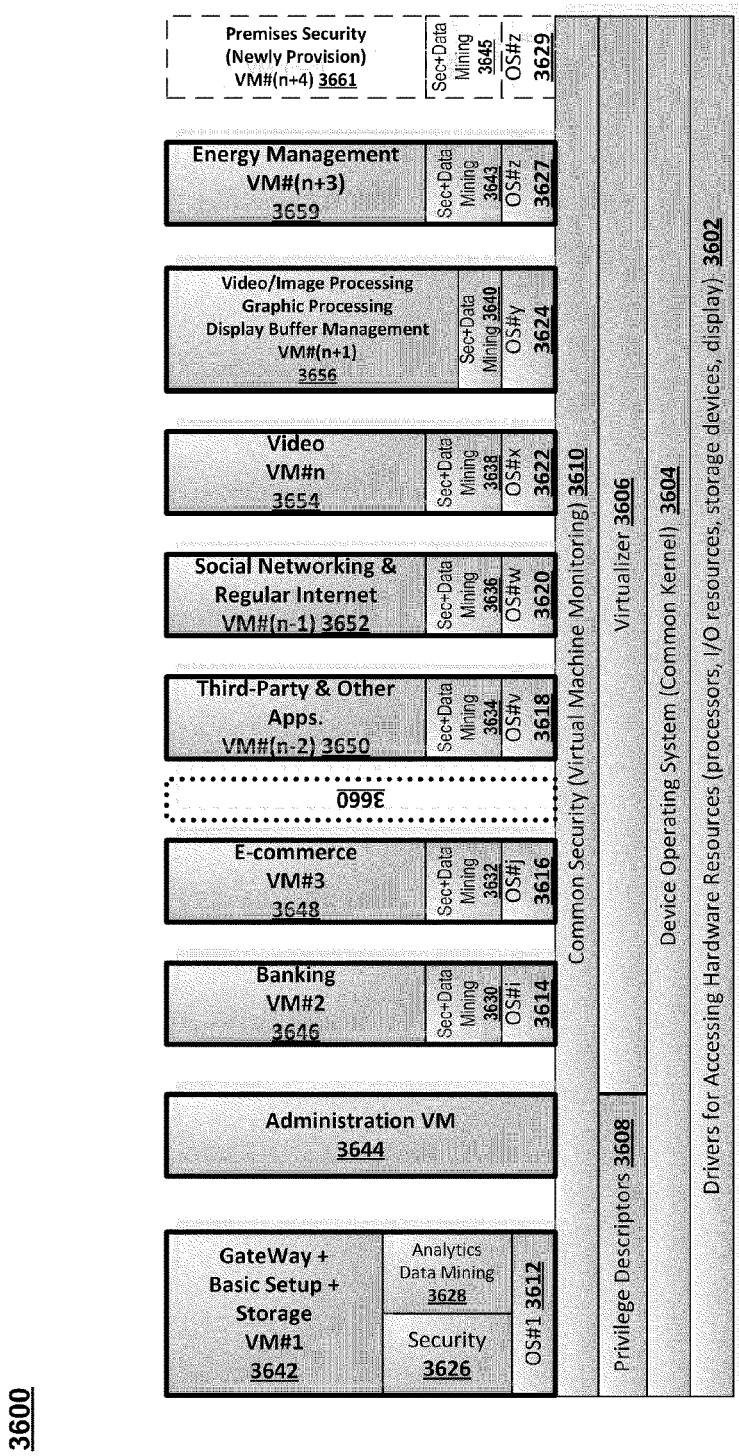

Referring to FIG. 36C, the administration function 3644 receives and replies a second set of test messages from an administration function residing on a server through one of the communication interfaces. Further, the administration function 3644 sends instructions to the virtualizer 3606 to remove the functional stack supporting the previous version of the energy management service (3625, 3641, 3657) (See FIG. 36B) from the network device by changing the privileged status and returning the resources used by the functional stack (3625, 3641, 3657) to a common pool using the common operating system based on the successful execution of the second set of test messages validating the pseudo functional stack (3627, 3643, 3659). In addition, common security functions and the fuzzy logic security functions that may be part of the common security layer 3610 are modified based on the set of updated version software applications that support the updated version of the energy management service to provide an updated version of cross-functional security between the updated energy management service and other services supported by the other virtual machines on the network device.

Moreover, a new hardware module may be introduced into the network device to support a new service. For example, the hardware module may support a premises security service such that the hardware module receives data from sensors located throughout the premises. Further, a newly provisioned virtual machine 3661 may be generated and configured dynamically in real-time by one or more software applications executed by the one or more processors and stored in the one or more storage devices on the network device. The newly provisioned virtual machine 3661 supporting a newly provisioned functional stack (3629, 3645, 3661) having a newly provisioned service operating system 3629, a set of security functions and a set of data mining functions 3645, and a set of newly provisioned software applications that support a newly provisioned premises security service. The newly provisioned functional stack (3629, 3645, 3661) has a corresponding privilege descriptor and a privilege status associated with the functional stack (3629, 3645, 3661). Initially, such a privilege status may be set to an inactive state. Further, the administration function 3644 may receive and reply to a set of test messages from the primary server through one of communication interfaces. Further, the administration function 3644 may send instructions to the virtualizer 3606 to modify the privilege status associated with the premises security functional stack (3629, 3645, 3661) to an active state based on successful execution of the set of test messages. Referring to FIG. 36D, the premises security functional stack (3629, 3645, 3661) as well as the premises security service is newly provisioned.

Figure 37B:
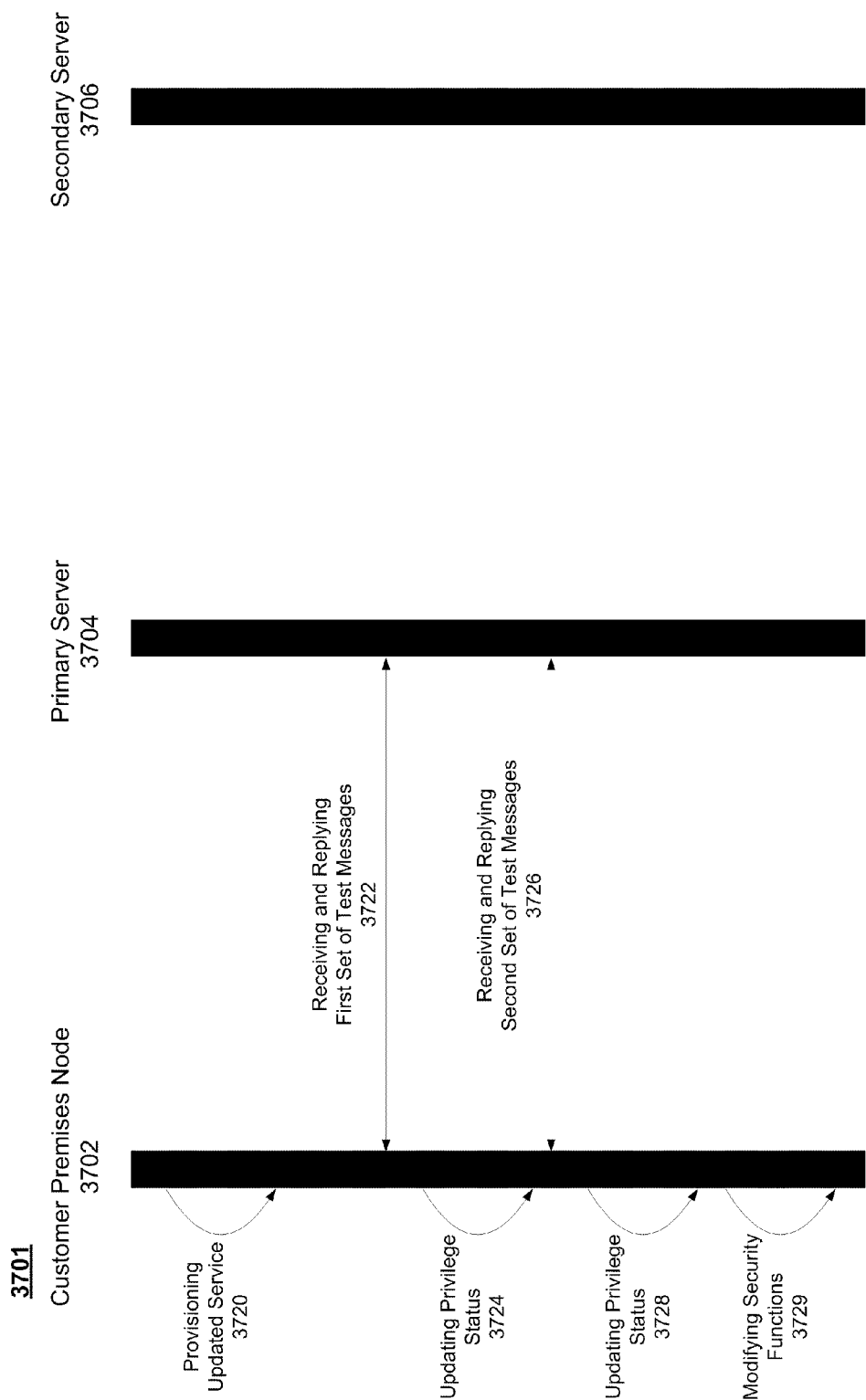

FIGS. 37A-37F are exemplary transaction diagrams that show example systems, devices and methods for enabling reconfiguration of one or more services supported by a network of one or more devices. Referring to FIG. 37A, a network of devices may include a customer premises node 3702 such as a secure access node or a service multiplexer, a primary server 3704, and a secondary server 3706, all of which are coupled and communicate with each other across one or more communication networks. Each of the customer premises node 3702, primary server 3704, and secondary server 3706 may support several services. Further, the secondary server 3706 supporting a particular service may provision an updated version of the service 3708 dynamically and in real-time. During such a provisioning process an administration terminal coupled to the secondary server 3706 may be used. For example, the secondary server 3706 may support an energy management service and may provision an updated version of such an energy management service. Thereafter, the primary server 3704 may be provisioned with the updated service 3710 dynamically and in real-time. The updated service may be supported by a functional stack implemented by a virtual machine as shown and described in FIGS. 36A-36D. Once the updated service has been provisioned on both the secondary server 3706 and primary server 3704, the primary server 3704 receives and replies to a first set of test messages 3712. Once the first set of test messages has been validated, the privilege status of a functional stack supporting the updated service is modified to an active state 3714 while the privilege status of the functional stack supporting the previous version of the service is modified to an inactive state. Further, the primary server 3704 receives and replies to a second set of test messages 3716 form the secondary server 3706. Once the second set of test messages has been validated, the privilege status of the functional stack supporting the previous version of the service is modified 3718 and the resources of such a stack are removed or reallocated to a common pool of resources on the primary server. In addition, the common security functions and the fuzzy logic security functions on the primary server 3704 are modified 3719 based on the set of updated version software applications that support an updated version of the service to provide an updated version of cross-functional security between the updated service and other services supported on the primary server.

Referring to FIG. 37B, the customer premises node 3702 may be provisioned with the updated service 3720 dynamically and in real-time. The updated service may be supported by a functional stack implemented by a virtual machine as shown and described in FIGS. 36A-36D. Note, the primary server 3704 already has the updated service provisioned. Once the updated service has been provisioned on both the primary server 3704 and the customer premises node 3702, the customer premises node 3702 receives and replies to a first set of test messages 3722. Once the first set of test messages has been validated, the privilege status of a functional stack supporting the updated service is modified to an active state 3724 while the privilege status of the functional stack supporting the previous version of the service is modified to an inactive state. Further, the customer premises node 3702 receives and replies to a second set of test messages 3726 from the primary server 3704. Once the second set of test messages has been validated, the privilege status of the functional stack supporting the previous version of the service is modified 3728 and the resources of such a stack are removed and/or reallocated to a common pool of resources on the customer premises node 3702. In addition, the common security functions and the fuzzy logic security functions on the customer premises node 3702 are modified 3729 based on the set of updated version software applications that support an updated version of the service to provide an updated version of cross-functional security between the updated service and other services supported on the customer premises node 3702.

Figure 37C:
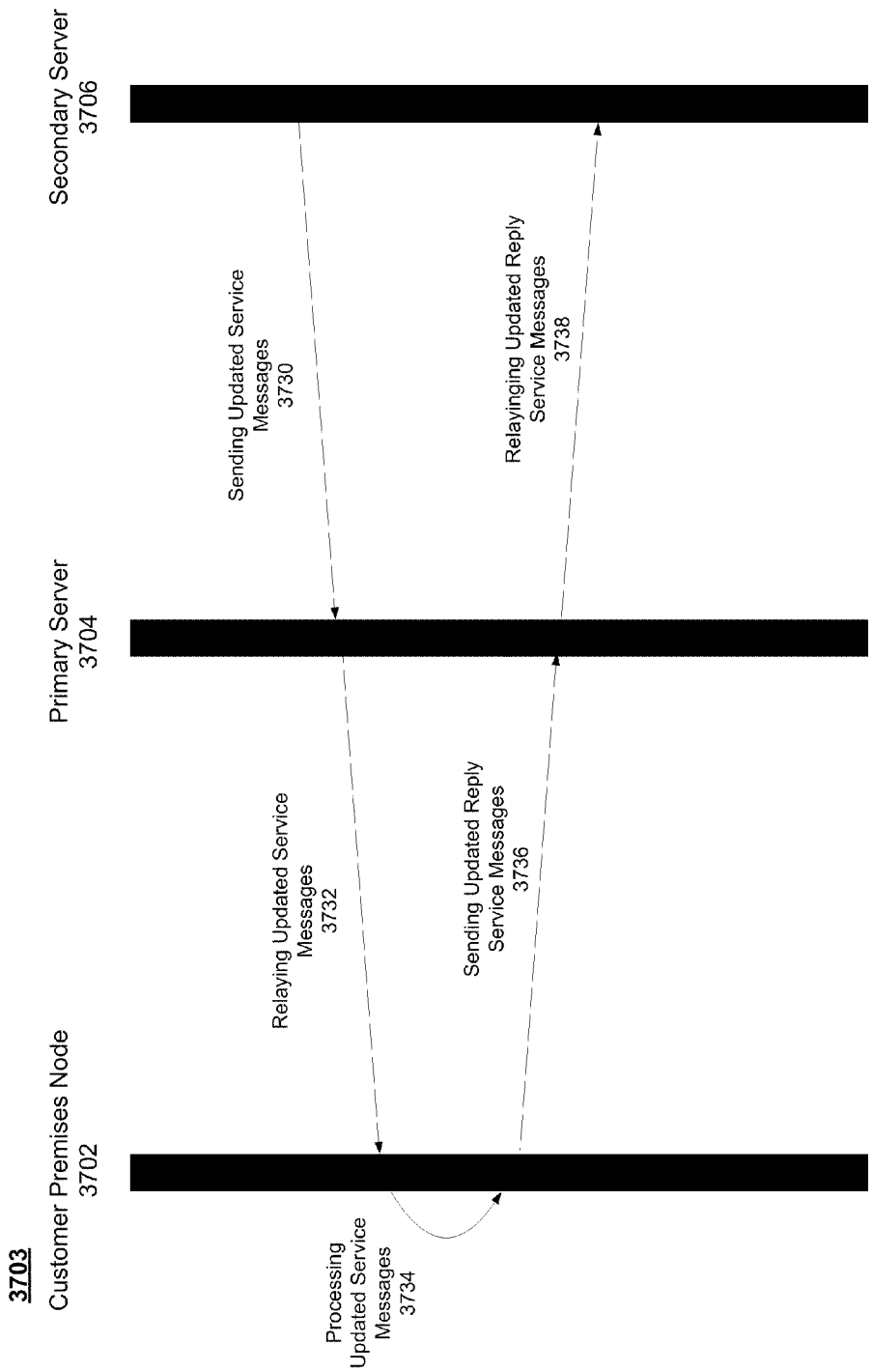

Referring to FIG. 37C, once the updated service is provisioned on the secondary server 3706, the primary server 3704, and customer premises node 3702, the network devices (3702, 3704, 3706) may exchange updated service messages to support the updated service. Particularly, the secondary server 3706 may send the primary server 3704 updated service messages 3730 and the primary server 3704 may relay the updated service messages to the customer premises node 3732. Further, the customer premises node 3702 may process the updated service messages 3734 and send updated reply service messages 3736 to the primary server 3704. In addition, the primary server 3704 may relay the updated reply service messages 3738 to the secondary server 3706. Alternative embodiments may include scenarios such that only a primary server and a secondary server are updated and a secure access node or service multiplexer need not be updated.

Figure 37D:
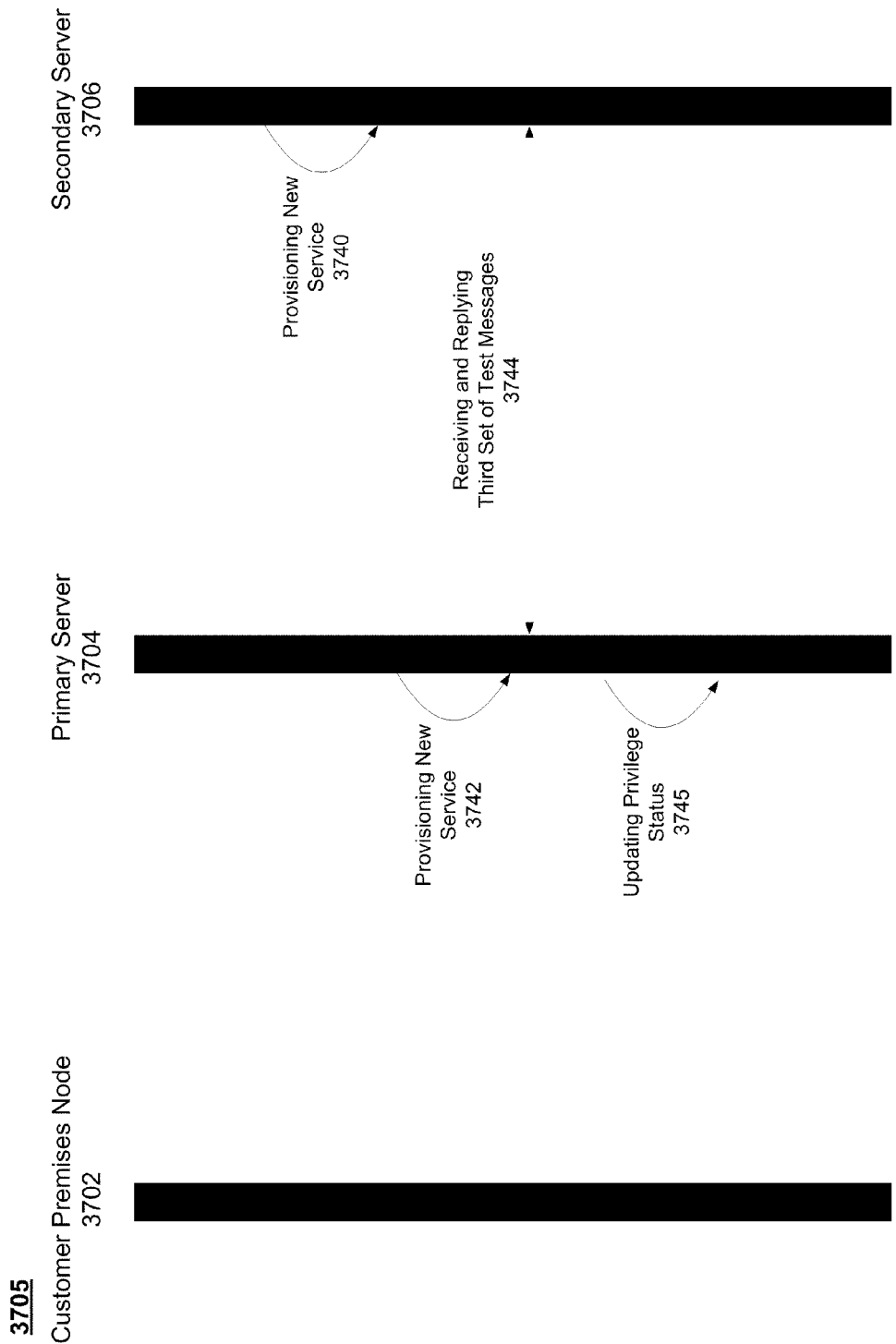

Referring to FIG. 37D, the secondary server 3706 may be provisioned with a newly introduced hardware module supporting a new service 3740 supported by a functional stack implemented by a virtual machine (See FIGS. 36A-36D). The newly provisioned functional stack has a privilege status initially being in an inactive state but then configured to an active state. Thereafter, the primary server 3704 may be provisioned with a new service 3742 supported by a functional stack implemented by a virtual machine (See FIGS. 36A-36D). The newly provisioned functional stack has a privilege status initially being in an inactive state. Further, the primary server 3704 receives and replies to a third set of test messages 3744 from the secondary server 3706 through one of the communication interfaces on the primary server. On validation of the third set of test messages, the privilege status of the functional stack supporting the updated service on the primary server 3704 is updated to an active state 3745.

Figure 37E:
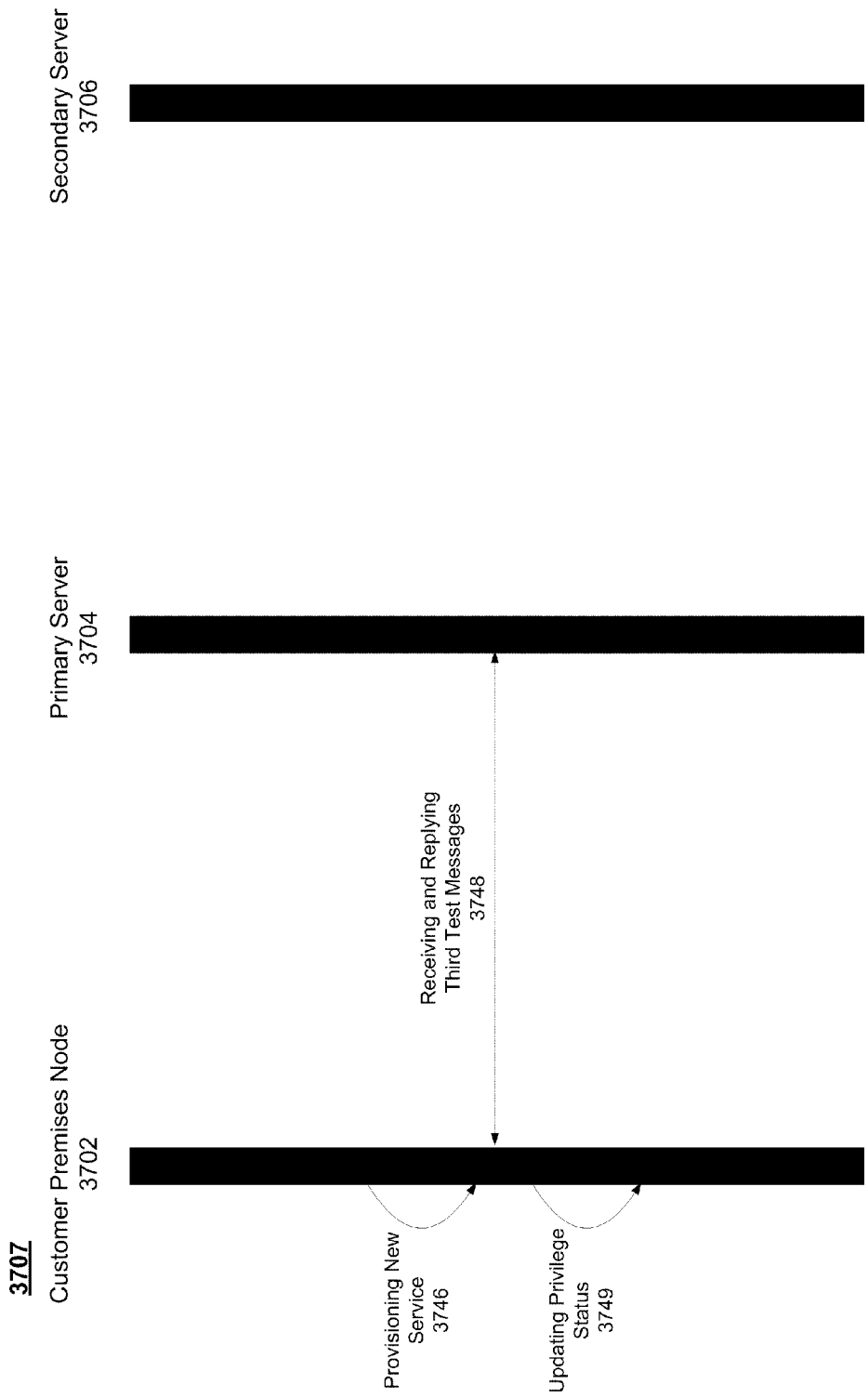

Referring to FIG. 37E, the customer premises node 3702 may be provisioned with a newly introduced hardware module supporting a new service 3746 supported by a functional stack implemented by a virtual machine (See FIGS. 36A-36D). The newly provisioned functional stack has a privilege status initially being in an inactive state. Further, the customer premises node 3702 receives and replies to a third set of test messages 3748 from the primary server 3704 through one of the communication interfaces on the customer premises node. On validation of the third set of test messages, the privilege status of the functional stack supporting the updated service on the customer premises node 3702 is updated to an active state 3749.

Figure 37F:
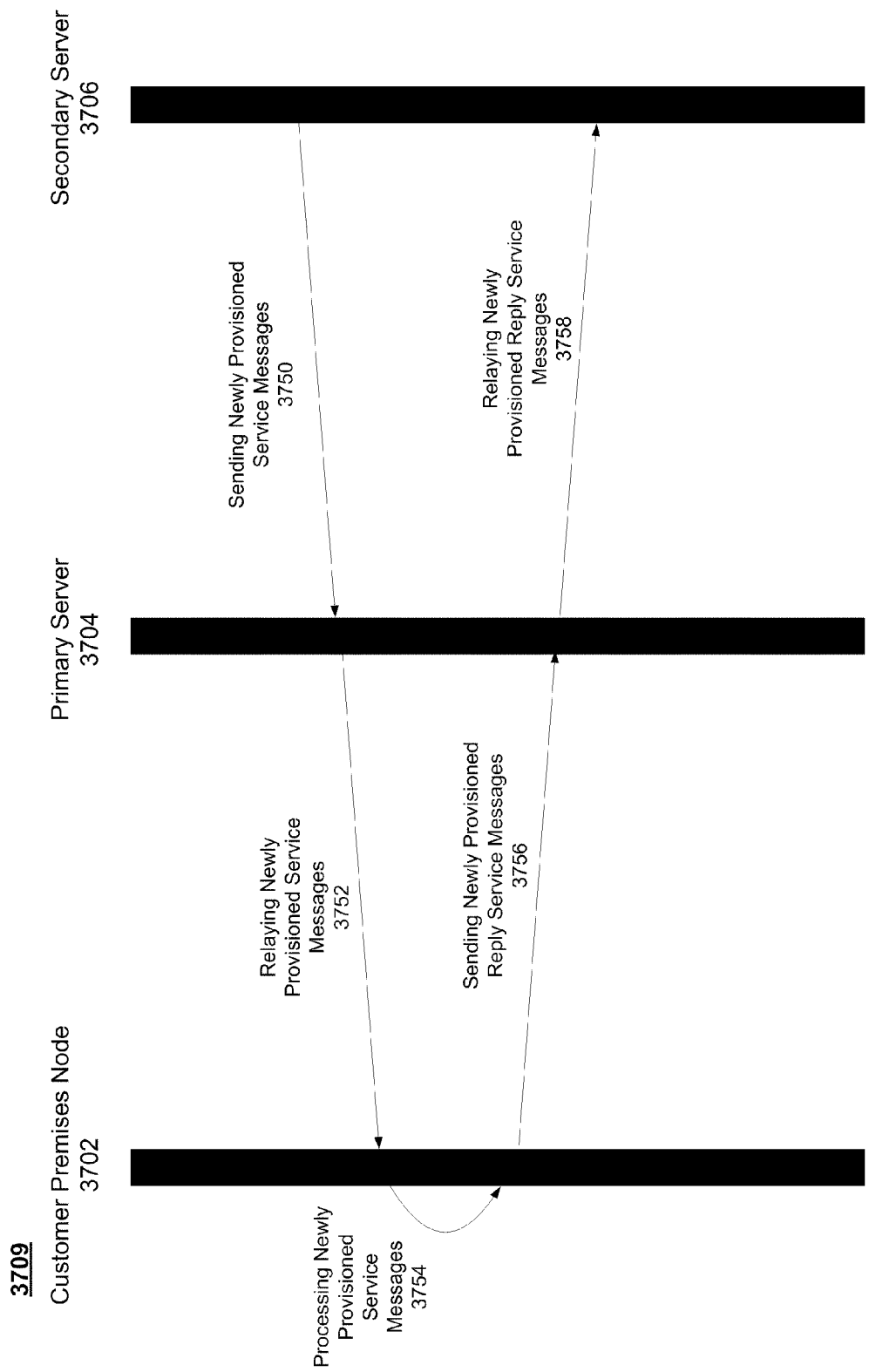

Referring to FIG. 37F, once the newly provisioned service is configured on the secondary server 3706, the primary server 3704, and customer premises node 3702, the network devices (3702, 3704, 3706) may exchange newly provisioned service messages to support the newly provisioned service. Particularly, the secondary server 3706 may send the primary server 3704 newly provisioned service messages 3750 and the primary server 3704 may relay the newly provisioned service messages to the customer premises node 3752. Further, the customer premises node 3702 may process the newly provisioned service messages 3754 and send newly provisioned reply service messages 3756 to the primary server 3704. In addition, the primary server 3704 may relay the newly provisioned reply service messages 3758 to the secondary server 3706. Alternative embodiments may include scenarios such that only a primary server and a secondary server are updated and a secure access node or service multiplexer need not be updated.

Figure 38A:
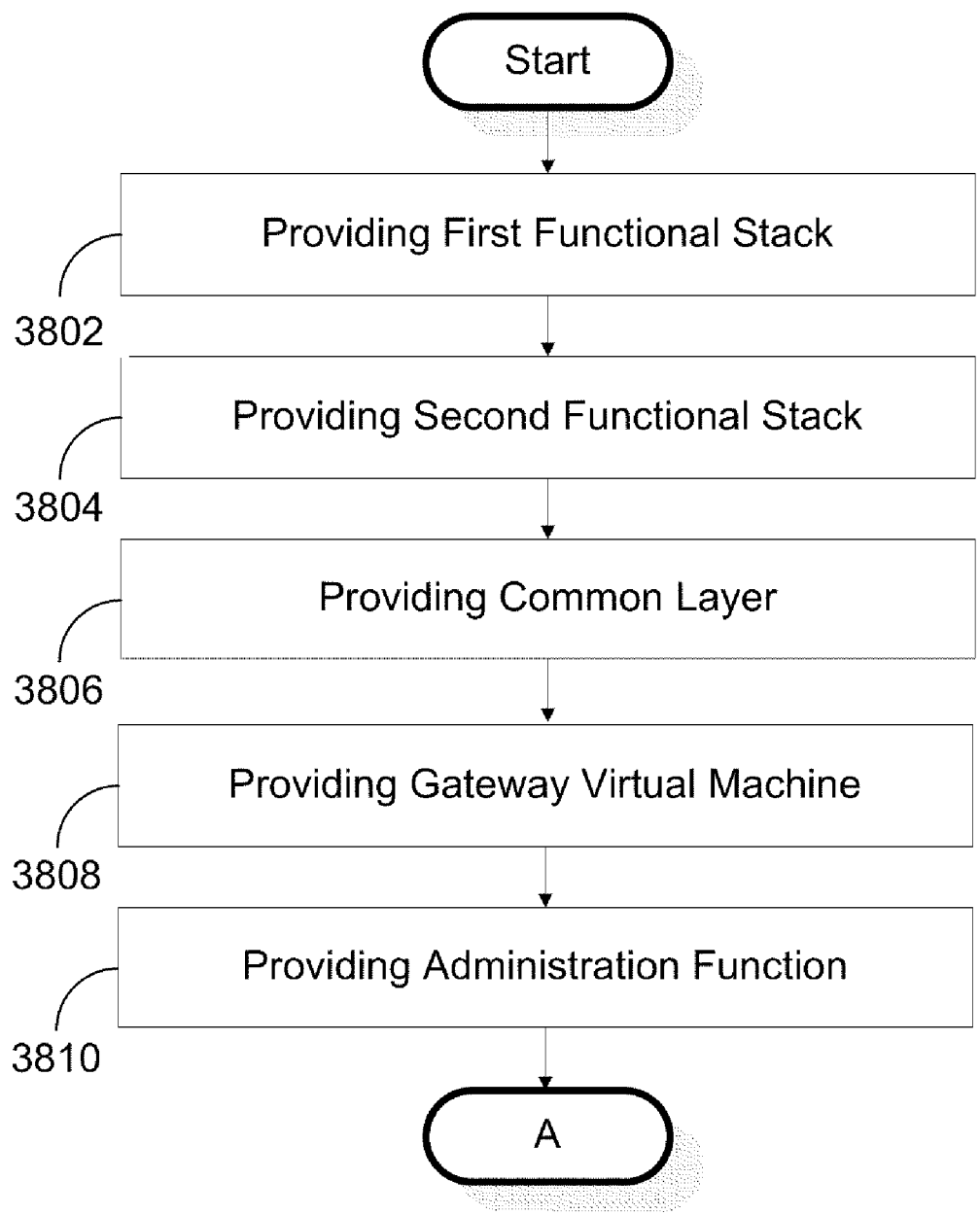
FIGS. 38A-38C show exemplary flowcharts that show example methods for enabling reconfiguration of one or more services supported by a network of one or more devices.
Figure 38B:
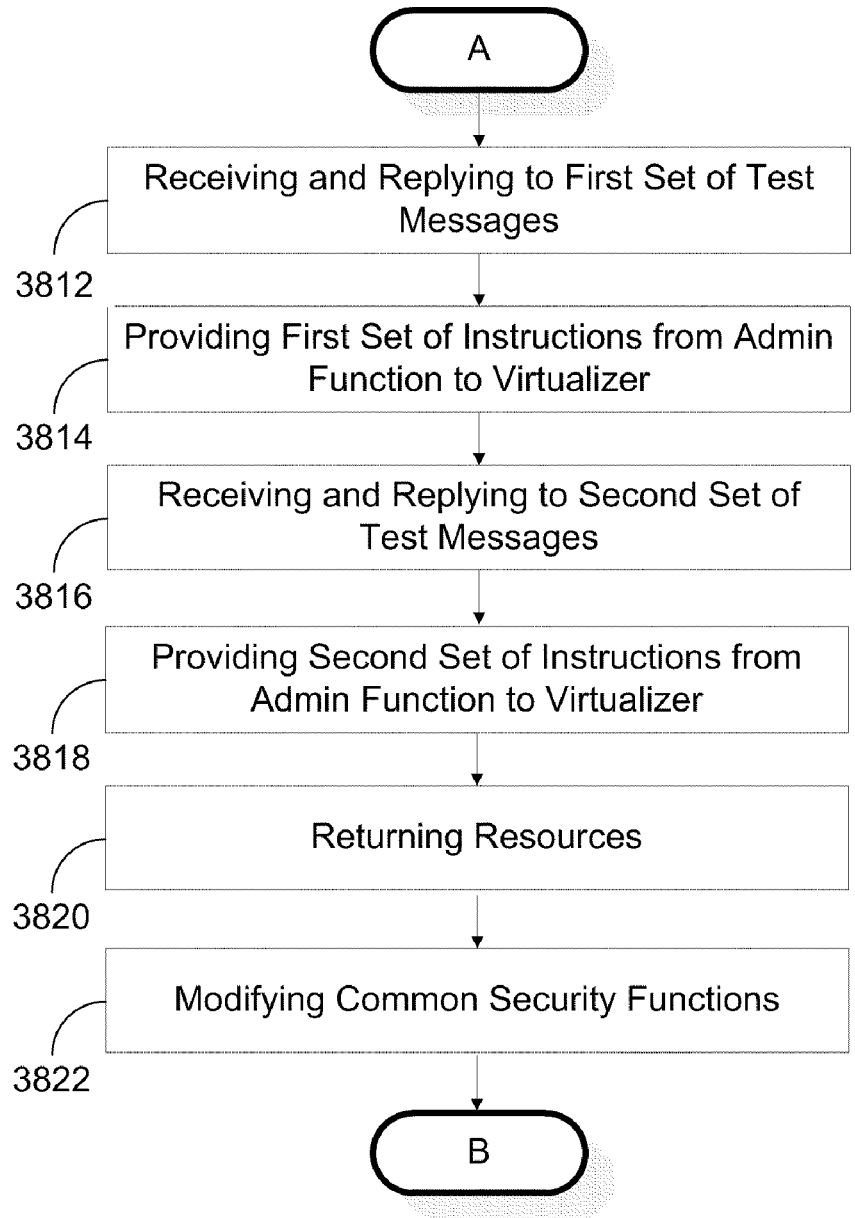
Figure 38C:
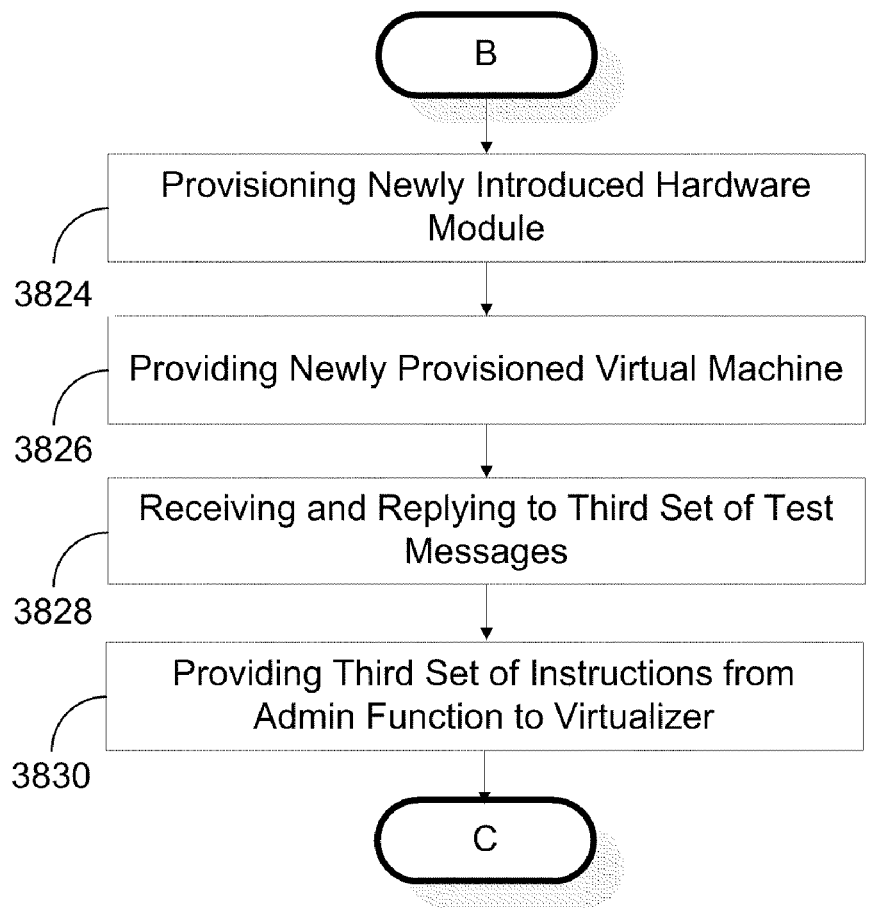

FIGS. 38A-38C show exemplary flowcharts that show example methods for enabling reconfiguration of one or more services supported by a network of one or more devices. A first step in the example methods may be providing a first functional stack implemented by a first virtual machine, the first functional stack having a first service operating system, a first set of security functions, a first set of data mining functions, and set of previous version software applications that support a previous version of a first service, as shown in block 3802. A further step in the example methods may be providing a second functional stack by a second virtual machine dynamically and in real-time, the second (pseudo) functional stack having a second service operating system, a second set of security functions, a second set of data mining functions, and set of updated version software applications that support an updated version of the first service, as shown in block 3804.

Another step may be providing a common layer generated and configured by one or more software applications executed by the one or more processors and stored in the one or more storage devices, as shown in block 3806. The common layer may include a common operating system and a common security layer having virtual machine monitoring functions, common security functions, fuzzy logic security functions, and an inter-virtual machine communication integrity checking function to segregate services among the one or more functional stack one the network devices and to minimize cross-service interference among services supported by one or more functional stacks. Additionally, the common layer may include one or more privilege descriptors, each privilege descriptor associated with a privilege status having one or more states. Further, each privilege descriptor and privilege status may correspond to a functional stack. Also, the common layer may include a virtualizer function that manages the one or more privilege descriptors and the state of the privilege status of each privilege descriptor. Moreover, the common operating system includes a common kernel that receives instructions from one or more software functions on a device and controls hardware resources (e.g. processors, storage devices, input/output resources, display components, etc.), A further step in the example methods may be providing a gateway virtual machine having a gateway functional stack providing basic network interface functions for the device that includes a gateway operating system, gateway security functions, gateway data mining functions, and set of gateway software applications that support gateway and basic services, as shown in block 3808. An additional step may be providing an administration function that manages and controls the functional stacks and network operations of the device, and receives and replies to messages from an administration function residing on other devices through one or more communication interfaces, as shown in block 3810. Note, one of the privilege descriptors is a first privilege descriptor corresponding to a first privilege status of the first functional stack and one of the privilege descriptors is a second privilege descriptor corresponding to a second privilege status of the second functional stack. The first privilege status is in an active state and the second privilege status is in an inactive state. Further, the first virtual machine, the second virtual machine, the gateway virtual machine, and the administrative function each are coupled to one of the communication interfaces on the device that may include an administrative user interface coupled to an administration terminal. Also, at least one of the communication interfaces is coupled to a communication network.

Referring to FIG. 38B, another step in the example methods may be receiving and replying to a first set of test messages by the administration function on the device from one of the communication interfaces, as shown in block 3812. A further step may be providing a first set of instructions from the administration function to the virtualizer to modify the first privilege status to an inactive state and the second privilege status to an active state to update the first service based on the successful execution of the first set of test messages, as show in block 3814. An additional step may be receiving and replying to a second set of test messages by the administration function from one of the communication interfaces, as shown in block 3816. Another step may be providing instructions from the administration function to the virtualizer to remove the first functional stack from the device and the virtualizer modifying the privileged status of the first functional stack based on the successful execution second set of test messages validating the second functional stack, as shown in block 3818. Another step in the example methods may be returning the resources used by the first functional stack to a common pool using the common operating system, as shown in block 3820. A further step may be modifying the common security functions and the fuzzy logic security functions based on the set of updated version software applications that support an updated version of the service to provide an updated version of cross-functional security between the updated service and other services supported by the device, as shown in block 3822.

Referring to FIG. 38C, another step in the example methods may be provisioning a newly introduced hardware module, as shown in block 3824. A further step may be providing a newly provisioned virtual machine generated and configured dynamically in real-time by one or more software applications executed by the one or more processors and stored in the one or more storage devices on the device. The newly provisioned virtual machine supporting a newly provisioned functional stack may have a newly provisioned service operating system, a set of security functions, a set of data mining functions, and set of newly provisioned software applications that support a newly provisioned service, as shown in block 3826. The newly provisioned functional stack has a corresponding privilege descriptor and a privilege status initially being in an inactive state. An additional step may be receiving and replying to a third set of test messages from one of the communication interfaces, as shown in block 3828. Another step may be providing instructions from the administration function to the virtualizer to modify the privilege status of the newly provisioned functional stack to an active state based on successful execution of the third set of test messages, as shown in block 3830.

Persons of ordinary skill in the art would understand that the examples described in the present disclosure are illustrative and not limiting and that the concepts illustrated in the examples may be applied to other examples and embodiments.

Note that the functional blocks, methods, devices and systems described in the present disclosure may be integrated or divided into different combination of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system for enabling reconfiguration of one or more services supported by a network of one or more devices, the system comprising:
   (a) a communication network;
   (b) a set of one or more devices coupled to the communication network wherein a primary server and each of a set of one or more secondary servers, a set of one or more secure access nodes, and a set of one or more service multiplexers is a device from the set of one or more devices;
   (c) each of the devices having:
      (i) one or more communication interfaces that includes an administrative user interface wherein at least one of the one or more communication interfaces is coupled to the communication network;
      (ii) one or more processors;
      (iii) one or more storage devices coupled to the one or more processors;
      (iv) one or more software applications stored in the one or more storage devices and executed by the one or more processors;
      (v) one or more virtual machines generated and configured by one or more software applications executed by the one or more processors and stored in the one or more storage devices, each virtual machine implementing a functional stack with a corresponding operating system, the functional stack supporting one or more services and capable of being reconfigured dynamically in real-time;
      (vi) a common layer generated and configured by one or more software applications executed by the one or more processors and stored in the one or more storage devices, the common layer having a common operating system and common security functions that segregate services supported by each functional stack on each virtual machine and minimize cross-service interference between services supported by each functional stack on each virtual machine during the reconfiguration of one or more functional stacks wherein the common operating system includes a common kernel that receives instructions from one or more software functions on the device and controls hardware resources, wherein the hardware resources include the one or more processors, the one or more storage devices, one or more input/output resources, and one or more display components;
      (vii) a gateway virtual machine having a gateway functional stack providing basic network interface functions for the device that includes a gateway operating system, gateway security functions, gateway data mining functions, and set of gateway software applications that support gateway and basic services;
      (viii) an administration function that manages and controls the functional stacks and network operations, and receives and replies to messages from an administration function of other devices through the one or more communication interfaces.

2. The system of claim 1, wherein each device includes:
   (a) a first virtual machine generated and configured by one or more software applications executed by the one or more processors and stored in the one or more storage devices, a first virtual machine supporting a first functional stack, the first functional stack having a first service operating system, a first set of security functions, a first set of data mining functions, and set of previous version software applications that support a previous version of a first service;
   (b) a second virtual machine generated and configured dynamically in real-time by one or more software applications executed by the one or more processors and stored in the one or more storage devices on the device, the second virtual machine supporting a second functional stack, the second functional stack having a second service operating system, a second set of security functions, a second set of data mining functions, and a set of updated version software applications that support an updated version of the first service;
   (c) a common security layer generated and implemented by the common layer, the common security layer including virtual machine monitoring functions, common security functions, fuzzy logic security functions, and an inter-virtual machine communication integrity checking function to segregate services among the one or more functional stacks on the devices and to minimize cross-service interference among services supported by the one or more functional stacks.

3. The system of claim 2, wherein the common layer further implements a virtualizer function that manages one or more privilege descriptors and a state of a privilege status of each privilege descriptor, each privilege descriptor and privilege status corresponding to a functional stack wherein one of the one or more privilege descriptors is a first privilege descriptor corresponding to a first privilege status of the first functional stack and one of the one or more privilege descriptors is a second privilege descriptor corresponding to a second privilege status of the second functional stack; wherein the first privilege status is in an active state and the second privilege status is in an inactive state.

4. The system of claim 3, wherein the administration function implemented by the device receives and replies to a first set of test messages from the one or more communication interfaces and the administration function sends a first set of instructions to the virtualizer to modify the first privilege status to an inactive state and the second privilege status to an active state to update the first service based on successful execution of the first set of test messages.

5. The system of claim 4, wherein the administration function receives and replies to a second set of test messages from the one or more communication interfaces, the administration function sends a second set of instructions to the virtualizer to remove the first functional stack from the device by changing the first privilege status to a null state and returning resources used by the first functional stack to a common pool using the common operating system based on successful execution of the second set of test messages validating the second functional stack.

6. The system of claim 2, wherein the common security functions and the fuzzy logic security functions are modified based on the set of updated version software applications that support an update version of the service to provide an updated version of cross-functional security between the updated service and other services supported by the device.

7. The system of claim 1, wherein the device includes:
(a) a newly introduced hardware module;
(b) a newly provisioned virtual machine generated and configured dynamically in real-time by one or more software applications executed by the one or more processors and stored in the one or more storage devices on the device, the newly provisioned virtual machine supporting a newly provisioned functional stack, the newly provisioned functional stack having a newly provisioned service operating system, a third set of security functions, a third set of data mining functions, and a set of newly provisioned software applications that support a newly provisioned service;
(c) wherein the newly provisioned functional stack has a corresponding third privilege descriptor and a third privilege status initially being in an inactive state.

8. The system of claim 7, wherein the administration function implemented by the device receives and replies to a third set of test messages from the one or more communication interfaces, the administration function sends a third set of instructions to the virtualizer to modify the third privilege status to an active state based on successful execution of the third set of test messages.

9. A device enabling reconfiguration of one or more services supported by the device, the device comprising:
(a) one or more communication interfaces that includes an administrative user interface wherein at least one of the one or more communication interfaces is coupled to the communication network;
(b) one or more processors;
(c) one or more storage devices coupled to the one or more processors;
(d) one or more software applications stored in the one or more storage devices and executed by the one or more processors;
(e) a first virtual machine generated and configured by one or more software applications executed by the one or more processors and stored in the one or more storage devices, a first virtual machine supporting a first functional stack, the first functional stack having a first service operating system, a first set of security functions, a first set of data mining functions, and set of previous version software applications that support a previous version of a first service;
(f) a second virtual machine generated and configured dynamically and in real-time by one or more software applications executed by the one or more processors and stored in the one or more storage devices, the second virtual machine supporting a second functional stack, the second functional stack having a second service operating system, a second set of security functions, a second set of data mining functions, and a set of updated version software applications that support an updated version of the first service;
(g) a common layer generated and configured by one or more software applications executed by the one or more processors and stored in the one or more storage devices, the common layer including (i) a common operating system and a common security layer having virtual machine monitoring functions, common security functions, fuzzy logic security functions, and an inter-virtual machine communication integrity checking function to segregate services among the one or more functional stacks one the network devices and to minimize cross-service interference among services supported by one or more functional stacks; (ii) one or more privilege descriptors, each privilege descriptor having a privilege status, the privilege status of each privilege descriptor having one or more states; and (iii) a virtualizer function that manages the one or more privilege descriptors and the state of the privilege status of each privilege descriptor, each privilege descriptor and privilege status corresponding to a function stack, wherein the common operating system includes a common kernel that receives instructions from one or more software functions on the device and controls hardware resources, wherein the hardware resources include the one or more processors, the one or more storage devices, one or more input/output resources, and one or more display components;
(h) a gateway virtual machine having a gateway functional stack providing basic network interface functions for the device that includes a gateway operating system, gateway security functions, gateway data mining functions, and set of gateway software applications that support gateway and basic services;
(i) an administration function that manages and controls the functional stacks and network operations, and receives and replies to messages from an administration function of other devices through the one or more communication interfaces;
(j) wherein one of the one or more privilege descriptors is a first privilege descriptor corresponding to a first privilege status of the first functional stack and one of the one or more privilege descriptors is a second privilege descriptor corresponding to a second privilege status of the second functional stack; wherein the first privilege status is in an active state and the second privilege status is in an inactive state.

10. The device of claim 9, wherein the administration function implemented by the device receives and replies a first set of test messages from the one or more communication interfaces and the administration function sends a first set of instructions to the virtualizer to modify the first privilege status to an inactive state and the second privilege status to an active state to update the first service based on the successful execution of the first set of test messages.

11. The device of claim 10, wherein the administration function receives and replies a second set of test messages from the one or more communication interfaces to the administration function sends a second set of instructions to the virtualizer to remove the first functional stack from the device by changing the privileged status and returning the resources used by the first functional stack to a common pool using the common operating system based on the successful execution of the second set of test messages validating the second functional stack.

12. The device of claim 11, wherein the common security functions and the fuzzy logic security functions are modified based on the set of updated version software applications that support an updated version of the service to provide an updated version of cross-functional security between the updated service and other services supported by the device.

13. The device of claim 9, the device further comprising:
(a) a newly introduced hardware module;
(b) a newly provisioned virtual machine generated and configured dynamically in real-time by one or more software applications executed by the one or more processors and stored in the one or more storage devices on the device, the newly provisioned virtual machine supporting a newly provisioned functional stack, the newly provisioned functional stack having a newly provisioned service operating system, a third set of security functions, a third set of data mining functions, and a set of newly provisioned software applications that support a newly provisioned service;
(c) wherein the newly provisioned functional stack has a corresponding third privilege descriptor and a third privilege status initially being in an inactive state.

14. The device of claim 13, wherein the administration function implemented by the device receives and replies to a third set of test messages from the one or more communication interfaces, the administration function sends a third set of instructions to the virtualizer to modify the third privilege status to an active state based on successful execution of the third set of test messages.

15. A method for enabling reconfiguration of one or more services supported by a device, the method comprising:
(a) providing a first functional stack by a first virtual machine, the first functional stack having a first service operating system, a first set of security functions, a first set of data mining functions, and set of previous version software applications that support a previous version of a first service;
(b) providing a second functional stack by a second virtual machine dynamically and in real-time, the second functional stack having a second service operating system, a second set of security functions, a second set of data mining functions, and set of updated version software applications that support an update version of the first service;
(c) providing a common layer generated and configured by one or more software applications executed by the one or more processors and stored in the one or more storage devices, the common layer including (i) a common operating system and a common security layer having virtual machine monitoring functions, common security functions, fuzzy logic security functions, and an inter-virtual machine communication integrity checking function to segregate services among the one or more functional stacks one the network devices and to minimize cross-service interference among services supported by one or more functional stacks; (ii) one or more privilege descriptors, each privilege descriptor having a privilege status, the privilege status of each privilege descriptor having one or more states, each privilege descriptor and privilege status corresponding to a function stack; and (iii) a virtualizer function that manages the one or more privilege descriptors and the state of the privilege status of each privilege descriptor wherein the common operating system includes a common kernel that receives instructions from one or more software functions on the device and controls hardware resources, wherein the hardware resources include the one or more processors, the one or more storage devices, one or more input/output resources, and one or more display components;
(d) providing a gateway virtual machine having a gateway functional stack providing basic network interface functions for the device that includes a gateway operating system, gateway security functions, gateway data mining functions, and set of gateway software applications that support gateway and basic services;
(e) providing an administration function that manages and controls the functional stacks and network operations, and receives and replies to messages from an administration function of other devices through one or more communication interfaces;
(f) wherein one of the one or more privilege descriptors is a first privilege descriptor corresponding to a first privilege status of the first functional stack and one of the one or more privilege descriptors is a second privilege descriptor corresponding to a second privilege status of the second functional stack; wherein the first privilege status is in an active state and the second privilege status is in an inactive state;
(g) wherein the first virtual machine, the second virtual machine, the gateway virtual machine, and the administrative function each are coupled to the one or more communication interfaces that includes an administrative user interface wherein at least one of the one or more communication interfaces is coupled to a communication network.

16. The method of claim 15, further comprising:
(a) receiving and replying to a first set of test messages by the administration function on the device from the one or more communication interfaces; and
(b) providing a first set of instructions from the administration function to the virtualizer to modify first privilege status to an inactive state and the second privilege status to an active state to update the first service based on the successful execution of the first set of test messages.

17. The method of claim 16, further comprising:
(a) receiving and replying to a second set of test messages by the administration function from the one or more communication interfaces;
(b) providing a second set of instructions from the administration function to the virtualizer to remove the first functional stack from the device and virtualizer modifying the privileged status of the first functional stack based on the successful execution second set of test messages validating the second functional stack;
(c) returning the resources used by the first functional stack to a common pool using the common operating system.

18. The method of claim 15, further comprising modifying the common security functions and the fuzzy logic security functions based on the set of updated version software applications that support an updated version of the service to provide an updated version of cross-functional security between the updated service and other services supported by the device.

19. The method of claim 15, the method further comprising:
(a) provisioning a newly introduced hardware module;
(b) providing a newly provisioned virtual machine generated and configured dynamically in real-time by one or more software applications executed by the one or more processors and stored in the one or more storage devices on the device, the newly provisioned virtual machine supporting a newly provisioned functional stack, the newly provisioned functional stack having a newly provisioned service operating system, a third set of security functions, a third set of data mining functions, and set of newly provisioned software applications that support a newly provisioned service;
(c) wherein the newly provisioned functional stack has a corresponding third privilege descriptor and a third privilege status initially being in an inactive state.

20. The method of claim 19, further comprising:
(a) receiving and replying to a third set of test messages from the one or more communication interfaces;
(b) providing a third set of instructions from the administration function to the virtualizer to modify the third privilege status to an active state based on successful execution of the third set of test messages.

* * * * *